(12) United States Patent
Kusakabe et al.

(10) Patent No.: US 7,372,594 B1
(45) Date of Patent: May 13, 2008

(54) IMAGE PROCESSING APPARATUS AND METHOD, AND STORAGE MEDIUM

(75) Inventors: Minoru Kusakabe, Yokohama (JP); Nobutaka Miyake, Yokohama (JP); Kiyoshi Umeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1003 days.

(21) Appl. No.: 09/671,623

(22) Filed: Sep. 28, 2000

(30) Foreign Application Priority Data

| Sep. 30, 1999 | (JP) | ................................. 11-278953 |
| Sep. 30, 1999 | (JP) | ................................. 11-279379 |
| Sep. 30, 1999 | (JP) | ................................. 11-279382 |
| Sep. 30, 1999 | (JP) | ................................. 11-279984 |
| Sep. 30, 1999 | (JP) | ................................. 11-279987 |
| Sep. 30, 1999 | (JP) | ................................. 11-279988 |
| Sep. 30, 1999 | (JP) | ................................. 11-280598 |
| Mar. 31, 2000 | (JP) | ................................. 2000-097124 |

(51) Int. Cl.
*G06F 15/00* (2006.01)
*B41C 1/02* (2006.01)
*H04N 1/46* (2006.01)

(52) U.S. Cl. ........................ 358/1.9; 358/3.3; 358/536

(58) Field of Classification Search ............... 358/1.9, 358/448, 3.06, 3.09, 3.1, 3.13, 3.28, 3.3, 358/3.2, 426.14, 536, 1.8; 382/181, 183, 382/149, 276, 251; 283/72, 113; 235/494; 340/5.86; 356/71

See application file for complete search history.

(56) References Cited

U.S. PATENT DOCUMENTS

| 4,507,685 | A | * | 3/1985 | Kawamura | ................... 358/536 |
| 4,582,346 | A | * | 4/1986 | Caprio et al. | ................. 283/94 |
| 4,897,736 | A | * | 1/1990 | Sugino | ....................... 358/1.9 |
| 4,920,501 | A | * | 4/1990 | Sullivan et al. | ............ 358/3.19 |
| 5,226,096 | A | * | 7/1993 | Fan | .............................. 382/237 |
| 5,287,275 | A | * | 2/1994 | Kimura | ......................... 707/5 |
| 5,315,098 | A | * | 5/1994 | Tow | ............................. 235/494 |
| 5,568,570 | A | | 10/1996 | Rabbani | ..................... 382/238 |
| 5,606,628 | A | * | 2/1997 | Miyabe et al. | ............. 382/183 |
| 5,638,463 | A | * | 6/1997 | Ohshita | ....................... 382/195 |
| 5,640,191 | A | * | 6/1997 | Zulian et al. | ............... 347/247 |
| 5,666,213 | A | * | 9/1997 | Ohshita et al. | ............ 358/448 |
| 5,710,636 | A | * | 1/1998 | Curry | ........................ 358/3.28 |
| 5,729,625 | A | * | 3/1998 | Miyake | ..................... 382/169 |
| 5,751,929 | A | * | 5/1998 | Ohnuma et al. | ............ 345/600 |
| 5,822,505 | A | * | 10/1998 | Okada | ........................ 358/1.14 |
| 5,920,646 | A | * | 7/1999 | Kamon | ....................... 382/173 |
| 5,984,364 | A | * | 11/1999 | Diamond | ..................... 283/67 |

(Continued)

FOREIGN PATENT DOCUMENTS

JP         2-266390         10/1990

(Continued)

OTHER PUBLICATIONS

Office Action, dated Jan. 30, 2004, in JP11-279382.

*Primary Examiner*—Madeleine A V Nguyen
(74) *Attorney, Agent, or Firm*—Fitzpatrick, Cella, Harper & Scinto

(57) ABSTRACT

A pattern which does not appear at a flat portion in normal binarization processing is set as a code pattern, and a code formed from this pattern is attached. At this time, code attachment with little degradation in image quality is implemented by selecting an unnoticeable pattern.

11 Claims, 115 Drawing Sheets

U.S. PATENT DOCUMENTS

| | | | | |
|---|---|---|---|---|
| 6,002,841 | A | * 12/1999 | Tanioka | 358/1.9 |
| 6,009,213 | A | * 12/1999 | Miyake | 382/300 |
| 6,072,592 | A | * 6/2000 | Ashworth | 358/1.9 |
| 6,101,002 | A | * 8/2000 | Urasawa | 358/3.13 |
| 6,126,342 | A | * 10/2000 | Kurumida | 400/76 |
| 6,184,995 | B1 | * 2/2001 | Sakai et al. | 358/1.15 |
| 6,278,525 | B1 | * 8/2001 | Watanabe et al. | 358/1.13 |
| 6,353,481 | B1 | * 3/2002 | Lee | 358/1.14 |
| 6,381,030 | B1 | * 4/2002 | Udagawa et al. | 358/1.14 |
| 6,414,757 | B1 | * 7/2002 | Salem | 358/3.28 |
| 6,445,465 | B1 | * 9/2002 | Samworth | 358/1.9 |
| 6,449,058 | B1 | * 9/2002 | Ueda | 358/1.16 |
| 6,490,681 | B1 | * 12/2002 | Kobayashi et al. | 713/171 |
| 6,519,056 | B1 | * 2/2003 | Hattori | 358/3.09 |
| 6,538,768 | B2 | * 3/2003 | Shibahara et al. | 358/1.9 |
| 6,724,499 | B1 | * 4/2004 | Satoh | 358/1.9 |
| 6,833,933 | B1 | * 12/2004 | Woods | 358/3.14 |
| 6,867,884 | B1 | * 3/2005 | Rozzi | 358/1.9 |
| 2001/0043341 | A1 | 11/2001 | Shibahara et al. | 358/1.9 |
| 2003/0007661 | A1 | * 1/2003 | Noguchi | 382/100 |
| 2005/0038756 | A1 | * 2/2005 | Nagel | 705/76 |

FOREIGN PATENT DOCUMENTS

| | | |
|---|---|---|
| JP | 5-130376 | 5/1993 |
| JP | 5-219353 | 8/1993 |
| JP | 5-301380 | 11/1993 |
| JP | 6-121158 | 4/1994 |
| JP | 8-211857 | 8/1996 |
| JP | 9-23333 | 1/1997 |
| JP | 9-051425 | 2/1997 |
| JP | 10-304176 | 11/1998 |
| JP | 10-304179 | 11/1998 |
| JP | 11-27530 | 1/1999 |
| JP | 11-32202 | 2/1999 |
| JP | 11-041446 | 2/1999 |
| JP | 11-069133 | 3/1999 |
| JP | 2000-287062 | 10/2000 |

* cited by examiner

FIG. 2

|   | * | a | b |
|---|---|---|---|
| c | d | e | f | g |
| h | i | j | k | l |

DENSITY 15/256

DENSITY 5/256

FIG. 7

| X | Y | Y | Y | X |
|---|---|---|---|---|
| Y | Y | Y | Y | Y |
| Y | Y | Y | Y | Y |
| Y | Y | Y | Y | Y |
| X | Y | X | X | X |

F I G. 10
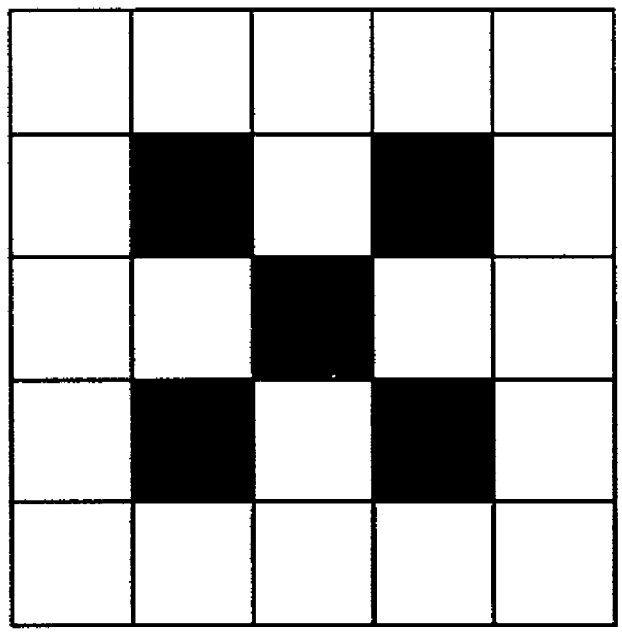

FIG. 15A

| 128 | 128 | 128 | 128 | 128 | 128 | 128 | 128 |
|-----|-----|-----|-----|-----|-----|-----|-----|
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

FIG. 15B

| 255 | 0 | 255 | 0 | 255 | 0 | 255 | 0 |
|-----|---|-----|---|-----|---|-----|---|
| 0 | 255 | 0 | 255 | 0 | 255 | 0 | 255 |
| 255 | 0 | 255 | 0 | 255 | 0 | 255 | 0 |
| 0 | 255 | 0 | 255 | 0 | 255 | 0 | 255 |
| 255 | 0 | 255 | 0 | 255 | 0 | 255 | 0 |
| 0 | 255 | 0 | 255 | 0 | 255 | 0 | 255 |
| 255 | 0 | 255 | 0 | 255 | 0 | 255 | 0 |
| 0 | 255 | 0 | 255 | 0 | 255 | 0 | 255 |

FIG. 15C

| 0 | 255 | 255 | 0 | 255 | 0 | 0 | 255 | 255 | 0 |
|---|-----|-----|---|-----|---|---|-----|-----|---|
| 255 | 0 | 0 | 255 | 0 | 255 | 255 | 0 | 0 | 255 |
| 255 | 255 | 0 | 0 | 0 | 0 | 255 | 0 | 0 | 255 |
| 255 | 0 | 255 | 0 | 0 | 0 | 255 | 255 | 255 | 0 |
| 0 | 255 | 0 | 255 | 255 | 0 | 255 | 0 | 0 | 255 |
| 255 | 0 | 0 | 255 | 255 | 255 | 0 | 255 | 0 | 0 |
| 0 | 255 | 255 | 255 | 0 | 0 | 255 | 0 | 0 | 0 |

400 ARTIFICIALLY GENERATED QUANTIZATION VALUES

401 QUANTIZATION VALUES WHICH APPEAR TO MAINTAIN DENSITY

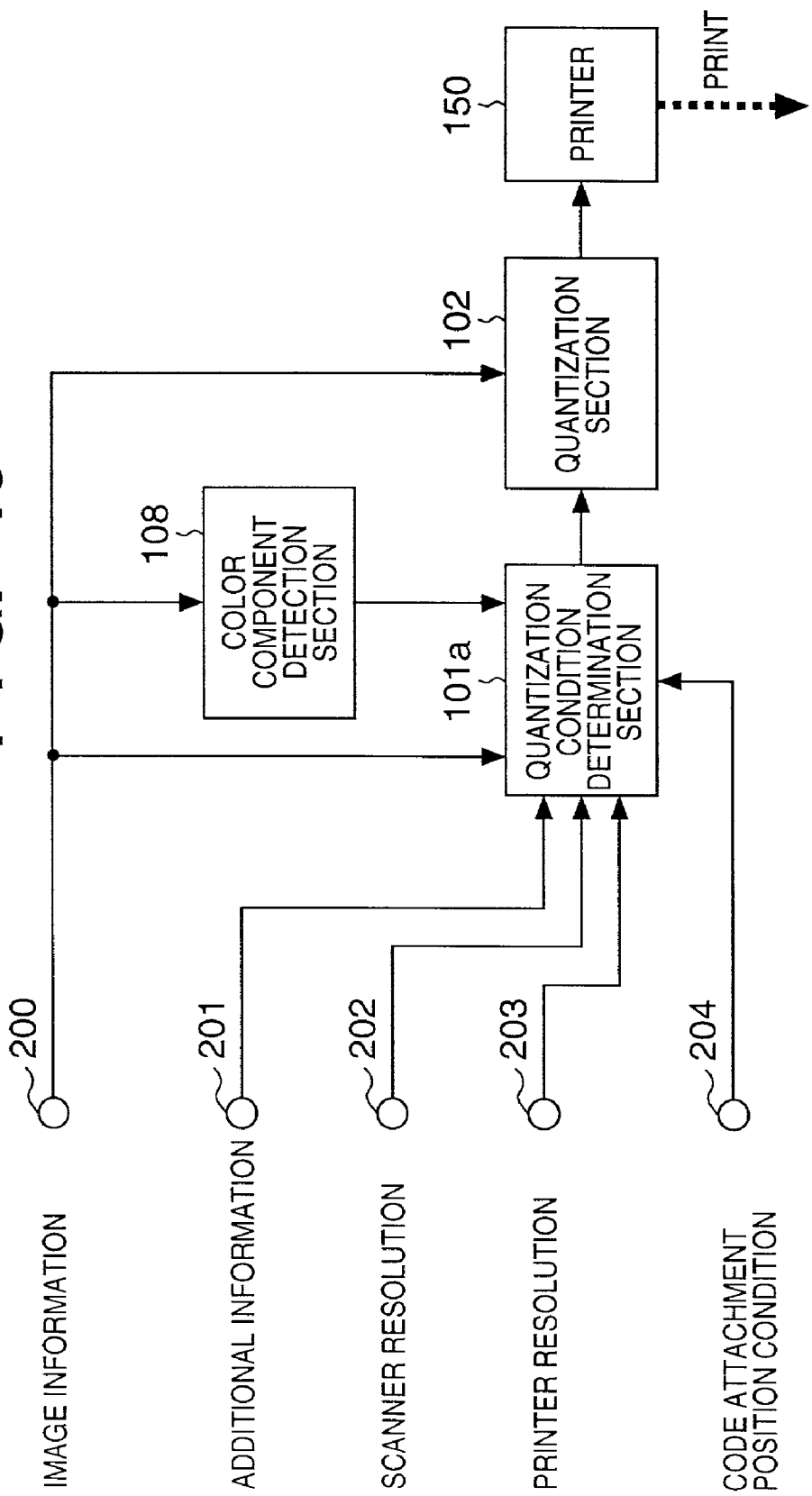

FIG. 21B

| 0 | 255 | 255 | 0 | 255 | 0 | 255 | 0 | 255 | 255 |
|---|---|---|---|---|---|---|---|---|---|
| 255 | 0 | 0 | 255 | 0 | 255 | 255 | 255 | 0 | 0 |
| 255 | 255 | 0 | 0 | 0 | 255 | 0 | 255 | 0 | 255 |
| 0 | 0 | 255 | 0 | 0 | 0 | 255 | 0 | 255 | 0 |
| 255 | 0 | 0 | 225 | 225 | 255 | 0 | 255 | 0 | 255 |
| 0 | 255 | 0 | 255 | 255 | 0 | 255 | 0 | 255 | 0 |
| 255 | 0 | 0 | 0 | 255 | 0 | 0 | 255 | 0 | 255 |
| 255 | 255 | 0 | 255 | 0 | 255 | 0 | 0 | 255 | 0 |

1000 — REGION HAVING IDENTICAL QUANTIZATION VALUES

1001 — REGION HAVING IDENTICAL QUANTIZATION VALUES

FIG. 21A

| a1 | a2 | a3 | a4 | a5 | a6 | a7 | a8 |
|---|---|---|---|---|---|---|---|
| a9 | a10 | a11 | a12 | a13 | a14 | a15 | a16 |
| a17 | a18 | a19 | a20 | X | X | a21 | a22 |
| a23 | a24 | Y | Y | X | X | a29 | a30 |
| a27 | a28 | Y | Y | a35 | a36 | a37 | a38 |
| a33 | a34 | a43 | a44 | a45 | a46 | a47 | a48 |
| a41 | a42 | a51 | a52 | a53 | a54 | a55 | a56 |
| a49 | a50 | | | | | | |

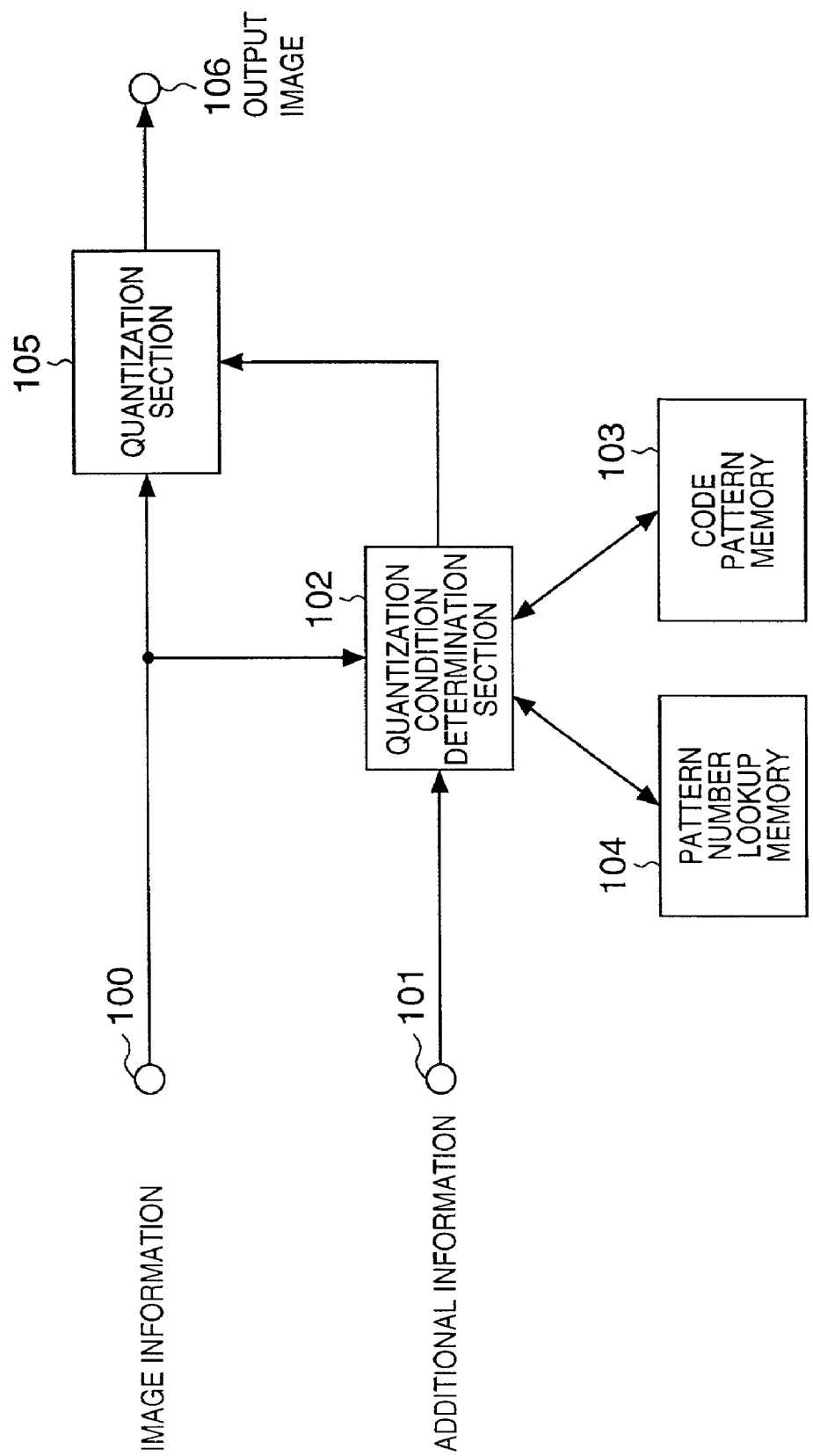

PATTERN 0

PATTERN 1

PATTERN 2

PATTERN 3

↑ PROCESSING ROW (HIGH DENSITY)

↑ PROCESSING ROW (LOW DENSITY)

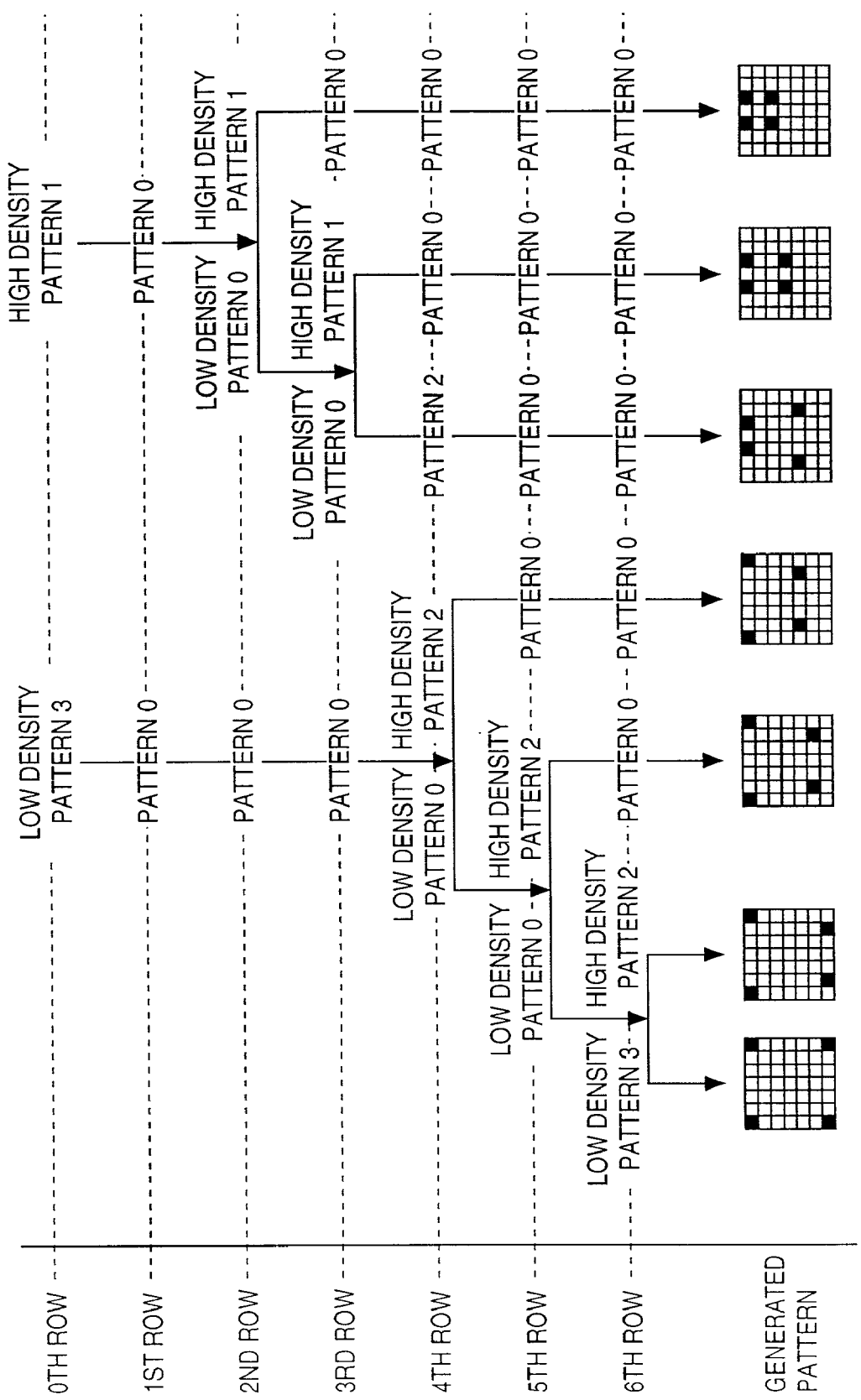

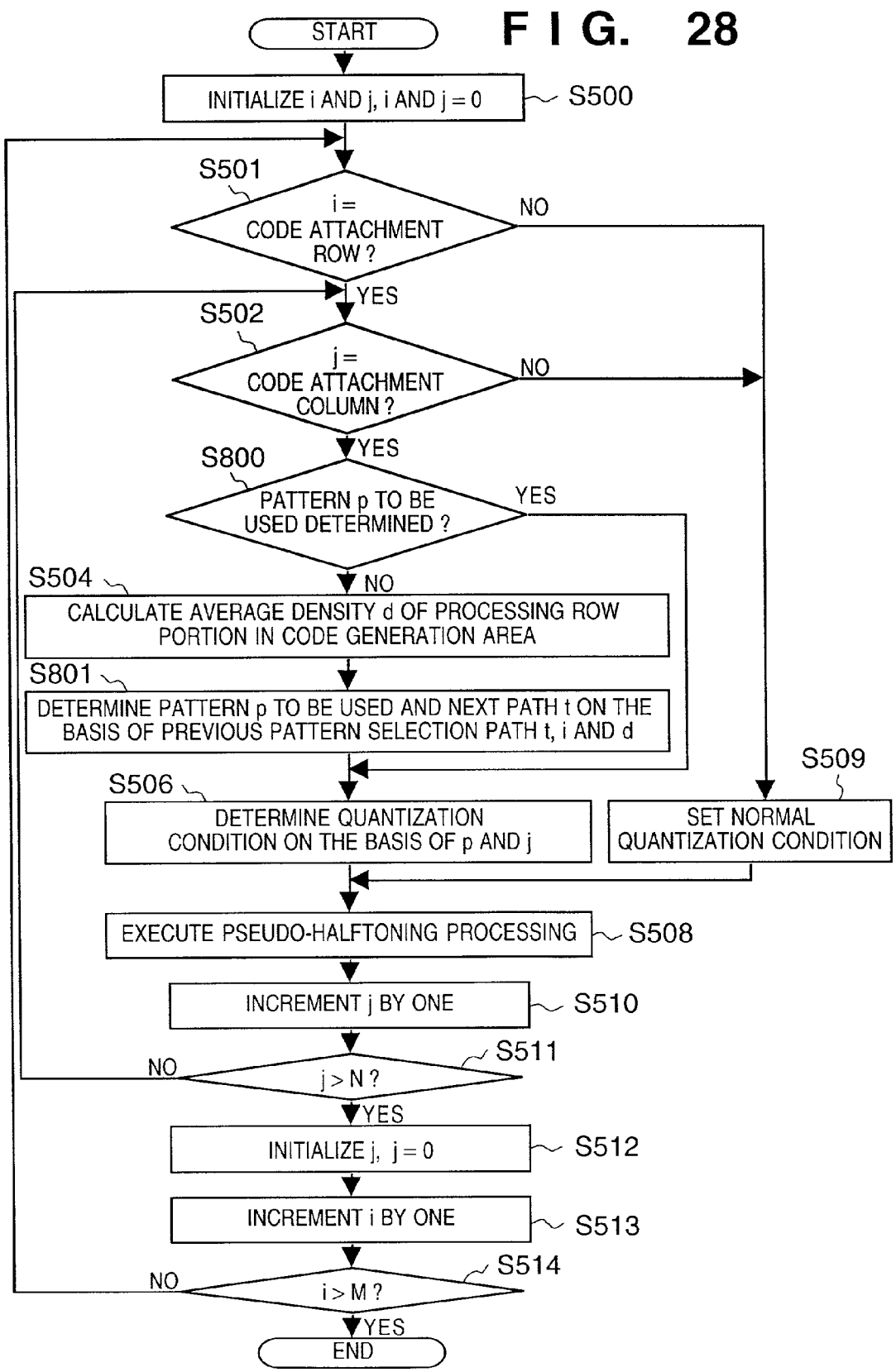

LOW-DENSITY REGION

INTERMEDIATE-DENSITY REGION

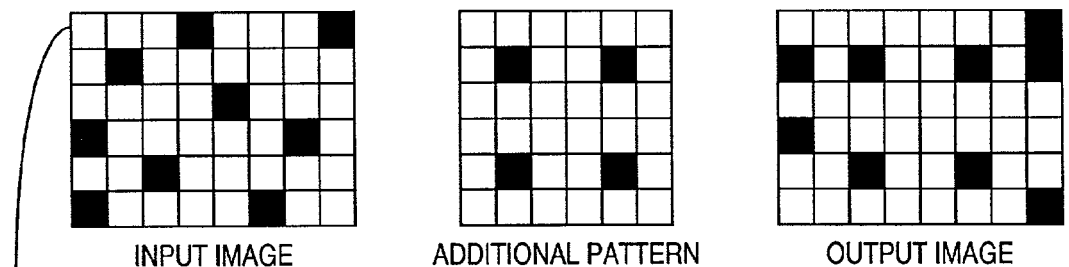
FIG. 34A  INPUT IMAGE
FIG. 34B  ADDITIONAL PATTERN
FIG. 34C  OUTPUT IMAGE
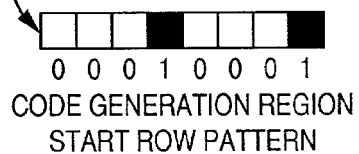
FIG. 34D
0 0 0 1 0 0 0 1
CODE GENERATION REGION
START ROW PATTERN
FIG. 34E        FIG. 34F
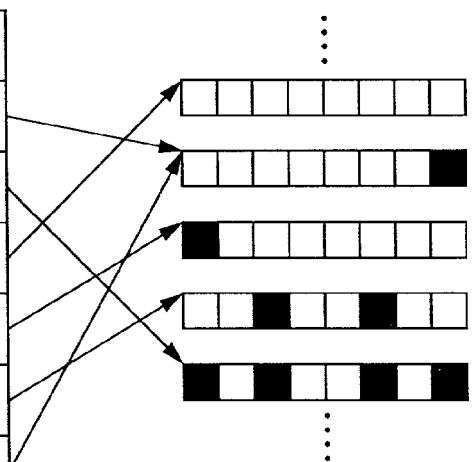
PATTERN IDENTIFICATION NUMBER
| PATTERN : 0 0 0 1 0 0 0 1 | |
|---|---|
| OUTPUT PATTERN LOOKUP | ROW NUMBER 0 |
| | ROW NUMBER 1 |
| | ROW NUMBER 2 |
| | ROW NUMBER 3 |
| | ROW NUMBER 4 |
| | ROW NUMBER 5 |

■ : CODE

ADDITIONAL INFORMATION SUPERPOSITION METHOD OF THE PRESENT INVENTION

F I G. 54

| TOTAL DATA AMOUNT R | IMAGE HORIZONTAL SIZE X | IMAGE VERTICAL SIZE Y | IMAGE DATA MAIN BODY |
|---|---|---|---|

SIMPLE IMAGE

COMPLEX IMAGE

PRINTABLE REGION

| MATRIX INTERVAL | N |
|---|---|
| NUMBER z | ATTACHMENT POSITION ($Lx^z$, $Ly^z$) |
| 1 | ( 1, 1 ) |
| 2 | ( 1, 3 ) |
| 3 | ( 1, 4 ) |
| ⋮ | ⋮ |
| z | ( $Lx^z$, $Ly^z$ ) |

DOT PATTERN FOR LOW-DENSITY REGION

| PIXEL COUNT C OF PATTERN | 4 |
|---|---|
| NUMBER c | PIXEL POSITION ($Pl_x{}^c$, $Pl_y{}^c$) |
| 1 | (2, −2) |
| 2 | (−2, −2) |
| 3 | (2, 2) |
| 4 | (−2, 2) |

DOT PATTERN FOR HIGH-DENSITY REGION

| PIXEL COUNT C OF PATTERN | 4 |
|---|---|
| NUMBER c | PIXEL POSITION ($Ph_x{}^c$, $Ph_y{}^c$) |
| 1 | (1, 0) |
| 2 | (0, −1) |
| 3 | (−1, 0) |
| 4 | (0, 1) |

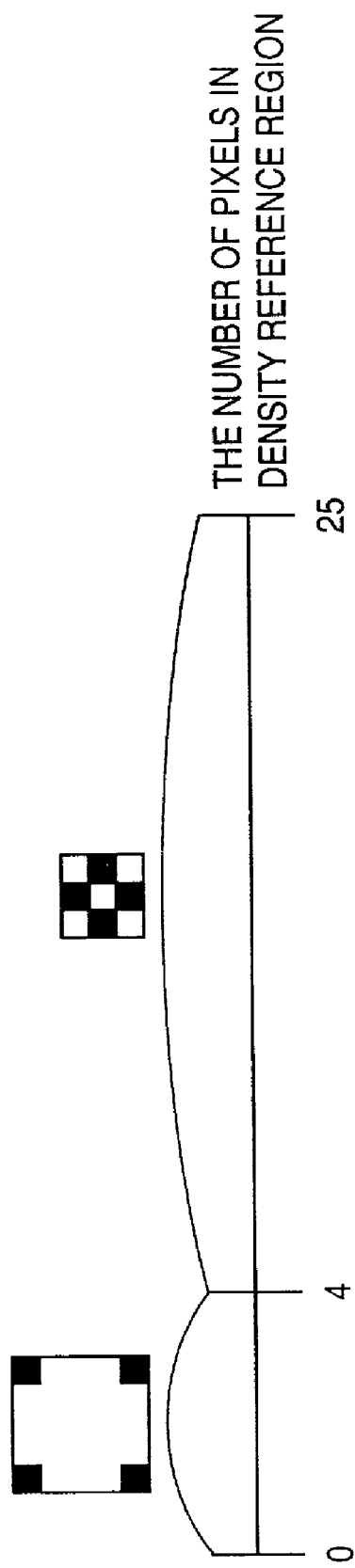

FIG. 67A
IMAGE BEFORE DOT PATTERN ATTACHMENT
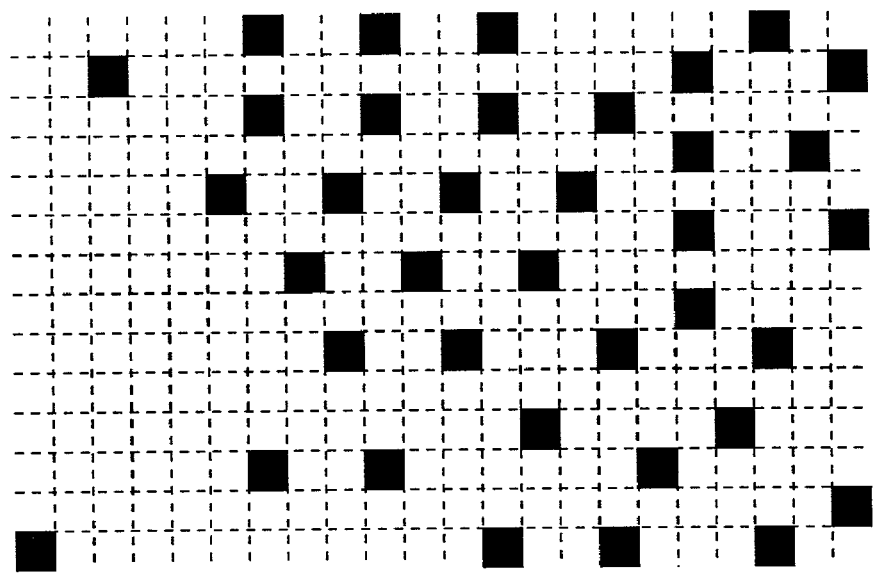
FIG. 67B
IMAGE AFTER DOT PATTERN ATTACHMENT          REGION A
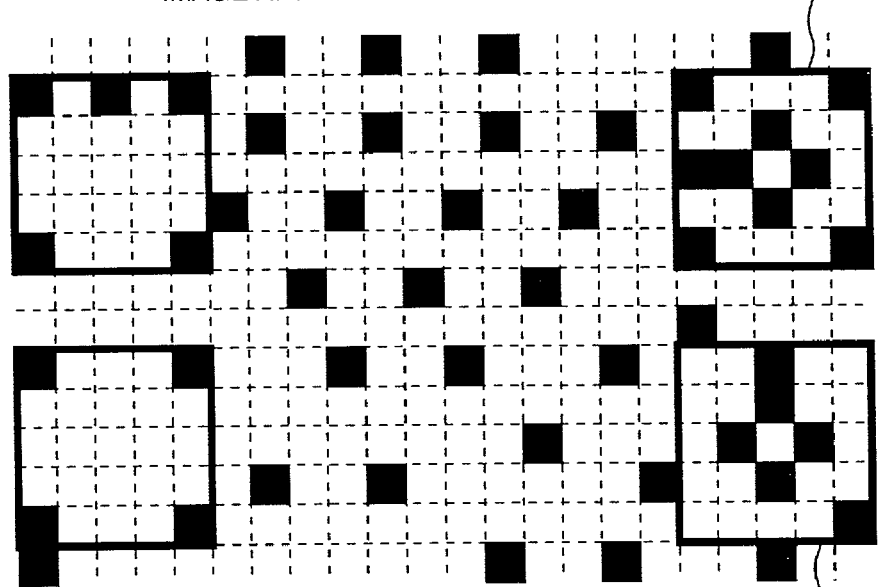
REGION B
□ : DOT PATTERN ATTACHMENT REGION

■ : DENSITY LEVEL 2

▨ : DENSITY LEVEL 1

☐ : DENSITY LEVEL 0

DOT PATTERN FOR LOW-DENSITY REGION

| PIXEL COUNT C OF PATTERN | 4 |
|---|---|
| DENSITY LEVEL V | −1 |
| NUMBER c | PIXEL POSITION $(Plx^c, Ply^c)$ |
| 1 | (2, −2) |
| 2 | (−2, −2) |
| 3 | (−2, 2) |
| 4 | (2, 2) |

DOT PATTERN FOR INTERMEDIATE-DENSITY REGION

| PIXEL COUNT C OF PATTERN | 4 |
|---|---|
| DENSITY LEVEL V | 1 |
| NUMBER c | PIXEL POSITION $(Pmx^c, Pmy^c)$ |
| 1 | (1, 0) |
| 2 | (0, −1) |
| 3 | (−1, 0) |
| 4 | (0, 1) |

DOT PATTERN FOR HIGH-DENSITY REGION

| PIXEL COUNT C OF PATTERN | 4 |
|---|---|
| DENSITY LEVEL V | 2 |
| NUMBER c | PIXEL POSITION ($Ph_x^c$, $Ph_y^c$) |
| 1 | (1, 0) |
| 2 | (0, −1) |
| 3 | (−1, 0) |
| 4 | (0, 1) |

☐ : DENSITY REFERENCE REGION
( 5-PIXEL SQUARE BLOCK )

F I G. 74A
IMAGE BEFORE DOT
PATTERN ATTACHMENT
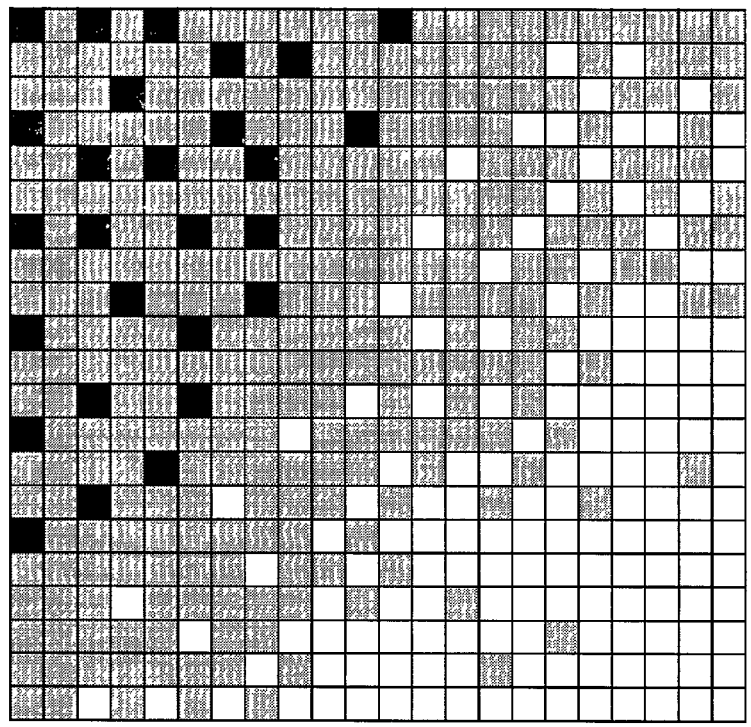
F I G. 74B
IMAGE AFTER DOT
PATTERN ATTACHMENT
☐ : DENSITY
REFERENCE
REGION
( 5-PIXEL SQUARE
BLOCK )
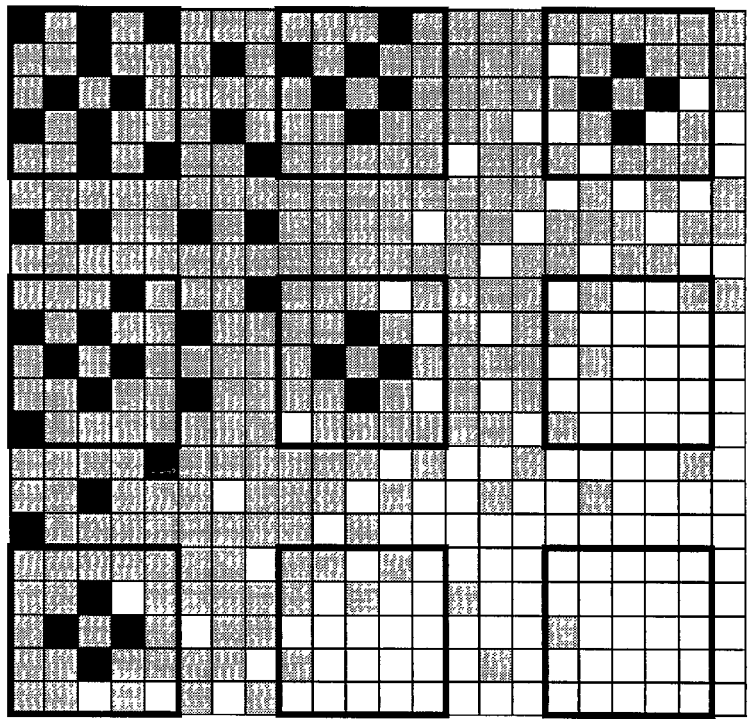

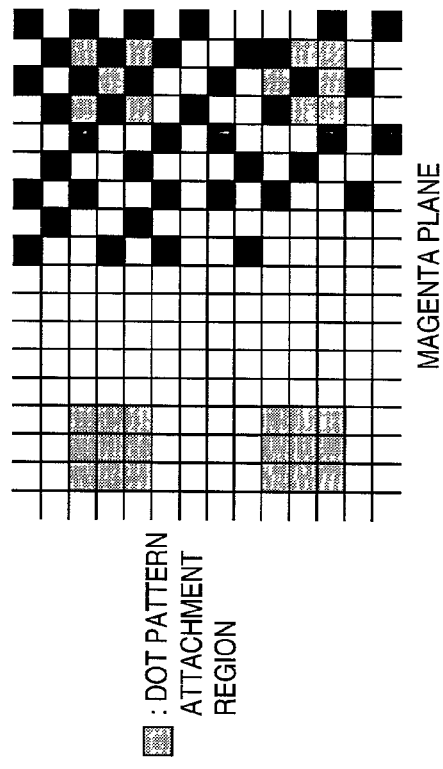
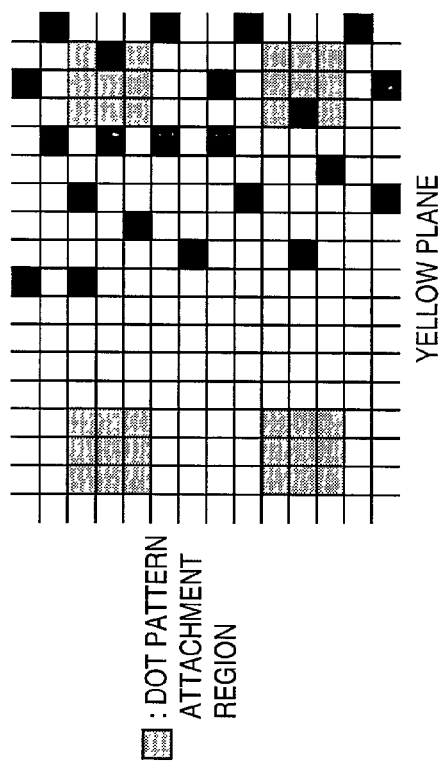
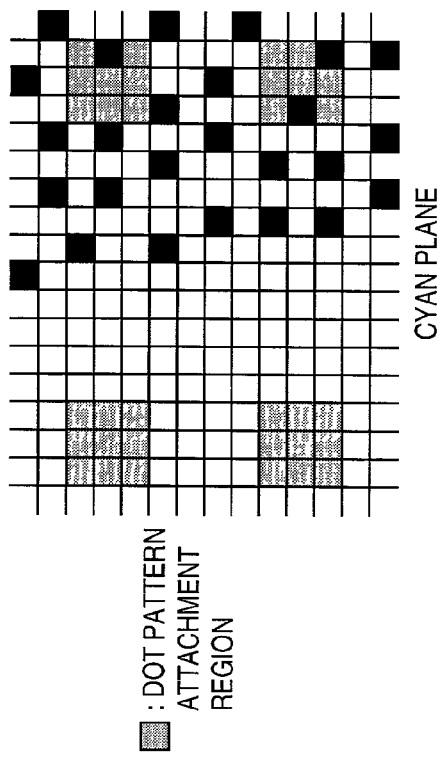
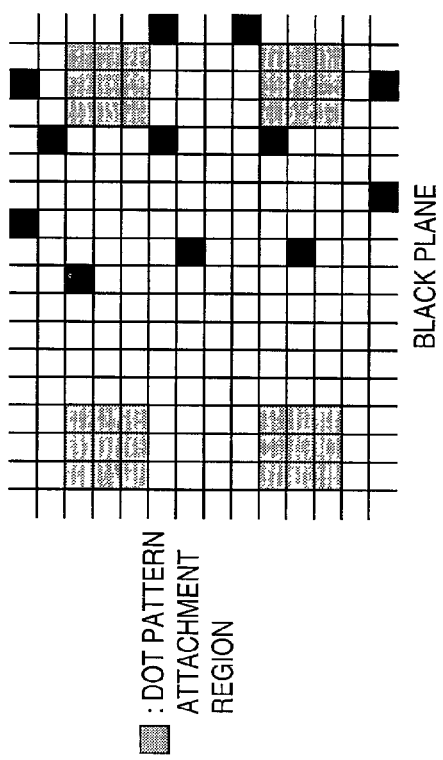

| MATRIX INTERVAL | N |
|---|---|
| NUMBER z | ATTACHMENT POSITION ($Lx^z$, $Ly^z$) |
| 1 | (0, 0) |
| 2 | (2, 0) |
| 3 | (4, 1) |
| ⋮ | ⋮ |
| z | ($Lx^z$, $Ly^z$) |

FIG. 80A
CYAN PLANE
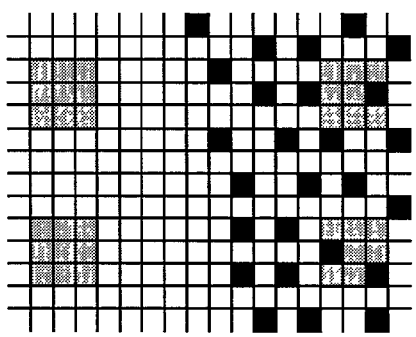
FIG. 80B
MAGENTA PLANE
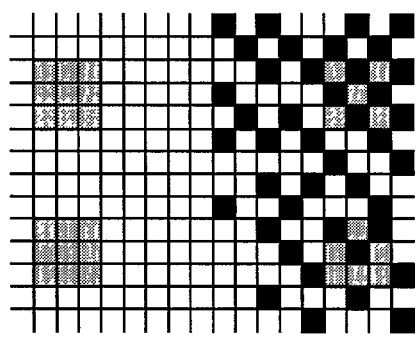
FIG. 80C
BLACK PLANE
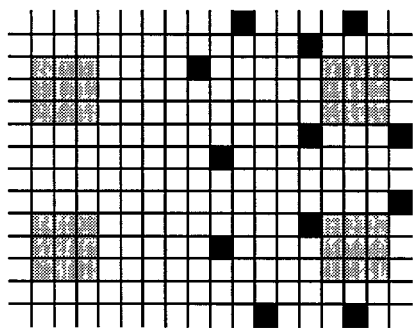
FIG. 80D
YELLOW PLANE
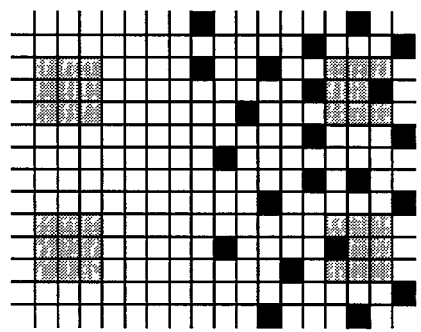
 : DENSITY REFERENCE REGION
( 3-PIXEL SQUARE BLOCK )

CYAN PLANE

MAGENTA PLANE

BLACK PLANE

YELLOW PLANE

REGION A

REGION B

CYAN PLANE

MAGENTA PLANE

BLOCK PLANE

YELLOW PLANE

FIG. 84A
CYAN PLANE
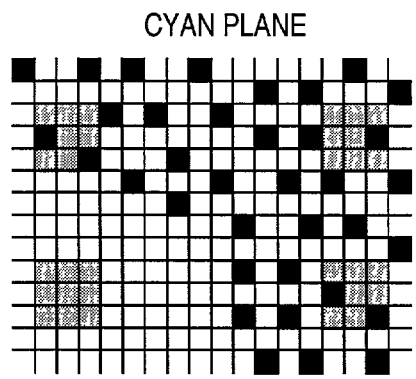
FIG. 84B
MAGENTA PLANE
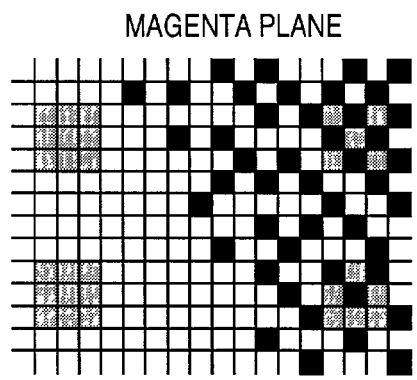
FIG. 84C
BLACK PLANE
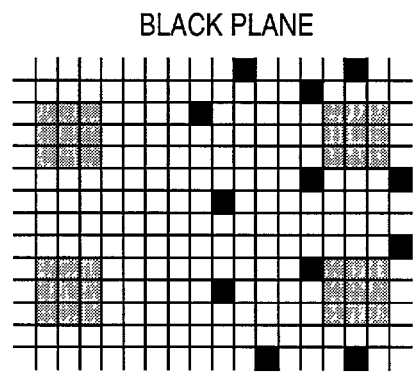
FIG. 84D
YELLOW PLANE
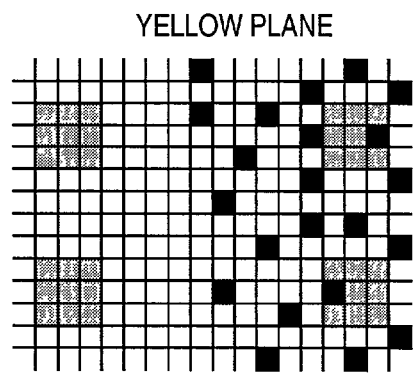
 : DENSITY REFERENCE REGION
( 3-PIXEL SQUARE BLOCK )

FIG. 85A
CYAN PLANE
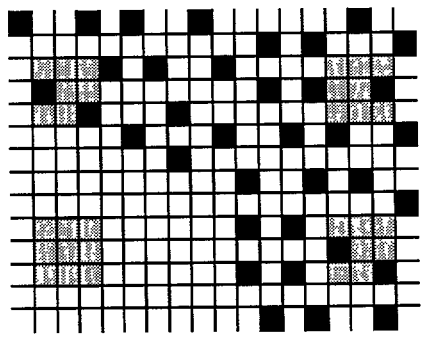
FIG. 85B
MAGENTA PLANE
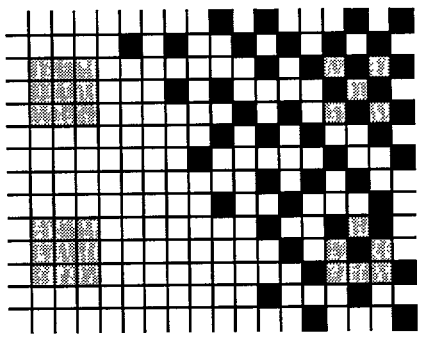
FIG. 85C
BLACK PLANE
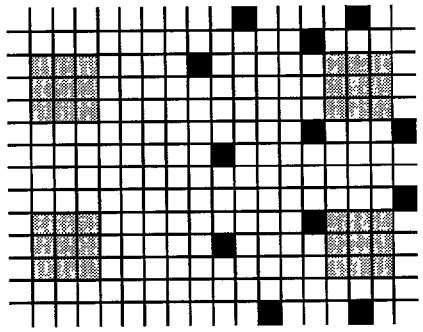
FIG. 85D
REGION A   YELLOW PLANE
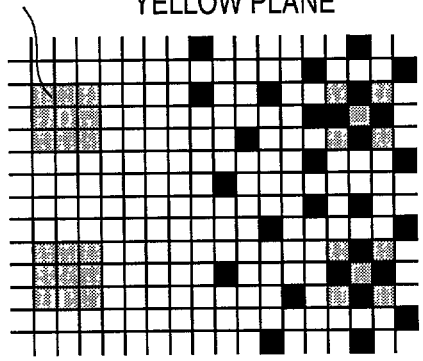
 : DOT PATTERN ATTACHMENT REGION

| MATRIX INTERVAL | N |
|---|---|
| NUMBER z | ATTACHMENT POSITION ($Lx^z$, $Ly^z$) |
| 1 | (1, 1) |
| 2 | (1, 3) |
| 3 | (1, 4) |
| ⋮ | ⋮ |
| z | ($Lx^z$, $Ly^z$) |

IMAGE BEFORE DOT PATTERN ATTACHMENT

☐ : DOT PATTERN ATTACHMENT REGION

IMAGE AFTER DOT PATTERN ATTACHMENT

☆ : PIXEL CONVERTED INTO OFF-DOT

☐ : DOT PATTERN ATTACHMENT REGION

● : PIXEL OF DOT PATTERN
☐ : DENSITY STORAGE REGION
☆ : PIXEL TO BE CONVERTED INTO OFF-DOT

☐ : DOT PATTERN ATTACHMENT REGION

■ : DENSITY LEVEL 2

▨ : DENSITY LEVEL 1

☐ : DENSITY LEVEL 0

FIG. 100

| PIXEL COUNT M OF PATTERN | 5 |
|---|---|
| DENSITY LEVEL V | 2 |
| NUMBER m | PIXEL POSITION ($Px^m$, $Px^m$) |
| 1 | (0, 0) |
| 2 | (1, 1) |
| 3 | (1, −1) |
| 4 | (−1, 1) |
| 5 | (−1, −1) |

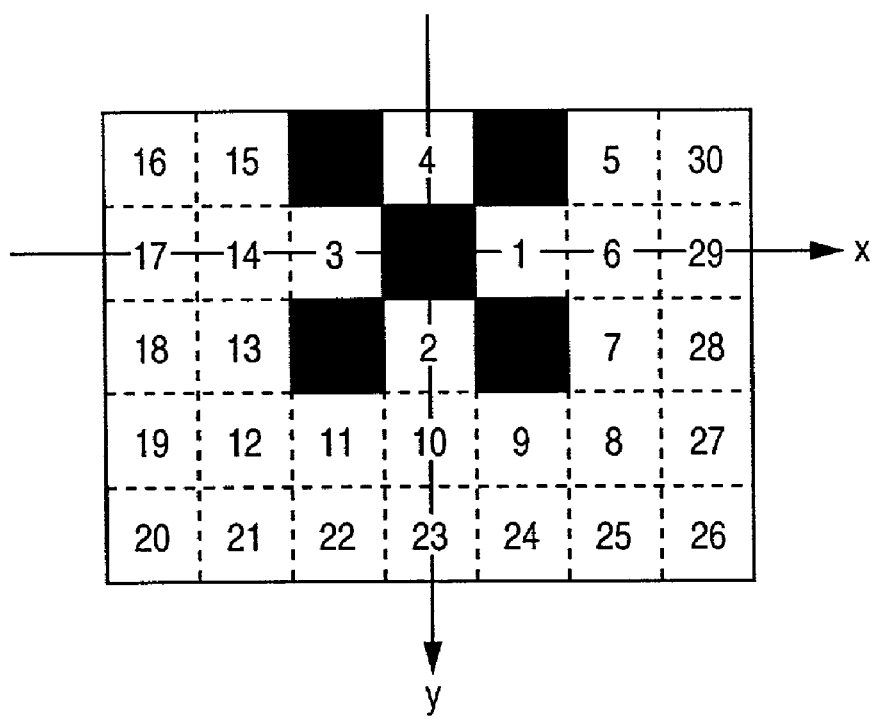
F I G. 101

F I G. 102

| NUMBER n | COORDINATES ($R_x^n$, $R_y^n$) |
|---|---|
| 1 | (1, 0) |
| 2 | (0, 1) |
| 3 | (−1, 0) |
| 4 | (0, −1) |
| ⋮ | ⋮ |
| 30 | (3, −1) |

BEFORE PROCESSING

☐ : DENSITY LEVEL 1

■ : DENSITY LEVEL 2

☆ : DOT PATTERN ATTACHMENT POSITION

AFTER PROCESSING

☐ : DENSITY LEVEL 1

■ : DENSITY LEVEL 2

▨ : DOT PATTERN ATTACHMENT REGION

CYAN PLANE

▨ : DOT PATTERN ATTACHMENT REGION

MAGENTA PLANE

▨ : DOT PATTERN ATTACHMENT REGION

BLACK PLANE

REGION A   ▨ : DOT PATTERN ATTACHMENT REGION

REGION B   YELLOW PLANE

IMAGE PROCESSING APPARATUS AND METHOD, AND STORAGE MEDIUM

FIELD OF THE INVENTION

The present invention relates to an image processing apparatus and method, and a storage medium.

BACKGROUND OF THE INVENTION

Along with recent improvements of image qualities of color printers and color copying machines, it becomes very easy to copy and faithfully reproduce an original image as a print. This makes it easy to forge securities such as bank notes, and various measures against such forgery have been taken.

Conventional anti-forgery techniques are roughly classified into a technique of recognizing an original as securities and inhibiting faithful printing and a technique of attaching, to a print, machine identification information for identifying a machine so as to specify a machine used for forgery of securities.

Especially, for the latter technique of multiplexing machine identification information onto image information, various methods have been proposed and applied to not only anti-forgery of securities but also copyright protection, secret information protection, and character/voice data transmission.

Methods of multiplexing information of a different kind such as machine identification information onto image information are roughly classified into a method of embedding information in a frequency domain and a method of embedding information in a real space domain. Embedding in a frequency domain is mainly implemented by converting image data from a real space domain into a frequency domain using a means such as FFT (Fast Fourier Transform) and then multiplexing additional information using a frequency component or phase component. On the other hand, embedding in a real space domain is implemented using quantization error which occurs when image data or the value of the least significant bit (LSB) of each pixel in the image data is quantized.

For the shape of a code to be attached, for example, a method of attaching a dot pattern formed from a plurality of regions with different longitudinal directions has been proposed.

However, the code used in the above method has a shape with a specific longitudinal direction. For this reason, when, e.g., image information is processed by pseudo-halftoning processing using error diffusion, and this code is attached to the image information, a continues dot layout appears in a specific direction in a highly dispersible dot layout unique to the error diffusion. Hence, the code is visually noticeable, resulting in degradation in image quality.

To attach identification information for anti-forgery, information blocks each having a plurality of codes must be laid out in the entire image. As a consequence, the codes tend to be periodically laid out and are visually perceivable, resulting in degradation in image quality.

For the shape of a code representing information, another method has been conventionally proposed in which in attaching, as a code, a dot pattern to an image expressed by pseudo-halftoning using error diffusion, a dot pattern that can appear in a flat image having an image density different from that of the region where the code is to be attached as a result of pseudo-halftoning expression using error diffusion is employed as a code shape, thereby suppressing degradation in image quality.

In this conventional method, however, the code shape is represented by a dot pattern having a plurality of pixels in the vertical and horizontal directions. The dot pattern is registered in advance, and appropriately selected and used in accordance with the image density in the prior art using error diffusion.

To attach a code with less degradation in image quality, a dot pattern representing the code is selected in accordance with the density of a region where the code is to be attached. However, having a number of patterns increases, e.g., the number of program codes, hardware configuration, or memory capacity.

In the above prior art, a dot pattern is generated in accordance with the average density of a region having a plurality of pixels, and used as a code. To do this, at the time of processing for the start row where code generation starts, the pixel values of rows to be processed later must be referred to. However, to prevent an increase in memory capacity and increase the processing speed, pseudo-halftoning processing may limit pixels to be referred to at once to one row. In this case, the image density can be detected only in the processing row, and the average pixel value of the entire region where the code is to be attached cannot be obtained.

As another technique of multiplexing information of a different kind in an image processing apparatus for expressing an image using pseudo-halftoning processing, for example, in pseudo-halftoning processing using error diffusion or the like, a combination of quantization values that cannot occur is artificially generated, maintaining the image density, whereby information of a different kind is multiplexed while suppressing degradation in image quality.

However, the above prior art has the following problems.

(1) If information is multiplexed on a frequency component of image data or pixel value of full-color image data, a printing apparatus for printing an image using pseudo-halftoning expression do not guarantee that a code representing the multiplexed information should be preserved on a printing medium such as printing paper.

(2) A recent printing apparatus has high resolution to improve the image quality. To detect a code embedded in an image, an image reading apparatus such as a scanner must also have high read resolution. To reliably read a code, the reading apparatus is required to have resolution higher by twice or more than that on the printing side due to the sampling theorem. However, the read resolution of an image reading apparatus such as a popular scanner is equal to or lower than the resolution of a printing apparatus such as an inkjet printer. Hence, if information of a different kind is multiplexed with image information without considering the resolution of the reading apparatus, an expensive special scanner with high resolution must be used to reliably separate the information of the different kind from the printed image, resulting in impracticality.

To control attachment of a code representing information, a method has been conventionally proposed in which in printing using achromatic colors that are not used for forgery of securities, no anti-forgery information such as the machine number of a printing apparatus is not attached.

However, in the above-described code attachment control method, a code is attached to an output image containing chromatic colors even when the information cannot be decoded due to the image state. For this reason, a code is attached as long as the image contains chromatic colors, resulting in a decrease in printing speed in many cases.

This influence is especially large when code attachment processing is performed not by hardware having relatively high processing speed but by software such as a printer driver.

The outline of additional information superposition processing will be described. FIG. 104 is a block diagram showing a general additional information embedding method. Referring to FIG. 104, an image signal represented by RGB components and input from a terminal 101 is converted into four components: C (cyan), M (magenta), Y (yellow), and K (black) by a color conversion section 102. These components are corrected by a various correction processing section 103. Next, a pseudo-halftoning processing section 104 executes pseudo-halftoning processing using a method such as systematic dithering or error diffusion.

Additional information generated by an additional information generation section 105 is superposed (added) on the Y component of the image signal that has undergone the above processing operations. When these components are input to a printer engine 106, an image having certain information other than image information can be printed.

FIG. 105 is a view showing a yellow plane to which a specific dot pattern is attached in order to superpose additional information. The hatched region (×[inch]) shown in FIG. 105 is called an information area. The additional information is represented by the layout of dots in this region.

However, the above-described method has the following problem.

The above-described dot pattern attachment processing degrades the image quality because information that is not present on the image is attached.

However, the degree of degradation in image quality largely depends on the texture of the image. More specifically, when the image to which additional information is to be attached is a very complex image containing a number of high-frequency components, degradation in image quality due to dot pattern attachment can hardly be visually confirmed.

To the contrary, when the image is a relatively simple image containing a number of flat portions, an unnatural yellow dot may be easily visually confirmed.

Conventionally, the degree of complexity of an image is detected using a certain method. Preferably, if it is determined that the image is complex, a dot pattern is attached as in the prior art, and if it is determined that the image is simple, the amount of dot pattern attachment is decreased as compared to the prior art. However, such a method has not been proposed yet.

Additionally, when a predetermined dot pattern obtained by simple addition is attached, as in the above-described additional information superposition processing method, the number of pixels changes in the neighboring region. More specifically, a change in number of pixels on an image that has undergone pseudo-halftoning processing means a change in density. If this occurs, an unnatural dot may be visually confirmed even if a yellow component can hardly be visually detected.

To avoid this situation, in attaching a dot pattern onto an image signal that has undergone pseudo-halftoning processing, certain processing must be executed to store the density (the number of pixels) in accordance with the situation of the neighboring portion.

A method has been proposed in consideration of this problem, in which processing is executed for image information before pseudo-halftoning processing. However, a method of attaching a dot pattern to image information after pseudo-halftoning processing while storing the density has not been proposed.

In a general method of superposing additional information onto an image, matrix points present at an N-pixel interval in a printable region are defined, as shown in FIG. 106, and additional information is expressed depending on whether a dot pattern predetermined and stored in a storage device in a computer or printer main body for executing processing is present at each matrix point.

In the conventionally proposed scheme, generally, the same dot pattern is used for all density regions on an image. Attachment of a dot pattern onto image information using this conventional scheme will be described with reference to the accompanying drawings. Assume an image after pseudo-halftoning processing as shown in FIG. 107 as an image example before superposition of additional information. When a dot pattern shown in FIG. 108 is attached to the image shown in FIG. 107, an image shown in FIG. 109 is obtained.

Referring to FIG. 109, in a density region (especially region A) having a pixel layout similar to that of the dot pattern, it is difficult to determine whether the dot pattern is present in the process of reading the attached information, and therefore, accurate additional information cannot be read.

To avoid this situation, the dot pattern may have pixels at a smaller interval, as shown in FIG. 110. However, when the dot pattern having pixels at high density as shown in FIG. 110 is attached to the entire image, an unnatural dot may be visually confirmed in a region having very low density, conversely to the above case, although a yellow component is hard to visually detect.

To avoid this state, in attaching a certain dot pattern to image information that has undergone pseudo-halftoning processing, processing of measuring the density, i.e., pixel density in the region around the attachment portion by some method and attaching an appropriate dot pattern in accordance with the measurement result must be executed. However, such a method has not been proposed yet.

FIG. 111 is a view showing an example of a yellow plane to which a specific dot pattern is added to superpose conventional additional information. Referring to FIG. 111, a dot indicates a point where a dot pattern shown in FIG. 112 is attached. FIG. 113 is an enlarged view of FIG. 111. Referring to FIG. 113, a pixel represented by a dot is a pixel (to be referred to as an "on-dot" hereinafter) printed on a printing medium such as paper using ink or toner.

In the above-described method, the dot pattern is generally embedded in the entire image at a predetermined period, as shown in FIG. 111. This predetermined period is an A-pixel period in the main scanning direction, and a B-pixel period in the sub-scanning direction.

However, the above-described conventional method has the following problem.

FIGS. 114A to 114D are views showing CMYK components after pseudo-halftoning processing. Especially, the yellow plane shown in FIG. 114D indicates Y (yellow) components of the CMYK components. The dot pattern shown in FIG. 112 is attached to each of halftone dot regions. It is found that, in all the CMYK planes, neither region A nor B have on-dots.

The conventional additional information superposition means attaches a dot pattern to all attachment positions on the Y plane, as shown in FIG. 115, regardless of the situation.

For this reason, in a region such as the region A or B where no on-dots are present in all the CMYK planes, only pixels of the dot pattern are printed on a printing medium such as paper. Under these circumstances, an unnatural dot may be visually confirmed, though the yellow component is hard to visually detect.

To avoid this situation, for example, in attaching a dot pattern onto the Y plane, processing of measuring, by some method, the density state (pixel distribution) around the position where the dot pattern is to be attached for all the CMYK components and determining in accordance with the measurement result whether the dot pattern should be attached is executed.

Even when this processing is executed, the attached information can be restored because the dot pattern representing the presence of additional information is periodically present. However, such a method has not been proposed yet.

SUMMARY OF THE INVENTION

It is an object of the present invention to provide an image processing apparatus and method, and a storage medium, all of which can solve at least one of the above problems.

The present invention has been made to solve the above problems, and has as its another object to provide an image processing method and apparatus capable of multiplexing additional information without degrading image quality.

The present invention has been made to solve the above problems, and has as its still another object to provide an image processing apparatus and method capable of minimizing degradation in image quality even when additional information is multiplexed on image information and also allowing even, e.g., a popular low-resolution image reading apparatus to properly separate and read the additional information from a printed image having the multiplexed additional information.

It is still another object of the present invention to provide an image processing apparatus and method, and a storage medium, all of which can suppress degradation in quality of an image and embed predetermined information such that it can be easily detected.

The present invention has been made to solve the above problem, and has as its still another object to provide an image processing method and apparatus capable of superposing additional information with little visual incompatibility while maintaining the density of image information.

The present invention has been made to solve the above problems, and has as its still another object to provide an image processing method and apparatus which can superpose additional information with little visual incompatibility and reduce the error rate of dot pattern detection in reading the additional information.

In order to achieve the above-described object, according to a preferred aspect of the present invention, there is provided an image processing method of multiplexing a code representing additional information with image information, characterized by comprising:

the shape setting step of setting code shape information on the basis of a feature of the image information;

the quantization condition determination step of determining a quantization condition of a pixel of interest in the image information on the basis of the code shape information and the additional information; and the quantization step of quantizing the pixel of interest on the basis of the quantization condition.

In order to achieve the above-described object, according to another preferred aspect of the present invention, there is provided an image processing apparatus for multiplexing additional information with image information, characterized by comprising:

first input means for inputting the image information;

second input means for inputting the additional information;

quantization means for multiplexing the additional information with the image information and executing pseudo-halftoning processing so as to express the additional information by a set of minimum number of pixels readable by an image reading apparatus in consideration of resolution of an image output apparatus for outputting the image information as an image and resolution of the image reading apparatus for reading the image output from the image output apparatus; and output means for outputting image data processed by pseudo-halftoning processing by the quantization means.

In order to achieve the above-described object, according to still another preferred aspect of the present invention, there is provided an image processing apparatus for reading an image having additional information multiplexed thereon and separating the additional information, characterized by comprising:

read means for reading the image;

detection means for detecting a position where the additional information is multiplexed in the image; and separation means for specifying the additional information multiplex position of the image on the basis of a detection result from the detection means and separating the additional information from the specified position.

In order to achieve the above-described object, according to still another preferred aspect of the present invention, there is provided an image processing method of multiplexing additional information with image information and separating the additional information from an image having the additional information multiplexed, characterized by comprising:

the first input step of inputting the image information;

the second input step of inputting the additional information;

the quantization step of multiplexing the additional information with the image information and executing pseudo-halftoning processing so as to express the additional information by a set of minimum number of pixels readable by an image reading apparatus in consideration of resolution of an image output apparatus for outputting the image information as an image and resolution of the image reading apparatus for reading the image output from the image output apparatus;

the output step of forming an image on the basis of image data processed by pseudo-halftoning processing and outputting the image;

the read step of reading the image;

the detection step of detecting a position where the additional information is multiplexed in the image; and the separation step of specifying the additional information multiplex position of the image on the basis of a detection result in the detection step and separating the additional information from the specified position.

In order to achieve the above-described object, according to still another preferred aspect of the present invention, there is provided an image processing apparatus for attaching predetermined information to image information, characterized by comprising:

input means for inputting the image information; and attachment means for attaching a plurality of different predetermined information to different color components of the image information input by the input means, respectively.

In order to achieve the above-described object, according to still another preferred aspect of the present invention, there is provided an image processing apparatus characterized by comprising:

generation means for generating a plurality of types of second dot patterns corresponding to a first region smaller than a size of a first dot pattern representing predetermined information; and embedding means for selectively embedding the plurality of types of second dot patterns in units of first regions.

In order to achieve the above-described object, according to still another preferred aspect of the present invention, there is provided an image processing apparatus for multiplexing image information and additional information different from the image information, characterized by comprising:

decodability determination means for determining whether decoding is possible when a code is attached on the basis of a pixel value around a pixel of interest in the image information; and quantization condition determination means for determining quantization condition on the basis of a determination result from the decodability determination means, the pixel value around the pixel of interest in the image information, and the additional information to be multiplexed; and quantization means for quantizing the pixel of interest in the image information by pseudo-halftoning processing under the quantization condition determined by the quantization condition determination means.

In order to achieve the above-described object, according to still another preferred aspect of the present invention, there is provided an image processing method of attaching predetermined information to image information, characterized by comprising the steps of:

determining detectability of the predetermined information attached to the image information and attaching the predetermined information in accordance with the determined detectability.

In order to achieve the above-described object, according to still another preferred aspect of the present invention, there is provided an image processing apparatus for superposing additional information different from image information on the image information and outputting the image information, characterized by comprising:

input means for inputting the image information;

pseudo-halftoning processing means for quantizing a pixel of interest in the image information; and additional information superposition means for selectively superposing a plurality of additional information each having a specific dot pattern in accordance with a density around the pixel of interest processed by the pseudo-halftoning processing means.

There is also provided an image processing apparatus for attaching predetermined information to image information, characterized by comprising:

input means for inputting the image information;

holding means for holding a plurality of dot patterns having different densities; and attachment means for selectively attaching the dot patterns to the image information in accordance with a density of the image information.

There is also provided an image processing apparatus for multiplexing image information and additional information different from the image information, characterized by comprising:

input means for inputting the image information;

quantization means for quantizing a pixel of interest in the image information;

dot pattern holding means for holding a specific dot pattern representing presence of the additional information in advance;

attachment position information generation means for converting the additional information into position information as an attachment position of the dot pattern;

density detection means for grasping a density state around the attachment position of the dot pattern, which is obtained by the attachment position information generation means; and additional information superposition means for determining, on the basis of a grasp result by the density detection means, whether the dot pattern is to be attached and superposing the additional information in accordance with a determination result.

There is also provided an image processing apparatus for attaching predetermined additional information to image information, characterized by comprising:

input means for inputting the image information;

holding means for holding the additional information;

detection means for detecting a density of the image information, which is represented by a plurality of color components of the image information around an attachment position of the additional information; and control means for, when the density of the image information, which is represented by the plurality of color components and detected by the detection means, has a predetermined value, controlling not to attach the additional information.

There is also provided an image processing apparatus for superposing additional information different from image information on the image information and outputting the image information, characterized by comprising:

input means for inputting the image information;

pseudo-halftoning processing means for quantizing a pixel of interest in the image information;

generation means for generating additional information having a specific dot pattern; and additional information superposition means for superposing the additional information, while maintaining a density around an attachment position of the additional information, in accordance with presence of a neighboring pixel around the attachment position of the additional information.

There is also provided an image processing apparatus characterized by comprising:

input means for inputting image information;

holding means for holding predetermined additional information;

attachment means for attaching the predetermined additional information to the image information in units of pixels; and adjustment means for adjusting a density of the image information around an attachment position of the additional information in accordance with a density of the additional information.

There is also provided an image processing method characterized by comprising:

the input step of inputting image information;

the holding step of holding predetermined additional information;

the attachment step of attaching the predetermined additional information to the image information in units of pixels; and the adjustment step of adjusting a density of the image information around an attachment position of the additional information in accordance with a density of the additional information.

There is also provided an image processing apparatus characterized by comprising:

input means for inputting image information;

generation means for generating an amount representing a degree of complexity of the image information; and information attachment means for attaching predetermined information to the image information in accordance with the amount representing the degree of complexity.

The present invention relates to an image processing apparatus having a new function, and a method and storage medium therefor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing an error distribution matrix of this embodiment;

FIG. 7 is a view showing threshold values for code generation of this embodiment;

FIG. 10 is a view showing a code pattern at an edge portion in this embodiment;

FIGS. 15A to 15C are views showing a quantization result of image information according to this embodiment;

FIG. 16 is a block diagram showing the arrangement of a multiplexing apparatus according to this embodiment, which multiplexes additional information with image information and prints the image;

FIGS. 21A and 21B are views showing a dither matrix according to this embodiment and a binarization result using the matrix;

FIG. 22 is a block diagram showing the arrangement of an image processing apparatus according to still another embodiment;

FIGS. 26A to 26F are views for explaining a code for high density and a code for low density;

FIG. 27 is a view showing a dot pattern selection method of this embodiment;

FIG. 28 is a flow chart showing the code attachment control procedure of this embodiment;

FIGS. 34A to 34F are views showing the dot pattern selection method of this embodiment;

FIG. 54 is a view showing a data format after compression processing in this embodiment;

FIG. 66 is a view showing a density threshold value in the first embodiment;

FIGS. 67A and 67B are views showing images before and after a dot pattern is attached using processing in this embodiment;

FIGS. 74A and 74B are views showing image examples before and after a dot pattern is attached using processing in this embodiment;

FIGS. 76A to 76D are views showing images after pseudo-halftoning processing of this embodiment;

FIGS. 80A to 80D are views showing density reference regions of this embodiment;

FIGS. 84A to 84D are views showing density reference regions of this embodiment;

FIGS. 85A to 85D are views showing images after additional information superposition processing of this embodiment;

FIG. 100 is a view showing the database of the dot pattern in this embodiment;

FIG. 101 is a view showing the order of off-dot processing in this embodiment;

FIG. 102 is a view showing the database of off-dot processing in this embodiment;

DETAILED DESCRIPTION OF THE PREFERRED EMBODIMENTS

Preferred embodiments of the present invention will be described below in detail with reference to the accompanying drawings. An image processing apparatus according to an embodiment is efficiently mainly incorporated as printer driver software or application software in a computer for generating image information to be output to a printer engine. However, it is also effective to incorporate the image processing apparatus as hardware and software in a copying machine, facsimile apparatus, or printer main body.

Figure 1:
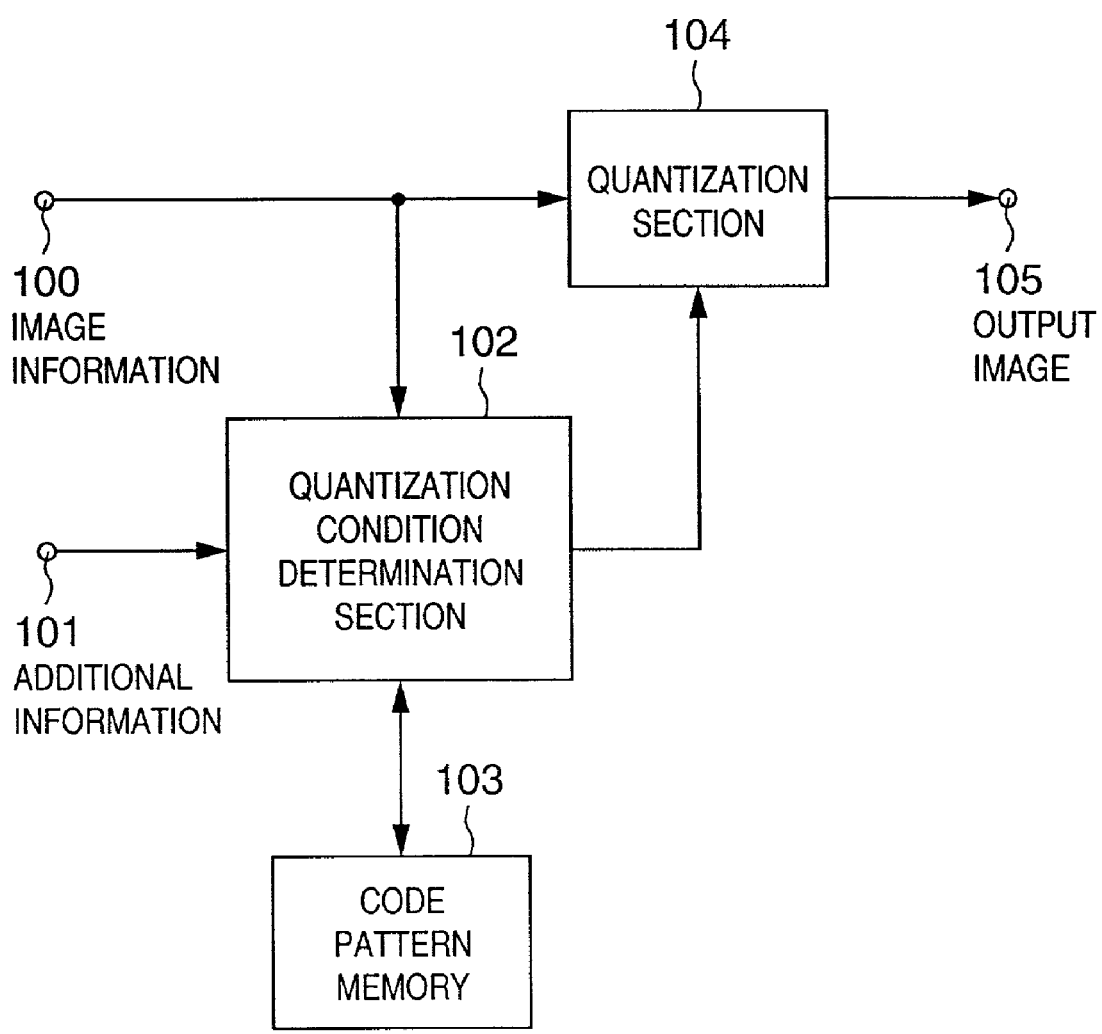
FIG. 1 is a block diagram showing the arrangement of an image processing apparatus according to an embodiment of the present invention.

FIG. 1 is a block diagram showing the arrangement of an image processing apparatus according to an embodiment, which can be applied to a printing apparatus such as an inkjet printer for forming an image using pseudo-halftoning expression.

Referring to FIG. 1, an input terminal 100 inputs image information, and an input terminal 101 inputs additional information such as identification information. A quantization condition determination section 102 determines a quantization condition for quantization of image information. The quantization condition determination section 102 holds, as a table, a plurality of quantization conditions in an internal ROM (not shown) in advance and selects an appropriate quantization condition. A code pattern memory 103 holds a plurality of types of dot patterns each representing one code of additional information. The held code patterns are referred to by the quantization condition determination section 102 to determine the quantization condition. A quantization section 104 quantizes image information. The quantization section 104 quantizes image information by a method such as error diffusion on the basis of the quantization condition determined by the quantization condition determination section 102. An output terminal 105 outputs the quantized image information.

Error diffusion is a method of expressing, by pseudo-halftoning, multilevel image information using binary values or quantization values smaller than the input image information. In this quantization method, an error generated upon quantizing a pixel value of interest is distributed to pixels around the pixel of interest, thereby storing the image density.

Figure 2:
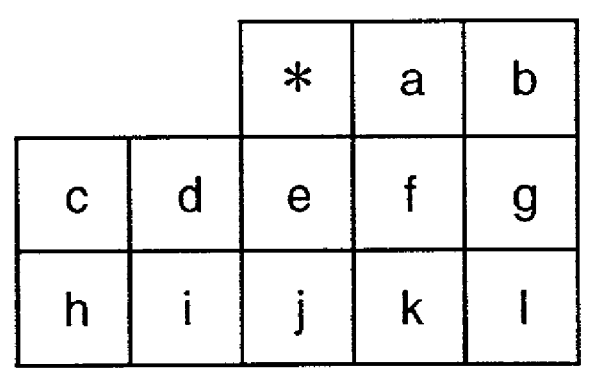

FIG. 2 is a view showing an error distribution matrix of error diffusion. Referring to FIG. 2, ★ represents the position of a pixel of interest, and a to 1 represent the distribution ratios of a quantization error generated in the pixel of interest. The error is distributed to neighboring pixels of the pixel of interest in accordance with the distribution ratios. In the example shown in FIG. 2, the error is distributed to 2×2 pixels around the pixel of interest. However, the error distribution range is not limited to this. In this embodiment, assume that the code attachment interval is constant in the vertical direction and is changed in the horizontal direction.

Figure 3:
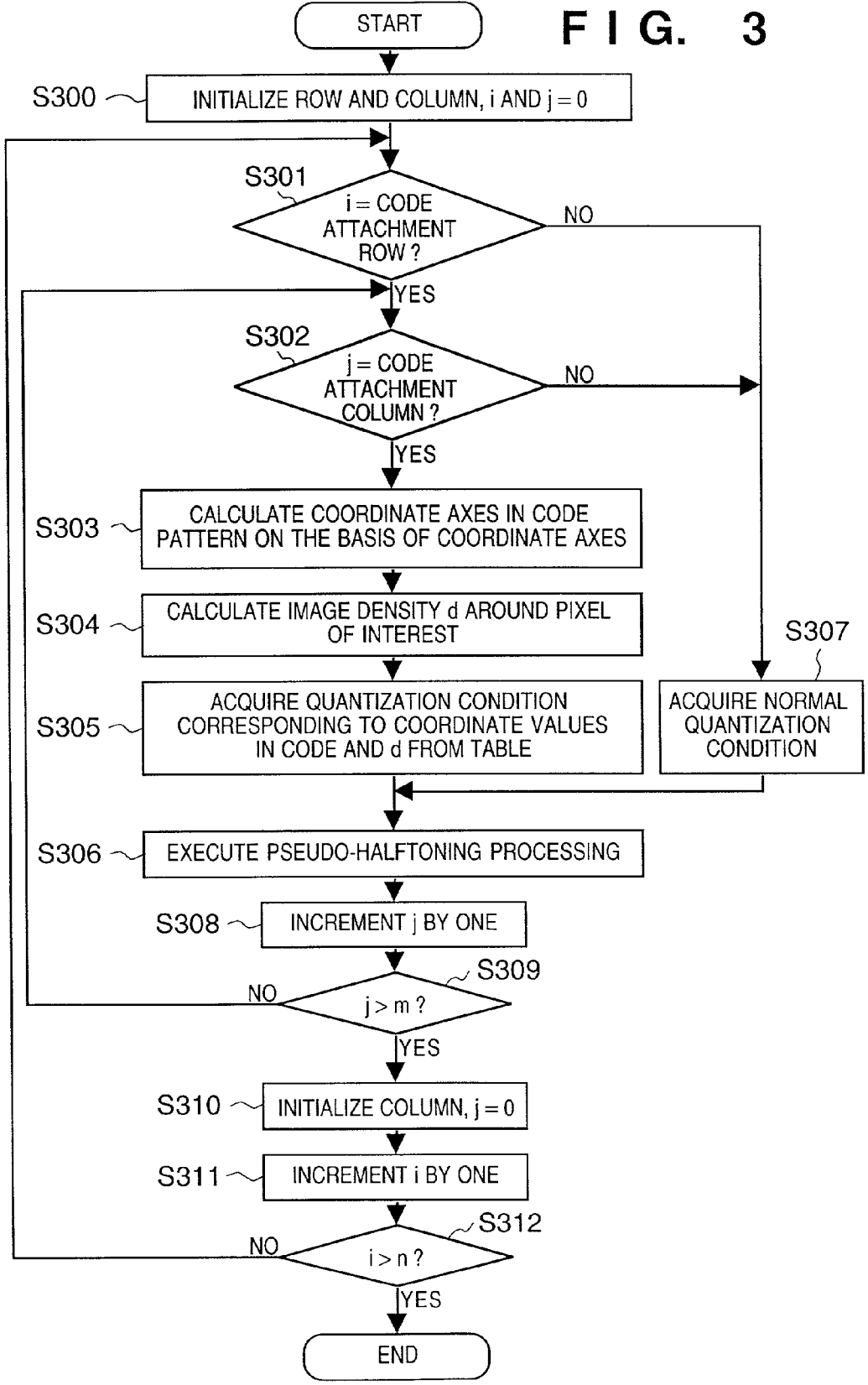
FIG. 3 is a flow chart showing the code attachment control procedure of this embodiment.

FIG. 3 is a flow chart showing the code attachment control procedure of this embodiment.

First, in step S300, a variable i for counting the vertical address and a variable j for counting the horizontal address are initialized. In step S301, it is determined whether code attachment is to be executed for a row indicated by the row address i. If YES in step S301, it is determined in step S302 whether code attachment is to be executed for a column indicated by the column address j.

If it is determined in steps S301 and S302 that a pixel of interest indicated by the addresses i and j is a code attachment position, the flow advances to step S303. In this embodiment, an additional code is represented by a code pattern formed from a predetermined layout of a plurality of dots. For this reason, in step S303, coordinate values in the code pattern of the pixel of interest are calculated on the basis of the coordinate values (i,j) of the pixel of interest, and in step S304, an image density d around the pixel of interest (i,j) is detected.

The code pattern of this embodiment is set in accordance with the target code attachment image from a plurality of dot patterns held in the code pattern memory 103. This code pattern is set before the start of code attachment processing. The setting method will be described later.

In step S305, the quantization condition determination section 102 acquires a quantization condition for code attachment from the table in which a plurality of quantization conditions are registered in advance, on the basis of the image density d around the pixel of interest, the coordinate values in the code pattern, and the additional information. After that, in step S306, pseudo-halftoning processing (quantization processing by the quantization section 104) for image information is executed. With this pseudo-halftoning processing, actual code attachment in this embodiment is executed.

On the other hand, if it is determined in step S301 or S302 that the pixel of interest is not a pixel position where code attachment is to be executed, the flow advances to step S307 to acquire a normal quantization condition without code attachment, and then, pseudo-halftoning processing for image information is executed in step S306.

In step S308, the count value of the column address j is incremented by one. In step S309, it is determined whether processing in the column direction is ended. If NO in step S309, the flow returns to step S302. If YES in step S309, the flow advances to step S310.

In step S310, the column address j is initialized. After that, in step S311, the count value of the row address i is incremented by one. In step S312, it is determined whether processing for all rows is ended. If NO in step S312, the flow returns to step S301. If YES in step S312, the code attachment processing is ended.

Figure 4:
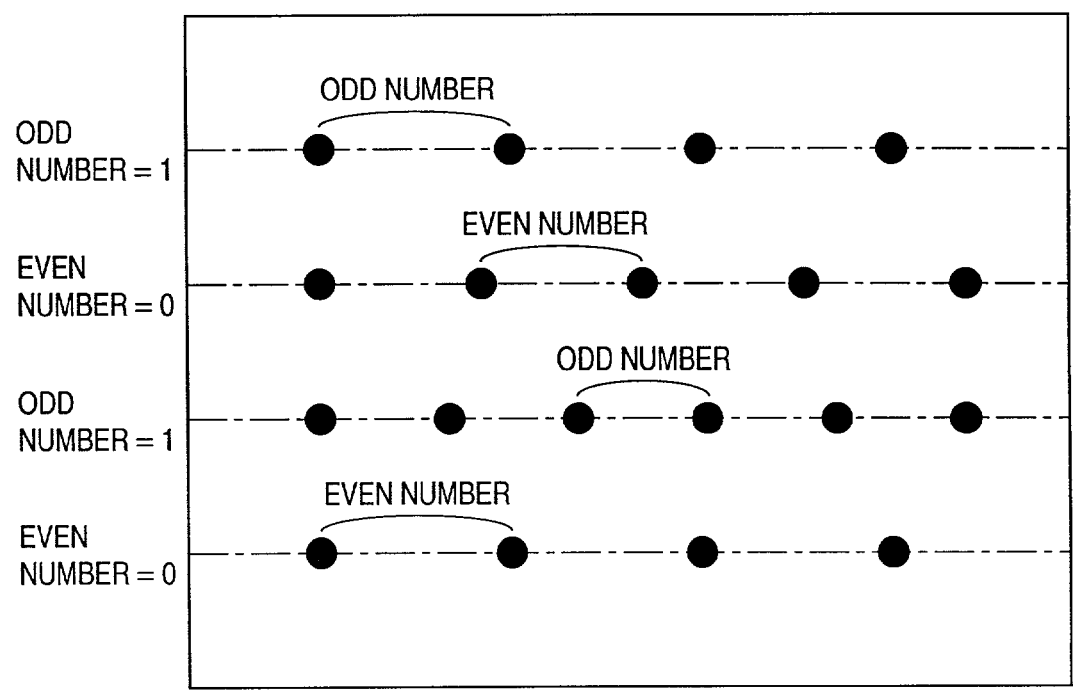
FIG. 4 is a view showing an attached information block of this embodiment.

FIG. 4 is a view showing an information block representing 4-bit information attached to image information in this embodiment. Referring to FIG. 4, "●" represents one code, i.e., a code pattern formed from a plurality of dots.

Referring to FIG. 4, an information bit is expressed in accordance with the interval of additional codes in units of code attachment rows in image information. According to FIG. 4, the code interval is constant in the same row. When the code interval corresponds to an odd number of codes, it represents an information bit "1". A code interval corresponding to an even number of codes represents an information bit "0". That is, the information block represents 4-bit information "1010".

In the anti-forgery technique which must reliably detect additional information from an image, the information block shown in FIG. 4 is embedded at any position in the entire image information. The information block shown in FIG. 4 is merely an example, and the present invention is not limited to this.

Generally, when a code representing specific information is attached in an image represented by pseudo-halftoning, the image quality degrades because the code is visually perceived. However, when a code is attached as a measure against forgery of securities, the code must be repeatedly attached in a wide range of an image so that the attached specific information can be reliably detected. Hence, the code itself must be unnoticeable.

As a method of making a code unnoticeable, a code in small size is used. However, this method is impractical because an image reading apparatus used to detect the code must have a high-resolution reading function, and the optimum read resolution changes in units of printing apparatuses.

As another method, a code having an unnoticeable pattern shape is used. However, the dot layout of an image expressed by pseudo-halftoning largely depends on the pseudo-halftoning processing method. For example, when pseudo-halftoning processing using error diffusion is performed, and the error distribution ratio in the error distribution matrix shown in FIG. 2 is changed, the dot layout of the output image changes. In addition, as a feature of the dot layout of an output image in a window having a predetermined size, especially at a flat image portion formed from a character, a specific pattern appears many times while another specific pattern does not appear at all. Furthermore, the pattern appearance rate also changes depending on the image density. A pattern that does not appear at a certain image density may appear at another density.

Considering the above-described characteristic features of pseudo-halftoning processing using error diffusion, a code pattern used in this embodiment and its attachment processing will be described in detail.

The code pattern of this embodiment will be described first with reference to FIGS. 5A to 7.

Figure 5B:
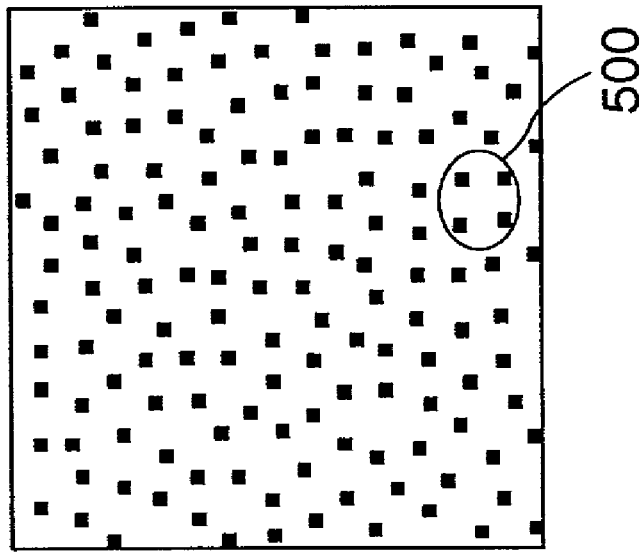
FIGS. 5A and 5B are views showing binarization of a flat image of this embodiment.
Figure 5A:
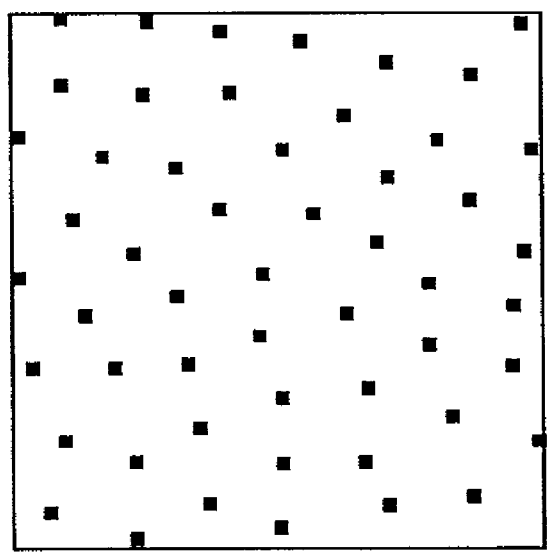
Figure 6:
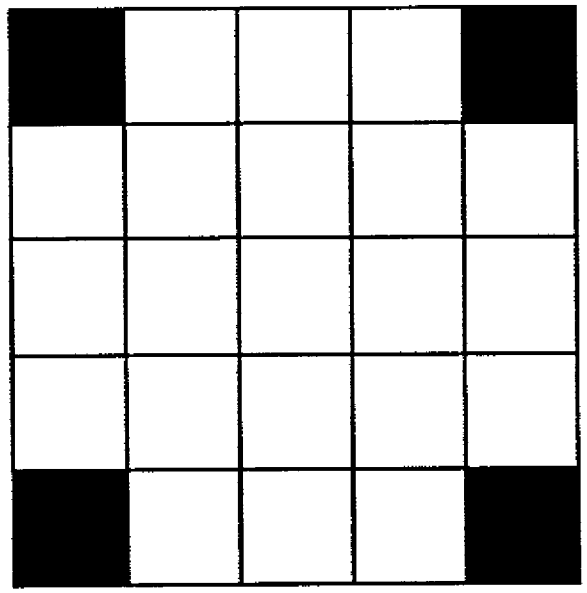
FIG. 6 is a view showing a code pattern of this embodiment.

FIGS. 5A and 5B are views respectively showing parts of images obtained by binarizing a flat image having a density of about 2% (5/256) and a flat image having a density of about 6% (15/256) by error diffusion. FIG. 6 is a view showing a 5×5 dot pattern window which represents the layout pattern of dots that appear at a portion 500 in FIG. 5B. The pattern shown in FIG. 6 does not appear in FIG. 5A.

In this embodiment, for the image density (about 2%) corresponding to FIG. 5A, the pattern shown in FIG. 6 is set as a code (to be referred to as a code pattern hereinafter) distinguishable from image information. More specifically, of the plurality of code patterns held in the code pattern memory 103, the pattern shown in FIG. 6 is selected by the quantization condition determination section 102 for a flat image having an image density of 2%. Code patterns held by the code pattern memory 103 can appear in the quantization result of a flat portion having a certain density. Hence, in this embodiment, a natural dot pattern can always be set as a code pattern.

Figure 7:
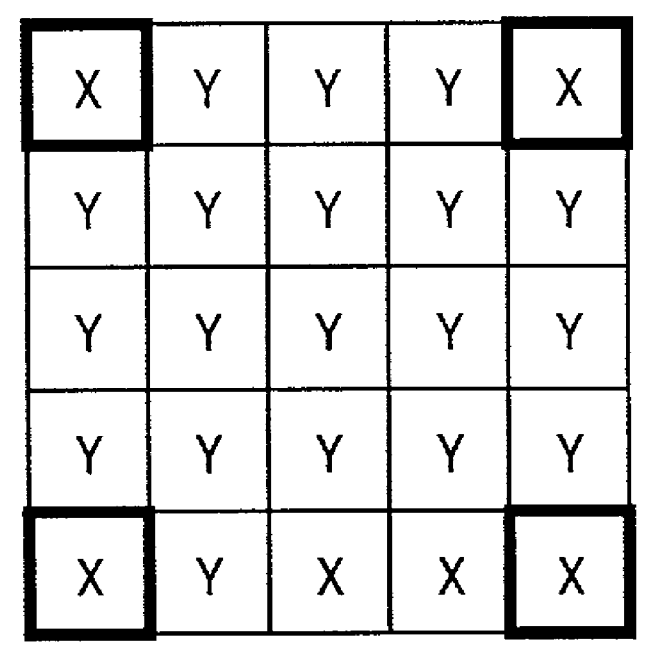

FIG. 7 is a view showing threshold values used to generate the code pattern shown in FIG. 6 in executing pseudo-halftoning expression using error diffusion. The accumulation of errors in error diffusion falls within a predetermined range. For this reason, when the threshold value for binarization is set to be equal to or smaller than a predetermined value, a dot corresponding to the threshold value can always be turned on. In the pixel block shown in FIG. 7, for X corresponding to pixels at four corners, a threshold value is set to always turn the dots on. For Y corresponding to the remaining pixels, a threshold value for normal processing is set. Using the thus generated threshold value block shown in FIG. 7, the code pattern shown in FIG. 6 can be reliably generated.

An example in which the code pattern in this embodiment is actually attached to an image will be described in detail with reference to FIGS. 8A and 8B.

Figure 8B:
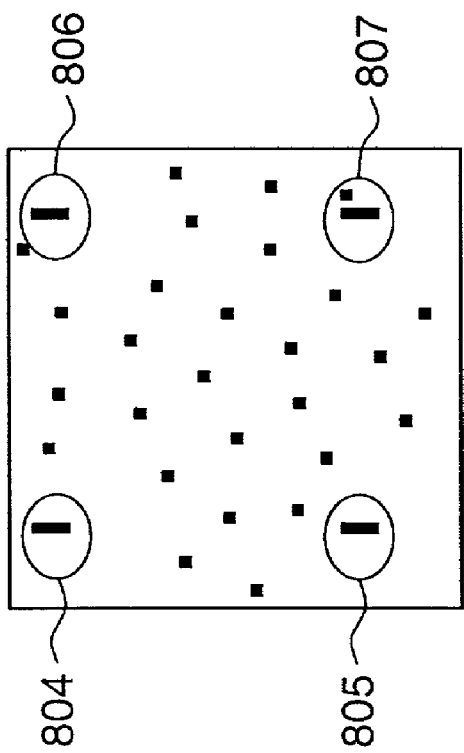
FIGS. 8A and 8B are views showing code attachment of this embodiment.
Figure 8A:
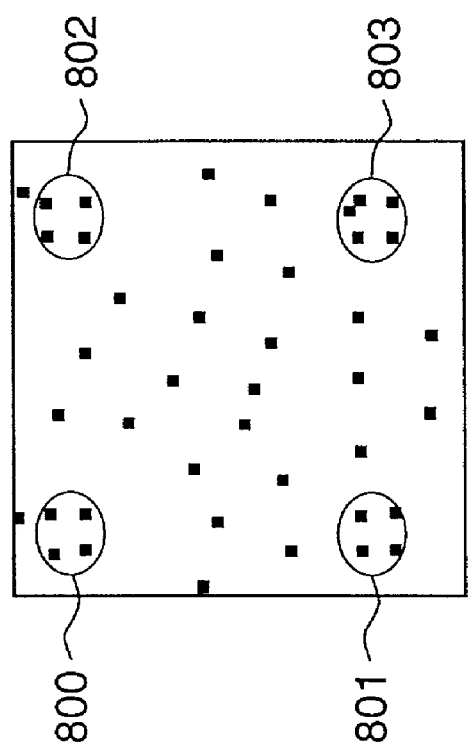

FIG. 8A is a view showing an output image obtained by binarization processing of attaching, as codes 800, 801, 802, and 803, the code pattern shown in FIG. 6 to an image having the same density as that in FIG. 5A.

FIG. 8B is a view showing an output image obtained by binarization processing of attaching, as codes 804, 805, 806, and 807, a pattern different from the code pattern shown in FIG. 6 to an image having the same density as that in FIG. 5A. Each of the patterns 804 to 807 has dots equal in number to those of the code pattern (codes 800 to 803 shown in FIG. 8A) shown in FIG. 6 but different in shape. This pattern does not appear in a flat portion in normal binarization processing.

As is apparent from FIGS. 8A and 8B, the code pattern (codes 800 to 803) set in this embodiment is more unnoticeable. More specifically, degradation in image quality upon code attachment can be suppressed by setting, as a code pattern, an unnoticeable pattern at a flat portion with this density.

In this embodiment, using the fact that the dot pattern shown in FIG. 6 does not appear at the density shown in FIG. 5A, this pattern is employed as a code pattern. However, an actual image does not always have a completely flat portion, and the pixel value may fluctuate in units of regions. Hence, in actually setting a code pattern, it must be confirmed that the pattern does not appear not only for a target density region but also for a neighboring density region.

In this embodiment, the density in the window forming the code pattern shown in FIG. 6 is higher than the average density of the image shown in FIG. 5A. Generally, for a pattern that hardly appears at a certain density but appears at another density, the density in the window is often largely different from the target image density. For the code pattern of this embodiment, the density in the window is higher or lower than the target image density. If the target image density is low, the density of the code pattern in the window is set higher than the target image density. Conversely, if the target image density is high, the density of the code pattern in the window is set lower than the target image density. More specifically, the number of on- or off-dots smaller in number than the other in the code pattern is set to be larger than that of a dot pattern that appears as a quantization result of the target image. This prevents the code pattern from being hidden in the dot layout of the image and becoming undetectable.

In this embodiment, the window size of code pattern is 5×5, as shown in FIG. 6. However, the window size is not limited to this, and the aspect ratio of window is not limited to this, either. That is, the code pattern shown in FIG. 6 is merely an example, and the present invention is not limited to this.

The dot pattern which appears upon binarization changes in accordance with the image density. For this reason, when the code pattern is changed in accordance with the image density, a more unnoticeable code shape can be set. It is also effective to change the window size of the code pattern in accordance with the image density.

As described above, according to this embodiment, when information of a different kind is to be multiplexed with image information obtained by expressing image information particularly having a number of flat portions by pseudo-halftoning, degradation in image quality can be suppressed by making the shape of code for expressing the information unnoticeable.

Another embodiment of the present invention will be described below.

As a characteristic feature of this embodiment, in attaching a code to a color image, the code shape is changed in units of color components.

Generally, a printing apparatus such as an inkjet printer or color laser printer prints a color image using C (cyan), M (magenta), Y (yellow), and K (black) inks or toners. In such color printing, even when the same shape is formed, the visual impression changed depending on the color component. For example, assume that a dot is printed on white paper. If K ink is used, the dot is noticeable. However, when Y ink is used, the dot is unnoticeable.

When information such as the machine number of an apparatus used for printing is attached for anti-forgery of securities, the additional information must be reliably detected. As a method of attaching a number of pieces of information in a small number of regions as much as possible, the information is divisionally attached to a plurality of color components. To reliably detect information regardless of the image, it is effective to attach information to a plurality of color components to increase the range of information readable condition.

However, because of the above-described visual sensitivity to ink colors, even when codes having identical shapes are attached to the respective colors, the code may be noticeable depending on colors.

As a characteristic feature of this embodiment, in attaching a code to a color image, the shape of code pattern is controlled in accordance with the visual sensitivity to a dot of each color component. More specifically, the code pattern shape is determined with emphasis on the unnoticeablity rather than the code attachment efficiency.

It is also effective to change the size of code pattern in units of color components.

In this embodiment, the code pattern shape is set following the same procedure as in the above-described embodiment.

As described above, according to this embodiment, the code pattern shape is controlled in consideration of the visual sensitivity of a color component to which a code is to be attached, thereby reducing degradation in image quality of a color image.

Still another embodiment of the present invention will be described below.

In the above-described embodiment, the code pattern is multiplexed especially at the flat portion of an image. However, actual image information may contain an edge portion. Particularly, when code attachment is to be executed for the purpose of anti-forgery of securities, an image as an attachment target contains characters, pictures, or patterns, i.e., many edge portions. Hence, to reliably read the additional information, the code pattern is preferably detected even at an edge portion.

In this embodiment, code pattern shape control at an edge portion will be described.

A code pattern used on the low density side of an edge portion has only a dot density almost hidden in the low-density region. Hence, at the edge portion, for example, the code pattern is hidden in the edge portion. If only half of the code pattern is detected, the detected dots can hardly be determined as the code pattern, i.e., the code. On the high-density side of the edge portion as well, the code can hardly be detected if the code pattern is formed from, e.g., dispersed dots.

As a characteristic feature of this embodiment, a code pattern which can be reliably detected even at an edge portion of an image is set.

Figure 9:
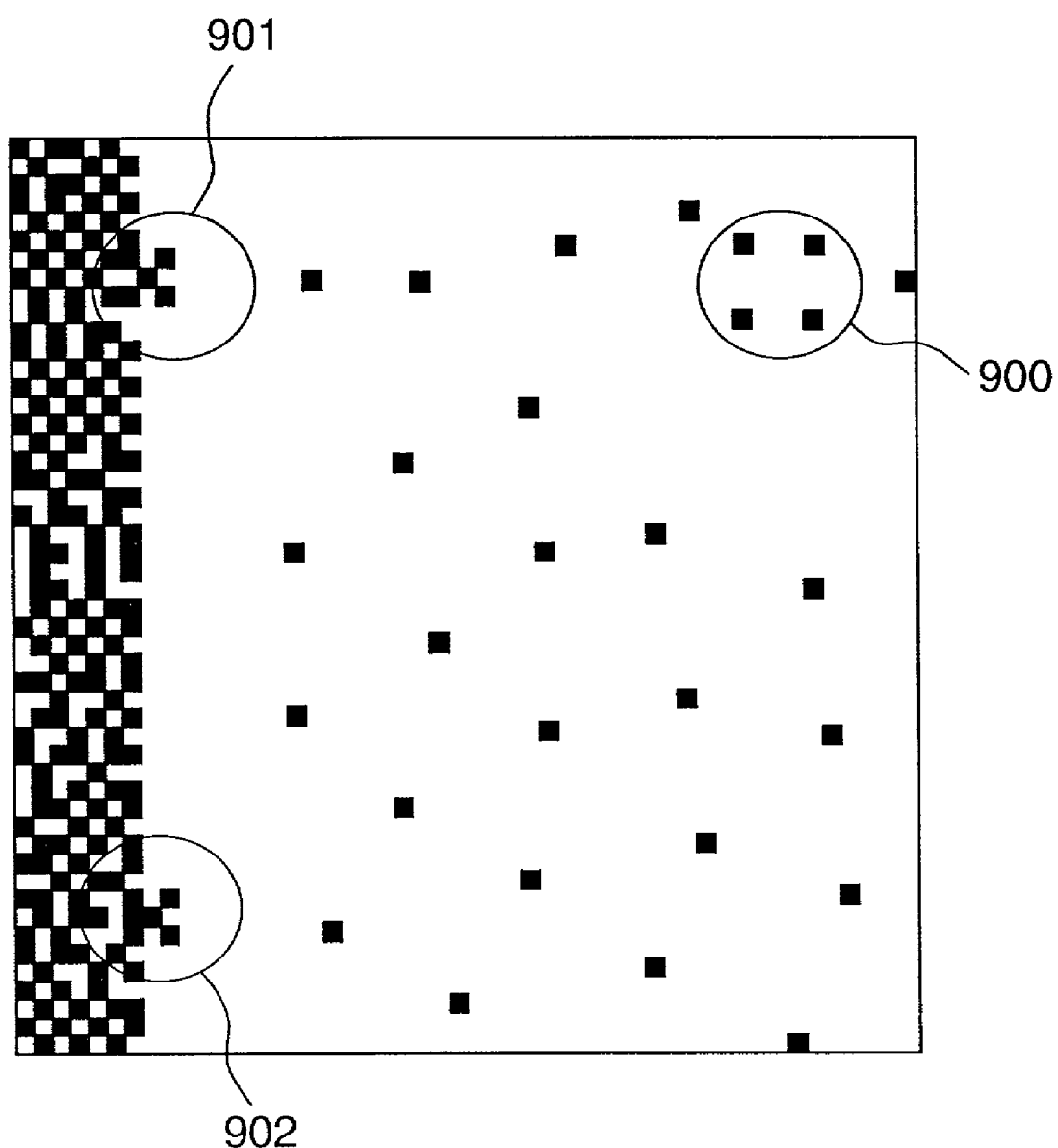
FIG. 9 is a view showing code attachment to an edge portion in this embodiment.

FIG. 9 is a view showing code attachment to an edge portion of an image. Referring to FIG. 9, reference numerals 900, 901, and 902 denote attached codes. The code 900 is unnoticeable in a low-density region under the quantization condition, like the code 800 in the above-described embodiment. On the other hand, the codes 901 and 902 are at an edge portion as a characteristic feature of this embodiment.

FIG. 10 is a view showing a code pattern corresponding to the codes 901 and 902. As is apparent from FIG. 10, a pattern having low dot dispersion, i.e., a pattern having dots densely is set as a code at the edge portion.

It is very effective to make the code pattern size large to reliably discriminate the code even when only part of the code pattern is detected. It is also effective to set the code pattern in consideration of the edge shape.

As described above, according to this embodiment, especially, when a code is attached to an edge portion of an image, the code can be reliably identified even when, e.g., only part of the code pattern is detected, by setting a code pattern including dots densely.

As has been described above, according to the present invention, additional information can be multiplexed without degradation in image quality.

Figure 11:
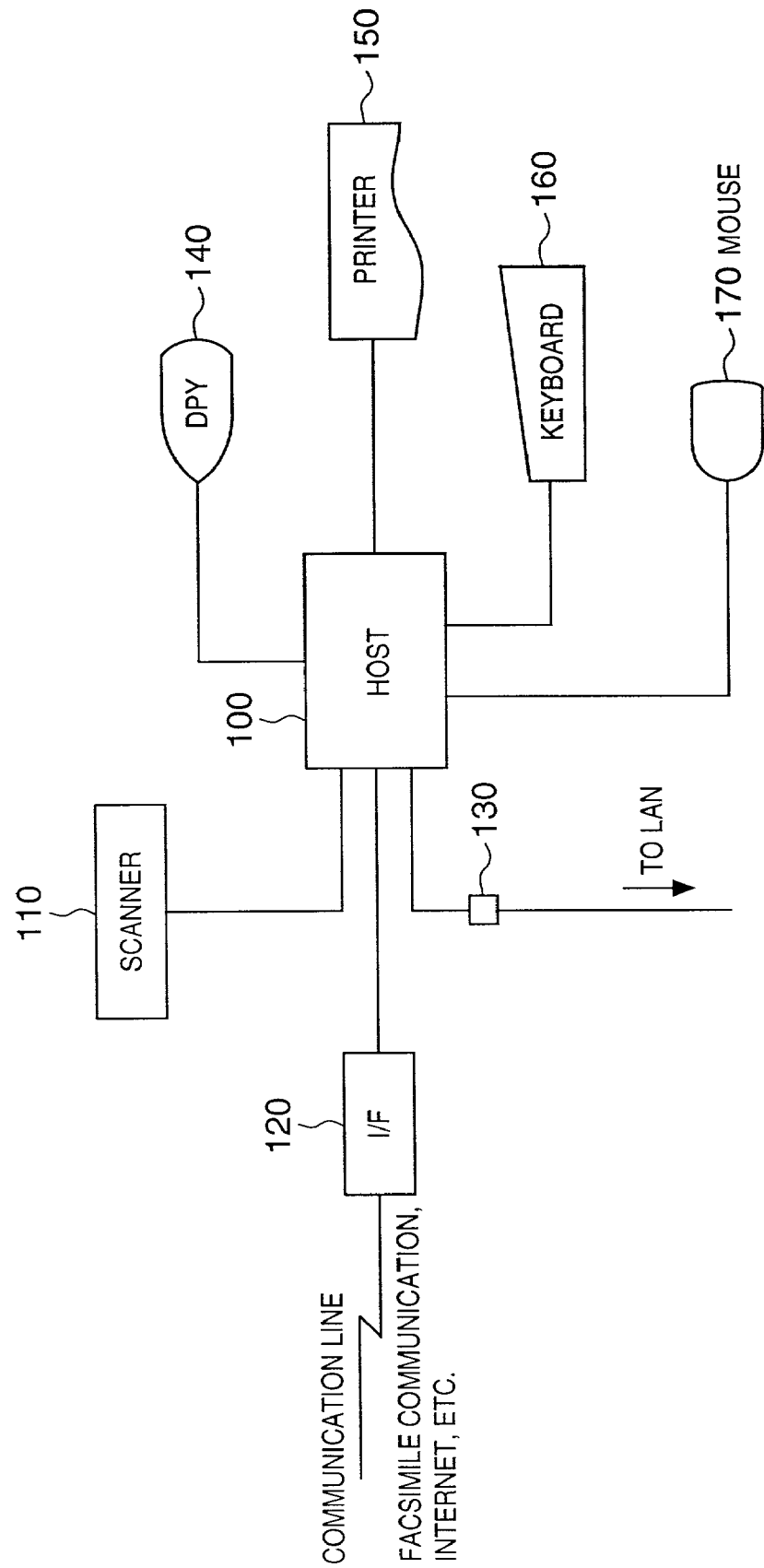
FIG. 11 is a block diagram showing the arrangement of an image processing apparatus according to another preferred embodiment of the present invention.

FIG. 11 is a block diagram showing the arrangement of an image processing apparatus according to another preferred embodiment of the present invention. As shown in FIG. 11, this apparatus comprises a host computer (to be referred to as a host hereinafter) 100 for processing image information, a scanner 110 for reading an image original and generating image information, a communication interface (I/F) 120 for receiving image information through a communication line, a LAN interface 130 for receiving image information through a LAN, a display 140 such as an LCD, PDP, FED, or CRT for displaying image information as an image, a printer 150 for outputting image information to a printing medium such as printing paper as an image, a keyboard (KB) 160 used to perform various man-machine operations necessary for image processing, and a mouse 170.

The host 100 has a CPU for executing image processing or communication control processing, a ROM which stores a control program and the like, a RAM used to store image information or as a working area for image processing, a hard disk or magnetooptical disk for storing a large quantity of data, and an interface for connecting various peripheral devices.

Data received by the communication interface (I/F) 120 can be facsimile data or digital image information input through the Internet.

The printer 150 is basically constructed by a printer controller serving as an interface to the host 100, and a printer engine. The printer engine can be a printer engine according to an inkjet scheme, a printer engine according to electrophotography, or an engine according to another printing scheme.

The image processing apparatus having the above arrangement can take various forms as an apparatus. More specifically, the apparatus can be built as, e.g., a stand-alone copying machine by removing the communication interface and LAN interface from the above arrangement and integrating the display, keyboard, and mouse as an operation panel. Alternatively, the apparatus can be built as a stand-alone facsimile apparatus when the LAN interface is removed, the display, keyboard, and mouse are integrated as an operation panel, and the communication interface is used as an interface dedicated to facsimile. When a personal computer is employed as a host, and the above devices are connected as peripheral devices, an image processing system can be built.

Image processing to be described below is mainly efficiently implemented as printer driver software in the host, which generates image information to be output to the printer engine. However, this processing may be implemented by hardware or software incorporated in a copying machine, facsimile apparatus, or printer main body.

Figure 12:
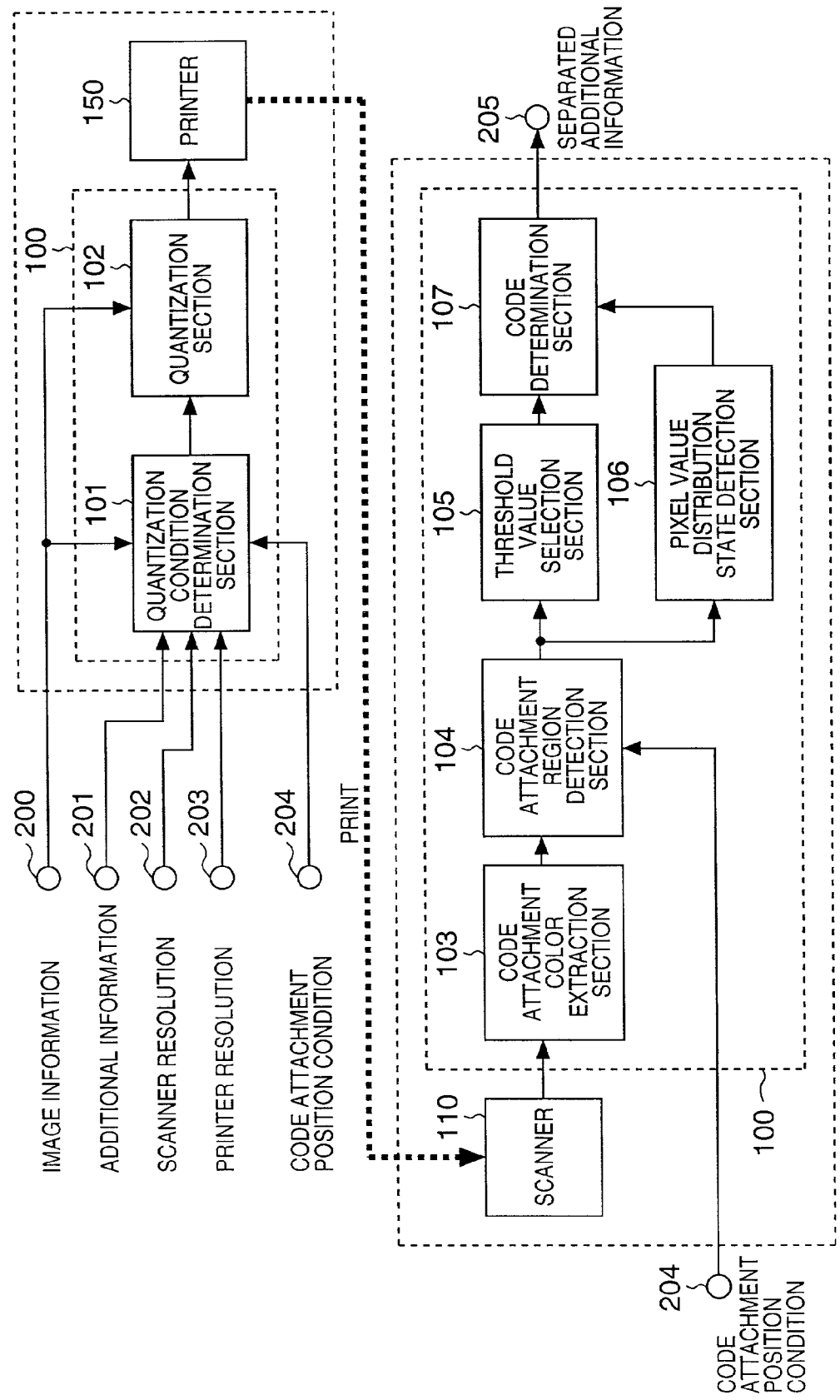
FIG. 12 is block diagram showing the arrangements of a multiplexing apparatus for multiplexing additional information with image information and printing the image and a separation apparatus for reading the image having the multiplexed additional information and separating the additional information, respectively.

FIG. 12 is block diagram showing the arrangements of a multiplexing apparatus for multiplexing additional information with image information and printing the image and a separation apparatus for reading the image having the multiplexed additional information and separating the additional information, respectively, using the system shown in FIG. 11. FIG. 12 shows the arrangement of the multiplexing apparatus, and FIG. 12 shows the arrangement of the separation apparatus.

Considering the correspondence to FIG. 11, the multiplexing apparatus comprises the host 100, display 140, keyboard 160, and mouse 170, and the separation apparatus comprises the host 100, scanner 110, display 140, keyboard 160, and mouse 170. The multiplexing apparatus and separation apparatus may be separate apparatuses located at remote sites.

Referring to FIG. 12, a quantization condition determination section 101 determines a quantization condition used for quantization processing of a pixel of interest on the basis of conditions such as image information around the pixel of interest, the code of additional information, the resolution of a target scanner apparatus, and the code attachment position. A quantization section 102 converts input image information into quantization levels smaller in number than the input gray levels by pseudo-halftoning processing and two-dimensionally expresses halftone using quantization values of a plurality of pixels.

An input terminal 200 inputs multilevel image information, an input terminal 201 inputs additional information to be multiplexed with image information, an input terminal 202 inputs the read resolution of the target scanner, an input terminal 203 inputs the resolution of the printer 150, and an input terminal 204 inputs a condition for determining the code attachment position in attaching the code to the image.

The input terminal 204 of the multiplexing apparatus can have various forms not as an input terminal in the literal sense but as an input source used by the apparatus user to input information from the host or input source used by software for multiplex processing to automatically input information.

Multilevel image information input from the input terminal 200 can be input through the Internet or LAN or through the scanner 110, or generated in the host 100.

Referring to FIG. 12, a code attachment color extraction section 103 extracts a color component to which a code is attached from image information obtained by the scanner 110. A code attachment region detection section 104 detects a code attachment region on the basis of the code attachment color component of image information, which is obtained by the code attachment color extraction section 103, and the code attachment position condition. A threshold value selection section 105 measures the average pixel value in the code attachment region and selects a threshold value corresponding to the average pixel value. A pixel value distribution state detection section 106 measures a local density at an arbitrary portion in the code attachment region, detects the maximum and minimum values, and then calculates the difference between the maximum value and the minimum value to detect the distribution state of pixel values. A code determination section 107 compares the threshold value selected by the threshold value selection section 105 with the difference in local average pixel value calculated by the pixel value distribution state detection section 106 to determine a code.

An output terminal 205 outputs additional information separated by the separation apparatus.

In the system having the above arrangement, the multiplexing apparatus records a code attachment position condition input from the input terminal 204 in, e.g., the uppermost line or several lines from the uppermost portion of a printed image output from the printer 150 as a predetermined dot pattern. On the other hand, in reading the image recorded by the multiplexing apparatus, the separation apparatus reads the dot pattern recorded in the uppermost line or several lines from the uppermost portion of the image and extracts the code attachment position condition.

If the multiplexing apparatus and separation apparatus handle an image having a predetermined format, and software for handling that format is executed in each apparatus, the above-described dot pattern recording and reading can be omitted by setting the code attachment position condition in the software in advance.

If the code attachment position condition set by the multiplexing apparatus can be known on the separation apparatus side, the condition may be input by the apparatus user using the host on the separation apparatus side. If the two apparatuses are connected through a network, the condition may be input through the network.

As described above, the code attachment position condition input terminal 204 on the separation apparatus side is not an input terminal in the literal sense but can have various forms.

Code attachment processing (additional information multiplex processing) executed by the multiplexing apparatus shown in FIG. 12 when two quantization values are used, and the print resolution of an image is equal to the read resolution will be described next with reference to the flow chart shown in FIG. 13.

Assume that as a color component used for code attachment, a color most unnoticeable is selected. For example, if the printer prints using four inks: cyan (C), magenta (M), yellow (Y), and black (Bk), a code is attached to the Y component that is most unnoticeable. The code attachment can be implemented by changing the quantization result by changing the quantization condition in error diffusion. Hence, in this embodiment as well, code attachment to image information is done by changing the quantization condition in pseudo-halftoning processing, and the size of image information is m×n pixels.

First, in step S200, variables (i) and (j) for counting addresses in the vertical direction (i (row) direction) and horizontal direction (j (column) direction) of an image are initialized to "0". In step S201, it is checked whether the address value indicated by the address variable (i) in the vertical direction represents a row to which a code is to be attached. In step S202, it is checked whether the address value indicated by the address variable (j) in the horizontal direction represents a column to which a code is to be attached.

If YES in steps S201 and S202, the flow advances to step S203 to calculate the code counter value (n) from the coordinate values of the pixel of interest. The code counter (n) is a code number counter for storing processing contents corresponding to a code generated for a plurality of rows.

In step S204, it is checked whether the nth code is generated for the first time or being generated. If the code is to be generated for the first time, the flow advances to step S205 to derive the quantization condition with reference to the image information and the code to be attached. In step S206, the quantization condition for generation of the nth code, which is derived in step S205, is stored, and the flow advances to step S207. If it is determined in step S204 that the code is being generated, the flow advances to step S208 to acquire the stored quantization condition of the code number (n), and then, the flow advances to step S207.

If NO in step S201 or S202, the flow advances to step S209 to acquire a normal quantization condition without code attachment, and then, the flow advances to step S207.

In step S207, pseudo-halftoning processing is executed for the image information. Especially, pseudo-halftoning processing in the code attachment region will be described later in detail with reference to FIGS. 15A to 15C.

In step S210, the count value of the address variable (j) in the column direction is incremented by one. In step S211, it is checked whether processing in the column direction is ended. If processing in the column direction is not ended for the same address variable (i), the flow returns to step S202 to repeat the above-described processing. If the processing is ended, the flow advances to step S212 to initialize the address variable (j) in the column direction to "0". In step S213, the count value of the address variable (i) in the row direction is incremented by one.

In step S214, it is checked whether processing is ended for all rows. If NO in step S214, the flow returns to step S201 to repeat the above-described processing. If YES in step S214, the flow advances to step S215 to record the image information that has undergone pseudo-halftoning processing.

Figure 14:
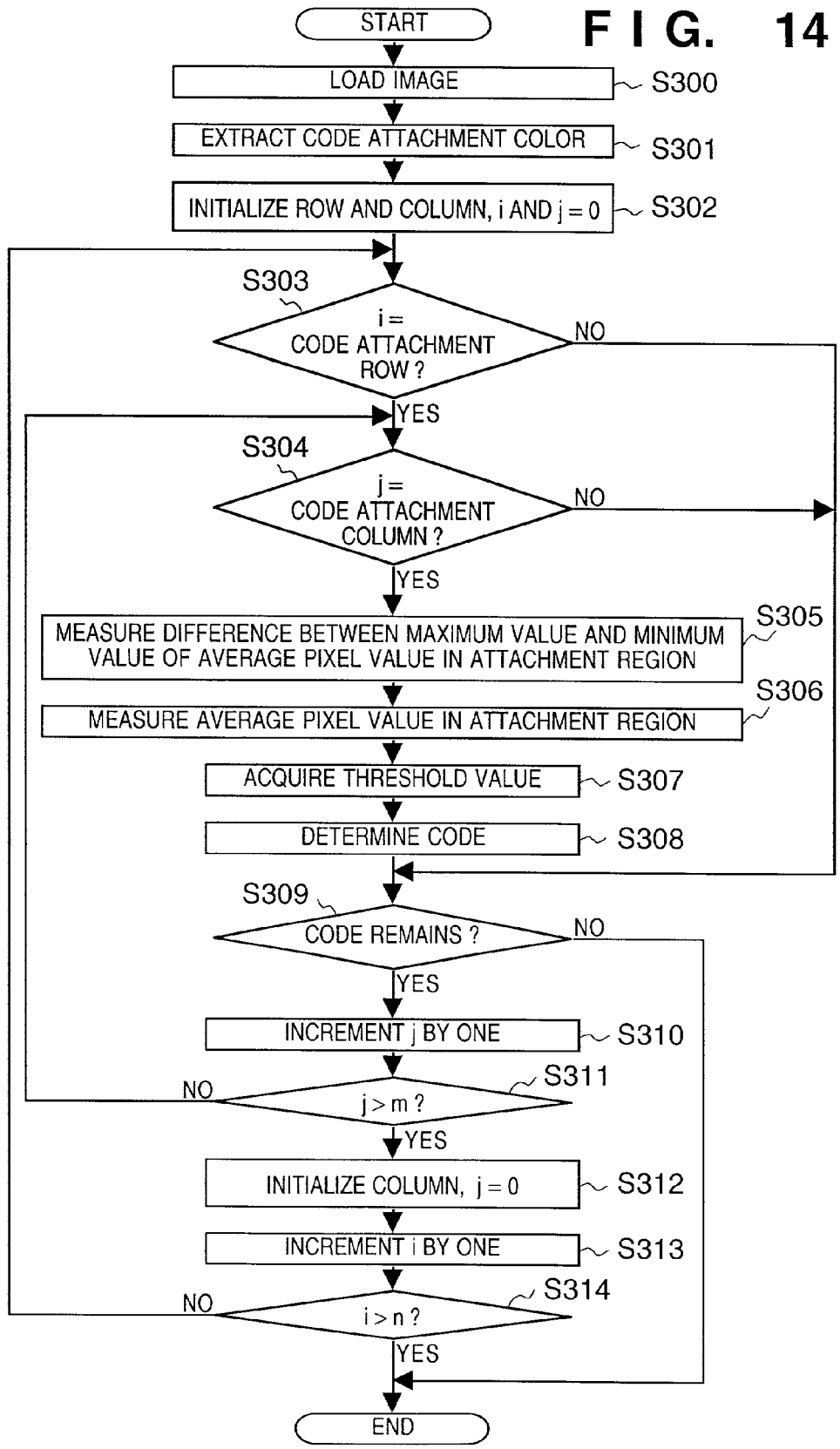
FIG. 14 is a flow chart showing code separation processing according to this embodiment.

Multiplexed additional information separation processing executed by the separation apparatus having the arrangement shown in FIG. 12 will be described with reference to the flow chart shown in FIG. 14.

In step S300, the scanner scans a print having a printed image to read the image. In step S301, a color component to which a code is attached is extracted from the image information acquired in step S300.

In step S302, the variables (i) and (j) for counting addresses in the vertical direction (i (row) direction) and horizontal (j (column) direction) of the image information are initialized to "0". In step S303, it is checked whether the value indicated by the address variable (i) represents a row to which a code is attached. In step S304, it is checked whether the value indicated by the address variable (j) represents a column to which a code is attached. If YES in steps S303 and S304, the flow advances to step S305. If it is determined in step S303 or S304 that at least one of the address variables (i) and (j) is not an address with code attachment, the flow skips steps S305 to S308 and advances to step S309.

In step S305, the average pixel value in an arbitrary local region in the code attachment region is measured, and the difference between the maximum value and the minimum value of the local average pixel value is calculated. In step S306, the average pixel value of the entire code attachment region is measured. In step S307, a threshold value used to determine the code is acquired on the basis of the average pixel value obtained in step S306. In step S308, the difference in local average pixel value, which is obtained in step S305, is compared with the threshold value obtained in step S307, thereby determining the code. After that, the flow advances to step S309.

In step S309, it is checked whether an unseparated code remains. If YES in step S309, the flow advances to step S310. If NO in step S309, the separation processing is ended.

In step S310, the value of address variable (j) is incremented by one. In step S311, it is checked whether processing in the column direction is ended. If processing in the column direction is not ended for the same address variable (i), the flow returns to step S304 to repeat the above-described processing. If the processing is ended, the flow advances to step S312 to initialize the address variable (j) in the column direction to "0". In step S313, the count value of the address variable (i) in the row direction is incremented by one.

In step S314, it is checked whether processing for the image information is ended. If NO in step S314, the flow returns to step S303 to repeat the above-described processing. If YES in step S314, the information separation processing is ended.

In the above processing, step S305 may be executed after step S306 or S307. If the end of code can be detected by checking the information after separation processing, processing in step S309 can be omitted.

Details of pseudo-halftoning processing in the code attachment region will be described next in more detail with reference to FIGS. 15A to 15C.

FIGS. 15A to 15C are views showing a state wherein image data in which one pixel is expressed by 8 bits is binarized using error diffusion, and a code representing additional information is multiplexed at the time of binarization processing.

Assume image data having a density of 50% (i.e., pixel value "128"), as shown in FIG. 15A. FIG. 15B shows an image obtained by binarizing the image data using error diffusion. FIG. 15C shows an image to which a code is attached at the time of binarization.

The code value is discriminated depending on whether a set of identical quantization values that are artificially generated is present. The artificially generated quantization value is determined in accordance with the average density of the image around the pixel to which the code is to be attached. When the average density of the image is high, a quantization value representing the lowest density (i.e., "0")

is selected. When the average density of the image is low, a quantization value representing the highest density (i.e., "255") is selected.

Since the image shown in FIG. 15A has an intermediate density, either quantization value can be selected. In this case, however, assume that a quantization value representing the lowest density ("0") is generated. When an inkjet printer or the like is used as the printer engine of the printer 150, an ink dot spreads on the medium in printing the image on a printing medium. For this reason, the average density around the pixel to which the code is to be attached in switching the quantization value selected as a code is not always 50%. In other words, the range of the pixel for which the quantization value is artificially generated, as shown in FIG. 15C, is determined on the basis of the resolution ratio of the printing apparatus to the image reading apparatus.

The minimum condition for the range for which the quantization value should be artificially generated is resolution ½ that of the image reading apparatus because of the sampling theorem. When the size of a pixel, which is calculated from the resolution of the printing apparatus by the spread of ink on the printing medium is different from the size of an ink dot on the medium or a blank region without ink, not the resolution of the printing apparatus but the size of an ink dot or blank region may be used.

In this embodiment, as shown in FIG. 15C, a region (set of the identical artificial quantization values) 400 having a 3 (horizontal)×2 (vertical) image size is generated. At this time, when binarization processing is executed using error diffusion, the density of image information should be stored, and therefore, a region 401 where the density is inverted from the artificially generated quantization value is generated. The density inverted region 401 can have various shapes and sizes. Since the region 401 is a factor for canceling the density in the artificially generated region 400, the size of region 401 is affected by the size of region 400 and becomes large. Each of the regions 400 and 401 is formed by identical quantization values. For this reason, when a code is attached, regions having low and high average densities simultaneously appear independently of the average density of the code attachment region.

Even when the average density of the image shown in FIG. 15A is changed by changing the average density in the code attachment region to change the artificially attached quantization values to, e.g., "90" or "150", local regions having low and high densities still simultaneously appear while storing the average density in the code attachment region. As a consequence, even after printing by the inkjet printer, the local low- and high-density regions simultaneously appear in the code attachment region.

For an image obtained by the image reading apparatus such as a scanner, consider the average pixel value in a range corresponding to the artificially generated region 400 in the code attachment region. The difference in average pixel value between pixels including the region 400 and those including the region 401 becomes large.

On the other hand, as shown in FIG. 15C, when a region as a set of identical quantization values that are artificially generated is not generated, the identical quantization values are distributed due to the characteristics of error diffusion. For this reason, the average pixel value in the range corresponding to the code attachment region is almost the same as that of the original image (FIG. 15A). When a code is attached, the regions 400 and 401 locally have the maximum average pixel value and minimum average pixel value, respectively, in the code attachment region. Hence, when the average pixel value in the range corresponding to the size of code to be artificially generated in the code attachment region is checked, and the difference between the maximum value and the minimum value of the average pixel value is compared with the threshold value, the value of code can be determined.

Since the pixel value distribution state changes depending on the average pixel value in the code attachment region, the threshold value changes depending on the average pixel value. Hence, the threshold value is measured in advance in units of densities by experiments. When the size of region 400 is set in consideration of not only the resolution ratio of the printing apparatus to the image reading apparatus but also a condition that the region 401 can be detected by the image reading apparatus, the detection accuracy improves.

At an edge portion of an image where the density abruptly changes, identical quantization values may not be distributed even when the code is not artificially attached. Hence, image processing may be performed at the edge portion to forcibly distribute the identical quantization values.

According to the above-described embodiment, a code is attached in consideration of the read resolution of the apparatus for reading the printed image, using a minimum and necessary pixel set in the reading apparatus. For this reason, the additional information can be reliably read from the printed image. In addition, degradation in image quality upon code attachment can be minimized.

FIG. 16 is a block diagram showing the arrangement of a multiplexing apparatus according to still another embodiment, which multiplexes additional information with image information and prints the image. The same reference numerals as in the above-descried embodiment denote the same components in FIG. 16, and a detailed description thereof will be omitted.

As is apparent from comparison of components between FIG. 16 and FIG. 12, in the above-described embodiment, a code is expressed by generating a set of pixels having identical quantization values in a pseudo-halftone image obtained by quantizing one color component of image information. In this embodiment, however, a code is expressed by a color component for which a set of pixels having identical quantization values is artificially generated.

In this embodiment, if a value (bit) to be embedded is "0", it is embedded in the yellow component. If the value to be embedded is "1", it is embedded in the magenta component. However, the color component as an embedding target is preferably a component that can hardly be perceived with a human eye.

The arrangement of the apparatus shown in FIG. 16 is different from that of the above embodiment in that a color component detection section 108 detects, from image information, a color component for which processing is in progress, and a quantization condition determination section 101a determines the quantization value in consideration of the output result from the color component detection section 108, i.e., a section for determining matching between the state (0 or 1) of the bit to be embedded and the color component as an embedding target is added.

Multiplex processing of a code representing additional information according to this embodiment will be described next with reference to the flow chart shown in FIG. 17. The same step numbers as in FIG. 13 denote the same processing steps in FIG. 17, or corresponding steps are not illustrated in FIG. 17. Especially, steps S200 and S201, S207, and S210 to S215 are not illustrated.

Figure 17:
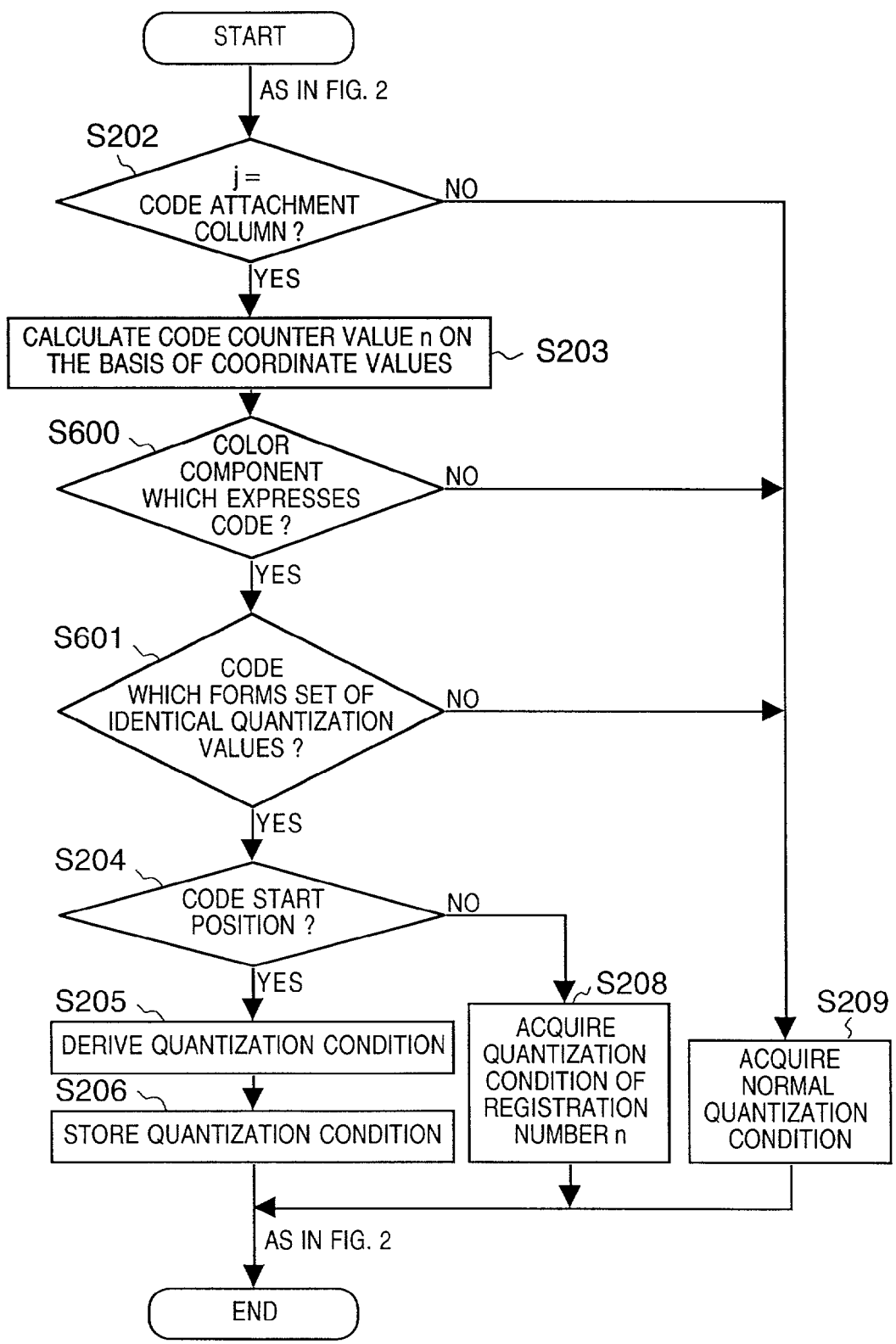
FIG. 17 is a flow chart showing code attachment processing according to this embodiment.

According to the flow chart shown in FIG. 17, after steps S200 to S203, it is checked in step S600 whether the color component that is currently being processed is a color component used for code expression. If YES in step S600, the flow advances to step S601. If NO in step S600, the flow advances to step S209.

In step S601, it is checked whether, for the code (code "0" or "1") to be currently processed, a set of identical quantization values is to be generated in the color component that is currently being processed. If YES in step S601, the flow advances to step S204. If NO in step S601, the flow advances to step S209.

Figure 13:
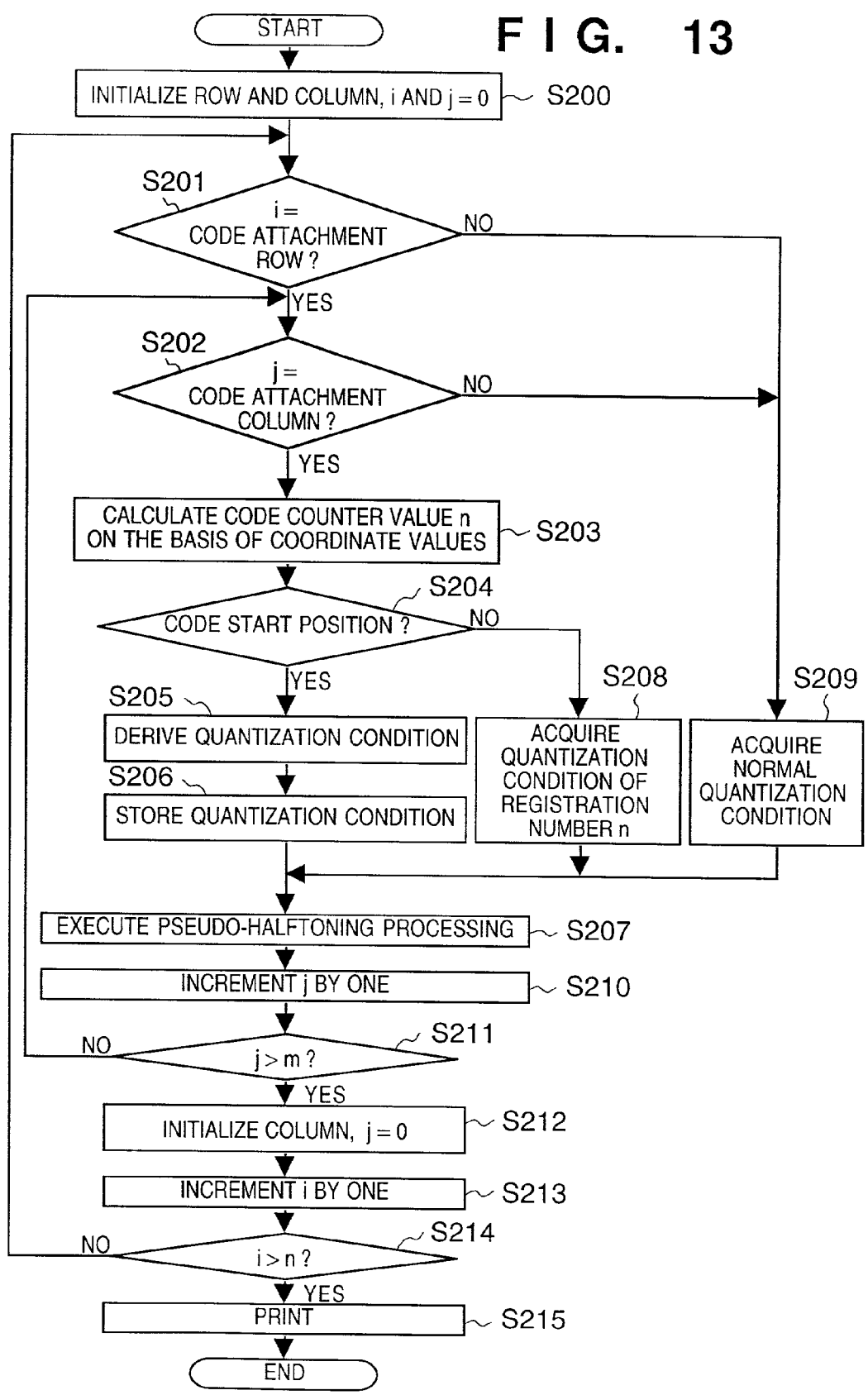
FIG. 13 is a flow chart showing code attachment processing according to this embodiment.

From step S204 or S209, the same processing as in FIG. 13 is executed.

As described above, according to this embodiment, the set of identical quantization values generated in the minimum unit area recognizable on the image reading apparatus side can be used for both a code "1" and a code "0".

Hence, unlike the above-described embodiment in which the code is determined on the basis of a set or distribution of identical quantization values, an ambiguous state hardly occurs, and the code can be more reliably detected.

As a characteristic feature of still another embodiment to be described below, a target to which additional information is attached is an unnoticeable region of a certain color component (e.g., yellow component). The unnoticeable region will be described. In a print printed by a printing apparatus such as an inkjet printer, the perceptibility of code changes depending on the manner the neighboring ink dots are printed. For example, at a low-density portion of an image, the opportunity of ink discharge is supposed to be low. If information as a code is embedded in this portion, and ink is discharged in correspondence with the code, the code is noticeable. However, in an intermediate-density region, appropriate ink discharge is done at the neighboring portion. Hence, even when information is embedded in this portion, the code is relatively unnoticeable. This embodiment exploits this fact. That is, the intermediate-density portion of an image to be printed is used as a code embedding target.

More specifically, the quantization condition determination section shown in FIG. 16 determines, for a yellow component derived from an input image, whether the average density including the neighboring pixel group surrounding the pixel of interest falls within the range between two threshold values with which the intermediate density is determined. If the average value falls within that range, the region is determined as an intermediate-density portion and determined as a code embedding target.

When the average density around the pixel of interest is the intermediate density not for a certain color component but for another color component, the color component as a code embedding target may be changed to embed the code in the intermediate-density region. Even when it is determined that all color components do not have the intermediate density, the code can be embedded in a color component whose average density around the pixel of interest is closest to the intermediate density.

As a result, according to this embodiment, a code can be unnoticeably attached, and consequently, degradation in image quality can be minimized.

Figure 18:
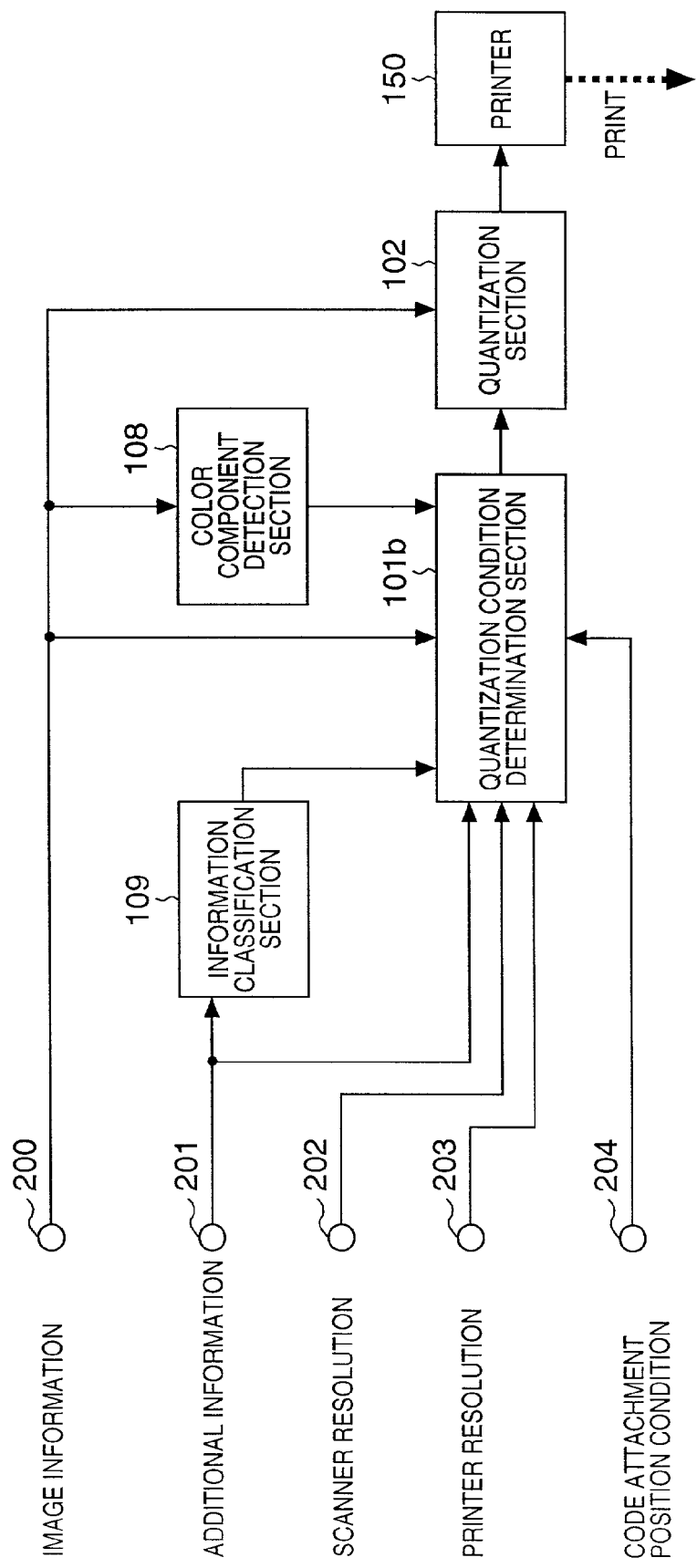
FIG. 18 is a block diagram showing the arrangement of a multiplexing apparatus according to still another embodiment, which multiplexes additional information with image information and prints the image.

FIG. 18 is a block diagram showing the main part of still another embodiment. In this embodiment, when a plurality of types of additional information are input, they are attached to different color components in units of types.

Figure 19:
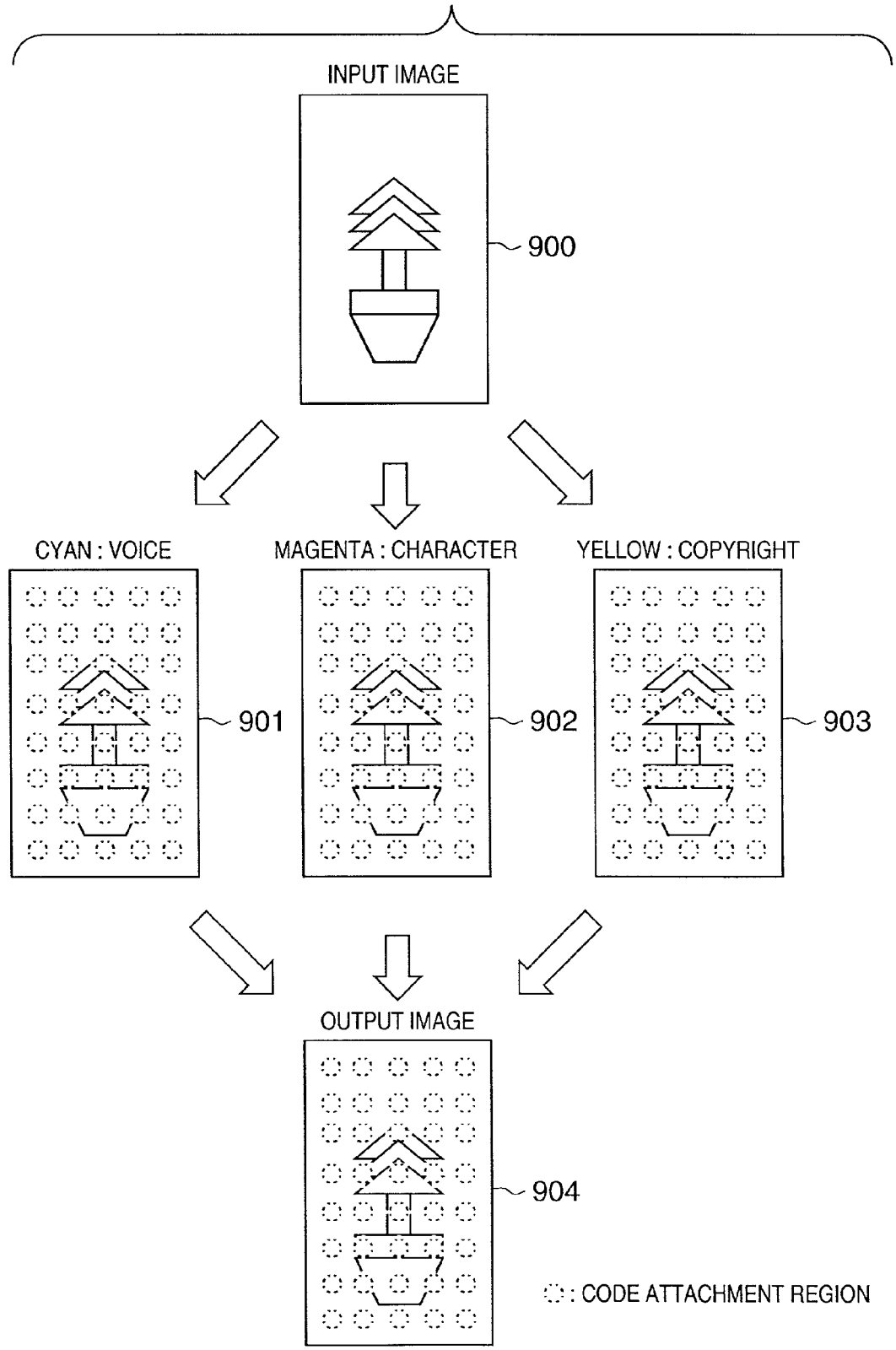
FIG. 19 is a view showing pieces of different information are attached to the color components of an input image, respectively.

FIG. 19 is a view showing a state wherein pieces of information of different types are attached to color components of an input image, respectively. Referring to FIG. 19, voice information is attached to a cyan (C) component 901 of an input image information 900, character information is attached to a magenta (M) component 902 of the input image information 900, and copyright information is attached to a yellow (Y) component 903 of the input image information 900. By printing processing of synthesizing the pieces of color component information 901, 902, and 903 having multiplexed additional information, image information (output image) 904 is obtained.

Multiplex processing of a code representing additional information according to this embodiment will be described next with reference to the flow chart shown in FIG. 20. The same step numbers as in FIG. 13 denote the same processing steps in FIG. 20, or corresponding steps are not illustrated in FIG. 20. Especially, steps S200 and S201, S207, and S210 to S215 are not illustrated.

Figure 20:
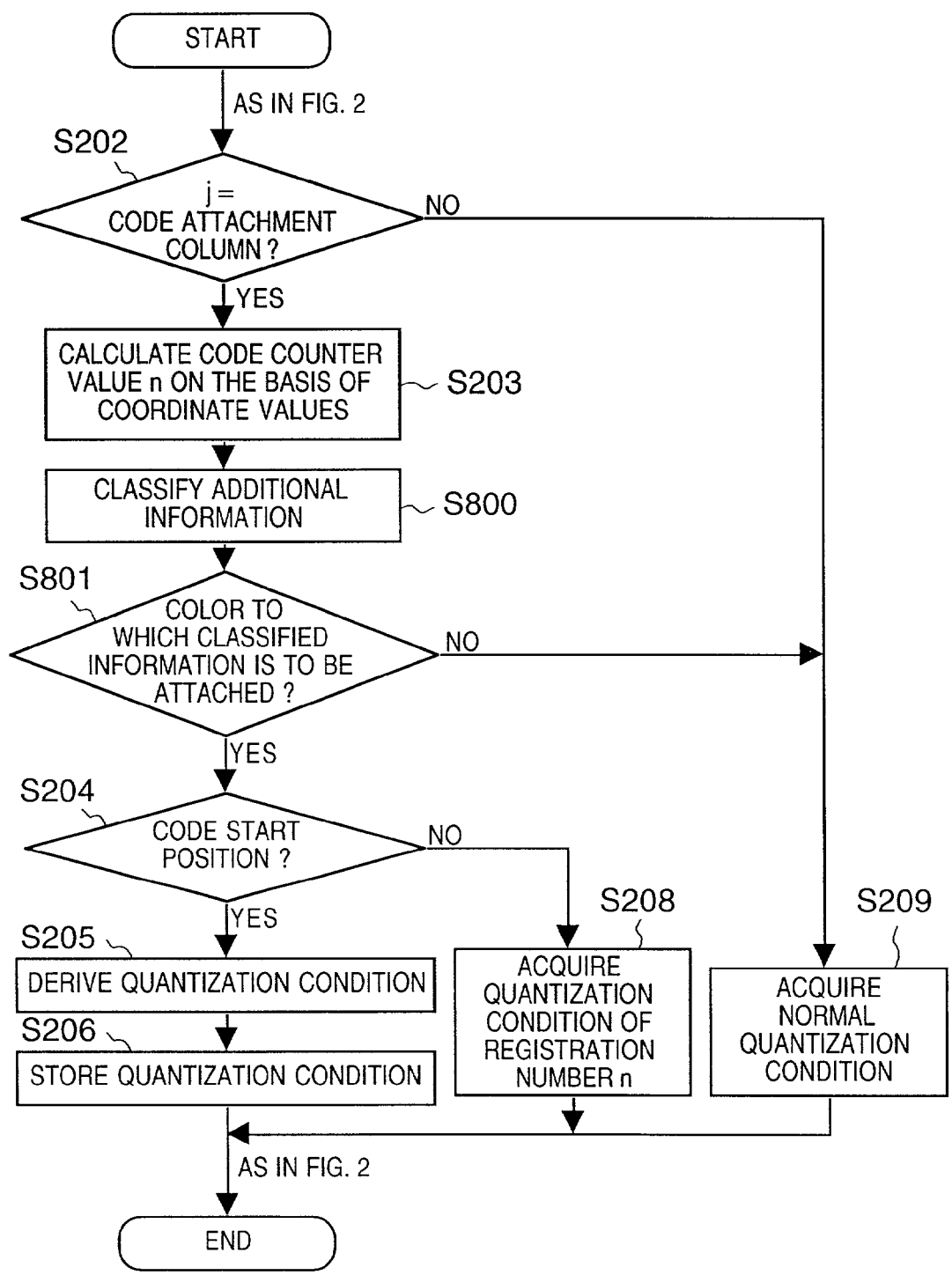
FIG. 20 is a flow chart showing code attachment processing according to this embodiment.

According to the flow chart shown in FIG. 20, after steps S200 to S203, in step S800, a plurality of input additional information are classified in units of color components to which the pieces of additional information are to be attached. In step S801, on the basis of the result in step S800, a color component that is currently being processed is input, and it is checked whether it is a color component to which the classified information is to be attached. if YES in step S801, the flow advances to step S204. If NO in step S801, the flow advances to step S209.

From step S204 or S209, the same processing as in FIG. 13 is executed. Processing in step S800 may be executed before step S203.

As described above, according to this embodiment, a plurality of types of information can be attached to one image information. In addition, since image processing needed for only a color component to which the information is to be attached, efficient processing is possible. The color components to which codes are attached and additional information are not limited to the example shown in FIG. 19, and any other combination can be used. In addition, pieces of information of the same type (e.g., character information) and having different contents can be attached to different color components.

As an embedding target for information to be attached, the above-described embodiment may be used.

In this embodiment, additional information multiplex processing is executed using an apparatus having the same arrangement as that of the above embodiment shown in FIG. 11. However, systematic dithering is used for pseudo-halftoning expression, unlike the above embodiment in which error diffusion is used for the pseudo-halftoning expression.

When error diffusion is used for the pseudo-halftoning expression, and, for example, a region 400 is artificially generated, as shown in FIG. 15C, a region 401 is naturally formed upon distributing the accumulated error. When systematic dithering is used, a threshold value matrix must be prepared such that regions including continuous pixels with two types of identical quantization values are generated in code attachment.

FIGS. 21A and 21B are views showing a dither matrix and an image having multiplexed additional information and binarized by dithering, respectively. FIG. 21A shows a threshold value matrix of systematic dithering in code attachment. FIG. 21B shows an image binarized using the dither matrix shown in FIG. 21A.

In the dither matrix shown in FIG. 21A, the threshold value "X" is made large to always obtain a binarization result "0", and the threshold value "Y" is made small to always obtain a binarization result "1". When binarization processing is executed using such a matrix, regions 1000 and 1001 having inverted densities and formed from a plurality of pixels with identical quantization values can be artificially generated, as shown in FIG. 21B.

When a code is expressed by the presence/absence of a combination of regions having inverted densities and formed from a plurality of pixels with identical quantization values, and the regions 1000 and 1001 are not attached, a threshold value matrix that forcibly prevents identical quantization values from being set over a plurality of pixels is used.

According to the above-described embodiment, since dithering is used for the pseudo-halftoning expression, processing such as error distribution is unnecessary, and code attachment can be done by high-speed processing as compared to error diffusion, and additionally, a code can be reliably attached regardless of the pixel value state in the code attachment region.

The dithering used in this embodiment can be applied to the above-described embodiments.

As has been described above, according to the present invention, in multiplexing additional information with image information, multiplexing is performed using a minimum pixel set readable by the image reading apparatus in consideration of the resolutions of the image output apparatus and image reading apparatus. Hence, in reading an image having multiplexed information by the image reading apparatus, even when the reading apparatus is a popular low-resolution scanner, the additional information can be reliably separated and read. In addition, degradation in image quality according to multiplexing can be minimized.

When predetermined information is adaptively attached on the basis of the resolution at which the output image can be reliably read, the additional information can be reliably read.

Since a plurality of different additional information can be attached to different color components of an image signal, a plurality of types of information can be attached to one image information.

FIG. 22 is a block diagram showing the arrangement of an image processing apparatus according to still another embodiment, which can be applied to a printing apparatus such as an inkjet printer for forming an image using pseudo-halftoning expression.

Referring to FIG. 22, an input terminal 100 inputs image information, and an input terminal 101 inputs additional information such as identification information to be attached to image information. A quantization condition determination section 102 determines a quantization condition for quantization of image information. A code pattern memory 103 holds dot patterns each forming a row component of a code that expresses additional information. A pattern number lookup memory 104 is used to select a dot pattern to be used from the dot patterns held in the code pattern memory 103. A quantization processing section 105 quantizes image information using, e.g., error diffusion on the basis of the quantization condition determined by the quantization condition determination section. An output terminal 106 outputs quantized image information.

FIGS. 23A to 23D are views showing dot patterns held in the code pattern memory 103. Each of the dot patterns shown in FIGS. 23A to 23D forms a row component of a code that expresses additional information. The dot patterns shown in FIGS. 23A to 23D are combined to form, e.g., a code shown in FIG. 24A, 24B, or 24C. For example, when the code is embedded in a predetermined region of an image, it represents "1". When no code is embedded, it represents "0".

As a method of generating each dot of the dot patterns shown in FIGS. 23A to 23D, for example, when a code is to be attached in pseudo-halftoning processing using error diffusion, the threshold value is made smaller such that the sum of the pixel value of the pixel of interest and quantization errors distributed from the neighboring pixels becomes equal to or larger than the threshold value in a pixel whose dot is to be turned on. On the other hand, for a pixel whose dot is not turned on, a normal threshold value is set to perform normal error diffusion.

Figure 24A:
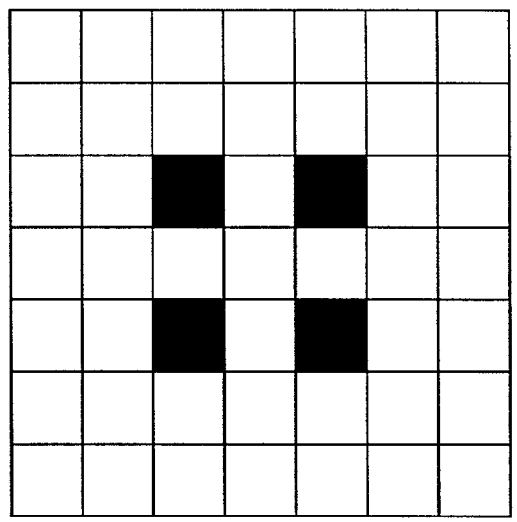
FIGS. 24A to 24C are views showing code shapes formed from the held dot patterns.
Figure 24B:
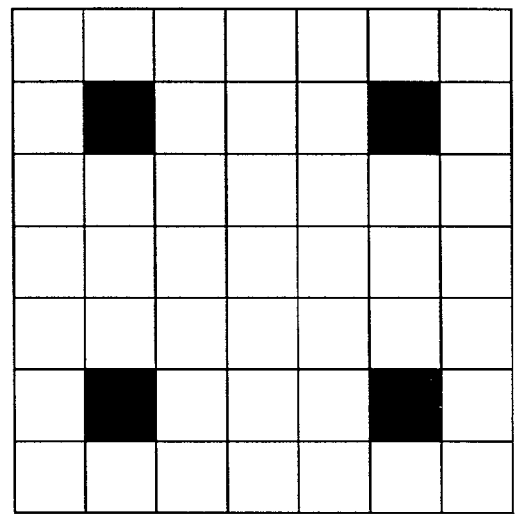
Figure 24C:
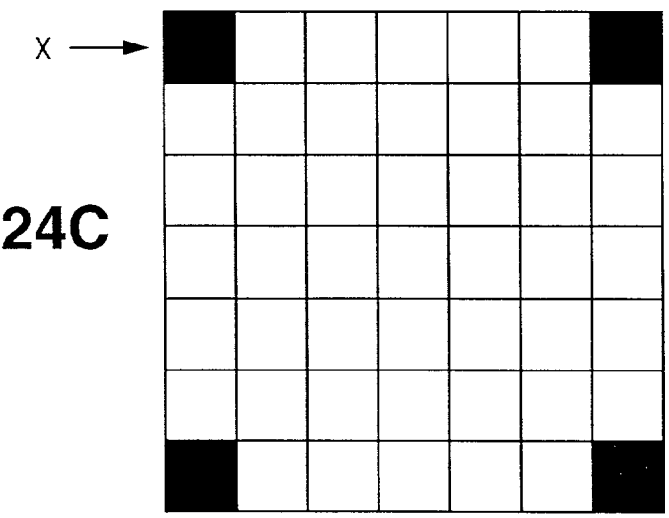

In this embodiment, the range where the dot pattern is attached as a code, as shown in FIGS. 24A to 24C, has a size of 7×7 pixels. However, the present invention is not limited to this.

Figure 25:
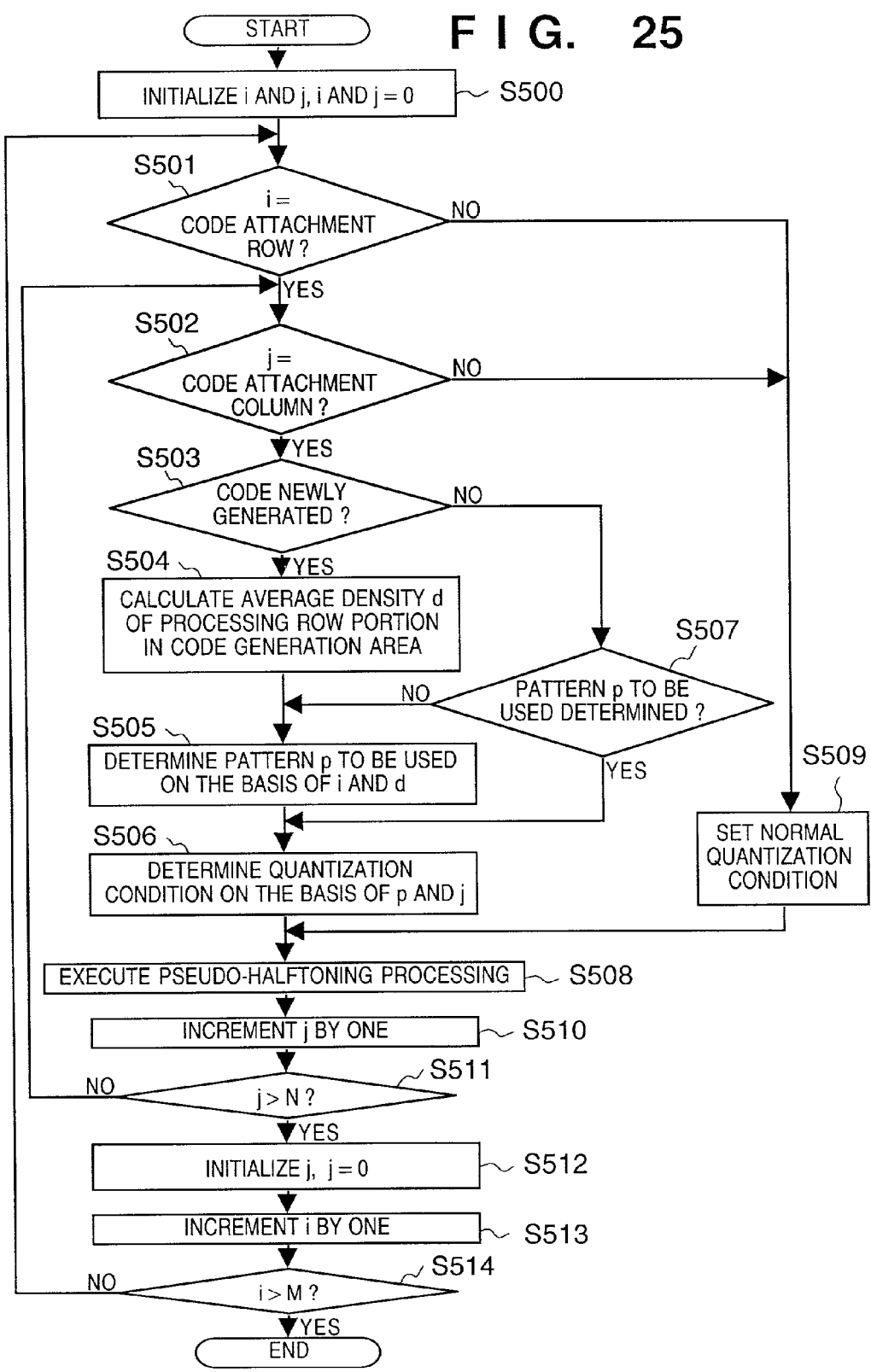
FIG. 25 is a flow chart showing the code attachment control procedure of this embodiment.

FIG. 25 is a flow chart showing the code attachment control procedure of this embodiment. The size of an input image is M pixels (in the row direction)×N pixels (in the column direction).

First, in step S500, a variable i for counting the row address and a variable j for counting the column address are initialized. In step S501, it is determined whether code attachment is to be executed for a row indicated by the row address i. If YES in step S501, it is determined in step S502 whether code attachment is to be executed for a column indicated by the column address j.

If it is determined in steps S501 and S502 that a pixel of interest indicated by the addresses i and j is a code attachment position, the flow advances to step S503.

In step S503, it is determined whether the code to be generated is a new code. If YES in step S503, the flow advances to step S504 to calculate an average density d of a row portion (for example, a range corresponding to 1×7 pixels of row X in the range of 7×7 pixels shown in FIG. 24C) for which processing is in progress within the code region that is currently being generated. Then, the flow advances to step S505.

If NO in step S503, the flow advances to step S507. In step S507, it is determined whether a dot pattern p to be used in the row for which processing is in progress within the code region that is currently being generated has been determined. If NO in step S507, the flow advances to step S505. If YES in step S507, the flow advances to step S506.

In step S505, the dot pattern p to be used is determined on the basis of the row address i and the average density d calculated from part of the code region that is currently being generated, and the flow advances to step S506.

In step S506, the quantization condition is determined on the basis of the dot pattern p and the column address j, and the flow advances to step S508. If NO in step S501 or S502, the flow advances to step S509 to set the normal quantization condition, and the flow advances to step S508.

After pseudo-halftoning processing is performed in step S508, the count value j of column address is incremented by one in step S510. In step S511, it is determined whether the j of column address exceeds the column-direction size of the image. If NO in step S511, the flow returns to step S502. If YES in step S511, the flow advances to step S512.

After the count value j of column address is initialized in step S512, the count value i of row address is incremented by one in step S513, and the flow advances to step S514. In step S514, it is determined whether the i of row address exceeds the row-direction size of the image. If NO in step S514, the flow returns to step S501. If YES in step S514, the processing is ended.

As described above, according to this embodiment, by combining dot patterns in units of rows and attaching them as a code, many types of codes can be generated while suppressing an increase in number of program codes, hardware configuration, or memory capacity.

The image density used to determine the code is detected for only a row where a code is generated for the first time. This is effective because almost the same image density is detected for the remaining rows when detection at an image flat portion is important.

In the above embodiment, a dot pattern to be used is determined using the density of a row in the code region, where a code is generated for the first time. If the density of the row where density detection has been executed is largely different from the average density in the remaining rows in the code region, the image quality may greatly degrade, or code detection may be impossible.

FIGS. 26A to 26F are views for explaining a code for high density and a code for low density.

Figure 26B:
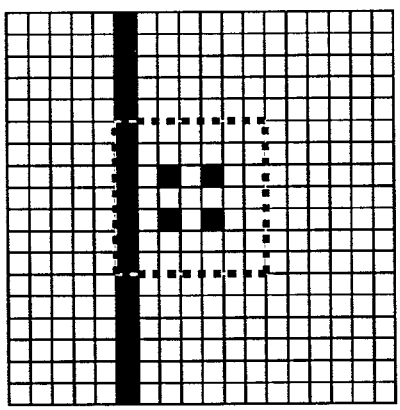
Figure 26C:
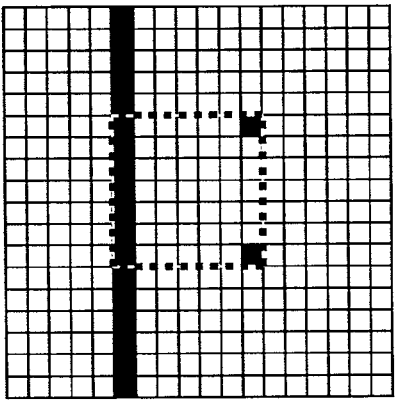
Figure 26E:
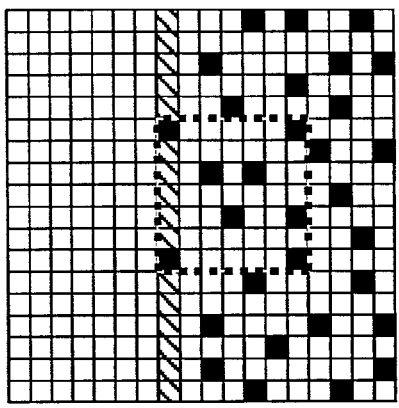
Figure 26A:
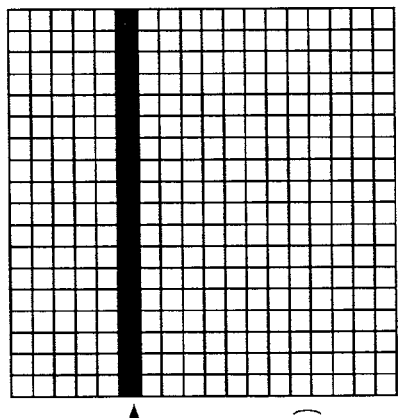
Figure 26D:
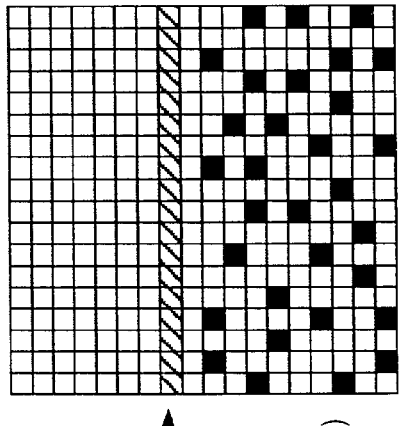

FIGS. 26A and 26D show original images. Assume the codes shown in FIGS. 24A to 24C are generated for the images shown in FIGS. 26A and 26D. A dot pattern of the code shown in FIG. 24A is a pattern for high density because the dot interval is small. Conversely, a dot pattern of the code shown in FIG. 24C is a pattern for low density because the dot interval is larger than that in FIG. 24A.

Referring to FIG. 26A, when only the first code generation row has high density, and the remaining rows have low density, the density becomes low as a whole. Hence, the code shown in FIG. 24C is preferably attached, as shown in FIG. 26B. However, when the pattern is determined using the density of the first code generation row, the code shown in FIG. 24A, i.e., the pattern for high density is selected, as shown in FIG. 26C, resulting in large degradation in image quality.

Referring to FIG. 26D, when only the first code generation row has low density, and the remaining rows have high density, the density becomes high as a whole. Hence, the code shown in FIG. 24A is preferably selected, as shown in FIG. 26E. However, when the pattern is determined using the density of the first code generation row, the code shown in FIG. 24C is selected, as shown in FIG. 26F. Since the code is hidden by other dots and can hardly be detected.

This embodiment is different from the above embodiment in the method of selecting a dot pattern in each code generation row. In this embodiment, a dot pattern to be used in the current row is determined on the basis of the average density in the code generation region of each row and information of a dot pattern used in the previous row within the same code.

Figure 23A:
FIGS. 23A to 23D are views showing dot patterns held in a code pattern memory.
Figure 23B:
Figure 23C:
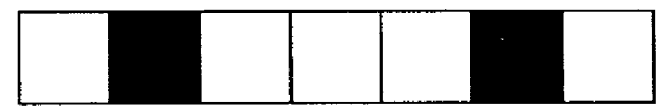
Figure 23D:
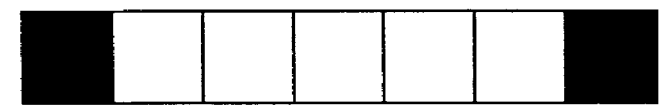

FIG. 27 is a view showing a dot pattern selection procedure of this embodiment. The code generated in FIG. 27 is determined by combining the dot patterns shown in FIGS. 23A to 23D. In this embodiment, the dot patterns and code are not limited to those shown in FIGS. 23A to 23D and FIG. 27, and various dot patterns and codes can be used. Referring to FIG. 27, the 0th row represents the first code generation row. Referring to FIG. 27, when the average density in the code attachment region of the 0th row is low, pattern 3 shown in FIG. 23D is selected. If the average density is high, pattern 1 shown in FIG. 23B is selected. When pattern 3 is selected for the 0th row, pattern 0 is selected for all the first to third rows. If the fourth row has low density, pattern 0 is selected. If the fourth row has high density, pattern 2 is selected. The pattern for each row is selected according to the same procedure as described above, thereby determining the code structure. Many types of codes can be generated, as shown in FIG. 27. This method is effective to embed 1-bit information that represents "1" with the presence of a certain code and "0" with the absence of the code.

An image processing apparatus of this embodiment has the same arrangement as that shown in FIG. 22 of the above embodiment except the contents of a pattern number lookup memory 104. The branch position for determining a path in pattern selection, branch condition, or patterns to be used are held in the pattern number lookup memory 104.

FIG. 28 is a flow chart showing the code attachment control procedure of this embodiment. The same step numbers as in FIG. 25 denote the same procedures in FIG. 28. The operation procedures in steps S500 to S502 are the same as in the above embodiment, and a detailed description thereof will be omitted.

If YES in step S502, the flow advances to step S800 to determine whether the pattern p to be used in the current row has been determined.

If NO in step S800, the flow advances to step S504 to calculate an average density d in the row for which processing is in progress in the code generation region.

Next, in step S801, the pattern p to be used in the current row and a next path t are determined on the basis of the previous pattern selection path t, count value i, and density d. The flow advances to step S506 to determine the quantization condition from the pattern p and count value j.

If YES in step S800, the flow advances to step S506 to determine the quantization condition. The subsequent procedures are the same as in the above embodiment.

As described above, according to this embodiment, even when image information can be referred to only in units of rows, a code to be generated across a plurality of rows can be changed in accordance with the image density. As a result, a code with high detection rate can be generated while suppressing degradation in image quality.

As a characteristic feature of an embodiment to be described below, a quantization error generated in quantization using error diffusion is used to select dot patterns registered in units of rows.

Figure 29:
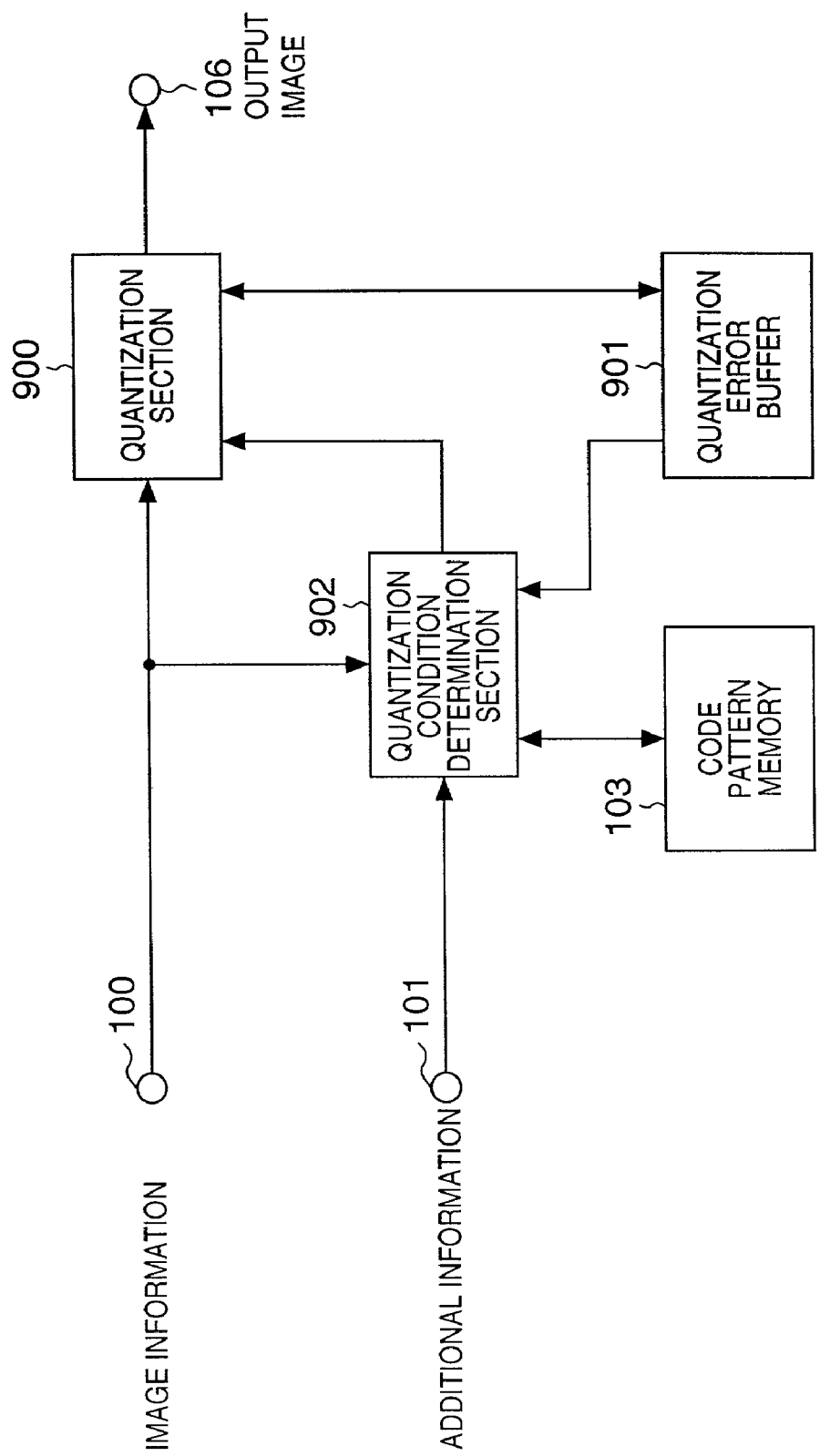
FIG. 29 is a block diagram showing the arrangement of an image processing apparatus according to still another embodiment.

FIG. 29 is a block diagram showing the arrangement of an image processing apparatus according to this embodiment. The same reference numerals as in FIG. 22 denote the same parts in FIG. 29.

A quantization section 900 performs pseudo-halftoning processing using error diffusion. A quantization error buffer 901 stores an error distributed to the neighbor by error diffusion. A quantization condition determination section 902 determines a pattern to be used on the basis of image information, additional information, and quantization error stored in the quantization error buffer 901 and determines the quantization condition by looking up a code pattern memory 103.

Figure 30A:
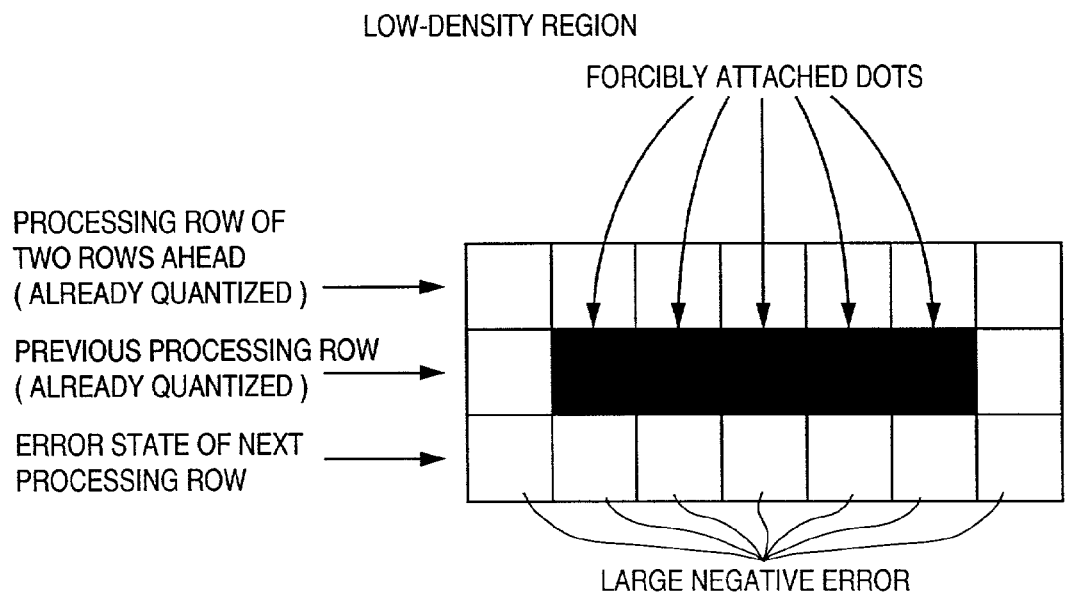
FIGS. 30A and 30B are views showing errors generated upon code attachment in this embodiment.
Figure 30B:
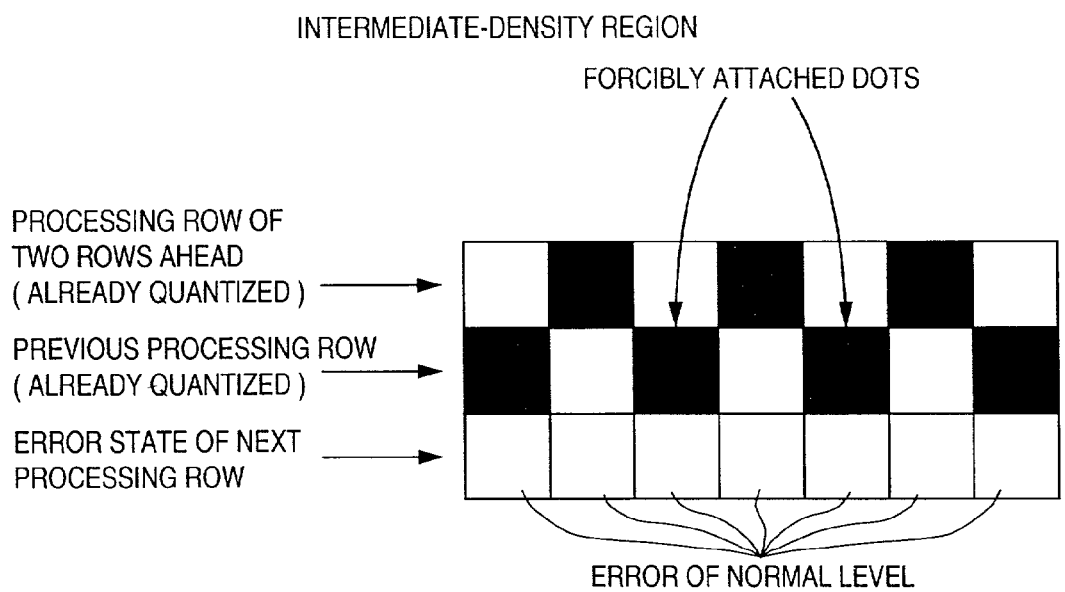

FIGS. 30A and 30B are views showing errors generated upon code attachment in this embodiment. FIGS. 30A and 30B show code attachment rows after quantization, to which codes are attached by changing the threshold value, and quantization error accumulated in a row next to the region where code attachment has been executed.

FIG. 30A shows a case wherein dots are attached to continuous pixels in a region having low image density. FIG. 30B shows a case wherein a small number of dots are attached to an image density region where the ratio of ON/OFF of dots is almost 1:1 as a result of normal quantization processing.

Referring to FIG. 30A, since continuous dots are forcibly generated for the low-density region, large negative quantization error is accumulated in the next row. On the other hand, referring to FIG. 30B, since a small number of dots are generated such that the normal quantization result is not affected, the quantization error accumulated in the next row is not so different from that of normal processing. In other words, when dots in a large size are generated such that the image quality readily degrades, large error is generated in the next row and is hidden in the neighboring dots. When dots are generated such that they can hardly be discriminated from the neighboring dots, error of normal level is generated in the next row.

When the average of quantization errors accumulated in the code generation region is checked, the influence of the dot pattern generated for the previous row on the image can be estimated. A dot pattern which rarely degrades the image quality and can be discriminated from the neighboring dots is generated at an appearance frequency slightly higher than that of the neighboring dots. When large negative error is accumulated in the current row, as shown in FIG. 30A, too many dots have been generated for the previous row as compared to the density. Hence, in the current row, a dot pattern is selected such that the dot generation ratio becomes lower relative to the density. Conversely, when the error accumulated in the current row falls within the range of normal level, as shown in FIG. 30B, a dot pattern is selected such that the dot generation ratio becomes higher relative to the density.

Figure 31:
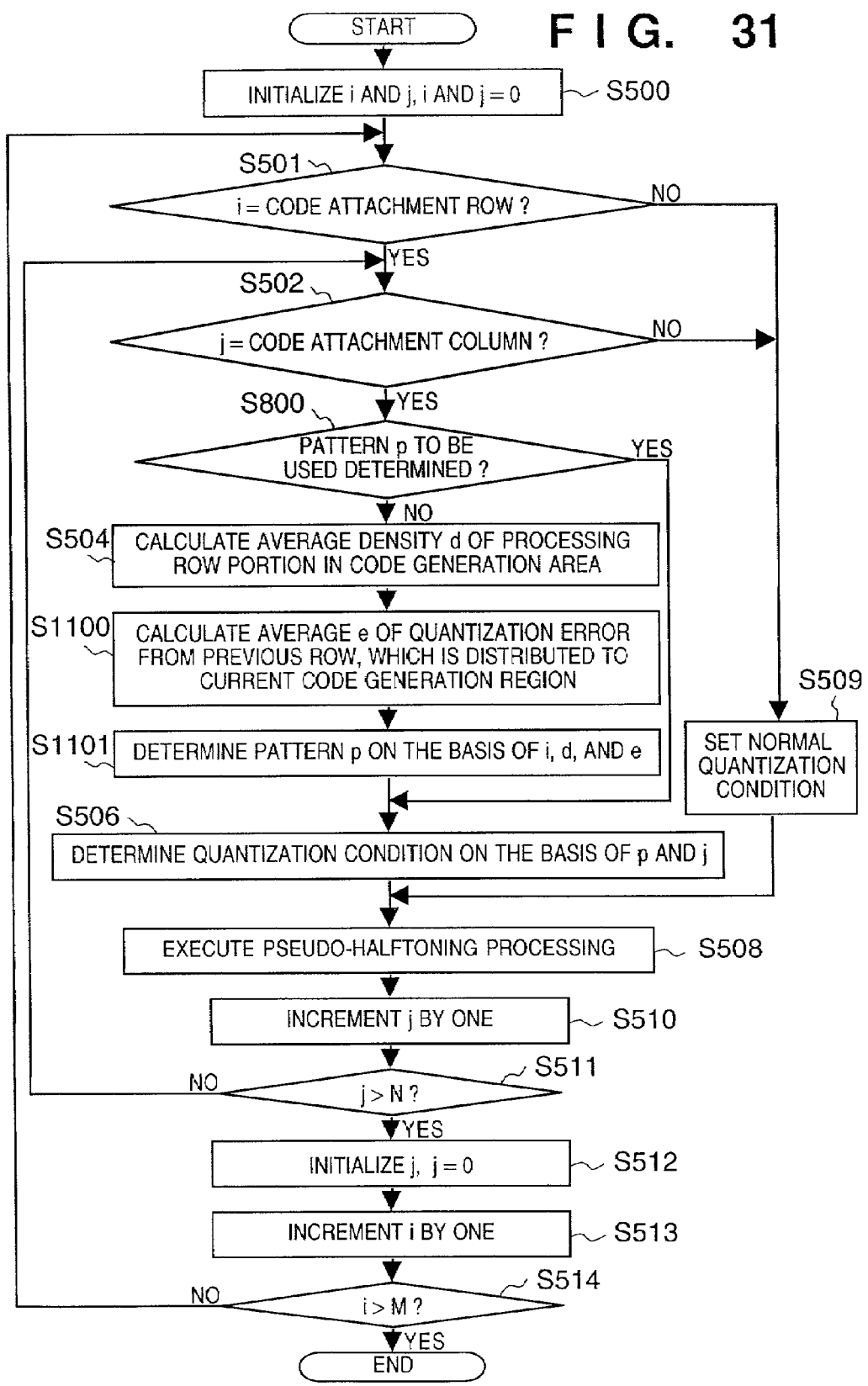
FIG. 31 is a flow chart showing the code attachment control procedure of this embodiment.

FIG. 31 is a flow chart showing the code attachment control procedure of this embodiment. The same step numbers as in FIGS. 25 and 28 denote the same procedures in FIG. 31. The operation procedures in steps S500 to S800 in FIG. 31 are the same as in the above embodiment.

In step S800, it is determined whether a pattern p to be used has been determined. If NO in step S800, the flow advances to step S504. If YES in step S800, the flow advances to step S506.

In step S504, the average density d of the processing row portion in the code that is currently being generated is calculated.

Next, in step S1100, an average value e of quantization errors distributed to the current code generation region is calculated.

In step S1101, the dot pattern p to be used is determined on the basis of the count value i of row address, average density d, and average value e. The operation from step S506 is the same as in FIG. 22.

In this embodiment, the relationship between degradation in image quality and the code detection rate with respect to the attached dot pattern also changes depending on the image resolution, or for an inkjet printer, an ink dot size on paper or ink color. Hence, considering the resolution information, ink dot size, or code generation color is also effective in determining a dot pattern.

As described above, according to this embodiment, even when image information can be referred to only in units of rows, a code with little degradation in image quality can be generated as long as only several types of dot patterns in units of rows are held. Consequently, this is effective because the complex relationship between dot patterns forming a code need not be held, and the number of program codes, hardware configuration, or memory use capacity need not be increased.

As a characteristic feature of an embodiment to be described below, when all data bits of a row for which quantization processing should be executed are "0", all quantization results in the processing row are nullified.

In many line printers such as inkjet printers, a printer driver executes pseudo-halftoning processing in units of rows in the host-side computer, and image information is sequentially transmitted to the printer side from a processed row. For color information, processing may be performed in units of ink colors of the same row. When all quantization results of the processing row are "0", image information may not be transmitted for the purpose of decreasing the transfer information amount or processing information amount, thereby representing that all quantization results of the processing row are "0". In this case, the average image density of the processing row is 0. If dots are forcibly generated, the image degrades at high probability. Assume that code generation processing is to be executed for a yellow component in a printer having ink colors, cyan, magenta, yellow, and black. In a line printer such as an inkjet printer, for a row having none of the color, components, a paper feed operation is performed without performing operations related printing, thereby improving the throughput. However, when a code is generated in a blank region where only the paper feed operation is normally performed, a yellow dot is generated. As a consequence, the printing operation is performed, and the throughput becomes low. To suppress the degradation in throughput, code attachment must be inhibited for a blank row.

The arrangement of this embodiment can be implemented by adapting it to the output portion of the quantization section 105 shown in FIG. 22 or quantization section 900 shown in FIG. 29. Since this embodiment does not depend on the quantization scheme, it can be adapted to another quantization method such as systematic dithering.

Figure 32:
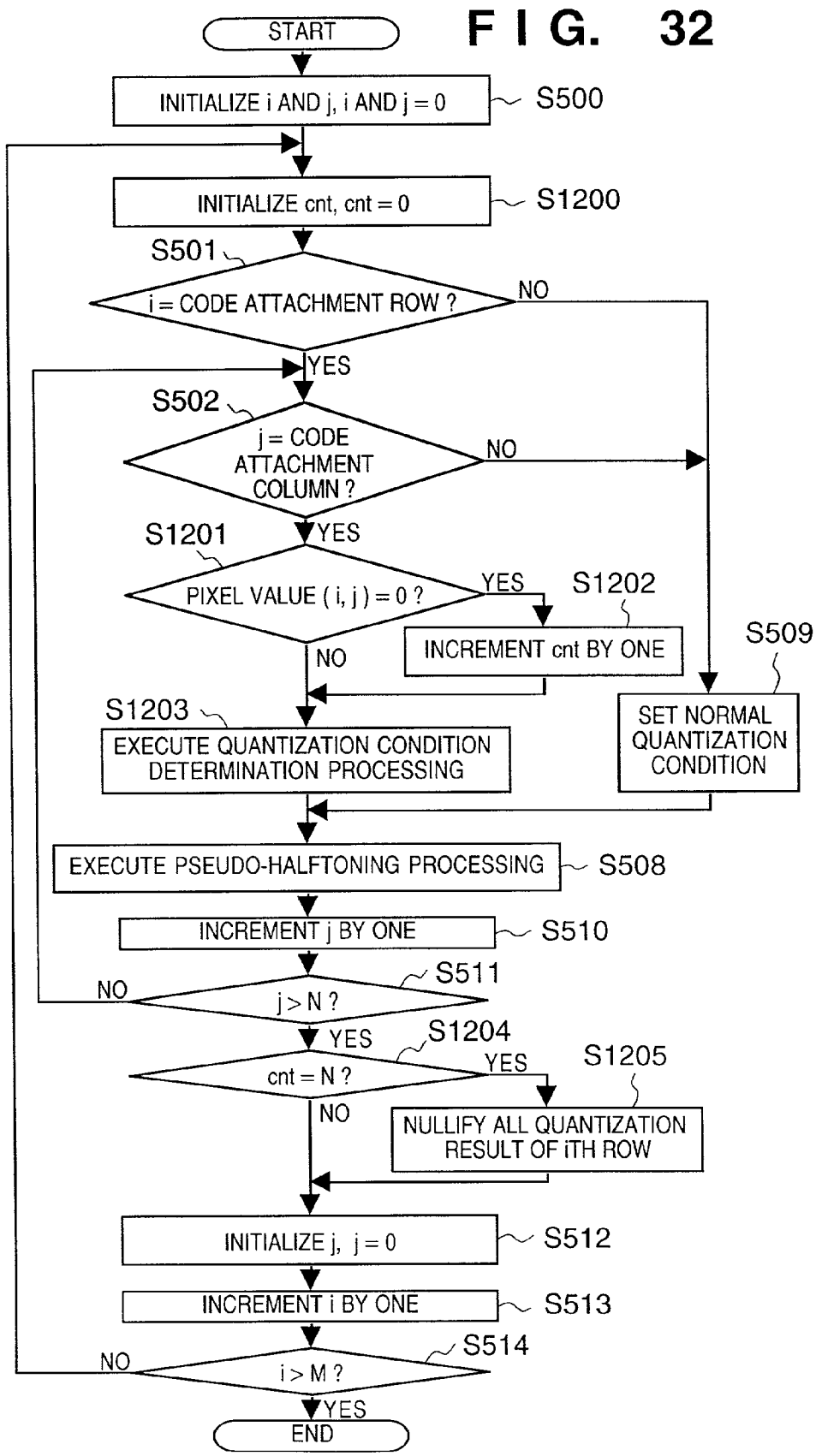
FIG. 32 is a flow chart showing the code attachment control procedure of still another embodiment.

FIG. 32 is a flow chart showing the code attachment control procedure of this embodiment. The same step numbers as in FIG. 25 denote the same processing operations in FIG. 32, and a detailed description thereof will be omitted.

Referring to FIG. 32, next to step S500, in step S1200, a count value cnt of the number of pixels in the processing row, which have a pixel value "0", is initialized. If YES in steps S501 and S502, the flow advances to step S1201.

In step S1201, it is determined whether the pixel value of the current pixel of interest is 0. If YES in step S1201, the count value cnt is incremented by one in step S1202, and the flow advances to step S1203. If NO in step S1201, the flow directly advances to step S1203.

In step S1203, the quantization condition is determined. To determine the quantization condition, any one of the above embodiments can be used. Alternatively, a quantization condition determination method other than the above embodiments may be used.

The procedures in steps S508 to 511 are the same as those in FIG. 25, and a detailed description thereof will be omitted. When it is determined in step S511 that processing for i rows is ended, the flow advances to step S1204.

In step S1204, it is determined whether the number of pixels having a pixel value "0" equals the number of pixels in the column direction of the image. If YES in step S1204, the flow advances to step S1205 to nullify all quantization results of the ith row, and the flow advances to step S512.

If NO in step S1204, the flow directly advances to step S512. Steps S512 and S513 are executed as in FIG. 25. If NO in step S514, the flow returns to step S1200. If YES in step S514, the processing is ended.

When image information is referred to only in units of rows, processing is often divisionally executed in units of color components even for image information of the same row. For this reason, with processing for a single row, it cannot be determined whether all information bits of other color components are 0. Hence, the operation of nullifying all code attachment results in the processing row is not performed by single row processing. Instead, it is also effective to change all code attachment results to 0 after the output result of each processing row is referred to, and when it is determined that a processing row is blank.

As described above, according to this embodiment, determination whether the image is an image to which information should be attached can be implemented by simple processing. In addition, since wasteful image information output for an image to which information need not be attached can be suppressed, degradation in throughput of a printer can be suppressed.

As a characteristic feature of an embodiment to be described below, a code that expresses additional information is generated for image information after quantization processing. In this embodiment, the number of quantization values is 2, and the quantization value is 0 or 1 for the descriptive convenience. This value represents ON/OFF of a dot in, e.g., an inkjet printer.

Even when the number of quantization values is larger than 2, this embodiment can be practiced by handling the quantization value as a quantization value in, e.g., 256 gray levels.

Figure 33:
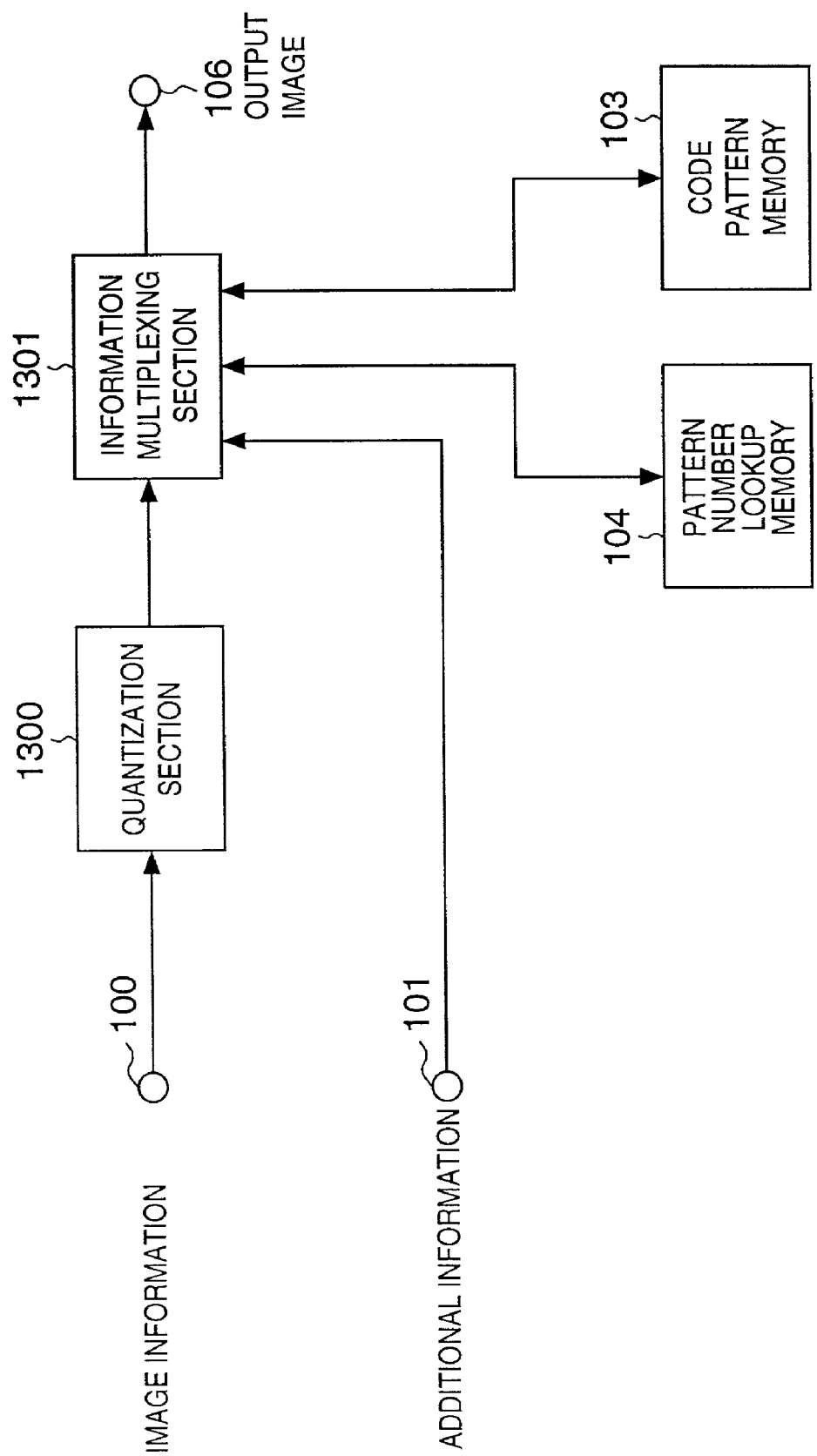
FIG. 33 is a block diagram showing the arrangement of the image processing apparatus according to still another embodiment.

FIG. 33 is a block diagram showing the arrangement of the image processing apparatus according to this embodiment. The same reference numerals as in FIG. 22 denote the same parts in FIG. 33.

A quantization section 1300 expresses image information by pseudo-halftoning. An information multiplexing section 1301 generates a code that expresses additional information by looking up a code pattern memory 103 and pattern number lookup memory 104. In this embodiment as well, a code pattern corresponding to one row is held in the code pattern memory 103, as in the above embodiment. The held dot patterns are used in accordance with the method held in the pattern number lookup memory 104.

FIGS. 34A to 34F are views showing the dot pattern selection procedure of this embodiment. FIG. 34A shows image information around the code attachment region. FIG. 34B shows a pattern generated in the code attachment region. The pattern shown in FIG. 34B is determined by describing it in the pattern number lookup memory, as shown in FIG. 34E, in correspondence with a code attachment region start row pattern shown in FIG. 34D in the code attachment region shown in FIG. 34A.

For example, dot patterns held in the code pattern memory are selected, as shown in FIG. 34F. Output image information is changed as shown in FIG. 34C by exchanging the dot patterns in the code attachment region.

Figure 35:
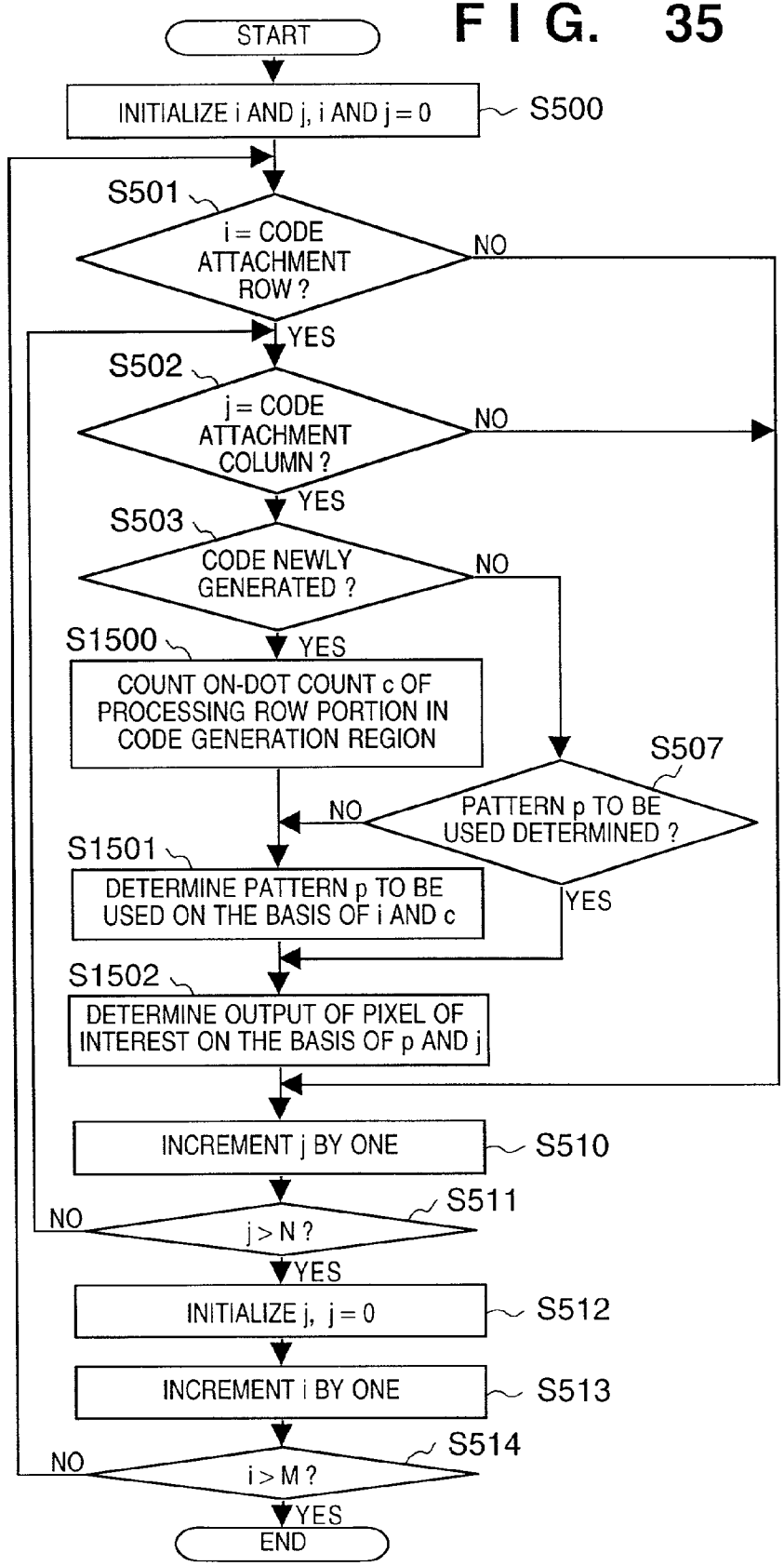
FIG. 35 is a flow chart showing the code attachment control procedure of this embodiment.

FIG. 35 is a flow chart showing the code attachment control procedure of this embodiment. The same step numbers as in FIG. 25 denote the same processing operations in FIG. 35. In step S500, the count values of row and column addresses are initialized. In steps S501 and S502, it is determined whether code attachment is to be executed for the row or column. If NO in step S501 or S502, the flow advances to step S510. If YES in steps S501 and S502, the flow advances to step S503. In step S503, it is determined whether the code to be generated is a new code. If NO in step S503, the flow advances to step S507.

If YES in step S503, the flow advances to step S1500 to count a dot count c of the current processing row portion in the region of the code to be generated, and the flow advances to step S1501. In step S507, it is determined whether a dot pattern p to be currently used has been determined. If NO in step S507, the flow advances to step S1501. If YES in step S507, the flow advances to step S1502. In step S1501, the dot pattern p to be used is determined on the basis of a count value i of the row address and the dot count value c. In step S1502, the output value of the pixel of interest is determined on the basis of the dot pattern p and a count value j of column address and replaced with input image information, and the flow advances to step S510. The procedures from step S510 are the same as in FIG. 25.

As described above, according to this embodiment, even when image information can be referred to only in units of rows, a code that expresses additional information can be generated regardless of the pseudo-halftoning processing method.

An embodiment to be described below is different from the above embodiment in the dot pattern selection procedure in each code generation row. In this embodiment as well, the number of quantization values is 2, and the quantization value is 0 or 1 for the descriptive convenience. This value represents ON/OFF of a dot in, e.g., an inkjet printer. Even when the number of quantization values is larger than 2, this embodiment can be practiced by handling the quantization value as a quantization value in, e.g., 256 gray levels.

As a characteristic feature of this embodiment, a dot pattern to be used in the current row is selected on the basis of the number of dots in the code generation region of each row and information of dot patterns used in the previous rows in the same code. The arrangement of this embodiment is the same as that shown in FIG. 33 of the above embodiment of the present invention except the contents of a pattern number lookup memory 104.

Figure 36:
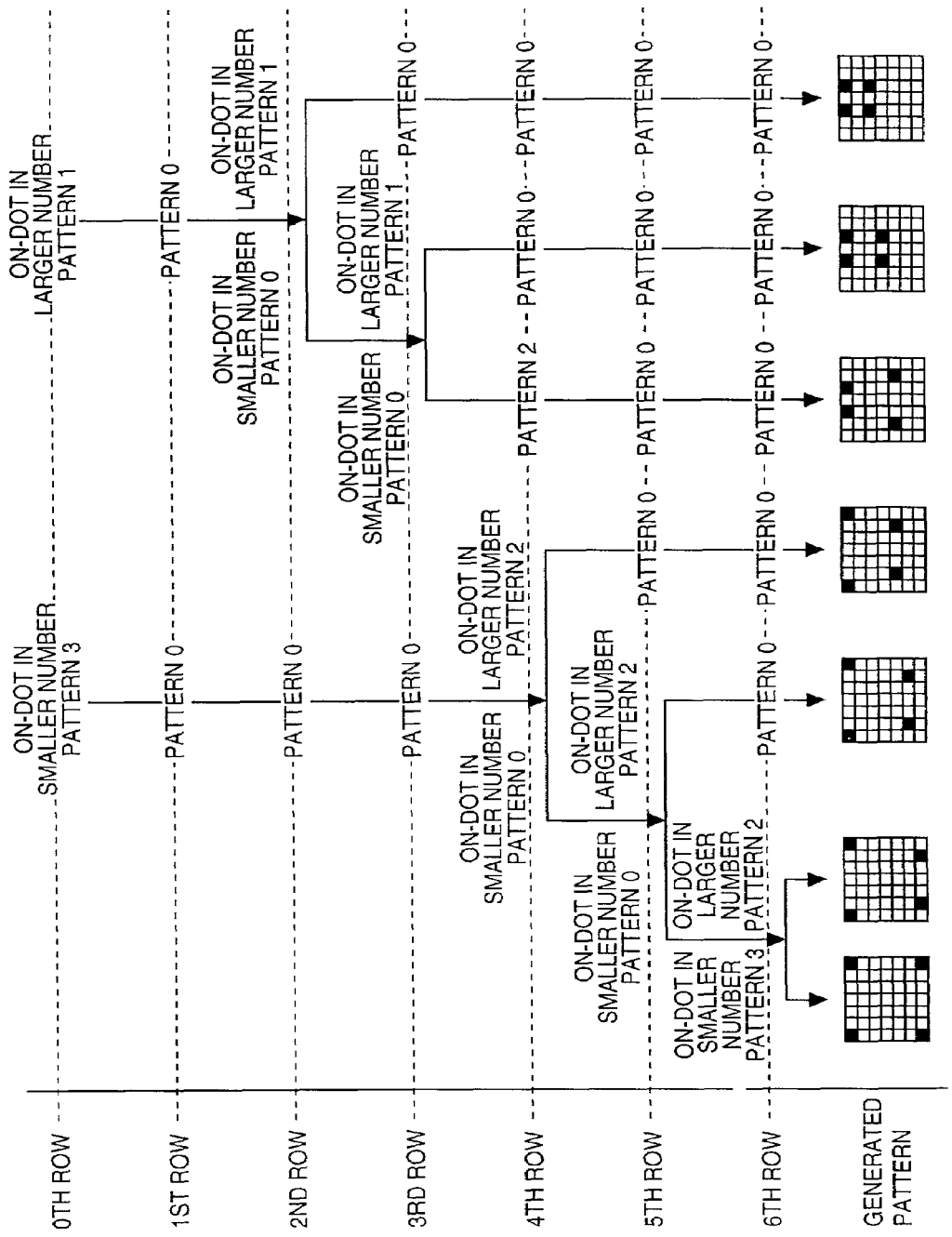
FIG. 36 is a view showing the dot pattern selection method of still another embodiment.

FIG. 36 is a view showing the pattern generation procedure of this embodiment. The pattern generated in FIG. 36 is determined by combining the row patterns shown in FIGS. 23A to 23D. In this embodiment, the patterns are not limited to those shown in FIGS. 23A to 23D and FIG. 36, and for example, various patterns such as patterns shown in FIGS. 34A to 34F can be used. Referring to FIG. 36, the 0th row represents the first code generation row. The procedure shown in FIG. 36 is almost the same as that shown in FIG. 27 except the following point. Referring to FIG. 27, a branch path is determined using the average density of image information. Referring to FIG. 36, instead, a branch path is determined in accordance with the dot count value.

Figure 37:
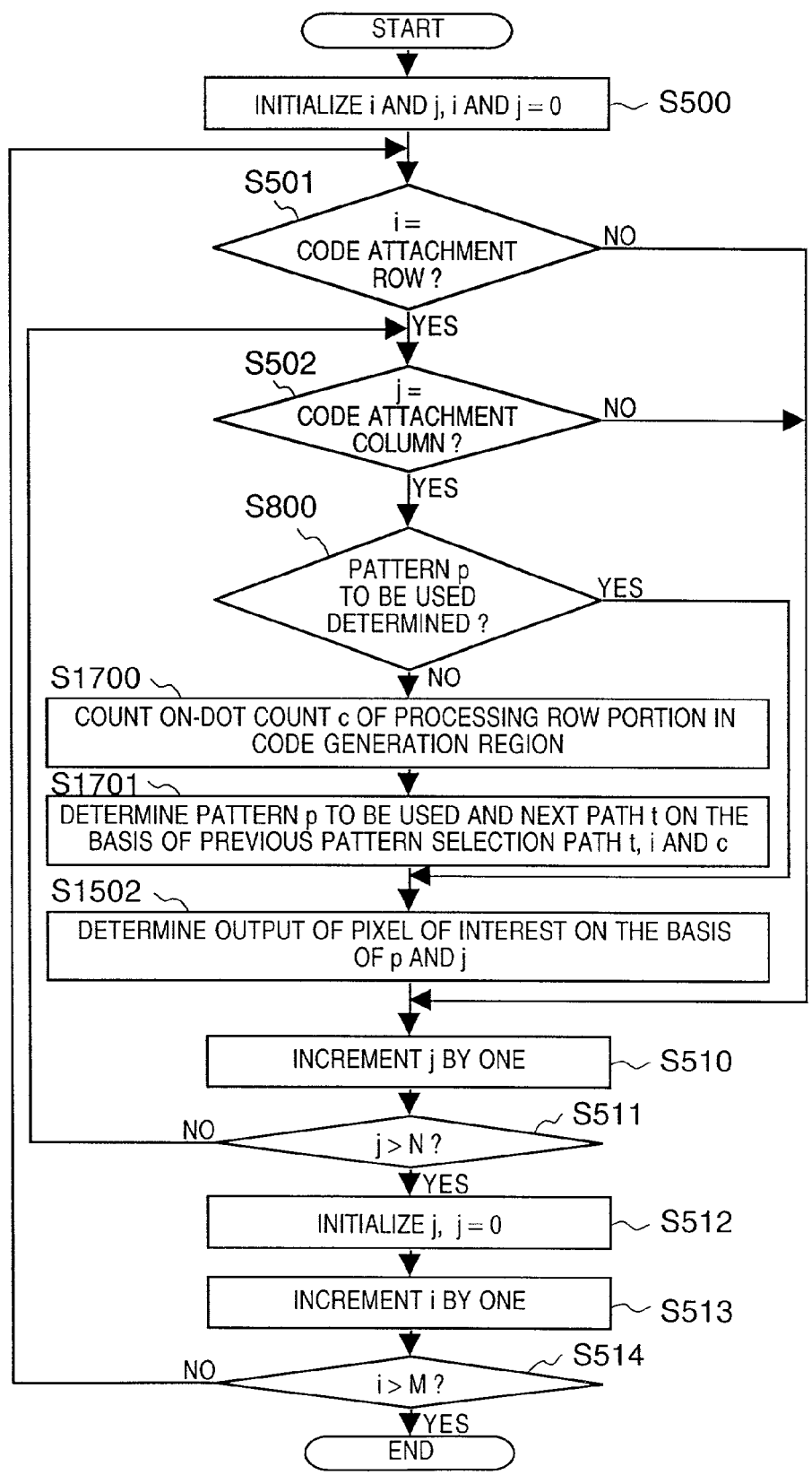
FIG. 37 is a flow chart showing the code attachment control procedure of this embodiment.

FIG. 37 is a flow chart showing the code attachment control procedure of this embodiment. The same step numbers as in FIGS. 28 and 35 denote the same processing operations in FIG. 37. Referring to FIG. 37, the operation before step S800 is the same as in FIG. 35. In step S800, it is determined whether a dot pattern p to be used has been determined. If YES in step S800, the flow advances to step S1502. If NO in step S800, the flow advances to step S1700. In step S1700, a dot count c in the processing row in the code region which is currently being generated is counted. In step S1701, the pattern to be used and a next path t are determined on the basis of the previous pattern selection path t, count value i of the row address, and dot count c. The flow advances to step S1502. The processing from step S1502 is the same as in FIG. 35.

As described above, according to this embodiment, in an image processing apparatus for processing information in units of rows, a code that expresses additional information can be generated independently of the pseudo-halftoning processing method. In addition, even when image information can be referred to only in units of rows, a code dot pattern across a plurality of rows can be changed in accordance with the image information. As a result, a code with high detection rate can be generated while suppressing degradation in image quality.

An embodiment to be described below is different from the above embodiments in the dot pattern selection method in each code generation row. In this embodiment as well, dot patterns are held in units of rows. As a characteristic feature, however, a dot pattern to be used in the current row is selected using the quantization value in the processing row in the code generation region before code attachment and the difference information between the quantization value before code attachment and that in the dot pattern. In this embodiment as well, the number of quantization values is 2, and the quantization value is 0 or 1 for the descriptive convenience. This value represents ON/OFF of a dot in, e.g., an inkjet printer. Even when the number of quantization values is larger than 2, this embodiment can be practiced by handling the quantization value as a quantization value in, e.g., 256 gray levels.

Figure 38:
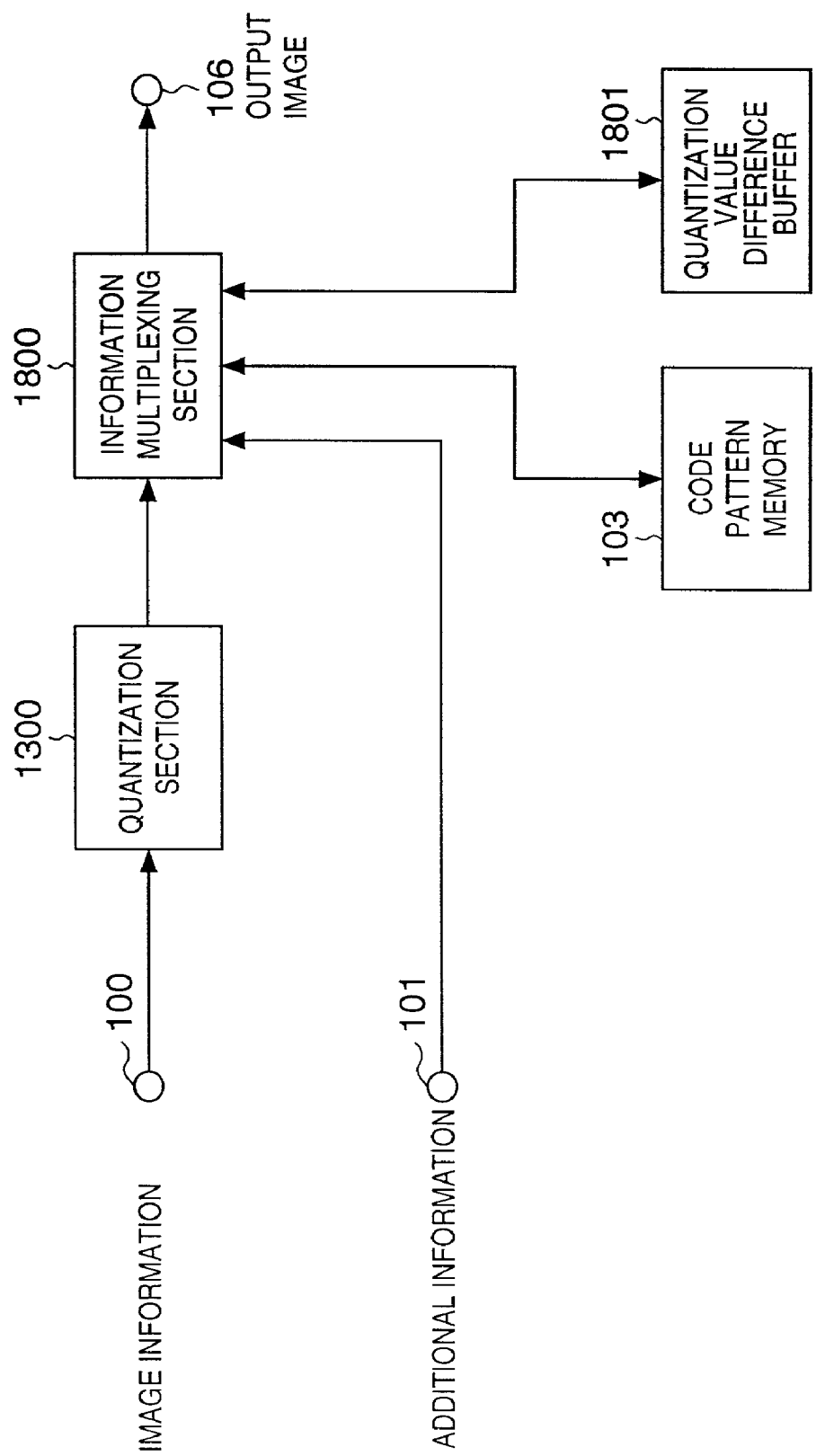
FIG. 38 is a block diagram showing the arrangement of an image processing apparatus according to still another embodiment.

FIG. 38 is a block diagram showing the arrangement of an image processing apparatus according to this embodiment. The same reference numerals as in FIG. 33 denote the same parts in FIG. 38.

Referring to FIG. 38, in a code pattern memory 103, dot patterns are registered in units of rows. A quantization value difference buffer 1801 stores quantization value error generated upon code pattern attachment in a row before the row for which processing is in progress in the code generation region. An information multiplexing section 1800 selects a pattern to be used from the dot patterns registered in the code pattern memory 103 on the basis of image information and quantization value error information stored in the quantization value difference buffer 1801.

The information multiplexing section 1800 also calculates the difference value between the number of dots of an input image and that in the dot pattern to be attached and stores the difference value in the quantization value difference buffer 1801.

Figure 39:
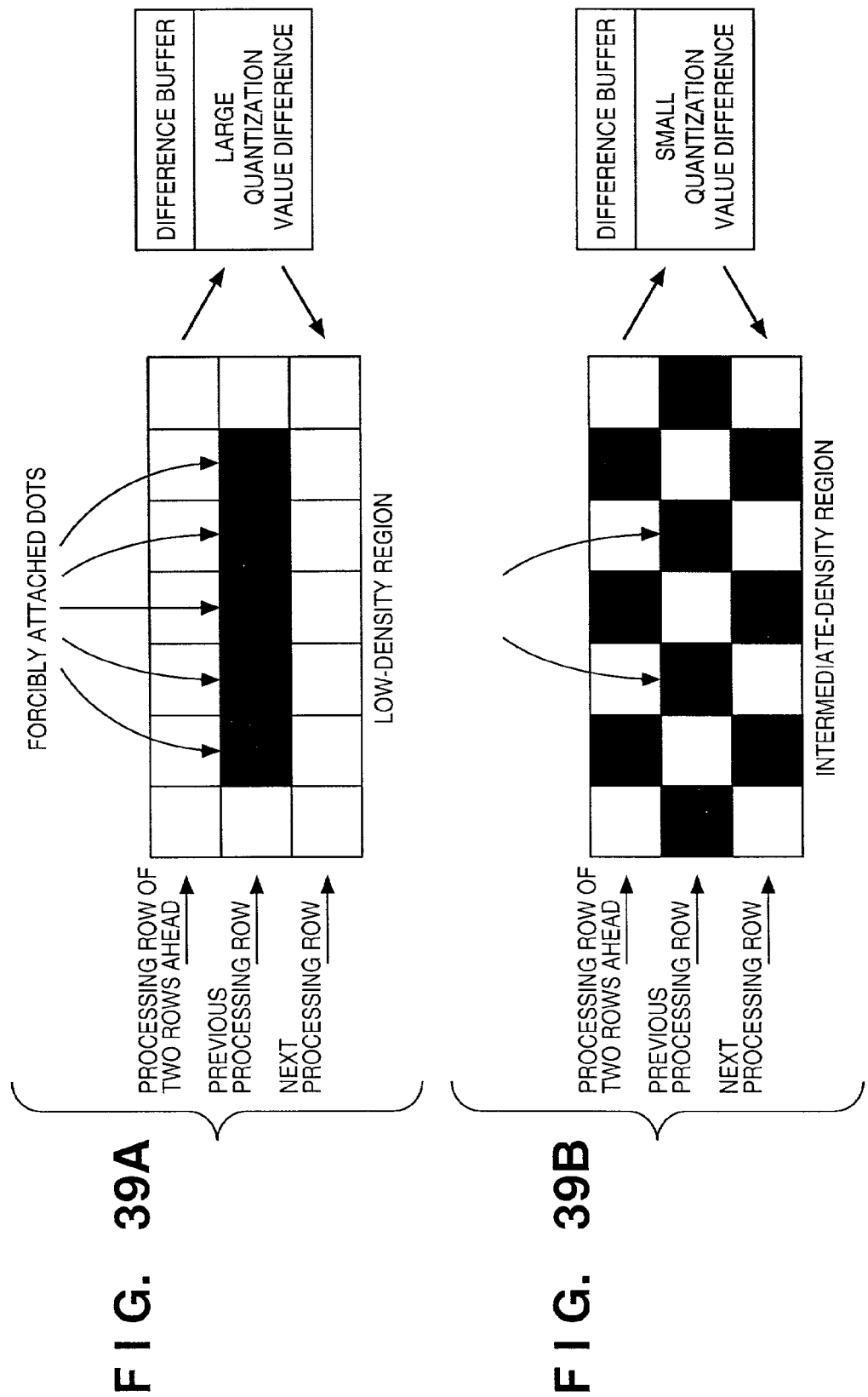
FIGS. 39A and 39B are views showing the state of a quantization value difference buffer in this embodiment.

FIGS. 39A and 39B are views showing the code attachment control procedure of this embodiment, in which a dot pattern is attached in the previous processing row. FIG. 39A shows a case wherein continuos dots are attached to a low-density region. Referring to FIG. 39A, in the previous processing row, continues dots are attached although the density is low. Hence, in the previous processing row, the difference in quantization value between the original image and the attached dot pattern becomes large. Since a dot pattern different from the distribution of the neighboring dots is attached, the neighboring dots and the attached pattern can be easily discriminated in FIG. 39A. However, from the viewpoint of storage of image density, a pattern having dots in number as small as possible is preferably selected in the next row. On the other hand, referring to FIG. 39B, a pattern whose dot ratio is close to the dot appearance rate of the original image is attached to a region where the original image has an intermediate density. Referring to FIG. 39B, since the dot ratio of the original image is close to that of the attached pattern, the difference in quantization value between the original image and the attached dot pattern in the previous processing row becomes small. Referring to FIG. 39B, since the attached pattern is close to the original image, degradation in image quality is small. However, this makes it difficult to detect the code. Hence, in the next processing row, an additional pattern including dots in number larger than the previous processing row is selected.

Figure 40:
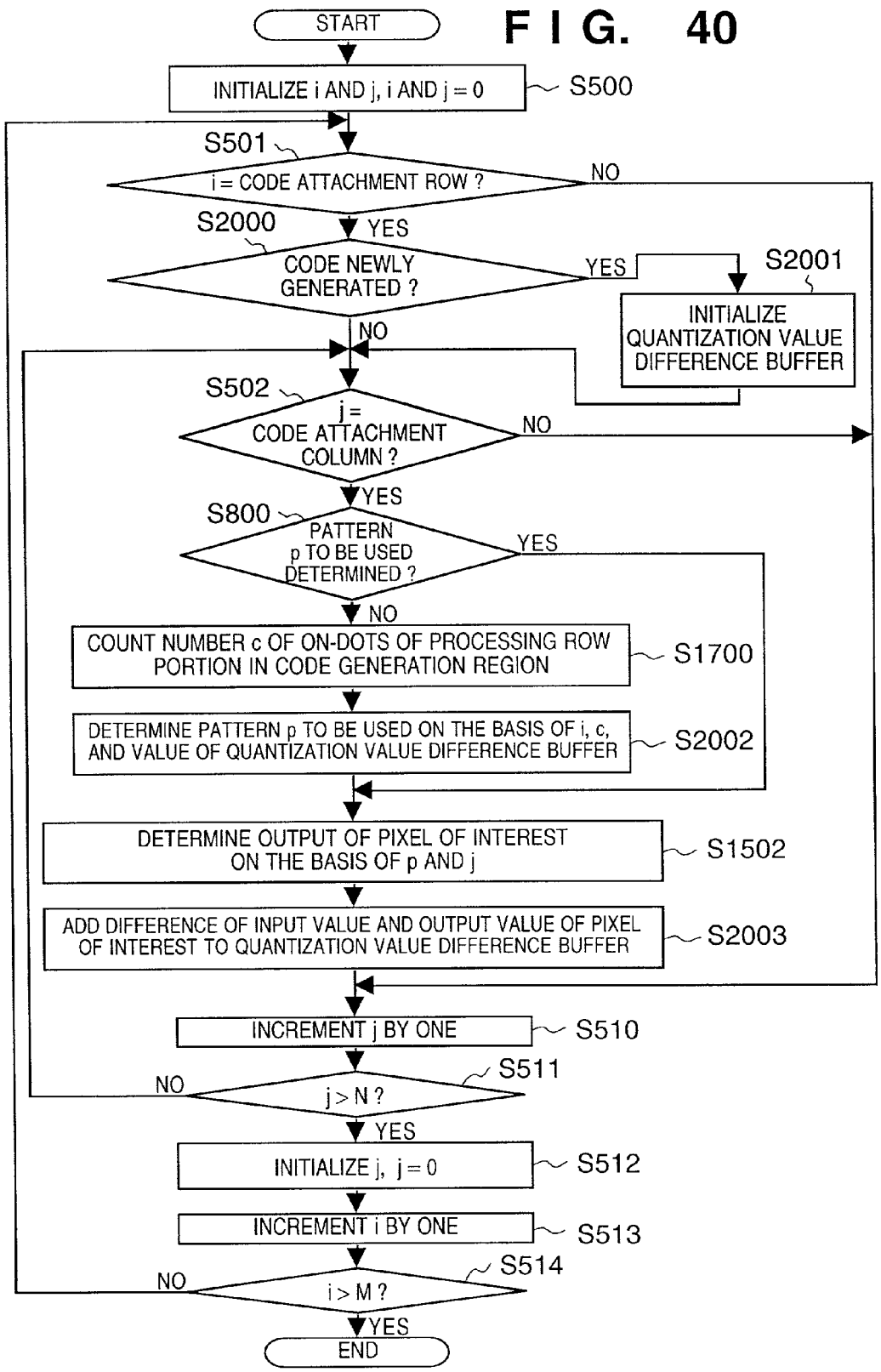
FIG. 40 is a flow chart showing the code attachment control procedure of this embodiment.

FIG. 40 is a flow chart showing the code attachment control procedure of this embodiment. The same step numbers as in FIG. 37 denote the same processing operations in FIG. 40. Referring to FIG. 40, the operations in steps S500 and S501 are the same as in FIG. 37. After that, in step S2000, it is determined whether the code to be currently generated is a code to be generated for the first time. If YES in step S2000, the quantization value difference buffer 1801 is initialized in step S2001, and then the flow advances to step S502. If NO in step S2000, the flow directly advances to step S502. The procedures in steps S502 to S1700 are the same as in FIG. 27. Next to step S1700, in step S2002, a dot pattern p to be used is determined on the basis of a counter i of the row address, a dot count c, and the value stored in the quantization value difference buffer. In step S1502, the output value of the pixel of interest is determined on the basis of the dot pattern p and a count value j of column address, and the flow advances to step S2003. In step S2003, the difference between the quantization value of the original image of the pixel of interest and the output determined in step S1502 is obtained and added to the value in the quantization value difference buffer. The flow advances to step S510, and the procedures from step S510 are the same as in FIG. 27.

In this embodiment, the calculated difference of quantization value is directly added to the quantization value difference buffer in step S2002 shown in FIG. 40. However, instead of using the difference value for processing of the next row, the difference value may be multiplied by a weighting coefficient to change the distribution ratio.

The relationship between degradation in image quality and the code detectability with respect to the attached dot pattern also changes depending on, e.g., image resolutions, or for an inkjet printer, ink dot sizes on paper or ink colors. Hence, considering the resolution information, ink dot size, or code generation color is also effective in determining a dot pattern.

As described above, according to this embodiment, even when image information can be referred to only in units of rows, a code dot pattern with little degradation in image quality can be generated regardless of the pseudo-halftoning processing method as long as only several types of dot patterns in units of rows are registered. Consequently, this is effective because the complex relationship between dot patterns need not be registered, and the number of program codes, hardware configuration, or memory capacity need not be increased.

As a characteristic feature of an embodiment to be described below, when all data bits of a row for which code attachment processing should be executed are "0", all output results in the processing row are nullified. This embodiment is different from the above embodiment in that code generation processing is controlled for image information after quantization processing.

The arrangement of this embodiment can be implemented by adapting it to the output portion of the information multiplexing section 1301 shown in FIG. 33 of the above embodiment or information multiplexing section 1800 shown in FIG. 38 of the above embodiment.

Since this embodiment does not depend on the code attachment scheme, it can be adapted to another code attachment processing for an image after quantization processing.

Figure 41:
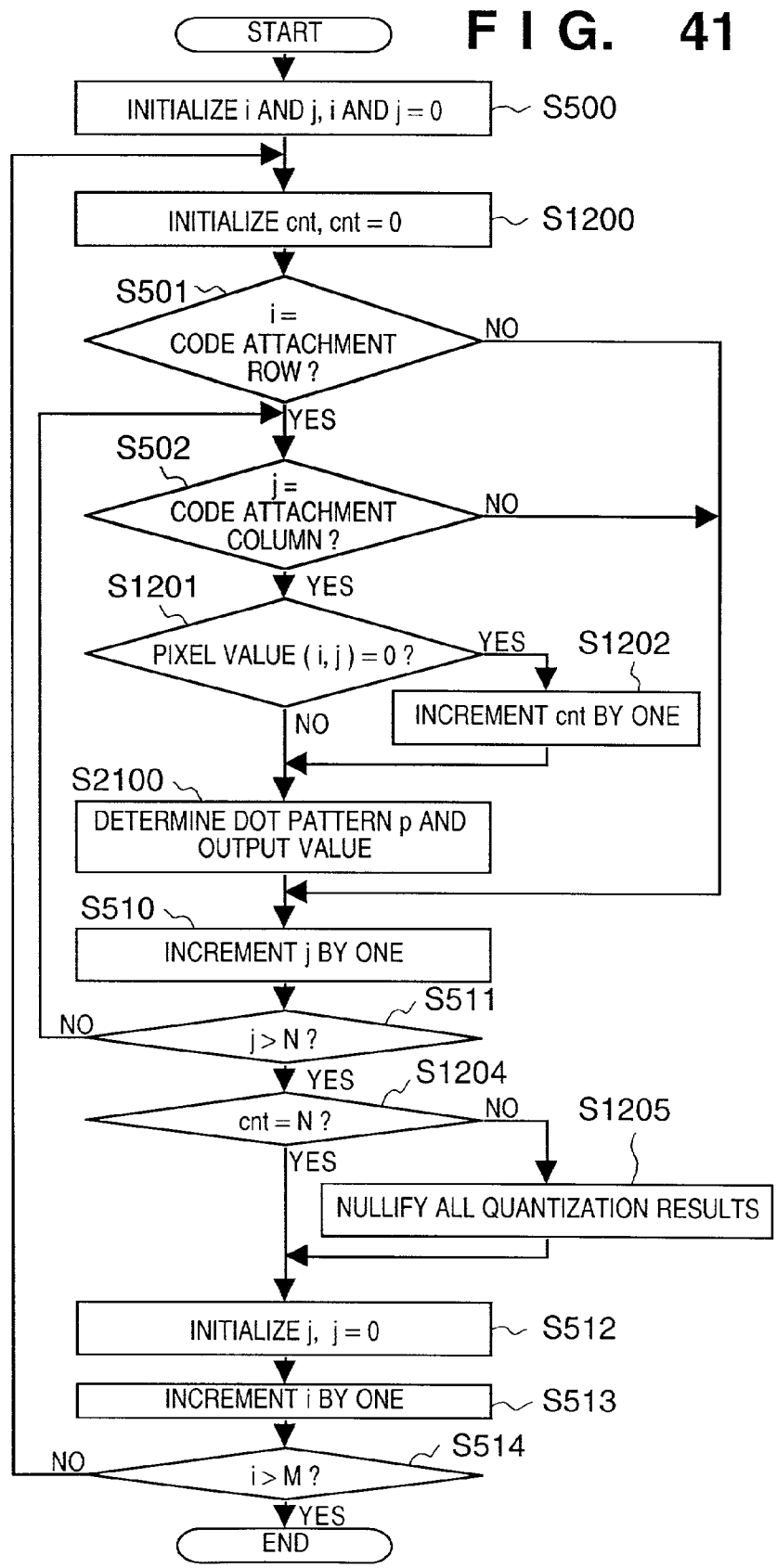
FIG. 41 is a flow chart showing the code attachment control procedure of still another embodiment.

FIG. 41 is a flow chart showing the code attachment control procedure of this embodiment. The same step numbers as in FIG. 32 denote the same processing operations in FIG. 41. Referring to FIG. 41, in steps S500 and S1200, initialization processing is executed, as in FIG. 32. In steps S501 and S502, it is determined whether the row or column is a code attachment position. If NO in step S501 or S502, flow advances to step S510. If YES in steps S501 and S502, the flow advances to step S1201. In step S1201, it is determined whether the pixel value of the pixel of interest is 0. If YES in step S1201, the flow advances to step S1202 to increment a value cnt by one, and the flow advances to step S2100. If NO in step S1201, the flow directly advances to step S2100. In step S2100, processing of determining the dot pattern p and then the output value is performed, and the flow advances to step S510. Processing in step S2100 is executed by the method of the above embodiment, as described above. Processing from step S2100 is the same as in FIG. 32.

As in the above embodiment, for a color image, the output results of all color components in the same row may be referred to, and then, all the code generation results may be nullified.

As described above, according to this embodiment, in code attachment processing of attaching a code to image information that has undergone quantization processing, when code attachment is unnecessary, wasteful dot output can be suppressed. For this reason, the influence on the quality of the output image or the throughput of, e.g., an inkjet printer can be reduced.

In the above embodiments, dot patterns are held in the code pattern memory 103 shown in FIG. 22 in units of rows, like the dot patterns shown in FIGS. 23A to 23D. For example, dot patterns may be held as shown in FIGS. 24A to 24C, and a dot pattern corresponding to one row may be generated from the dot patterns shown in FIGS. 24A to 24C in selecting a dot pattern.

In the above embodiments, dot patterns are determined in units of rows. However, dot patterns need not always be selected in units of rows. For example, dot patterns may be determined in units of smaller regions than the range (the range of 7×7 pixels shown in FIGS. 24A to 24C) of attachment of a dot pattern representing information, e.g., every two rows or in units of columns.

As has been described above, according to the present invention, since the number of dot patterns to be generated can be reduced, an increase in the number of program codes, hardware configuration, or memory capacity can be prevented.

In addition, since the dot pattern can be selectively embedded in units of regions smaller than a first dot pattern representing predetermined information, degradation in image quality can be suppressed, and the predetermined information can be detectably embedded.

Figure 42:
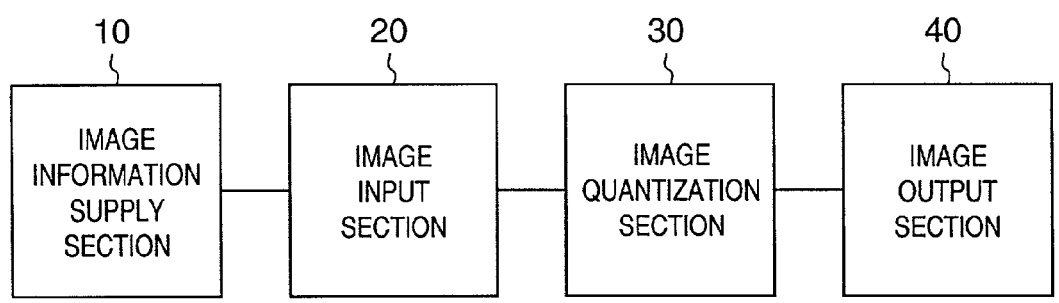
FIG. 42 is a schematic block diagram showing the arrangement of an image processing apparatus according to still another embodiment of the present invention.

FIG. 42 is a schematic block diagram showing the arrangement of an image processing apparatus according to still another embodiment of the present invention. Referring to FIG. 42, an image information supply section 10 supplies image information to be processed, to which all arrangements capable of supplying a processing image correspond, including a scanner, CD-ROM, optical disk, and magnetic disk.

An image input section 20 receives image information from various image information supply sections 10, separates the information into image information and additional information, and supplies them to an image quantization section 30. The image quantization section 30 receives the image information and additional information different from the image information from the image input section 20 and executes multiplex processing. When code attachment is executed on the basis of pixel values around the pixel of interest in image information, the image quantization section 30 determines whether decoding is possible, determines the quantization condition on the basis of the determination result, the pixel values around the pixel of interest in image information, and the additional information to be multiplexed, and quantizes the pixel of interest in image information by pseudo-halftoning processing under the determined quantization condition.

An image output section 40 outputs the image information quantized by the image quantization section 30. The image output section 40 comprises, e.g., a printing apparatus such as an inkjet printer for forming an image using the pseudo-halftoning expression.

Figure 43:
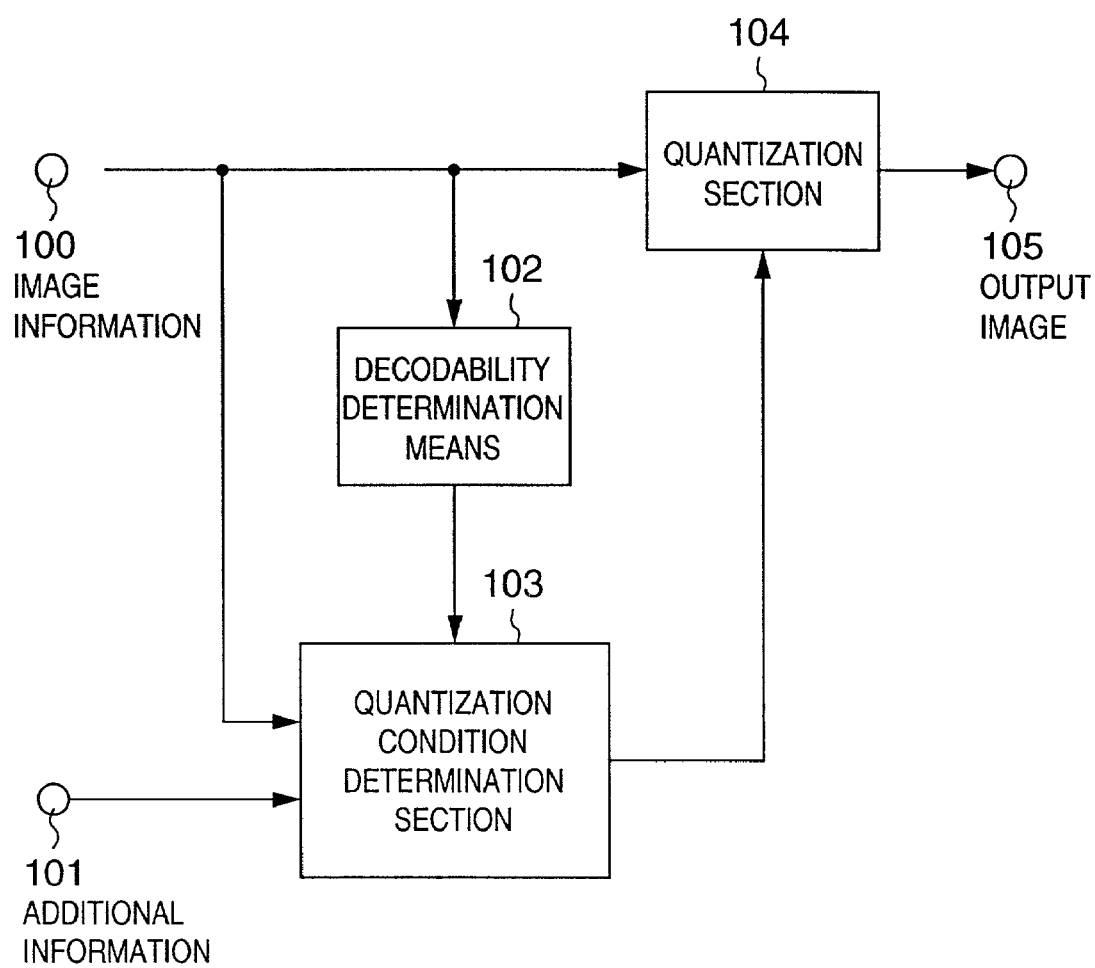
FIG. 43 is a block diagram showing the detailed arrangement of an image quantization section shown in FIG. 42.

The detailed arrangement of the image quantization section 30 will be described below with reference to FIG. 43. FIG. 43 is a block diagram showing the detailed arrangement of the image quantization section 30 shown in FIG. 42.

Referring to FIG. 43, an input terminal 100 inputs image information. An input terminal 101 inputs additional information such as identification information. A decodability determination means 102 detects the image density in the code attachment region and determines whether the attached code is decodable. The decodability determination means 102 is referred to in determining the quantization condition.

A quantization condition determination means 103 determines the quantization condition for quantization of image information. A quantization means 104 quantizes the image information. The quantization means 104 quantizes the image information using, e.g., error diffusion under the quantization condition determined by the quantization condition determination means 103. An output terminal 105 outputs the quantized image information.

Error diffusion is a method of expressing, by pseudo-halftoning, multilevel image information by using binary values or quantization values smaller than the input image information. In this quantization method, an error generated upon quantizing a pixel value of interest is distributed to pixels around the pixel of interest, thereby storing the image density.

Figure 44:
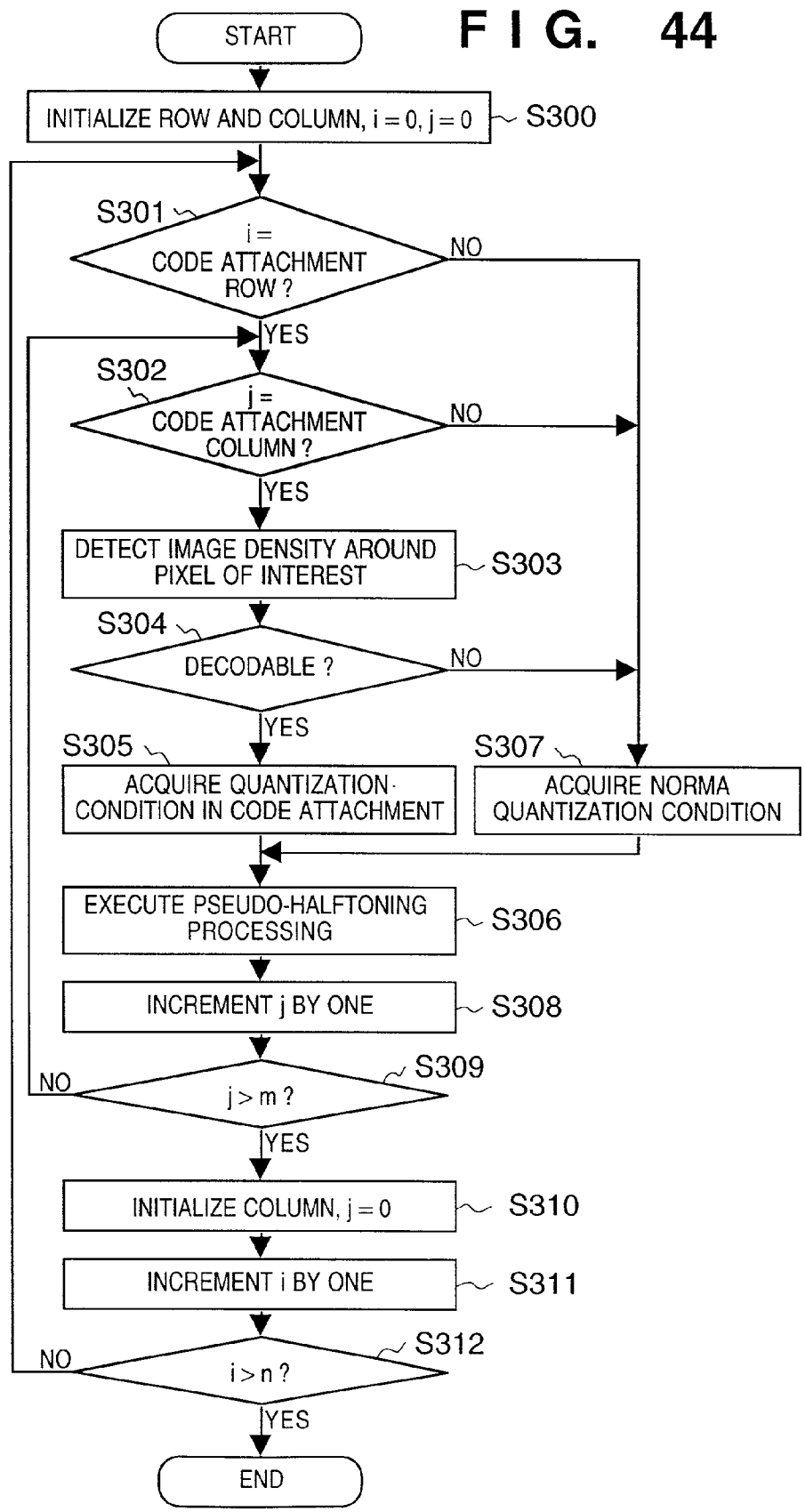
FIG. 44 is a flow chart showing the operation procedure of the image quantization section of the embodiment shown in FIG. 43.

An image information processing method according to this embodiment having the above arrangement will be described below with reference to the flow chart shown in FIG. 44. FIG. 44 is a flow chart showing the operation procedure of the image quantization section 30 of the embodiment shown in FIG. 43.

Referring to FIG. 44, initialization processing is performed in step S300. Step S300 represents initialization of variables (i,j) for counting the vertical and horizontal addresses. In step S301, it is determined on the basis of the address value whether a row (i) is a code attachment row. In this case, whether the row address (i) indicates a row to which code attachment is to be executed is determined. If YES in step S301, the flow advances to step S302 to determine whether a column (j) is a code attachment column. Step S302 also represents a determination means based on the address value, as in step S301. Whether the column address (j) represents a column to which a code is to be attached is determined.

If YES in steps S301 and S302, the flow advances to step S303. In step S303, the image density around the pixel of interest is detected. In step S304, the decodability of a code attached by code attachment is determined on the basis of the image density around the pixel of interest. If YES in step S304, the flow advances to step S305 to acquire the quantization condition for code attachment. Then, the flow advances to step S306.

If NO in step S301 or S302, or if NO in step S304, the flow advances to step S307 to acquire the normal quantization condition without code attachment. Then, the flow advances to step S306.

In step S306, pseudo-halftoning processing is executed for the image information in accordance with the quantization condition acquired in step S305 or S307. In step S308, the column address (j) is incremented by one. In step S309, it is determined whether the column address (j) exceeds a column-direction size "m" of image information, thereby checking whether processing in the column direction is ended. If NO in step S309, the flow returns to step S302 to perform quantization processing for the next column.

When the quantization conditions acquired in steps S305 and S307 are compared, the speed of pseudo-halftoning processing executed in step S306 is higher under the quantization condition acquired in step S307.

If YES in step S309, the flow advances to step S310. In step S310, the column address j is initialized. In step S311, the row address (i) is incremented by one. In step S312, it is determined whether the row address (i) exceeds a row-direction size "n" of image information, thereby determining whether processing in the row direction is ended. If NO in step S312, the flow returns to step S301 to execute quantization processing for the next row.

If YES in step S312, the processing is ended.

Figure 45:
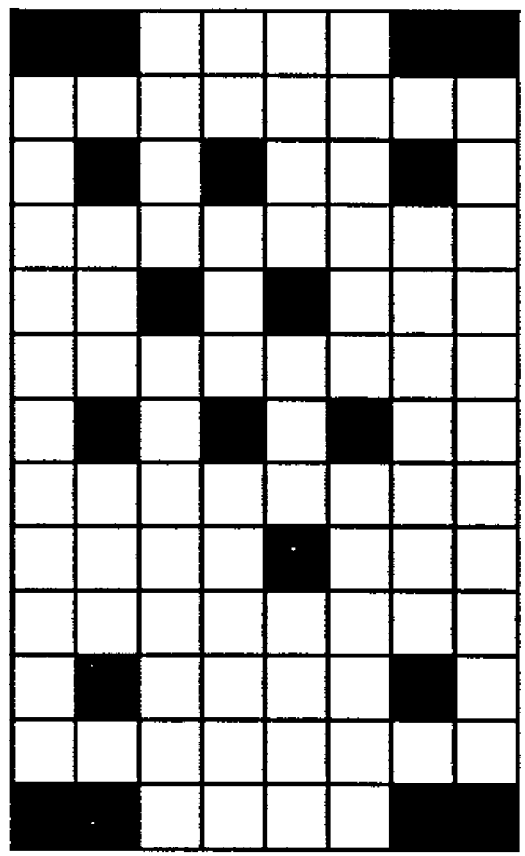
FIG. 45 is a view showing an information block of this embodiment.

An example of attachment of information of a different kind to image information in this embodiment will be described next with reference to FIG. 45. FIG. 45 is a view showing an information block unnoticeably embedded in image information in this embodiment. The information block is a unit of information to be attached and is formed from, e.g., the machine identification number of a printing apparatus, which is used for anti-forgery of securities.

In the information block, codes formed from a plurality of dots are laid out in accordance with a specific regularity. For anti-forgery, the information block shown in FIG. 45 is unnoticeably embedded in the entire image information.

The information block shown in FIG. 45 expresses information by a code layout in the range whose four corners are defined by continuous codes, in which rows having codes attached at a predetermined interval in the vertical direction are present. An information bit is expressed depending on whether the number of codes in the code attachment row is even or odd. In anti-forgery of securities, for which information must be reliably detected from an image, the information block is preferably repeatedly embedded in the entire image information. To do this, however, codes must be generated for a wide range of the entire image.

When ink is used for printing, as in an inkjet printer, an image is expressed by pseudo-halftoning processing using binary values or low-level quantization values, and then, ink dots corresponding to the quantization values are printed. A code attached to the printed image is also formed by a set of dots.

When liquid ink is used for printing, the ink spreads on the printing medium in printing. For this reason, an off-dot without ink printing may be overwritten on the printed image. Hence, a dot forming a code is preferably an on-dot having ink printing.

However, when the image density becomes high in a color component for code generation, an on-dot is hidden in image information and becomes undetectable. That is, the code is meaningless in a high-density region, and consequently, code attachment processing is wasteful. When the image density is detected, and code attachment processing is not performed if the image density disables code detection, the processing time can be shortened.

Figure 46:
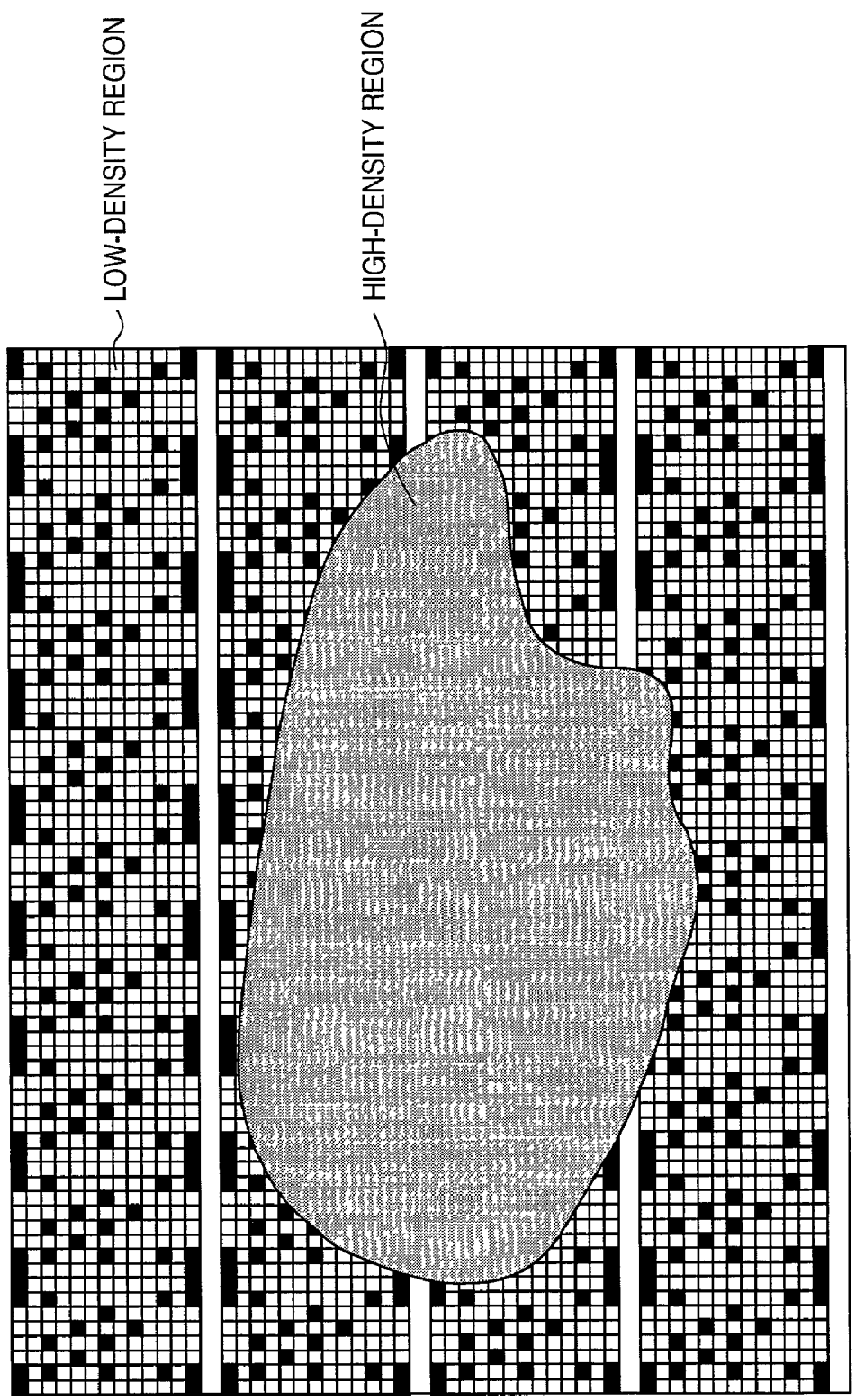
FIG. 46 is a view showing information attachment according to an image density in code attachment processing of this embodiment.

FIG. 46 is a view showing information attachment according to the image density in code attachment processing of this embodiment. In the example shown in FIG. 46, codes are attached to the entire image information. In an image density region where no code can be detected, code generation processing is not performed, and only normal pseudo-halftoning processing is executed.

The information block shown in FIG. 45 or 46 is merely an example of the present invention, and the present invention is not limited to the above form.

As described above, according to the above embodiment of the present invention, code generation is controlled in accordance with the image density in the code attachment region. If a code attached by code attachment can be detected, code attachment is executed. If the code is undetectable, code attachment is not executed. This increases the speed of printing processing.

A printing apparatus such as an inkjet printer or color laser printer prints a color image using C (cyan), M (magenta), Y (yellow), and K (black) inks or toners. Even when a code is attached by the same method, the perceptibility of codes changes depending on printed color components.

For example, when a dot is printed on white paper using the K ink, the dot is noticeable. However, a dot printed using the Y ink is unnoticeable. hence, when information such as the machine number of a printing apparatus used for printing is to be attached for anti-forgery of securities, a code is preferably generated using the unnoticeable Y ink.

When C, M, and Y, which are supposed to be ideal complementary colors, are mixed, black is obtained. Since pure black cannot be obtained by actual inks, K ink is often used, though an actual inkjet printer still prints color close to K by mixing the C, M, and Y inks.

As a result, when a Y component region as a code attachment color is extracted by reading the printed image with a scanner and separating its colors, a dot formed by simultaneously printing the C, M and Y inks and that formed by printing only the K ink can hardly be discriminated. A dot formed by the K ink may be determined as a dot printed by the Y ink.

Hence, a dot pattern having a shape similar to a code may appear in a region without any code formed by the code attachment color component, resulting in information detection error. Additionally, as described in the above embodiment, even when the density of the code attachment color is low, and it is determined that code detection is possible, if the K ink component is attached in the same region, the density of code attachment color component may become high in an image obtained by reading a printed image with a scanner, and code reading may be impossible.

In this embodiment, execution of code attachment processing is controlled in accordance with the density of K ink component of image information in code attachment processing, thereby preventing meaningless code generation.

The basic arrangement of this embodiment is the same as that of the above-described embodiment, and a portion different from the above embodiment will be described. In this embodiment, the operation contents of a decodability determination means 102 shown in FIG. 43 are different.

Figure 47:
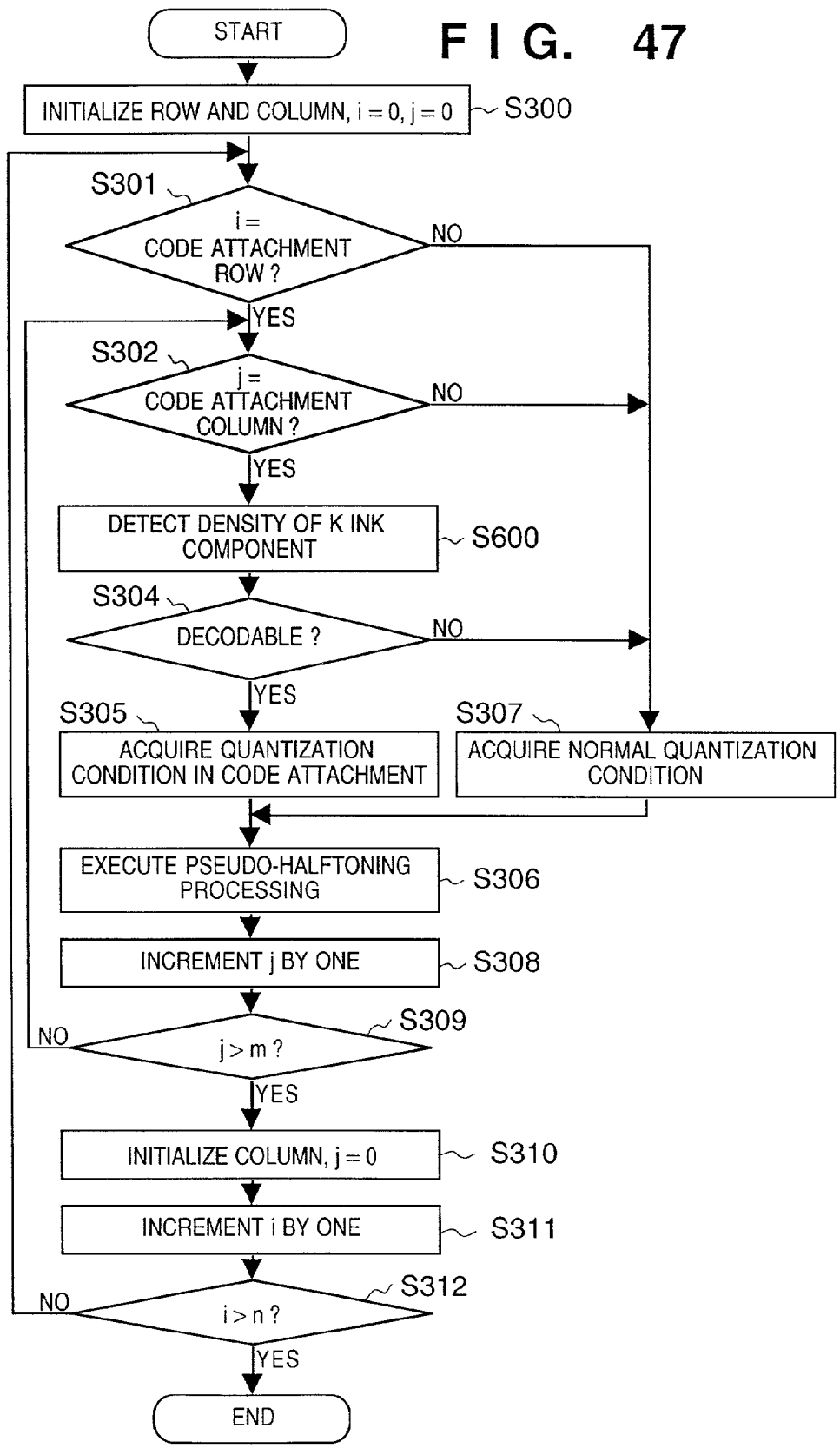
FIG. 47 is a flow chart showing the operation procedure of this embodiment.

FIG. 47 is a flow chart showing the operation procedure of this embodiment. The same step numbers as in the above-described embodiment shown in FIG. 44 denote the same processing operations in FIG. 47, and a detailed description thereof will be omitted.

Referring to FIG. 47, as a part different from the embodiment shown in FIG. 44, if it is determined in steps S301 and S302 that a row (i) is a row for which code attachment is to be executed, and a column (j) is a column for which code attachment is to be executed, the flow advances to not step S303 but step S600 to detect the density of K ink component around the pixel of interest. Then, the flow advances to step S304. In step S304, the decodability of a code attached by code attachment is determined on the basis of the result obtained in step S600. The remaining processing contents are the same as in the above embodiment.

According to this embodiment, since code attachment is not executed for a region where no code can be detected due to the influence of K ink component, as described above, efficient processing can be performed by omitting wasteful processing.

An embodiment wherein when an information block crosses an edge portion of image information, special quantization processing is executed will be described next.

When the information block crosses an edge portion of image information, at the edge portion of the image information, the layout of dots that appear changes depending on the image densities on the both sides of the edge or steepness of the edge, and various layouts are obtained.

For this reason, a code expressed by a specific dot layout may be undetectable due to the influence of dots around a certain edge. For example, when dots forming a code are arranged in a distributed layout, the code may be hidden in the dot layout in the image information near a blur edge generated in a natural image. In addition, when the dots forming a code are arranged in a concentrated layout, and the code attachment region is located on the high-density side of the edge, the edge may be unnoticeable. In this embodiment, when an edge is present near the code attachment region, and decoding may be difficult, control is performed not to execute code generation, thereby omitting wasteful processing and implementing efficient processing.

This embodiment also has the same basic arrangement as that of the above-described embodiment shown in FIGS. 42 and 43, and a portion different from the above-described embodiment will be described below. In this embodiment, the operation contents of a decodability determination means 102 shown in FIG. 43 are different.

Figure 48:
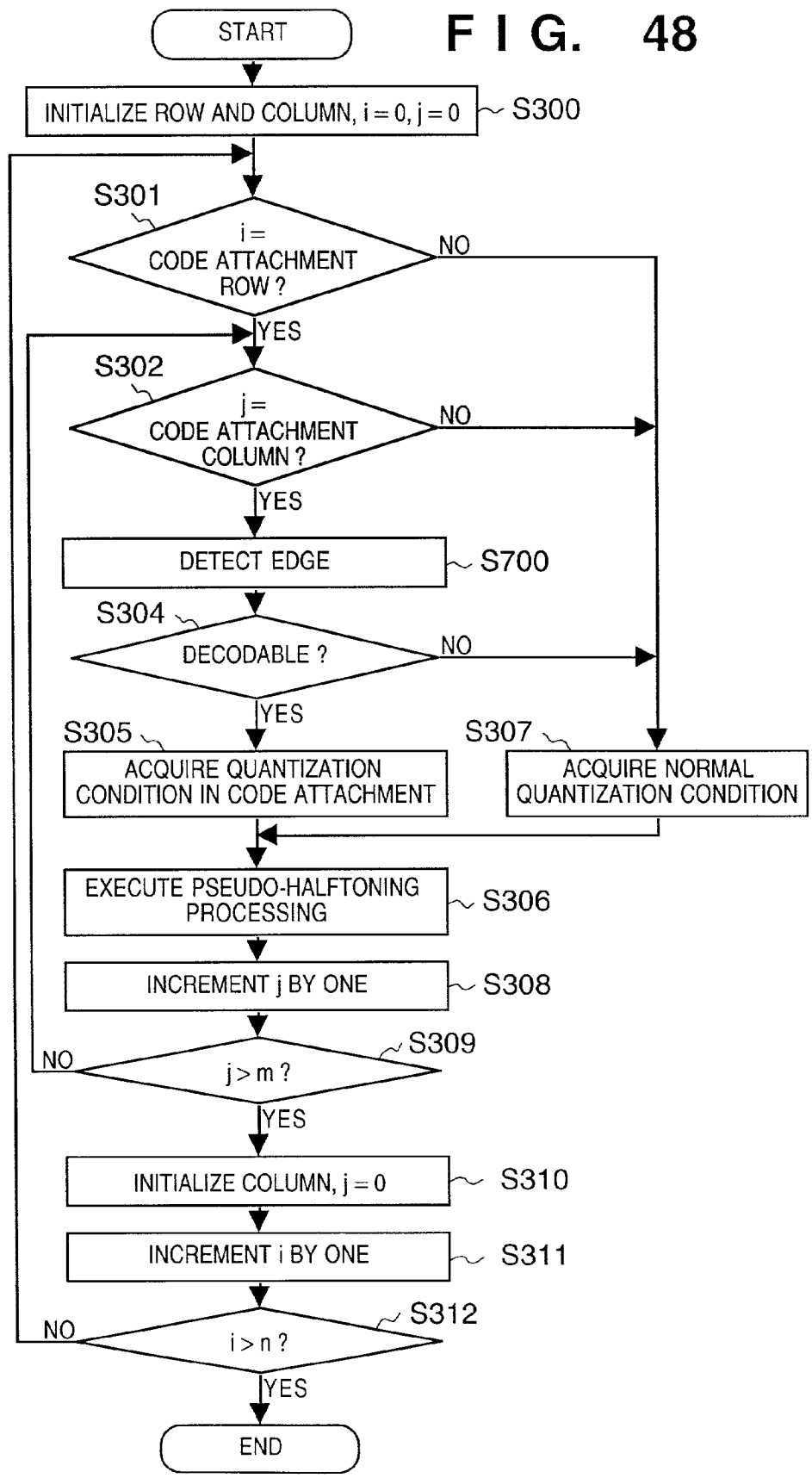
FIG. 48 is a flow chart showing the operation procedure of this embodiment.

FIG. 48 is a flow chart showing the operation procedure of this embodiment. The same step numbers as in the above-described embodiment shown in FIG. 44 denote the same processing operations in FIG. 48, and a detailed description thereof will be omitted.

Referring to FIG. 48, as a part different from the embodiment shown in FIG. 44, if it is determined in steps S301 and S302 that a row (i) is a row for which code attachment is to be executed, and a column (j) is a column for which code attachment is to be executed, the flow advances to not step S303 but step S700 to check the image state around the pixel of interest and detect an edge. Then, the flow advances to step S304.

In step S304, the decodability of a code attached by code attachment is determined on the basis of the result obtained in step S700. If YES in step S304, the flow advances to step S305. If NO in step S304, the flow advances to step S307. The remaining processing contents are the same as in the above embodiment.

Figure 49:
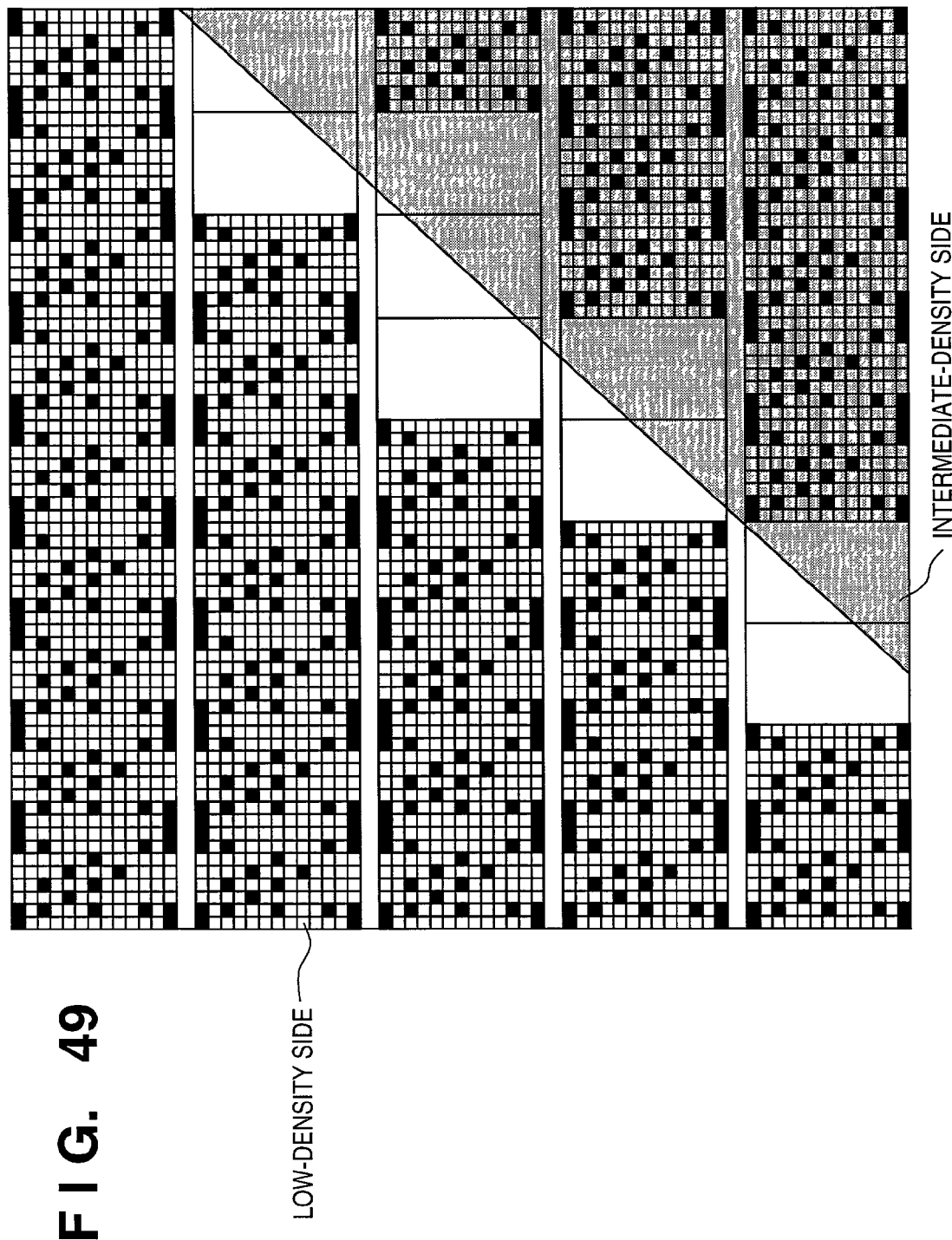
FIG. 49 is a view showing information attachment to an edge portion in this embodiment.

FIG. 49 is a view showing information attachment according to edge detection in code attachment processing of this embodiment. In the example shown in FIG. 49, image information is divided into a low-density region and intermediate-density region at the edge. An information block including the edge portion is not generated.

It is also effective to control generation in units of codes, as shown in FIG. 46 of the above-described embodiment.

As described above, according to this embodiment, when an edge is present near the code attachment region, code attachment can be controlled in accordance with the type of edge. For this reason, efficient code attachment can be implemented without wasteful processing.

As has been described above, according to the present invention, when information of a different kind is to be multiplexed with image information expressed by pseudo-halftoning, execution of attachment of a code representing information is controlled in accordance with the image density of code attachment color, thereby implementing efficient information attachment without wasteful processing.

In addition, when a printing apparatus including the K ink is used, execution of code attachment processing is controlled in accordance with the density of K ink component, thereby implementing efficient information attachment without wasteful processing.

Furthermore, execution of code attachment processing is controlled in accordance with the type of edge in image information, thereby implementing efficient information attachment without wasteful processing.

Moreover, the detectability of predetermined information attached to image information is determined, and the predetermined information is attached in accordance with the determined detectability, thereby implementing efficient information attachment without wasteful processing. Also, the image quality can be prevented from degrading. The attached information can be read.

Figure 50:
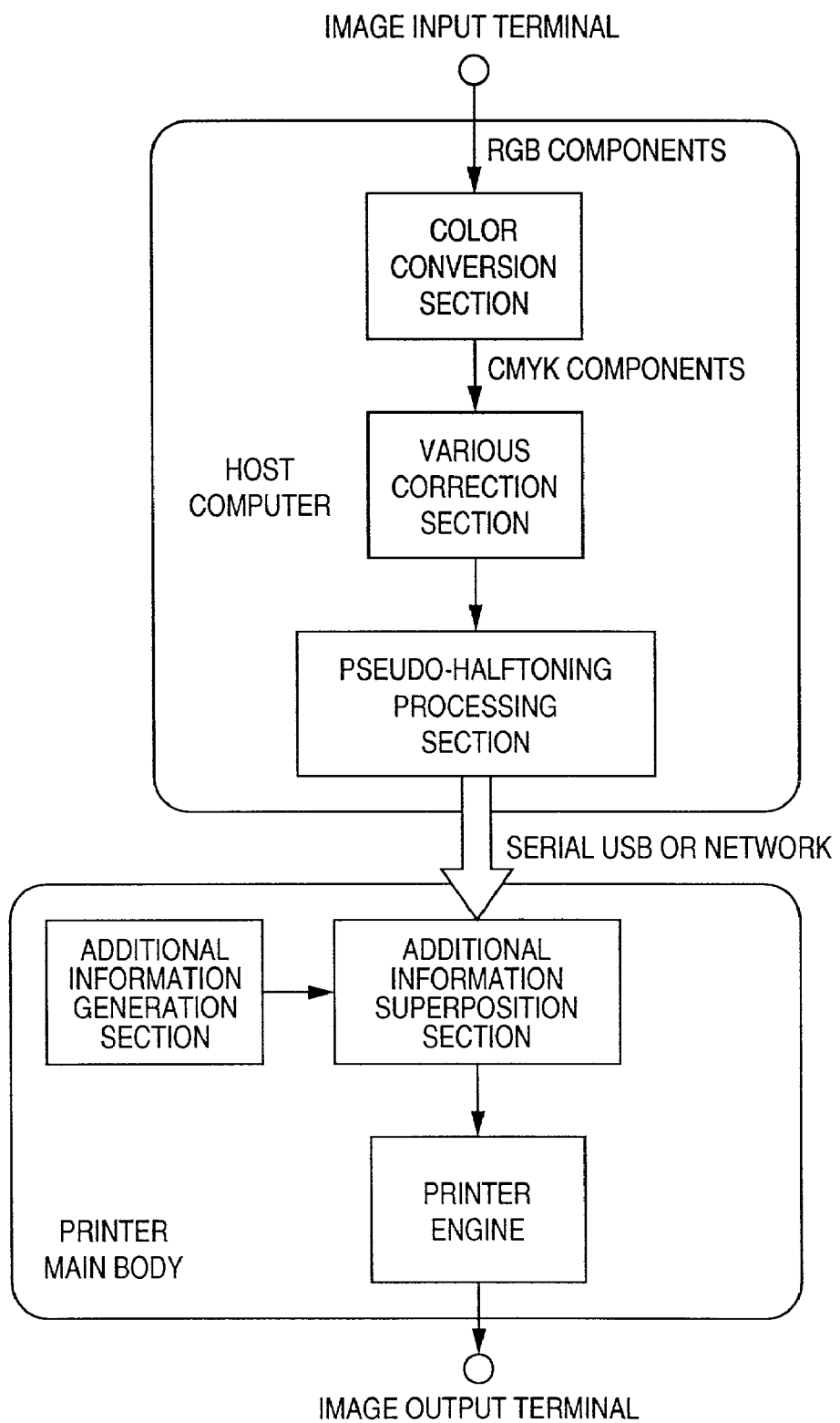
FIG. 50 is a view showing additional information superposition in this embodiment.

In an embodiment to be described below, as shown in FIG. 50, color conversion processing, various correction processing operations, and pseudo-halftoning processing are executed on a host computer to which a printer is connected directly or indirectly through a network. An image signal that has undergone the above processing operations is transmitted into the printer main body through a serial or USB cable or the network. An additional information superposition section in the printer main body superposes additional information on the image signal.

Figure 53:
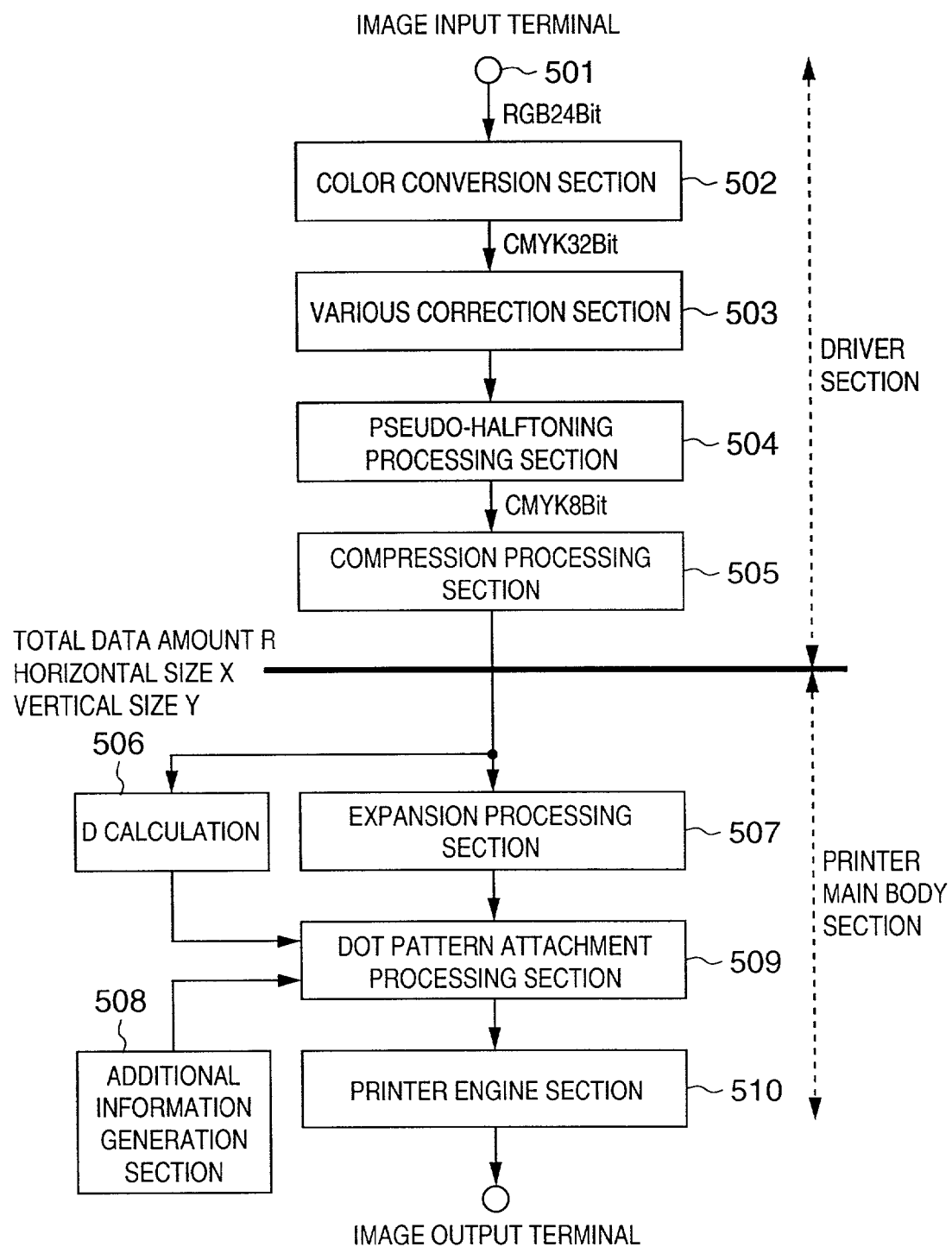
FIG. 53 is a block diagram showing processing in this embodiment.

FIG. 53 is a block diagram showing the flow of processing in the first embodiment. The flow of processing will be described below with reference to FIG. 53.

Image data input from the upper end in FIG. 53 is converted from RGB 24-bit data (each component: 8 bits) into CMYK 32-bit data by a color conversion section 502. Various correction processing operations including gamma correction are executed by a various correction section 503. Then, the image data is quantized to binary to quarternary values (1 to 2 bits) by a pseudo-halftoning processing section 504.

The image data after pseudo-halftoning processing is input from the host computer to the printer main body through an interface such as a parallel cable. At this time, to shorten the data transfer time, the image data is compressed.

Generally, a compression processing section 505 compresses the image data after pseudo-halftoning processing using a compression method called PackBits. This PackBits is a coding scheme based on Run-Length Coding and used in a general printer system because coding/decoding processing is very simple. As is known, the compression ratio of image data compressed by PackBits is high for a simple image having many flat portions, and low for a more complex image including many high-frequency components.

FIG. 54 is a view showing the data format of image data after compression processing in this embodiment. In this embodiment, prior to image data transfer, the total amount [Byte] of image data after compression and the horizontal size [Pixel] and vertical size [Pixel] of the image are transferred to the printer main body.

Processing by the driver section operating on the host computer has been described above.

In the printer main body, upon receiving the compressed data, the total amount [Byte] of image data after compression and the horizontal size [Pixel] and vertical size [Pixel] of the image are input to an information area interval calculation processing section 506. The image data main body other than the above data is input to an expansion processing section 507 and decoded in accordance with the processing procedure of PackBits. Using the three input parameters, the information area interval calculation processing section 506 calculates a data amount R [bit/pixel] per pixel given by $$R = \frac{R}{X \times Y} \qquad (1.1)$$

Since the data amount R represents the image data compression ratio, the data amount R is used as an evaluation amount representing the complexity of image data.

Generally, when image data is compressed by removing certain redundancy, most images having a small average information amount R per pixel, i.e., a high compression ratio are simple images including many flat portions. Conversely, most images having a large average information amount R, i.e., a low compression ratio are complex images including many high-frequency components.

Hence, the information area interval calculation processing section calculates the information area interval using $$D = \frac{1}{R} \cdot C_0 + C_1 \qquad (1.2)$$

where $C_0$ and $C_1$ are arbitrary constants defined in each printer system. Equation (1.2) means that the value D is large for an image having a small average information amount R, i.e., a simple image, and small for an image having a large average information amount R, i.e., a complex image.

Figure 51:
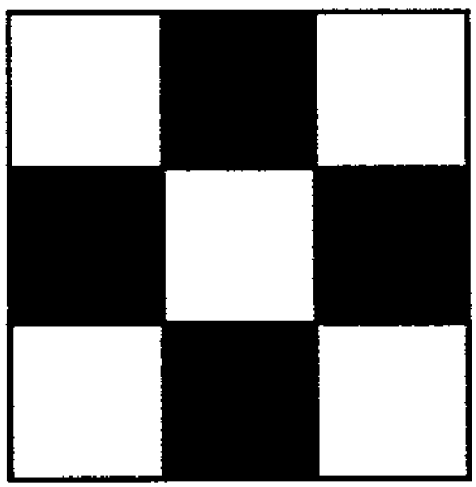
FIG. 51 is a view showing a dot pattern to be attached.
Figure 52:
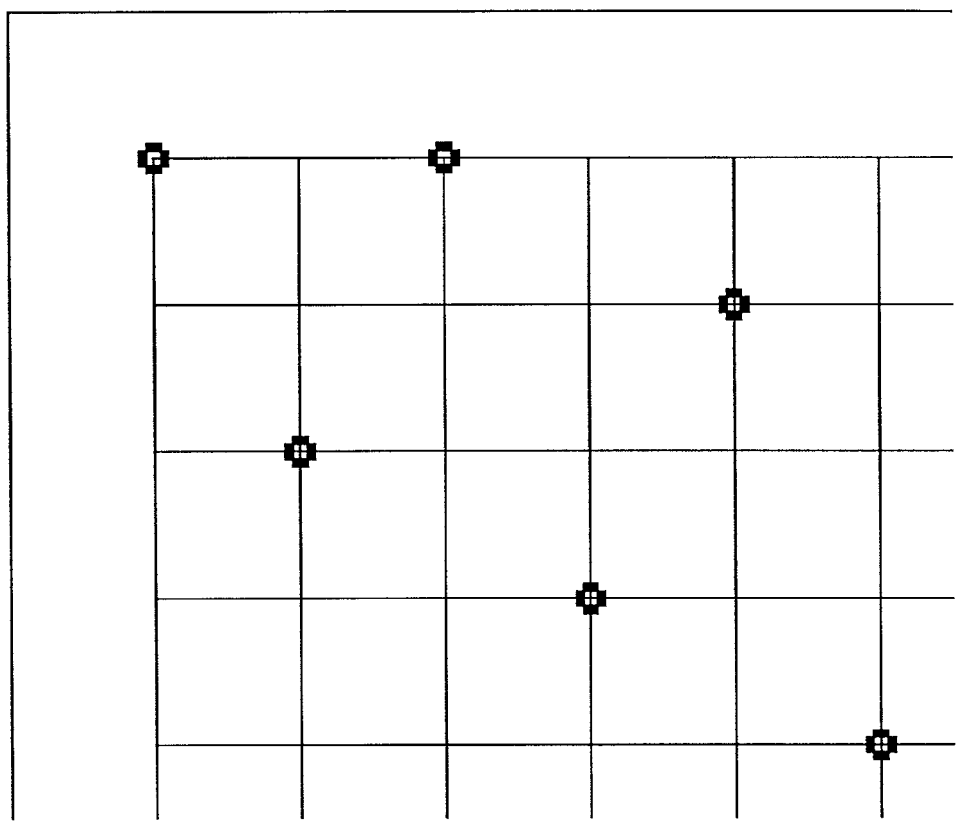
FIG. 52 is an enlarged view of a yellow plane to which the dot pattern is attached.

The value D calculated by the above-described method is input to a dot pattern attachment processing section which attaches a dot pattern onto image information decoded by the expansion processing section. Dot pattern attachment position information is generated by an additional information generation section 508. The additional information generation section converts information to be attached (the machine number of printer main body, date and time of printing, and printing condition) into a dot pattern layout in the information area on the basis of some rule. On the basis of this layout, the dot pattern attachment processing section attaches the dot pattern shown in FIG. 51. FIG. 52 is an enlarged view of the dot pattern. Referring to FIG. 52, a pixel indicated by a black point represents a pixel (to be referred to as an on-dot hereinafter) printed on a printing medium such as paper using ink or toner.

Figure 55A:
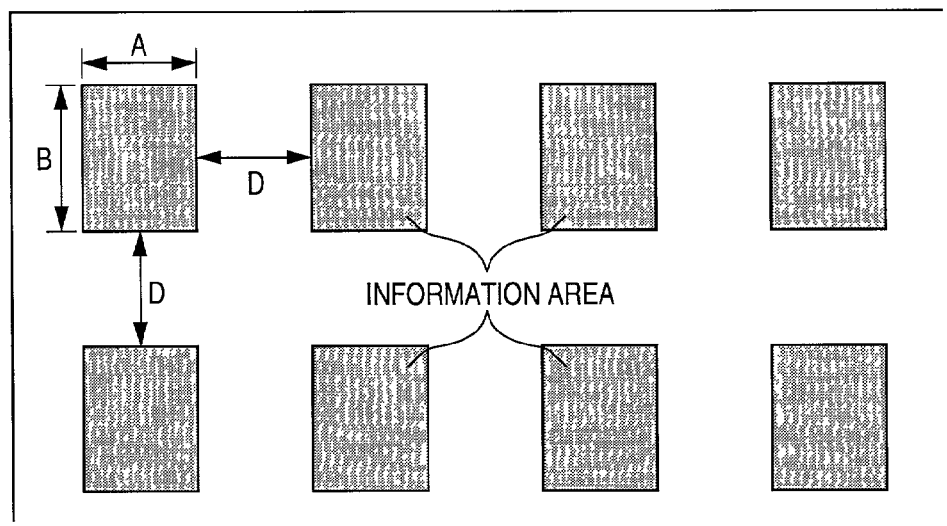
FIGS. 55A and 55B are views showing the layouts of information areas in this embodiment.
Figure 55B:
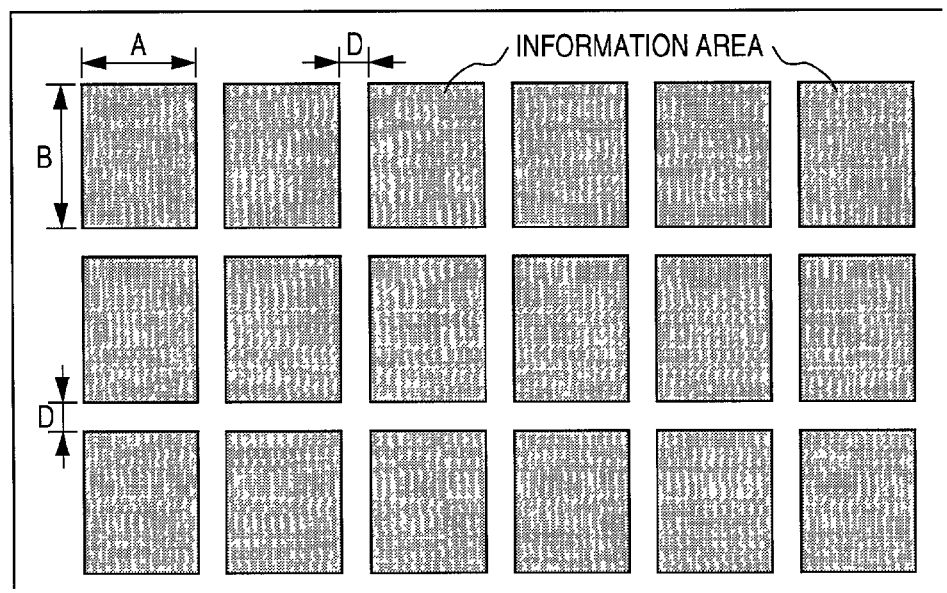

FIGS. 55A and 55B are views showing the layouts of information areas obtained using the method described in this embodiment. As shown in FIGS. 55A and 55B, the information area interval is set to be larger on a simple image (FIG. 55A) than on a complex image (FIG. 55B) using the above method. For this reason, the total amount of dot pattern attached can be suppressed, and the additional information can be superposed with little visual incompatibility.

Figure 56:
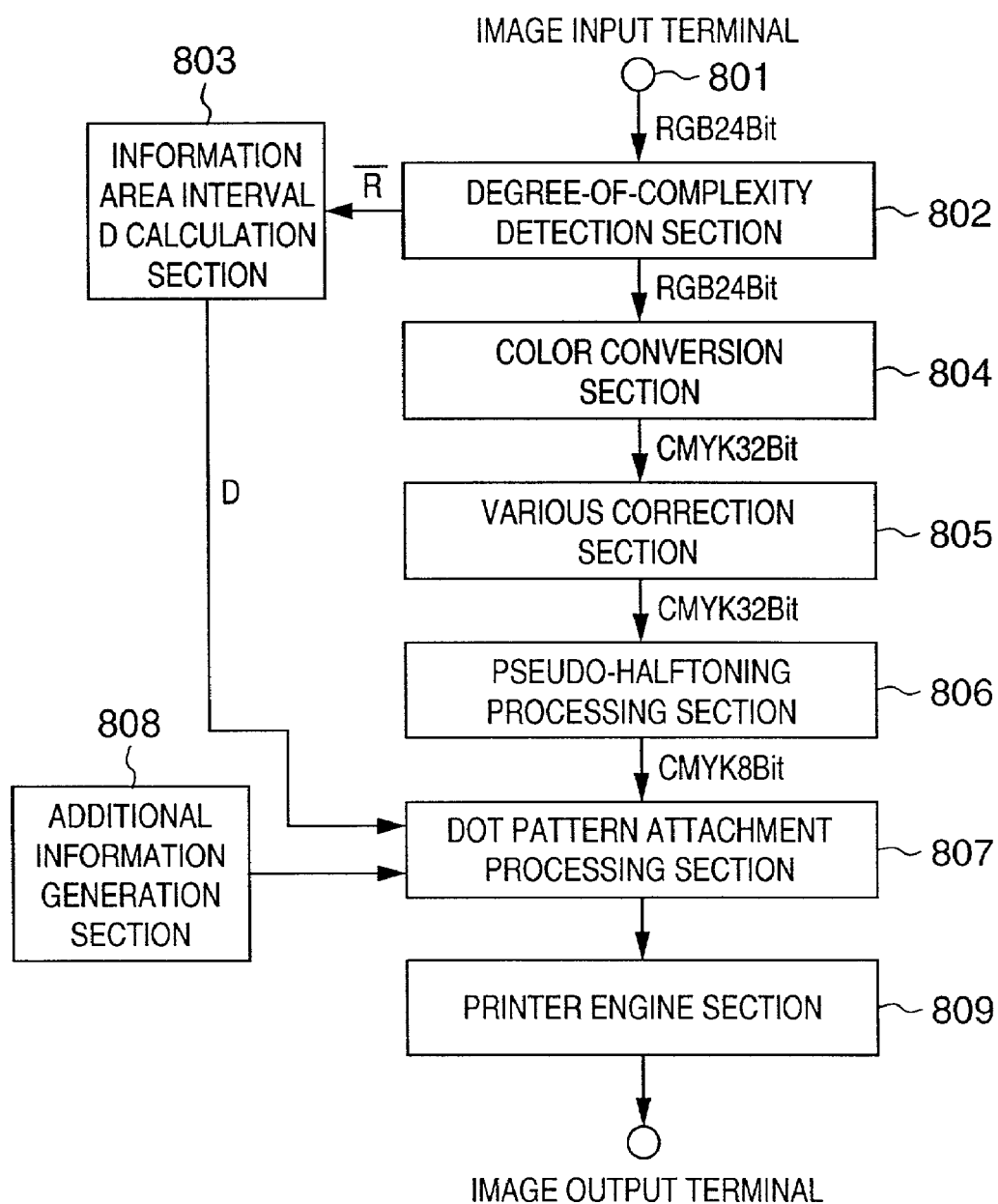
FIG. 56 is a block diagram showing processing in this embodiment.

FIG. 56 is a block diagram showing processing in an embodiment to be described below. Each portion will be described below with reference to FIG. 56.

Image data input from the upper end in FIG. 56 is input to a degree-of-complexity detection section 802, which measures the complexity of the input image.

In this embodiment, as an evaluation amount representing the complexity of an image, the square-sum of high-frequency components obtained by frequency-converting the image is used. To frequency-convert an image, various methods such as Fourier transform, wavelet, and subband are available, and any method can be used within the scope of the present invention. In this embodiment, a description will be made using the most popular discrete cosine transform (to be referred to as DCT hereinafter).

Figure 57:
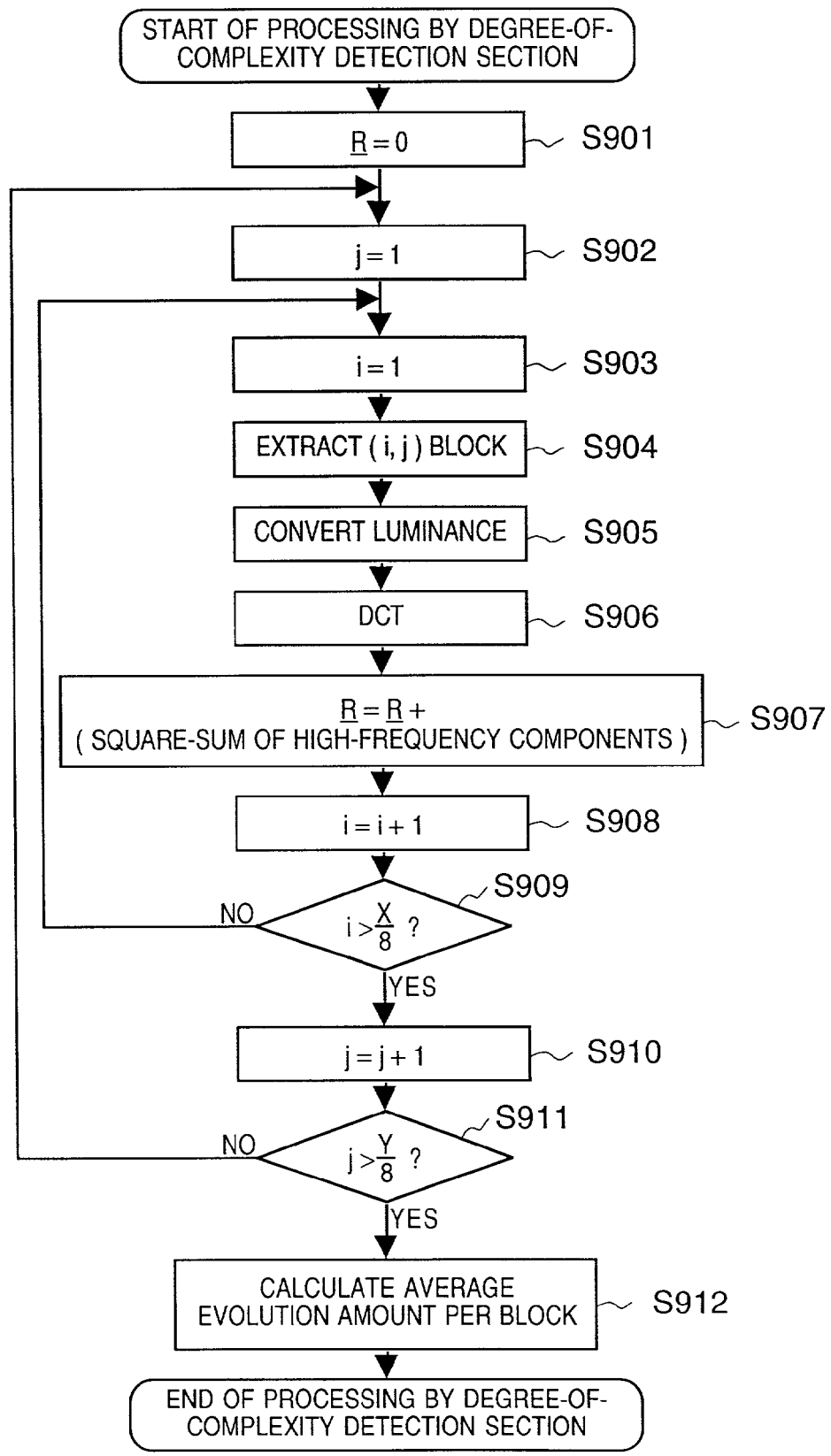
FIG. 57 is a flow chart showing the flow of processing of a degree-of-complexity detection section of this embodiment.

FIG. 57 is a flow chart of processing of the degree-of-complexity detection section. In steps S901 to S903, initial setting of various variables is done. R is an evaluation amount representing the complexity, and i and j are block numbers to be described later.

Figure 58:
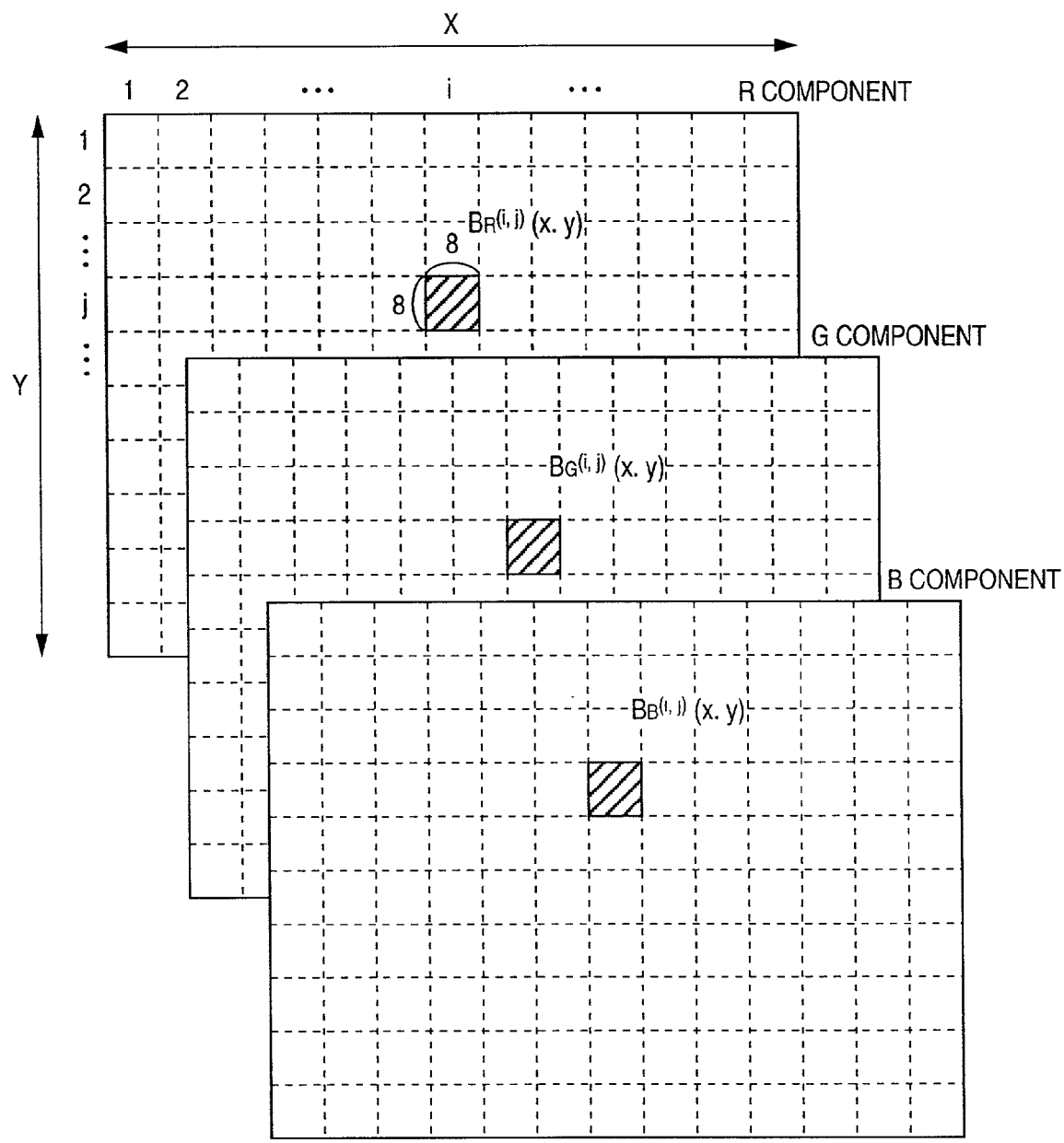
FIG. 58 is a view showing block segmentation in this embodiment.

In this embodiment, an input image is segmented into square blocks each having 8×8 pixels in units of RGB components, and in step S904, sequentially loaded onto a memory incorporated in the computer that executes processing of this embodiment. In this embodiment, the loaded (i,j)th block is expressed by $B_R^{(i,j)}(x,y)$, $B_G^{(i,j)}(x,y)$, and $B_B^{(i,j)}(x,y)$ in units of RGB components. In this case, $0 \leq x \leq 7$ and $0 \leq y \leq 7$ are satisfied. FIG. 58 is a view showing an example of an image (RGB components) segmented into blocks.

Each extracted block is converted into a luminance signal value $B_Y^{(i,j)}(x,y)$ using a method represented by $$B_Y^{(i,j)}(x,y) = 0.299 \cdot B_R^{(i,j)}(x,y) + 0.587 \cdot B_G^{(i,j)}(x,y) + 0.114 \cdot B_B^{(i,j)}(x,y) \qquad (2.1)$$

In S906, DCT is executed for the luminance signal value $B_Y^{(i,j)}(x,y)$ obtained by the above equation. The DCT processing method is widely known, and a detailed description thereof will be omitted.

Figure 59:
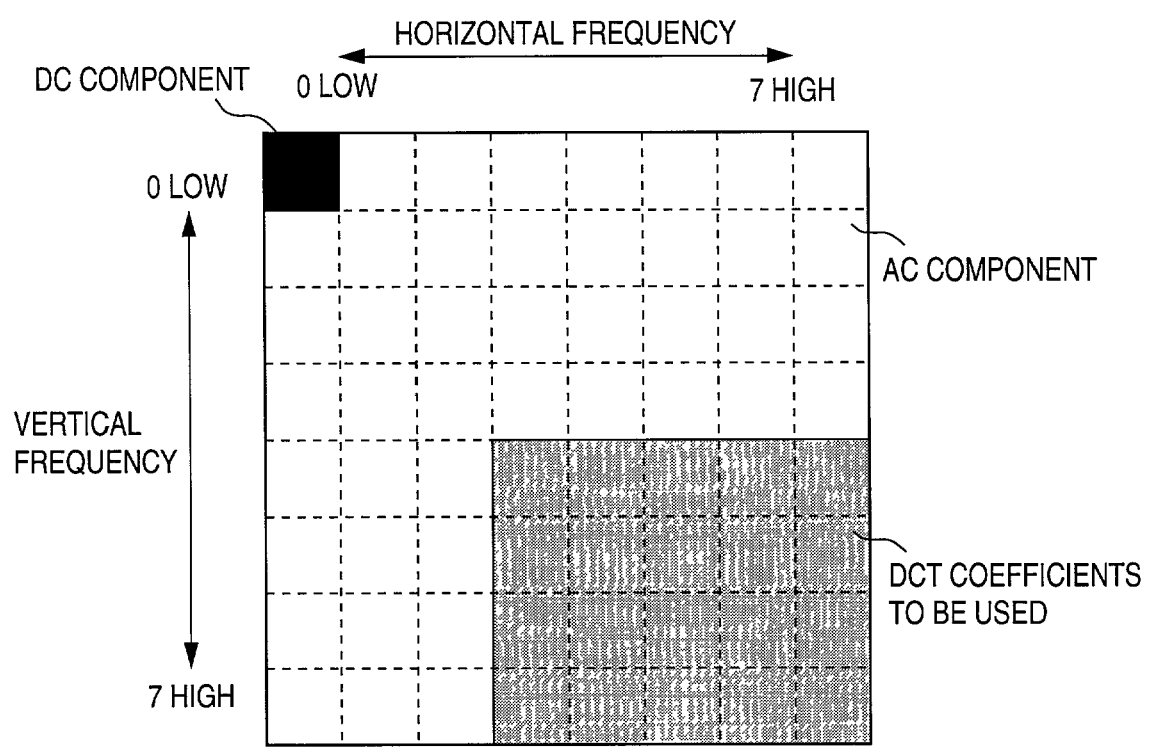
FIG. 59 is a view showing DCT coefficients used in this embodiment.

When DCT is executed for the luminance value of 8×8 pixels, 64 DCT coefficients $F^{(i,j)}(x,y)$ are obtained. FIG. 59 is a view showing the coefficients two-dimensionally arranged in accordance with the frequencies. Referring to FIG. 59, a DC component is present at the upper left corner, and the remaining portion represents AC components. For the AC components, the horizontal frequency becomes high from the left to the right, and the vertical frequency becomes high from the upper side to the lower side.

In this embodiment, 16 hatched high-frequency components in FIG. 59 will be exemplified, and their square-sum is calculated by $$R = R + \sum_{j=4}^{7} \sum_{i=4}^{7} \{F^{(i,j)}(x,y)\}^2 \qquad (2.2)$$

The calculation represented by equation (2.2) is executed for all blocks (S908 to S911).

When the above-described processing is ended for all blocks in the image, an average evaluation amount [R] per block is calculated in step S912 by $$[R] = \frac{R}{(X/8) \cdot (Y/8)} \quad (2.3)$$

Thus, processing by the degree-of-complexity detection section 802 is ended.

The calculated average evaluation amount [R] is input to an information area interval calculation processing section. When the average evaluation amount [R] takes a large value, the image is a complex image including many high-frequency components. When the average evaluation amount [R] takes a value close to 0, the image is a simple image including many low-frequency components. Hence, as described in the above embodiment, the information area interval calculation processing section calculates the information area interval using $$D = \frac{1}{[R]} \cdot C_0 + C_1 \quad (2.4)$$

where $C_0$ and $C_1$ are arbitrary constants defined in each printer system. Equation (2.4) means that the value D is large for an image having a small average evaluation amount [R], i.e., a simple image, and small for an image having a large average evaluation amount [R], i.e., a complex image.

The value D calculated by the above-described method is input to a dot pattern attachment processing section 807. The dot pattern attachment processing section 807 attaches a dot pattern to image information that has undergone processing by a color conversion section 804, various correction section 805, and pseudo-halftoning processing section 806. Dot pattern attachment position information is generated by an additional information generation section 808. The additional information generation section converts information to be attached (the machine number of printer main body, date and time of printing, and printing condition) into a dot pattern layout in the information area on the basis of some rule. On the basis of this layout, the dot pattern attachment processing section attaches the dot pattern.

With the processing described in this embodiment, the information area layout shown in FIG. 55 can be implemented, as in the above embodiment. Hence, the additional information can be superposed with little visual incompatibility.

In the above embodiment, as the evaluation amount representing the degree of complexity of an image, the square-sum of high-frequency components obtained upon frequency-converting the image is used.

In this embodiment, as in the above-described embodiment, the absolute sum of 16 hatched high-frequency components shown in FIGS. 85A to 85D is used as an evaluation amount representing the degree of complexity of the image. That is, the absolute sum [R] of the high-frequency components is given by $$R = R + \sum_{j=4}^{7} \sum_{i=4}^{7} |F^{(i,j)}(x, y)| \quad (3.1)$$

As in the above embodiment, when processing based on the above equation is ended for all blocks in the image, the average value per block is obtained by equation (2.3). The remaining processing is the same as in the above embodiment.

When the processing described in this embodiment is executed, almost the same processing as in the above embodiment can be done with a small calculation amount.

As has been described above, according to the present invention, in processing of multiplexing some additional information with image information, the degree of complexity of the target image is detected, and the information area is controlled in accordance with the result, thereby controlling the total amount of dot pattern to be attached. Hence, additional information can be multiplexed with little visual incompatibility.

Figure 60:
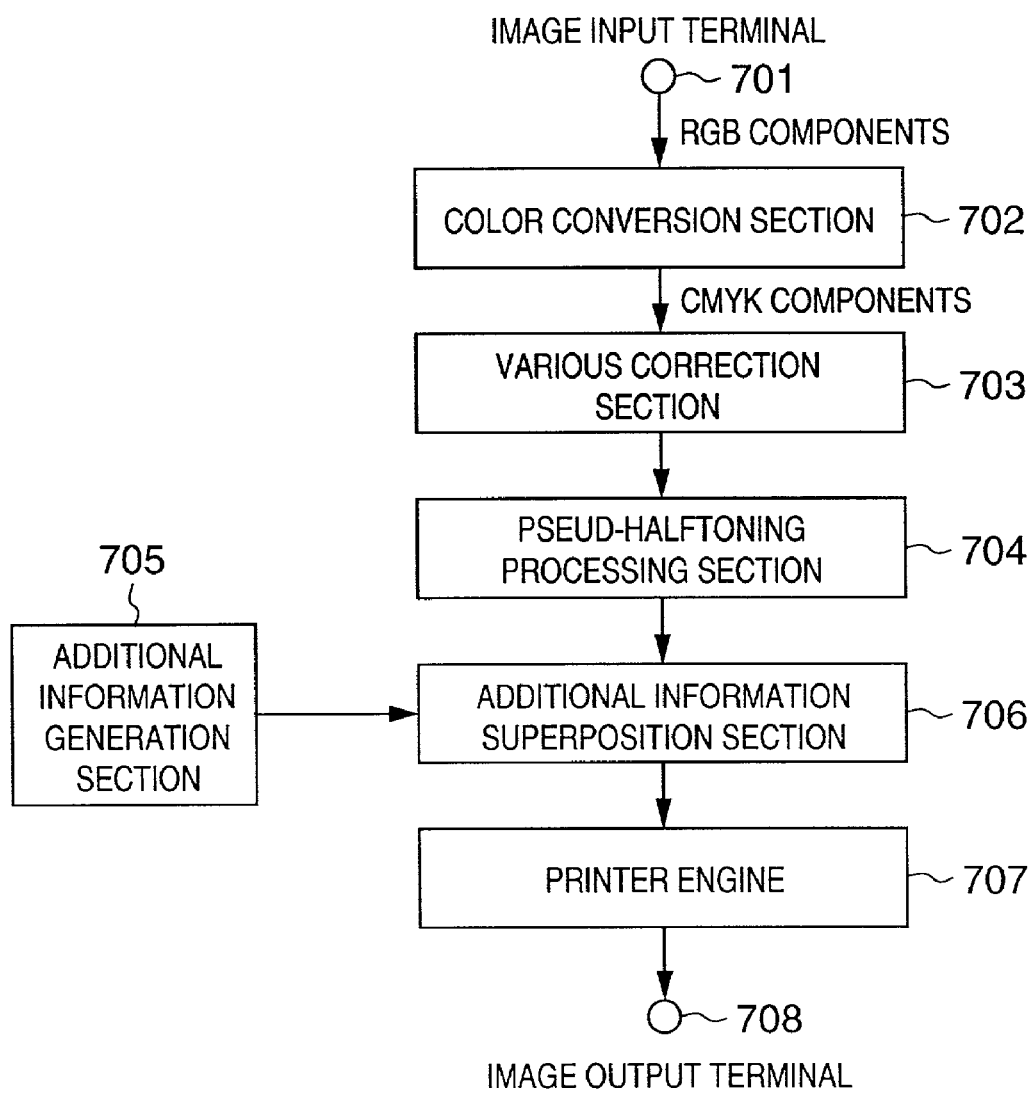
FIG. 60 is a block diagram showing the additional information superposition method of an image processing apparatus according to still another embodiment.

FIG. 60 is a block diagram showing the additional information superposition method of an image processing apparatus according to still another embodiment. The outline of operation will be described first with reference to FIG. 60, and then, each section will be described in detail.

Referring to FIG. 60, an input terminal 701 inputs multilevel RGB image signals. The input signals are converted into CMYK signals by a color conversion section 702, subjected to various correction processing operations by a various correction processing section 703, and input to a pseudo-halftoning processing section 704. The pseudo-halftoning processing section 704 converts the input image signal into quantization levels smaller in number than the input gray levels by pseudo-halftoning processing and two-dimensionally expresses halftone using quantization values of a plurality of pixels. In this embodiment, for pseudo-halftoning processing, any one of existing systematic dithering and error diffusion can be used. Any scheme can be used assuming that the quantization values are binary values "0" and "1". When the quantization value is "1", a dot (ink or toner) is printed on a printing medium such as paper. CMYK components after the above-described pseudo-halftoning processing will be represented by $I_c(x,y)$, $I_m(x,y)$, $I_y(x,y)$, and $I_k(x,y)$, respectively.

Figure 61:
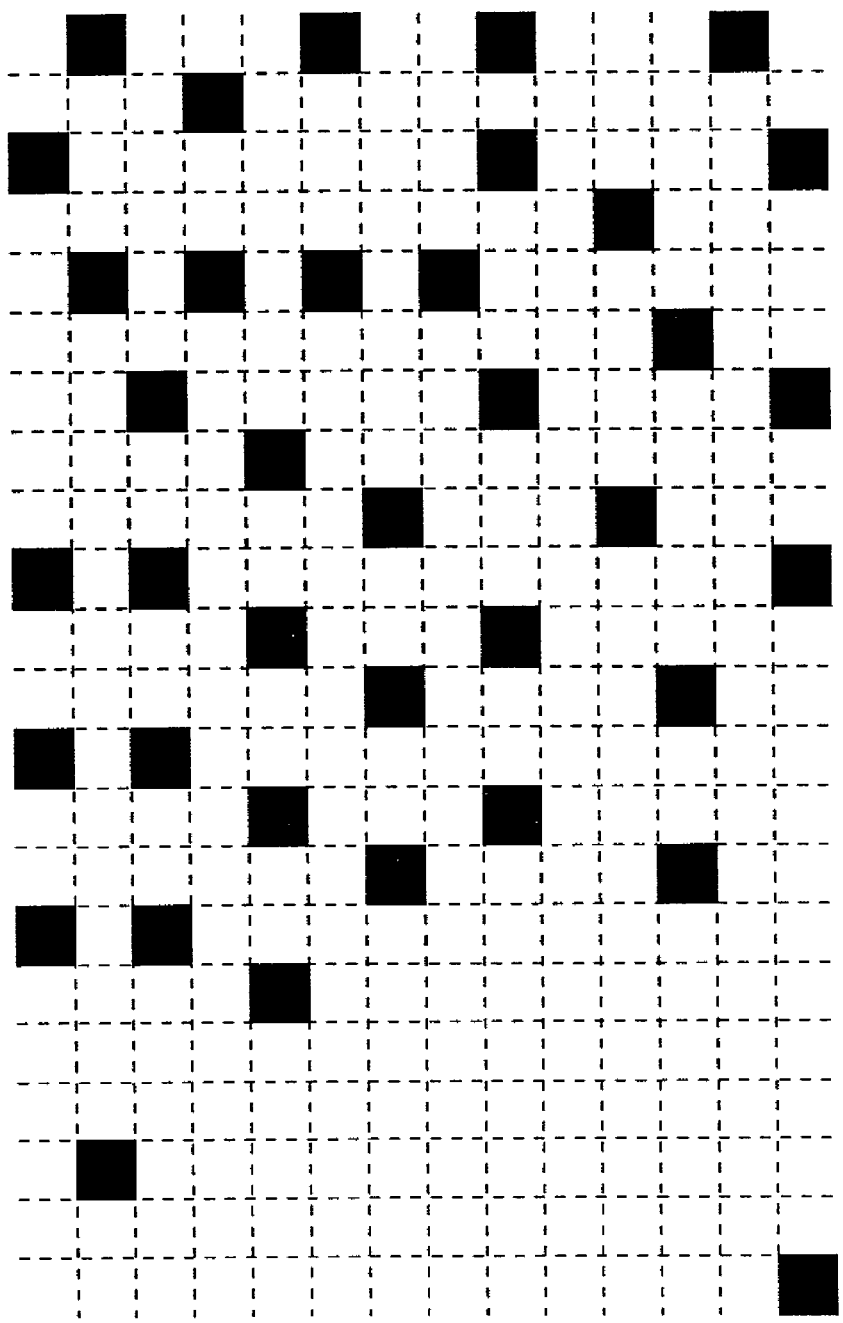
FIG. 61 is a view showing an image that has undergone pseudo-halftoning processing in this embodiment.

FIG. 61 is a view showing an image that has undergone pseudo-halftoning processing in this embodiment. The example in FIG. 61 shows a Y (yellow) component $I_y(x,y)$.

Additional information generated by an additional information generation section 705 shown in FIG. 60 is superposed on the Y component $I_y(x,y)$ binarized by the pseudo-halftoning processing section 704, using a predetermined dot pattern by an additional information superposition section 706. This processing uses the feature that the Y component is hard to identify with a human eye as compared to the remaining components. As information to be attached by the additional information superposition section 706, various kinds of information are available, including the output device manufacturer name, model name, machine number, and output condition in outputting the image to paper. These signals are encrypted, as needed, and superposed.

After the above processing, the CMYK components are output to a printer engine 707. Consequently, an output image having various kinds of information superposed can be obtained.

The outline of operation of the image processing apparatus according to this embodiment has been described above. Each of the above-described sections will be described below in detail. First, the additional information generation section 705 will be described.

Figure 62:
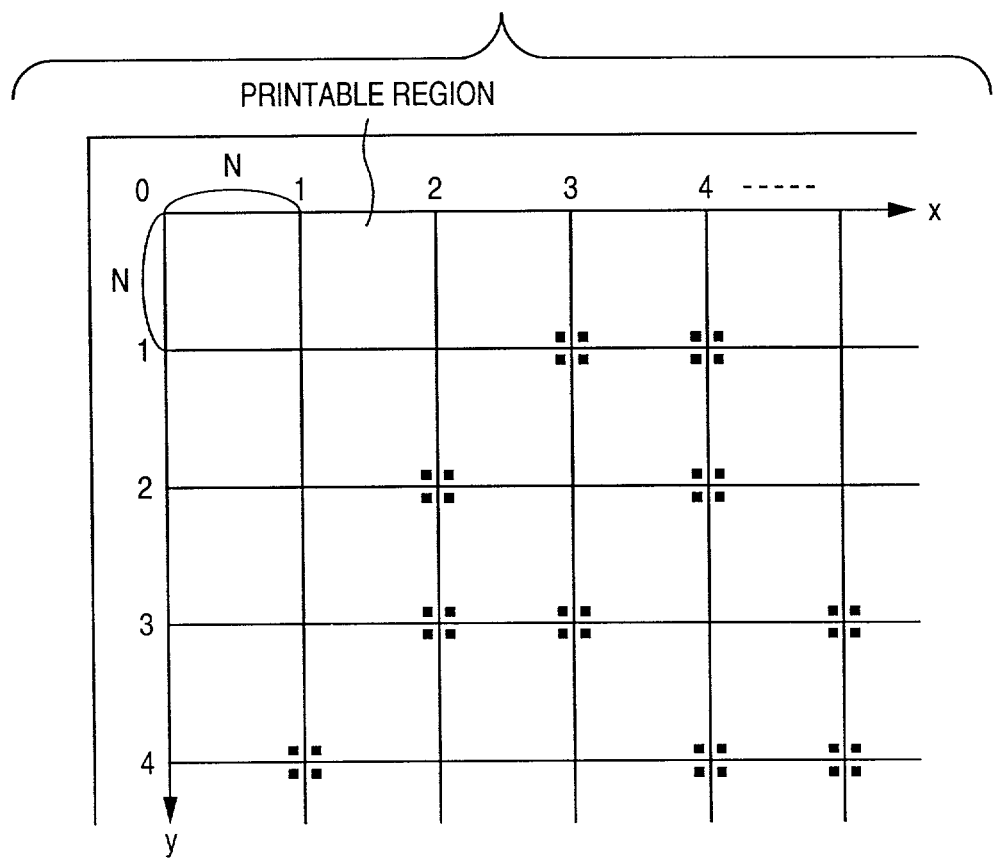
FIG. 62 is a view showing generated additional information position.

As a general method of superposing additional information on an image, matrix points present at an N-pixel interval in a printable region are defined, as shown in FIG. 62, and additional information is expressed depending on whether a dot pattern stored in a storage device in a computer or printer main body for executing predetermined processing is present at each matrix point.

Figure 63A:
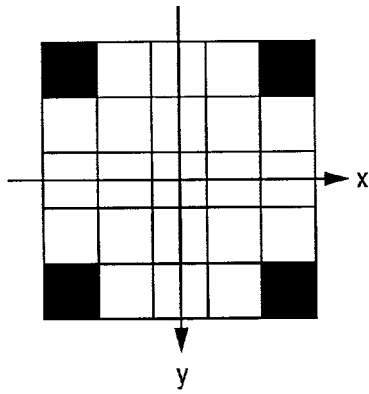
FIGS. 63A and 63B are views showing dot patterns in this embodiment.
Figure 63B:
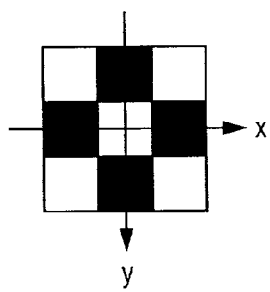

FIGS. 63A and 63B are views showing dot patterns in this embodiment. Referring to FIGS. 63A and 63B, a point where a dot (ink to toner) is printed on paper is indicated by a black point. In this embodiment, two dot patterns are prepared for high- and low-density regions, as shown in FIGS. 63A and 63B, and selectively used in accordance with the density around the attachment position. In addition, since the origin of the coordinate axes is set at the center of each of the dot patterns shown in FIGS. 63A and 63B, data such as a pixel count C of the dot pattern, and pixel positions ($P_{lx}^c, P_{ly}^c$) and ($P_{hx}^c, P_{hy}^c$) as shown in the tables shown in FIGS. 63A and 63B are stored in advance in the storage device present in the computer or printer main body for performing processing.

When the number of dots per unit area in the dot pattern shown in FIG. 63A is compared with that in the dot pattern shown in FIG. 63B, the number of dots is larger in the dot pattern shown in FIG. 63B. In other words, the basic unit formed from a plurality of dots (5×5 pixels in FIG. 63A, and 3×3 pixels in FIG. 63B) is smaller in FIG. 63B. That is, the density of the dot pattern forming the basic unit is higher in FIG. 63B.

The additional information generation section 705 obtains a position where the above-described dot pattern is to be attached, using, e.g., a means for converting information (e.g., the machine number of printer) to be superposed on the basis of some rule. Various rules can be used for conversion to position information. For example, the machine number or model name of the printer main body is expressed by a binary sequence, and bits "1" and "0" are expressed by the presence and absence of dot pattern, respectively. In this embodiment, any method can be used. The pieces of obtained attachment position information are expressed by the matrix point interval N and the coordinates ($L_x^z, L_y^z$) of Z matrix points where the pieces of information are to be attached, as shown in the table of FIG. 62, and input to the additional information superposition section 706. The additional information generation section 705 has been described above.

Figure 64:
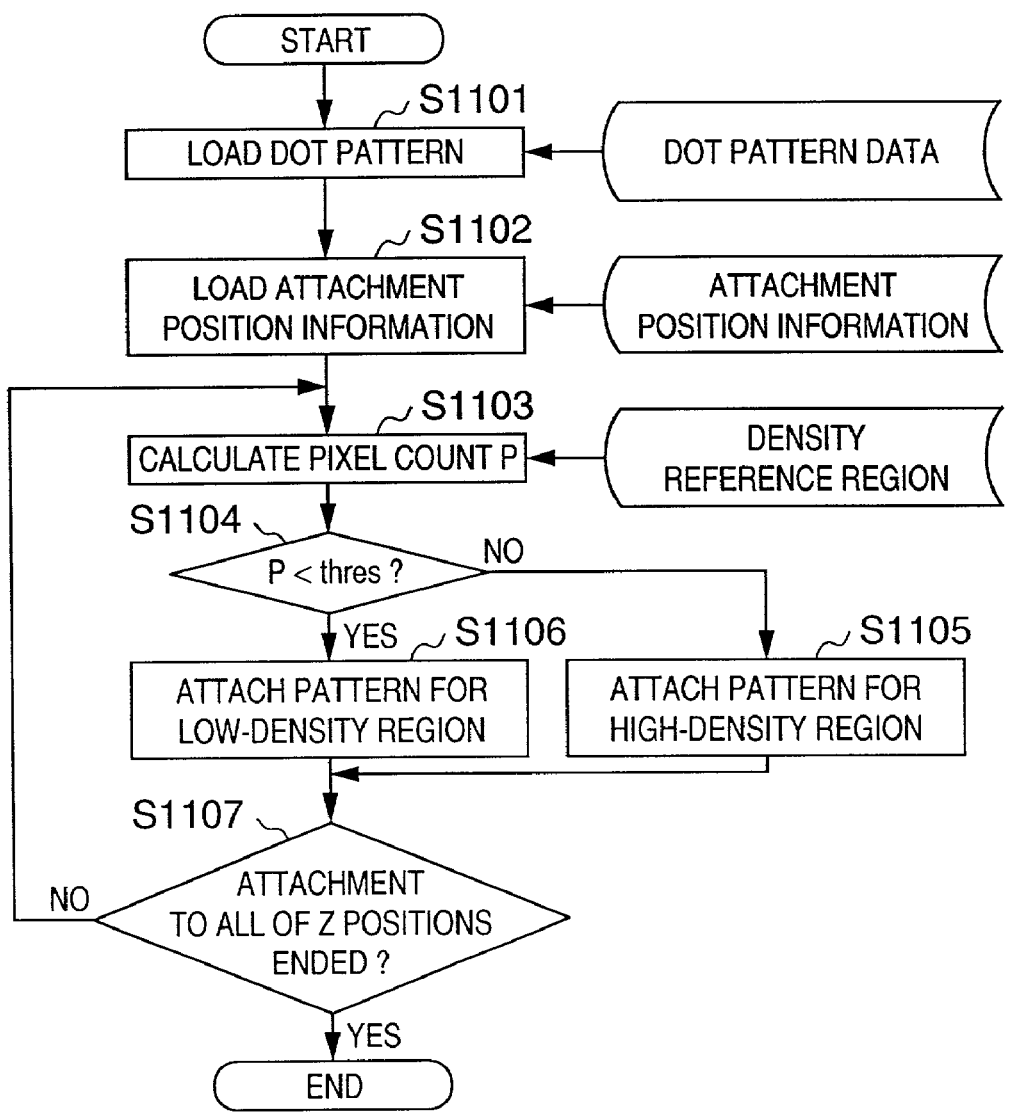
FIG. 64 is a flow chart showing additional information superposition processing in this embodiment.

Additional information attachment processing by the additional information superposition section 706 will be described next. FIG. 64 is a flow chart showing additional information superposition processing in this embodiment. First, in step S1101, the two dot pattern data shown in the tables in FIGS. 63A and 63B are loaded. In step S1102, each attachment position information generated by the additional information generation section 705 is loaded.

Figure 65:
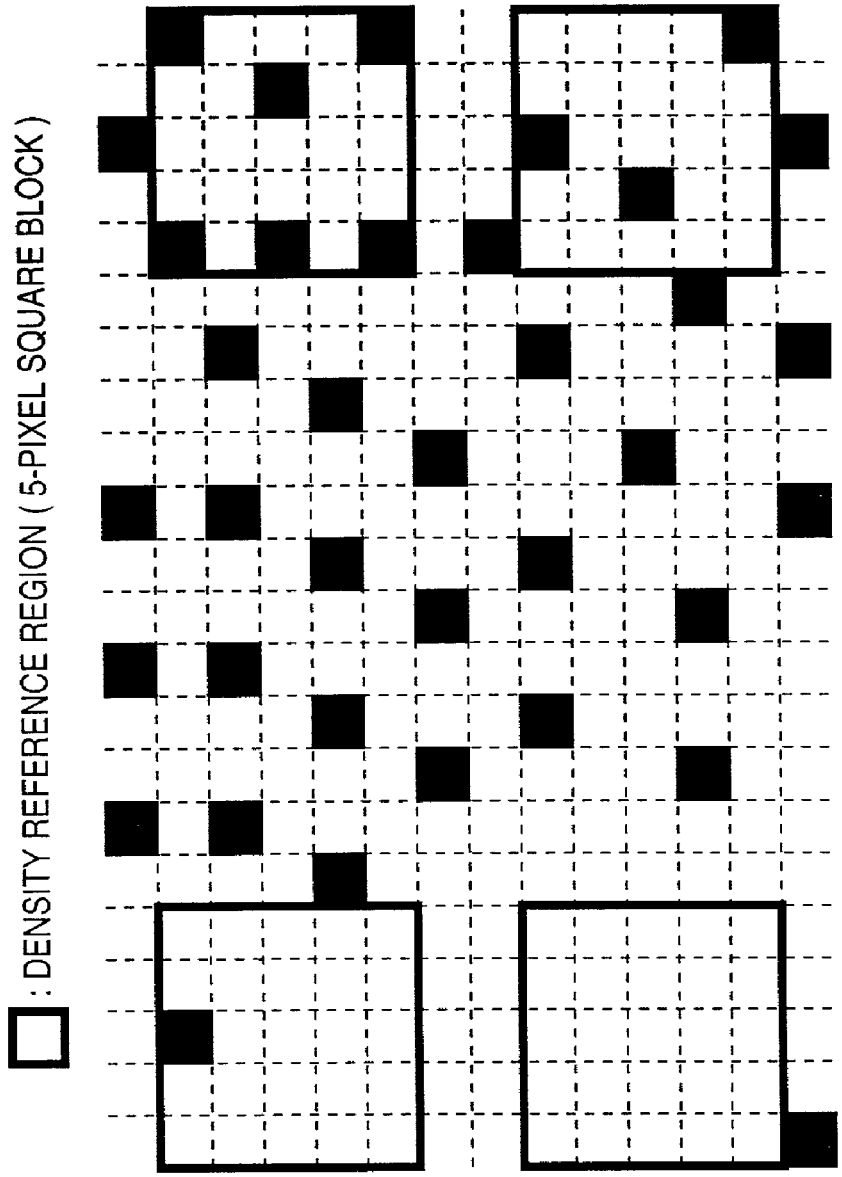
FIG. 65 is a view showing a density reference region in this embodiment.

From step S1103, the dot patterns are attached to $I_y(x,y)$ using these pieces of information. First, in step S1103, to grasp the density state around an attachment position, an S-pixel square block centered on the attachment position ($L_x^z, L_y^z$) is defined, and a pixel count P in that region is calculated. The above-described region will be referred to as a "density reference region" hereinafter. FIG. 65 is a view showing a density reference region in this embodiment. Referring to FIG. 65, S=5. The block size S characterizing the density reference region is predetermined and held in the storage device in the computer or printer main body for executing processing in this embodiment.

In step S1104, it is determined whether the dot pattern is to be switched, using the pixel count P in the density reference region, which is calculated in step S1103. More specifically, a threshold value thres predetermined and held in the storage device in the computer or printer main body for executing processing in this embodiment is used and when the pixel count P is smaller than the threshold value thres, the low-density region dot pattern shown in FIG. 63A is attached. If the pixel count P is equal to or larger than the threshold value thres, the high-density region dot pattern shown in FIG. 63B is attached. The above operation can be expressed by if (P<thres)

$$I_y(L_x^z+P_{lx}^c, L_y^z+P_{ly}^c)=1, \ 1 \leq c \leq C \quad (1.1)$$

else $$I_y(L_x^z+P_{hx}^c, L_y^z+P_{hy}^c)=1, \ 1 \leq c \leq C \quad (1.2)$$

FIGS. 67A and 67B are views showing images before and after the dot pattern is attached using processing in this embodiment. Referring to FIGS. 67A and 67B, the threshold value thres=4, as shown in FIG. 66. The threshold value thres may be either a fixed value for each system or freely set by the user in units of images. As is apparent from FIG. 67B, a high-density region dot pattern is attached to regions A and B having high density (large number of pixels).

With the above-described processing of this embodiment, in processing of superposing a dot pattern on an image, the dot pattern can be switched in accordance with the density state around the attachment position by a relatively simple means. Hence, additional information can be superposed with little visual incompatibility, and the dot pattern detection operation in reading additional information can be facilitated.

Still another embodiment of the present invention will be described next in detail with reference to the accompanying drawings.

In the above-described embodiment, as the output result from the pseudo-halftoning processing section 704 shown in FIG. 60, binary values (0 and 1) are assumed as quantization values. In this embodiment, ternary values (0, 1, and 2) are assumed as quantization values.

Figure 68:
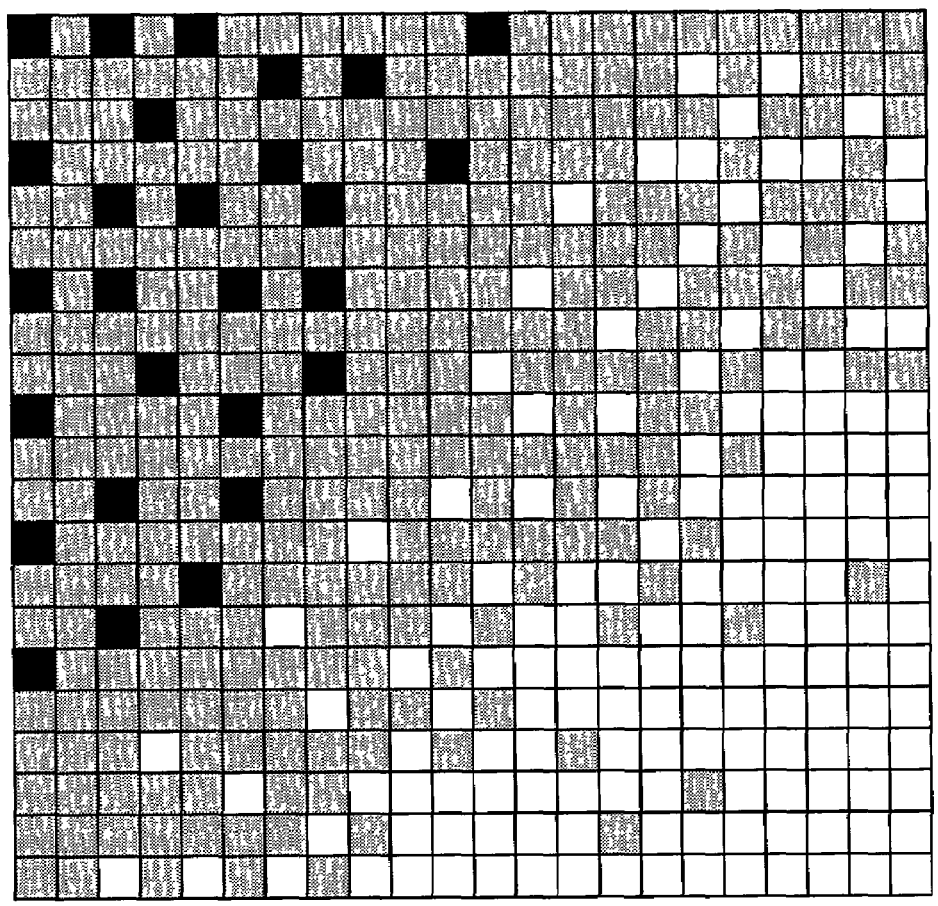
FIG. 68 is a view showing an image that has undergone pseudo-halftoning processing in still another embodiment.

FIG. 68 is a view showing an image that has undergone pseudo-halftoning processing in this embodiment. Referring to FIG. 68, pixels indicated by density level 1 and density level 2 represent positions where dots are printed on paper using ink or toner. A pixel indicated by density level 0 represents a position where no dot is printed. A pixel indicated by density level 2 is printed at a density twice that of the pixel indicated by density level 1. In this embodiment, the same processing as described in the above embodiment is executed for a pseudo-halftone image quantized to multiple levels (binary or more levels).

Figure 69:
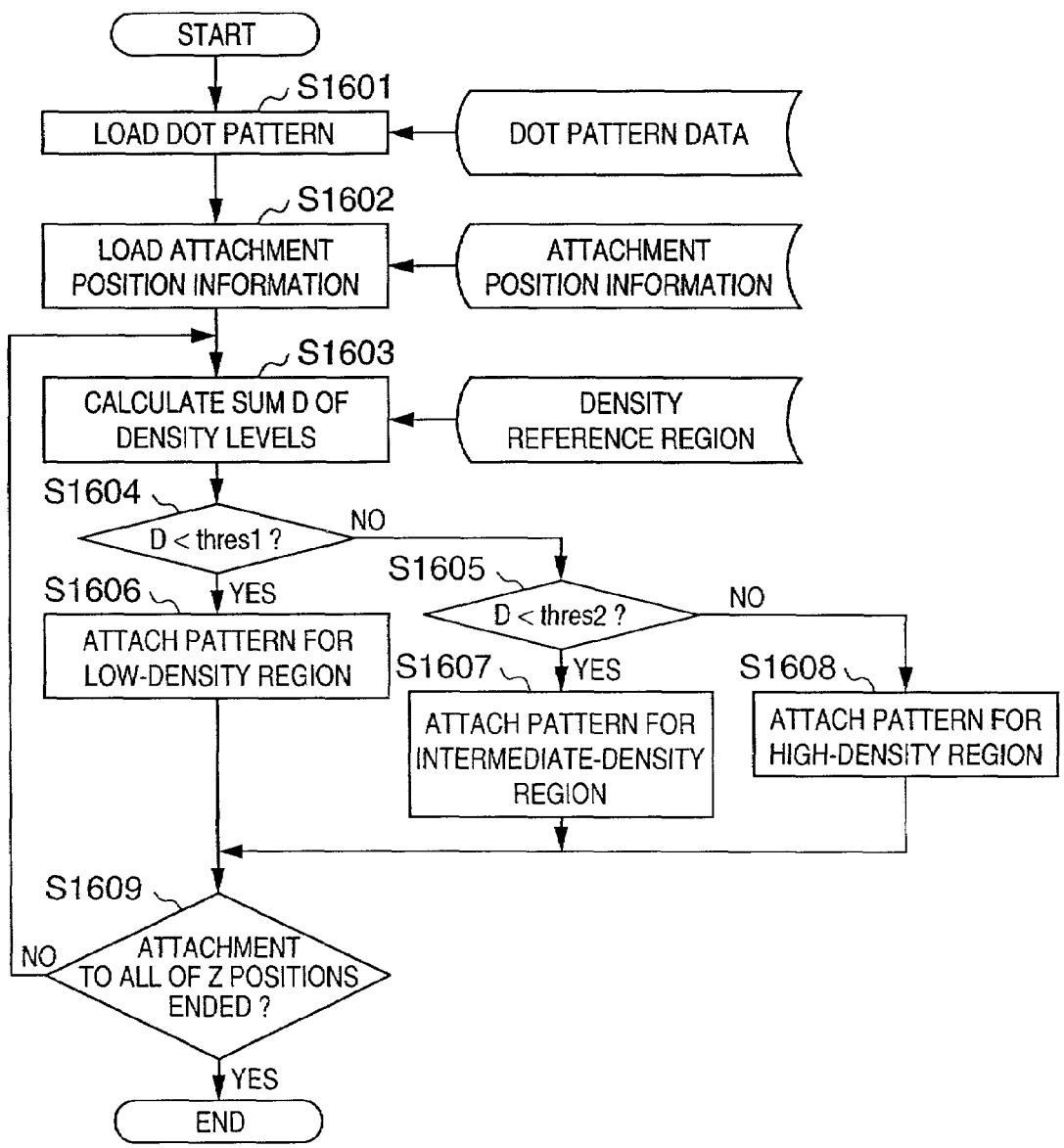
FIG. 69 is a flow chart showing additional information superposition processing in this embodiment.

FIG. 69 is a flow chart showing additional information superposition processing in this embodiment. In step S1601, as in the above-described embodiment, a dot pattern predetermined and stored in the storage device section of a computer or printer main body for executing processing of this embodiment is loaded.

Figure 70A:
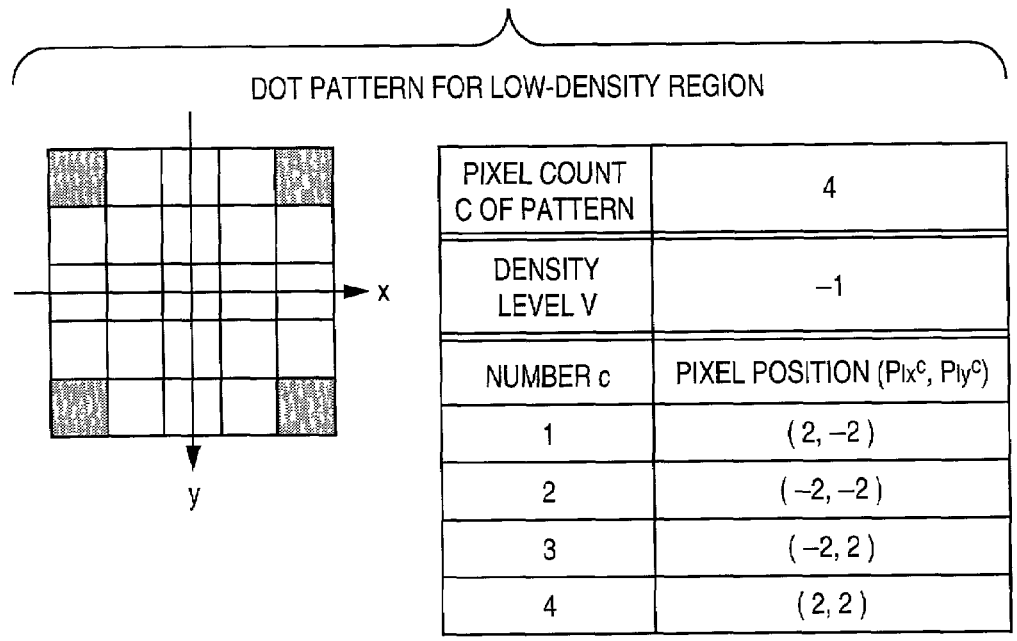
FIGS. 70A and 70B are views showing dot patterns used in this embodiment.
Figure 70B:
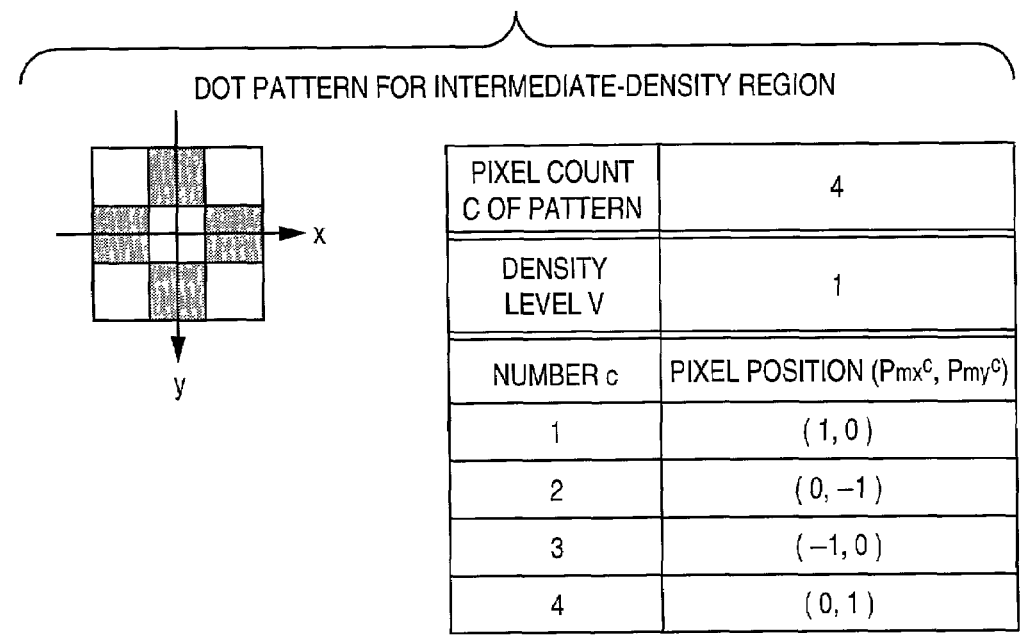
Figure 71:
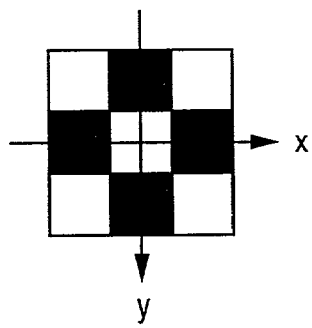
FIG. 71 is a view showing a dot pattern used in this embodiment.

FIGS. 70A and 70B and FIG. 71 are views showing dot patterns used in this embodiment. In this embodiment, the three dot patterns are used, which are dot patterns for low-, intermediate-, and high-density regions, respectively.

The two dot patterns shown in FIGS. 70A and 70B are formed from pixels of density level 1. The high-density region dot pattern shown in FIG. 71 is formed from pixels of density level 2. These dot patterns are described by data as shown in the tables of FIGS. 70A, 70B, and 71 and stored in the storage device. This embodiment is different from the above-described embodiment in that the density level for dot pattern attachment is described. Next, in step S1602, each position information ($L_x^z, L_y^z$) for dot pattern attachment is loaded. This processing is the same as described in the above embodiment.

Figure 72:
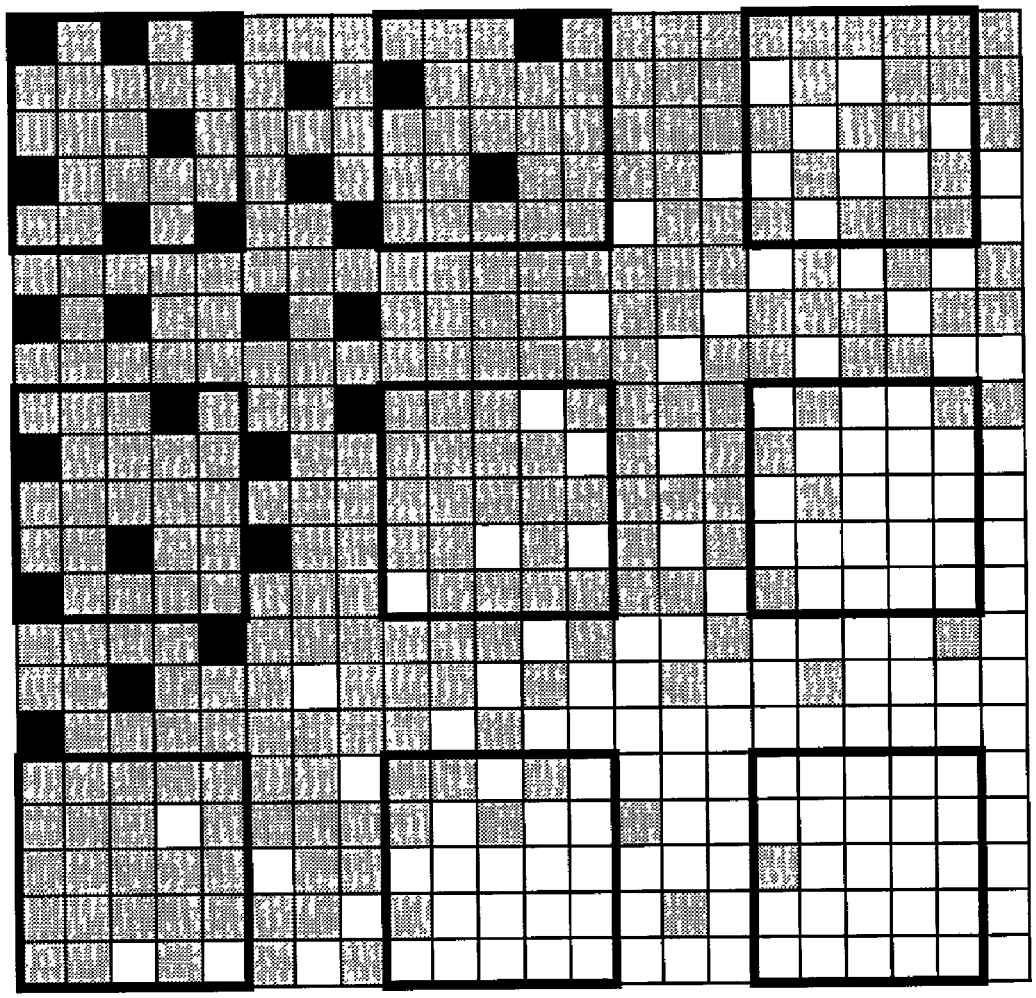
FIG. 72 is a view showing a density reference region in this embodiment.

From step S1603, the dot patterns are attached to $I_y(x,y)$ using these pieces of information. First, in step S1603, to grasp the density state around an attachment position, an S-pixel square block centered on the attachment position ($L_x^z, L_y^z$) is defined as a density reference region, and a sum D of the densities of pixels in that region is calculated, as in the above embodiment. FIG. 72 is a view showing the density reference region of this embodiment. Referring to FIG. 72, S=5, as in the above-described embodiment.

In steps S1604 and S1605, it is determined whether the dot pattern is to be switched, using the sum D of densities in the density reference region, which is calculated in step S1603. More specifically, two predetermined threshold values thres1 and thres2 are used, and when the sum D of densities is smaller than the threshold value thres1, the low-density region dot pattern shown in FIG. 70A is used. If the sum D is equal to or larger than the threshold value thres1 and smaller than the threshold value thres2, the intermediate-density region dot pattern shown in FIG. 70B is used. If the sum D is equal to or larger than the threshold value thres2, the high-density region dot pattern shown in FIG. 71 is used. The above operation can be expressed by if (D<thres1)

$$I_y(L_x^z+P_{lx}^c, L_y^z+P_{ly}^c)=1, 1 \leq c \leq C \qquad (2.1)$$

else if (D<thres2)

$$I_y(L_x^z+P_{mx}^c, L_y^z+P_{my}^c)=1, 1 \leq c \leq C \qquad (2.2)$$

else $$I_y(L_x^z+P_{hx}^c, L_y^z+P_{hy}^c)=1, 1 \leq c \leq C \qquad (2.3)$$

Figure 73:
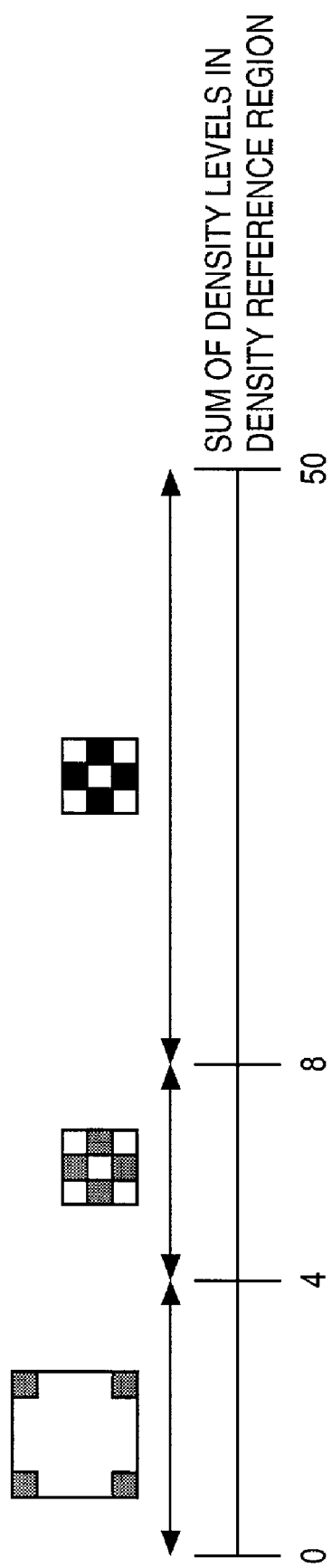
FIG. 73 is a view showing a density threshold value and dot pattern to be used in this embodiment.

FIGS. 74A and 74B are views showing images before and after the dot pattern is attached using processing in this embodiment. Referring to FIGS. 74A and 74B, the two threshold values are set as thres1=4 and thres2=8, as shown in FIG. 73. These threshold values may be either fixed values for each system or freely set by the user in units of images.

With the above-described processing of this embodiment, in processing of superposing a dot pattern on an image, the dot pattern can be switched in accordance with the density state around the attachment position by a relatively simple means. Hence, additional information can be superposed with little visual incompatibility, and the dot pattern detection operation in reading additional information can be facilitated.

In this embodiment, only three dot patterns have been prepared and described for the descriptive convenience. However, the present invention is not limited to this. Even when the number of types of dot patterns increases to four or more, the same processing as described above can be executed.

As has been described above, according to the present invention, additional information with little visual incompatibility can be superposed on input image information and output, and the error rate of dot pattern detection can be reduced in reading the additional information.

In addition, when dot patterns having different densities are selectively attached to image information in accordance with the density of the image information, the error rate of dot pattern detection can be reduced in reading the additional information.

An embodiment of the present invention will be described below in detail with reference to the accompanying drawings. The following description will be made about an image processing apparatus such as an inkjet printer, thermal transfer printer, or laser printer for expressing image information using pseudo-halftoning processing.

The image processing apparatus according to the embodiment to be described below is efficiently mainly incorporated as printer driver software in a computer for generating image information to be output to a printer engine. However, it is also effective to incorporate the image processing apparatus as hardware and software in a copying machine, facsimile apparatus, or printer main body.

Figure 75:
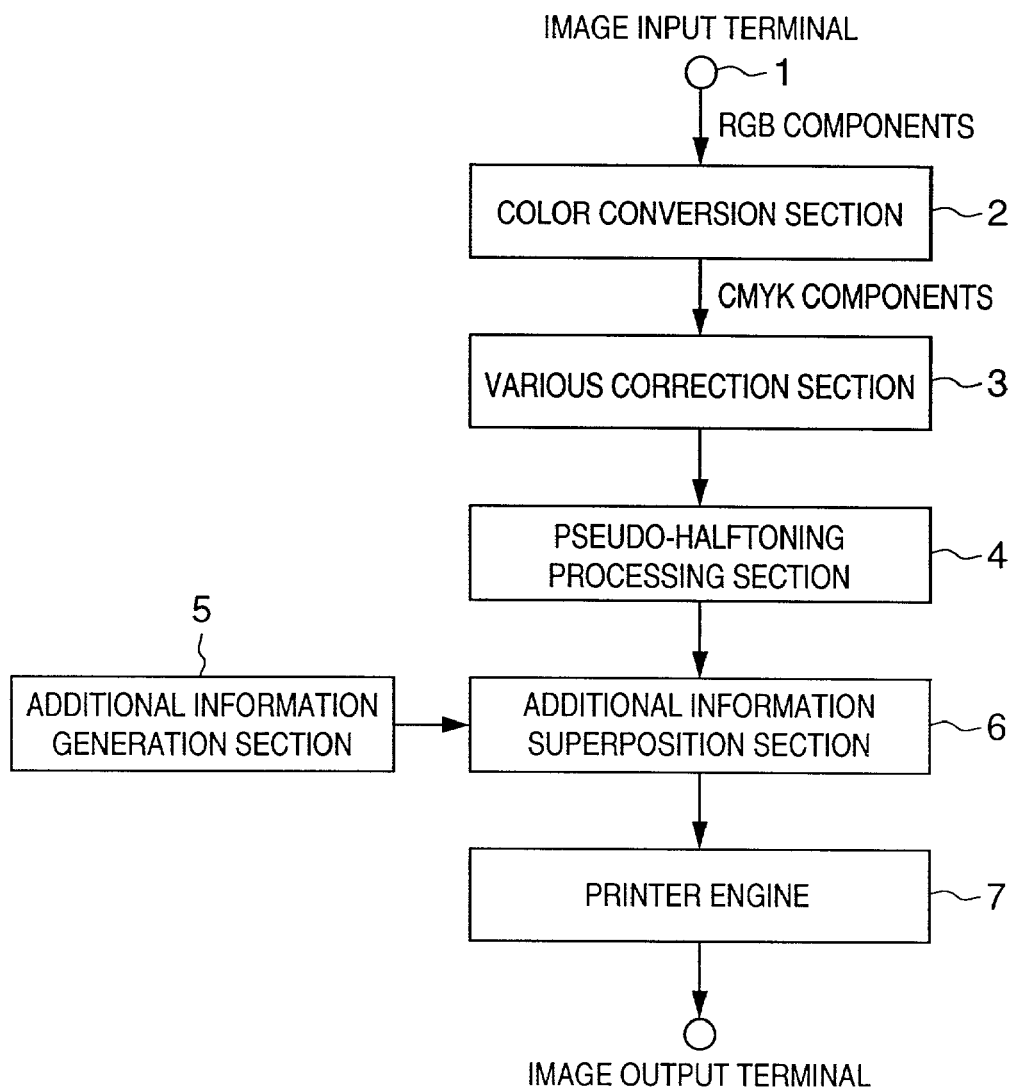
FIG. 75 is a block diagram showing the arrangement of an image processing apparatus according to a preferred embodiment of the present invention.

FIG. 75 is a block diagram showing the arrangement of an embodiment of the present invention. The outline of this embodiment will be described first with reference to FIG. 75, and then, each section will be described in detail.

Referring to FIG. 75, an input terminal 1 inputs multilevel RGB image signals. These signals are converted into CMYK signals by a color conversion section 2, subjected to various correction processing operations by a various correction processing section 3, and input to a pseudo-halftoning processing section 4. The pseudo-halftoning processing section 4 converts the input image signal into quantization levels smaller in number than the input gray levels by pseudo-halftoning processing and two-dimensionally expresses halftone using quantization values of a plurality of pixels.

In this embodiment, for pseudo-halftoning processing, any one of existing systematic dithering and error diffusion can be used. Any scheme can be used assuming that the quantization values are binary values "0" and "1". When the quantization value is "1", a dot (ink or toner) is printed on a printing medium such as paper.

CMYK components after the above-described pseudo-halftoning processing will be represented by $I_c(x,y)$, $I_m(x,y)$, $I_y(x,y)$, and $I_k(x,y)$, respectively.

FIGS. 76A to 76D are views showing CMYK components after pseudo-halftoning processing of this embodiment. FIG. 76A shows the C (cyan) component after pseudo-halftoning processing, FIG. 76B shows the M (magenta) component after pseudo-halftoning processing, FIG. 76C shows the K (black) component after pseudo-halftoning processing, and FIG. 76D shows the Y (yellow) component after pseudo-halftoning processing. Referring to FIGS. 76A to 76D, the gray regions are 3-pixel square regions to which a dot pattern is to be attached.

Additional information generated by an additional information generation section 5 shown in FIG. 75 is superposed on the Y (yellow) component $I_y(x,y)$ binarized by the pseudo-halftoning processing section 4, using a predetermined dot pattern by an additional information superposition section 6.

This processing uses the feature that the Y component is hard to identify with a human eye as compared to the remaining components. As information to be attached by the additional information superposition section 6, various kinds of information are available, including the output device manufacturer name, model name, machine number, and output condition in outputting the image to paper. These signals are encrypted, as needed, and superposed.

After the above processing, the CMYK components are output to a printer engine 7. Consequently, an output image having various kinds of information superposed can be obtained. The outline of operation of this embodiment has been described above.

Figure 77:
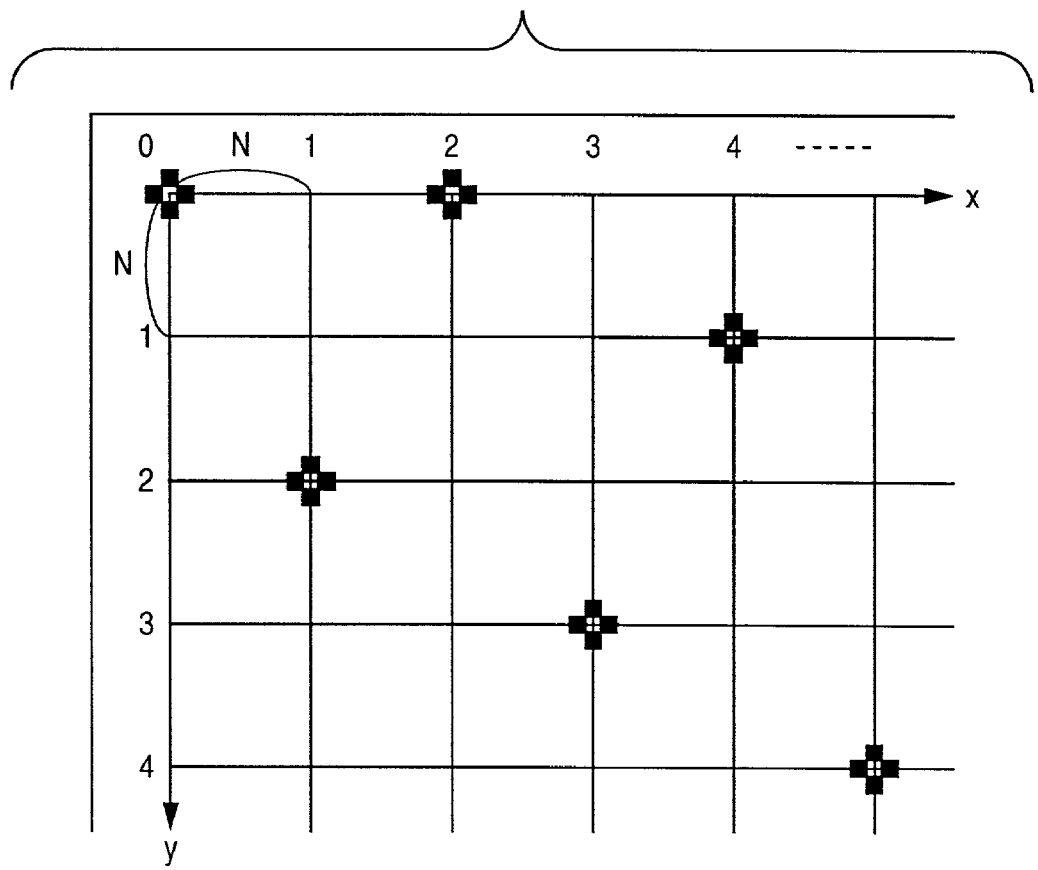
FIG. 77 is a view showing generated attachment position information.

Each section will be described below in detail. First, the additional information generation section 5 will be described in detail. As a general method of superposing additional information on an image, matrix points present at an N-pixel interval in a printable region are defined, as shown in FIG. 77, and additional information is expressed depending on whether a dot pattern predetermined and stored in a storage device in a computer or printer main body for executing processing of this embodiment is present at each matrix point.

Figure 78:
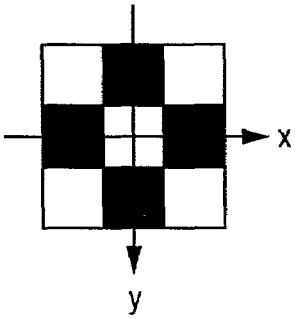
FIG. 78 is a view showing a dot pattern and dot pattern data used in this embodiment.

FIG. 78 is a view showing a dot pattern in this embodiment. Referring to FIG. 78, a pixel at which a dot is printed on paper using ink or toner is indicated by a black point. Since the origin of the coordinate axes is set at the center of the dot pattern, data such as a pixel count C of the dot pattern, and a pixel position $(P_x,P_y)$ as shown in the table shown in FIG. 78 are stored in advance in the storage device present in the computer or printer main body for performing processing.

The additional information generation section 5 converts information (e.g., the machine number of printer) to be superposed into position information at which the above-described dot pattern is to be attached, on the basis of some rule. Various rules can be used for conversion to position information. For example, the machine number or model name of the printer main body is expressed by a binary sequence, and bits "1" and "0" are expressed by the presence and absence of dot pattern, respectively. In this embodiment, any method can be used. The pieces of obtained attachment position information are expressed by a matrix point interval N and the coordinates $(Lx^z, Ly^z)$ of Z matrix points where the pieces of information are to be attached, as shown in the table of FIG. 77, and input to the additional information superposition section 6.

The additional information generation section 5 of this embodiment has been described above.

Figure 79:
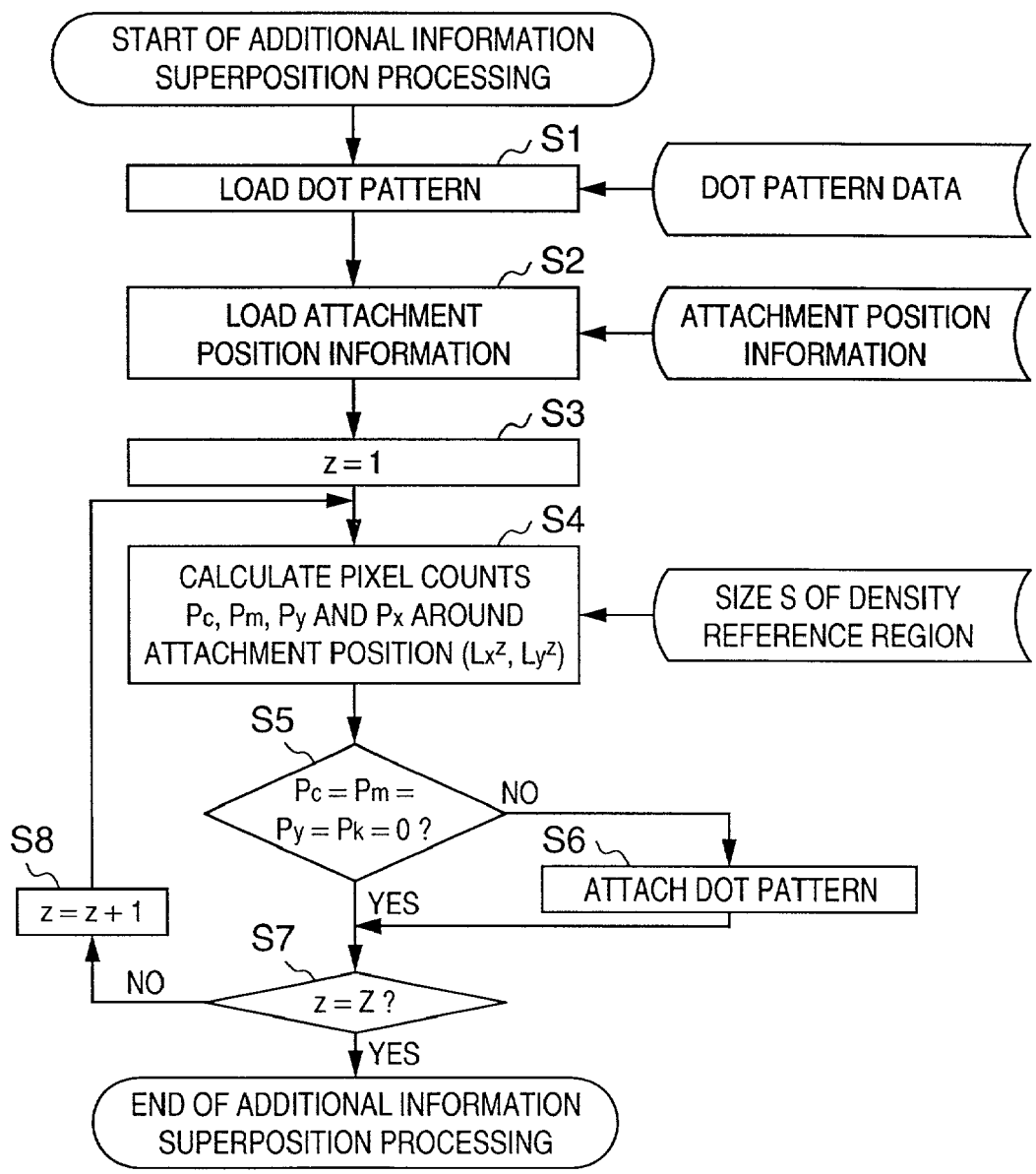
FIG. 79 is a flow chart showing details of additional information superposition processing in this embodiment.
Figure 81A:
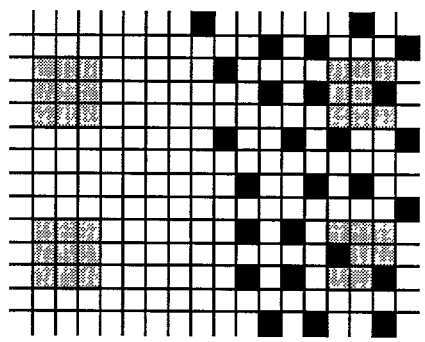
FIGS. 81A to 81D are views showing images after additional information superposition processing in this embodiment.
Figure 81B:
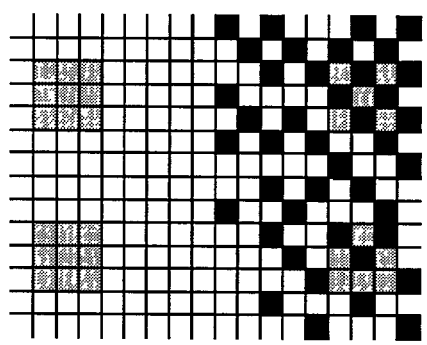
Figure 81C:
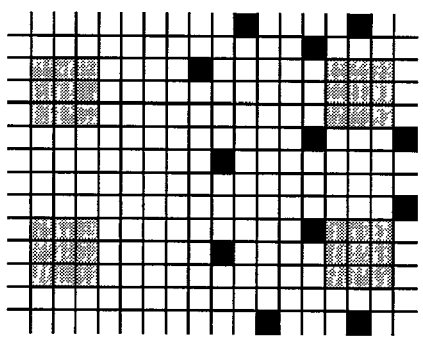
Figure 81D:
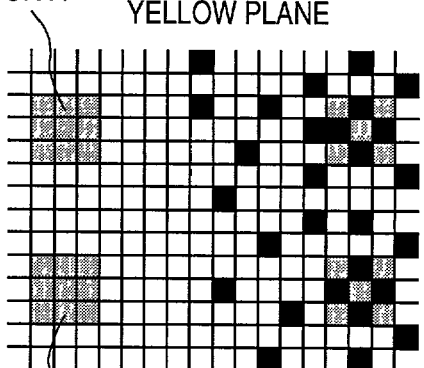

The operation of the additional information superposition section 6 of this embodiment will be described next with reference to the flow chart shown in FIG. 79.

First, in step S1, dot pattern data shown in the table in FIG. 78 is loaded. In step S2, each of the Z attachment position information generated by the additional information generation section 5, to which the dot pattern is to be attached, is loaded.

From step S3, the dot pattern is attached to the Y component Iy(x,y) using these pieces of information. First, in step S3, z=1 is set. In step S4, to grasp the density state around the attachment position, an S-pixel square block region centered on the attachment position $(Lx^z, Ly^z)$ is defined, and pixel counts Pc, Pm, Py, and Pk in that region are calculated in units of CMYK planes using $$P_c = \sum_{k=-T}^{T} \sum_{l=-T}^{T} I_c(N \cdot L_x + k, N \cdot L_y + l) \quad (1.1)$$

$$P_m = \sum_{k=-T}^{T} \sum_{l=-T}^{T} I_m(N \cdot L_x + k, N \cdot L_y + l) \quad (1.2)$$

$$P_y = \sum_{k=-T}^{T} \sum_{l=-T}^{T} I_y(N \cdot L_x + k, N \cdot L_y + l) \quad (1.3)$$

$$P_k = \sum_{k=-T}^{T} \sum_{l=-T}^{T} I_k(N \cdot L_x + k, N \cdot L_y + l) \quad (1.4)$$

In equations (1.1) to (1.4), T=[S/2].

The region defined above will be referred to as a "density reference region" hereinafter. FIGS. 80A to 80D are views showing density reference regions in this embodiment. FIG. 80A shows the density reference region of C (cyan) component, FIG. 80B shows the density reference region of M (magenta) component, FIG. 80C shows the density reference region of K (black) component, and FIG. 80D shows the density reference region of Y (yellow) component.

Referring to FIGS. 80A to 80D, the block size S characterizing the density reference region is set to "3" having the same size as that of the dot pattern. This block size S is predetermined and held in the storage device in the computer or printer main body for executing processing of this embodiment.

In step S5, it is determined whether the dot pattern is to be attached, using the calculated pixel counts Pc, Pm, Py and Pk in the density reference regions. More specifically, when the pixel counts Pc, Pm, Py and Pk satisfy equation (1.5) below, it is determined that no on-dot is present for all of the CMYK planes in the current density reference region of interest. In this case, the dot pattern is not attached to the matrix point coordinates $(Lx^z, Ly^z)$, and the flow advances to step S7.

$$Pc=Pm=Py=Pk=0 \quad (1.5)$$

On the other hand, if NO in step S5, the flow advances to step S6 to execute processing of attaching the dot pattern to the matrix point coordinates $(Lx^z, Ly^z)$, and then, the flow advances to step S7. This processing of attaching the dot pattern is expressed by $$Iy(N \cdot Lx^z + Px^c, N \cdot Ly^z + Py^c) \quad (1.6)$$

In step S7, it is checked whether z=Z, thereby checking whether additional information superposition processing for all of the L positions is ended. If NO in step S7, the flow returns to step S4 to execute additional information superposition processing for the next attachment position. When additional information superposition processing for all image positions is ended, this processing is ended.

FIGS. 81A to 81D are views showing images in which the dot pattern is unnoticeably embedded using the above processing of this embodiment.

In regions A and B shown in FIGS. 81A to 81D, no on-dot is present in all the CMYK planes. For this reason, the dot pattern is not attached. Even when such processing is executed, the additional information can be decoded because the dot pattern is attached every specific period.

As described above, with the processing of this embodiment, in processing of superposing a dot pattern on an image, whether the dot pattern is to be attached can be determined in accordance with the density state around the attachment position, and additional information can be superposed with little visual incompatibility.

In the above-described embodiment, in attaching the dot pattern to the Y component to superpose additional information on an image, when no pixel is present around the attachment position in all the CMYK components, the dot pattern is not attached. With this processing, the dot pattern can be prevented from undesirably becoming noticeable at a portion where no dots are printed on a printing medium such as paper at all.

In an embodiment to be described below, as another example in which a dot pattern is undesirably noticeable, assume a case wherein a yellow dot pattern is attached to a region where on-dots are present only in the cyan component. The basic arrangement of this embodiment is the same as in the above-described embodiment shown in FIG. 75, and a detailed-description thereof will be omitted. Different portions will be mainly described below.

Figure 82A:
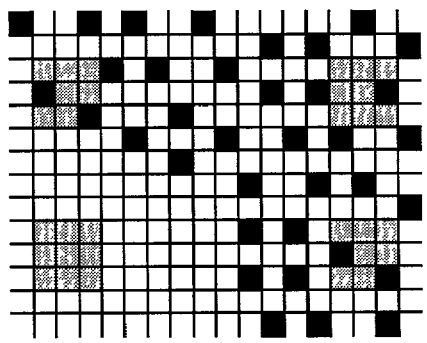
FIGS. 82A to 82D are views showing images that have undergone pseudo-halftoning processing of this embodiment.
Figure 82B:
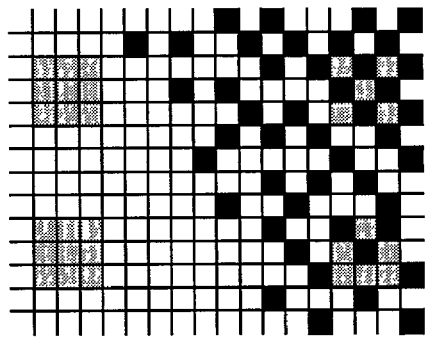
Figure 82C:
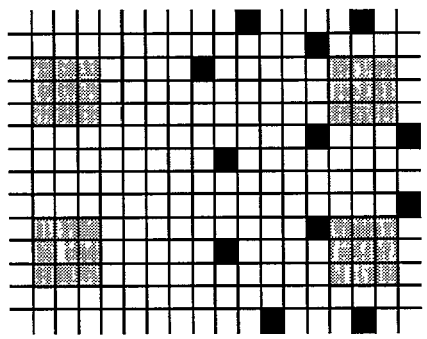
Figure 82D:
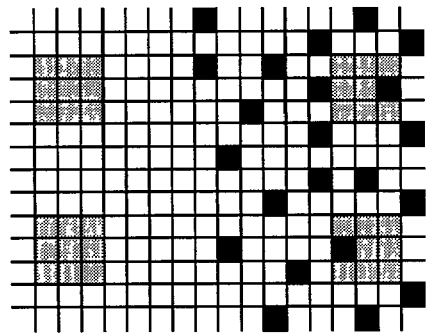

FIGS. 82A to 82D are views showing images after pseudo-halftoning processing used in this embodiment of the present invention. FIGS. 82A to 82D show images before dot pattern attachment. FIG. 82A shows the C (cyan) component after pseudo-halftoning processing, FIG. 82B shows the M (magenta) component after pseudo-halftoning processing, FIG. 826C shows the K (black) component after pseudo-halftoning processing, and FIG. 82D shows the Y (yellow) component after pseudo-halftoning processing. Referring to FIGS. 82A to 82D, the gray regions are 3-pixel square regions to which a dot pattern is to be attached.

Figure 83:
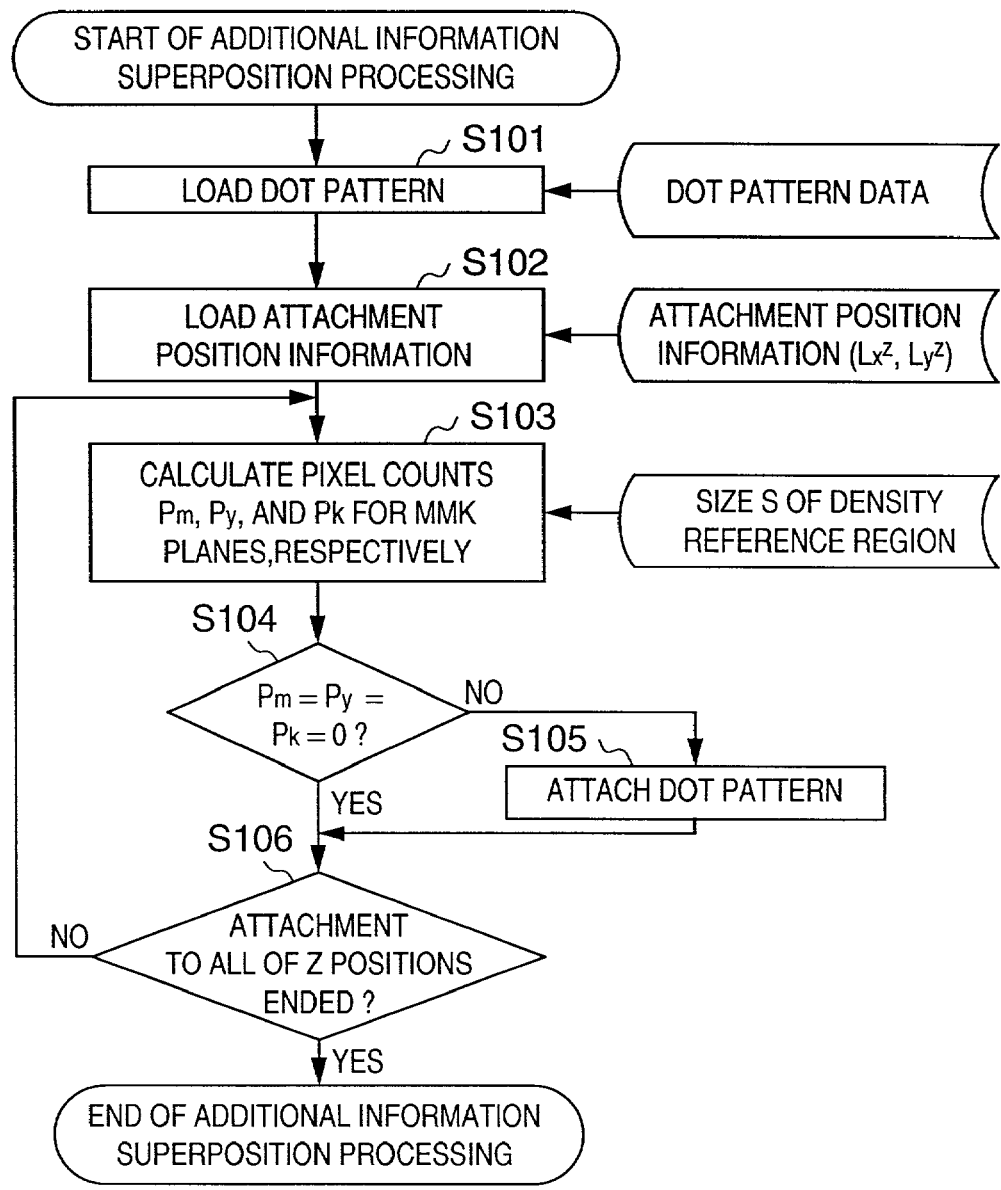
FIG. 83 is a flow chart showing details of additional information superposition processing of this embodiment.

FIG. 83 is a flow chart showing the operation of an additional information superposition section 6 (FIG. 75) of this embodiment. Additional information superposition processing of this embodiment will be described below in detail with reference to FIG. 83.

Referring to FIG. 83, first, in step S101, dot pattern data shown in the table in FIG. 78 is loaded. In step S102, each Z attachment position information generated by the additional information generation section 5, to which the dot pattern is to be attached, is loaded. From step S103, the dot pattern is attached to the Y component Iy(x,y) using such information.

First, in step S103, to grasp the density state around the attachment position, an S-pixel square block region centered on the attachment position $(Lx^z, Ly^z)$ is defined, and pixel counts Pm, Py, and Pk in that region are calculated in units of MYK planes except the cyan component using $$P_m = \sum_{k=-T}^{T} \sum_{l=-T}^{T} I_m(N \cdot L_x + k, N \cdot L_y + l) \quad (2.1)$$

$$P_y = \sum_{k=-T}^{T} \sum_{l=-T}^{T} I_y(N \cdot L_x + k, N \cdot L_y + l) \quad (2.2)$$

$$P_k = \sum_{k=-T}^{T} \sum_{l=-T}^{T} I_k(N \cdot L_x + k, N \cdot L_y + l) \quad (2.3)$$

In equations (2.1) to (2.3), T=[S/2].

The region defined above will be referred to as a "density reference region" hereinafter. FIGS. 84A to 84D are views showing density reference regions in this embodiment. FIG. 84A shows the density reference region of C (cyan) component, FIG. 84B shows the density reference region of M (magenta) component, FIG. 84C shows the density reference region of K (black) component, and FIG. 84D shows the density reference region of Y (yellow) component.

Referring to FIGS. 84A to 84D, the block size S characterizing the density reference region is set to "3" having the same size as that of the dot pattern. This block size S is predetermined and held in the storage device in the computer or printer main body for executing processing of this embodiment.

In step S104 shown in FIG. 83, it is determined whether the dot pattern is to be attached, using the calculated pixel counts Pm, Py and Pk in the density reference regions. More specifically, when the pixel counts Pm, Py and Pk satisfy equation (2.4) below, it is determined that no on-dot is present for the MYK planes except the cyan component in the current density reference region of interest. The flow advances to step S106, and the dot pattern is not attached to the matrix point coordinates $(Lx^z, Ly^z)$.

$$Pm=Py=Pk=0 \quad (2.4)$$

On the other hand, if NO in step S104, the flow advances to step S105 to execute processing of attaching the dot pattern to the matrix point coordinates $(Lx^z, Ly^z)$. This processing can be expressed by $$I_y(L_x^z + P_{hz}^c, L_y^z + P_{hy}^c) = 1, \ 1 \le c \le C \quad (2.3)$$

Then, the flow advances to step S106.

In step S106, it is checked whether additional information superposition processing for all of the L positions is ended. If NO in step S106, the flow returns to step S103 to execute additional information superposition processing for the next attachment position. When additional information superposition processing for all image positions is ended, this processing is ended.

FIGS. 85A to 85D are views showing images after the dot pattern is attached using the above-described processing of this embodiment. In a region A, the dot pattern is attached in the above-described embodiment. However, in this embodiment, no dot pattern is attached. Even when such processing is executed, the additional information can be decoded because the dot pattern is attached every specific period.

As described above, with the processing of this embodiment, in processing of superposing a dot pattern on an image, whether the dot pattern is to be attached can be determined in accordance with the density state around the attachment position, and additional information can be superposed with little visual incompatibility.

In this embodiment, the dot pattern is not attached to a region where on-dots are present for only the cyan component. However, the same processing as described above can be executed even for the remaining components (magenta and black), and this is also incorporated within the scope of the present invention.

In the above-described embodiment, binary values (1 and 0) are assumed as the quantization outputs from the pseudo-halftoning processing section 4. However, the present invention is not limited to this, and multilevel values (e.g., 0, 1, and 2) may be assumed. An embodiment of the present invention in which multilevel values (e.g., 0, 1, and 2) are assumed as quantization outputs from a pseudo-halftoning processing section 4 will be described below.

In this embodiment, when the quantization value is "0", no dot is printed on a printing medium such as paper. When the value is "1", a dot is printed using a light ink. When the value is "2", a dot is printed using a dark ink.

Even when such multilevel values are used, the same processing as in the above-described embodiment can be executed. More specifically, the values Pc, Pm, Py, and Pk obtained by equations (1.1) to (1.4) in the above embodiment are not the pixel counts in the density reference region but the sums of quantization output values. If these values satisfy equation (1.5), it is determined that no on-dot is present on all the MYK plane in the current density reference region of interest, and the dot pattern is not attached to the matrix point coordinates $(Lx^z, Ly^z)$.

Processing of this embodiment has been described above.

In the above-described embodiment, binary values (1 and 0) are assumed as the quantization outputs from the pseudo-halftoning processing section 4. However, the present invention is not limited to this, and multilevel values (e.g., 0, 1, and 2) may be assumed. An embodiment of the present invention in which multilevel values (e.g., 0, 1, and 2) are assumed as quantization outputs from a pseudo-halftoning processing section 4 will be described below.

In this embodiment, when the quantization value is "0", no dot is printed on a printing medium such as paper. When the value is "1", a dot is printed using a light ink. When the value is "2", a dot is printed using a dark ink. Even when such multilevel values are used, the same processing as in the above-described embodiment can be executed. More specifically, the values Pm, Py, and Pk obtained by equations (2.1) to (2.3) in the above embodiment are not the pixel counts in the density reference region but the sums of quantization output values. If these values satisfy equation (2.4), it is determined that no on-dot is present for the MYK components except the cyan component in the current density reference region of interest, and the dot pattern is not attached to the matrix point coordinates $(Lx^z, Ly^z)$. Processing of this embodiment has been described above.

An embodiment of the present invention will be described below in detail with reference to the accompanying drawings.

An image processing apparatus according to this embodiment is efficiently mainly incorporated as printer driver software or application software in a computer for generating image information to be output to a printer engine. However, it can also be incorporated in a copying machine, facsimile apparatus, or printer main body as hardware and software.

Image information can be expressed by pseudo-halftoning processing used by an inkjet printer, thermal transfer printer, laser printer, or the like.

Figure 86:
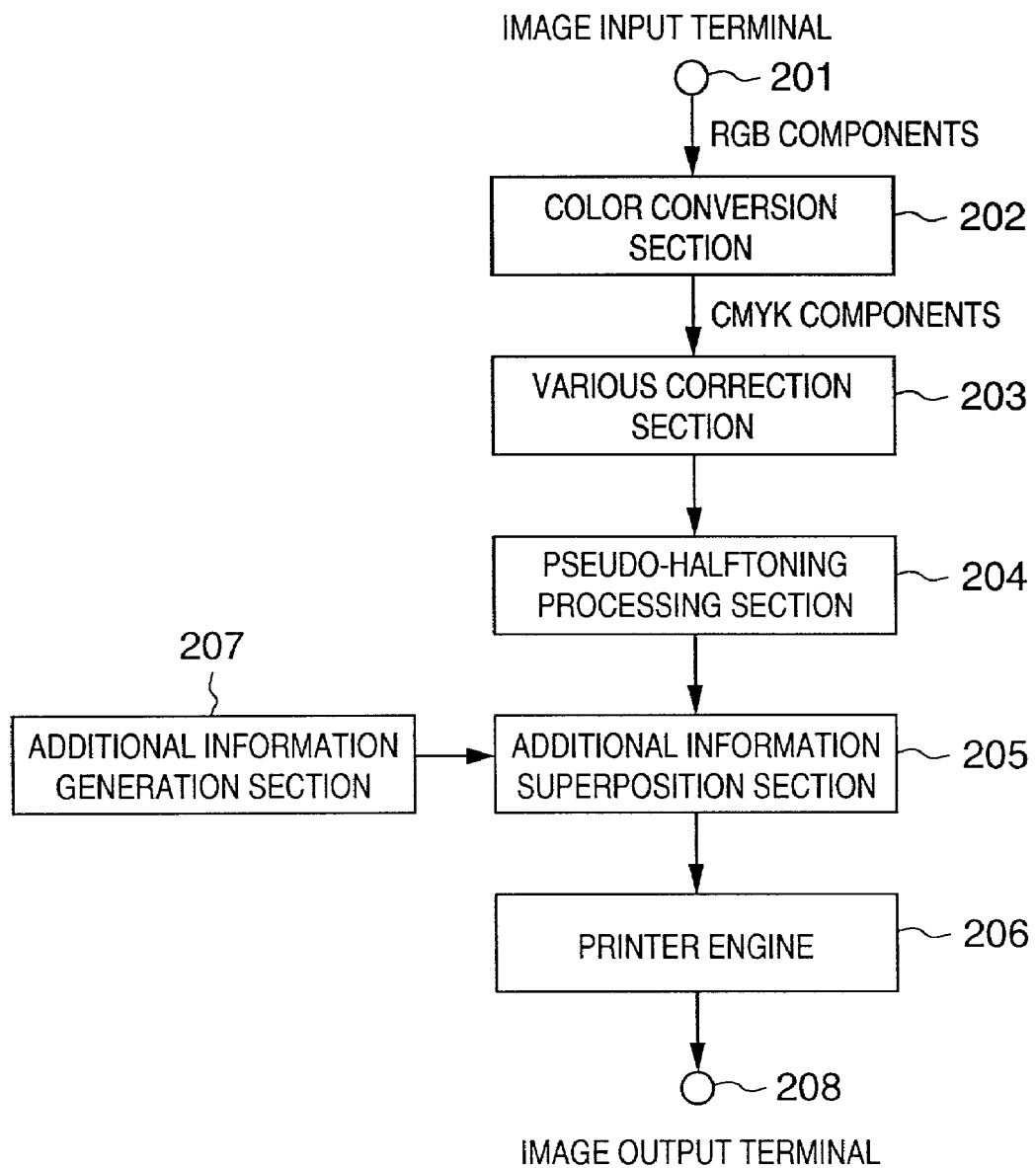
FIG. 86 is a block diagram showing the additional information attachment superposition method of the image processing apparatus of this embodiment.

FIG. 86 is a block diagram showing the additional information attachment superposition method of an image processing apparatus according to this embodiment. The outline of operation will be described first with reference to FIG. 86, and then, each section will be described in detail.

Referring to FIG. 86, an input terminal 201 inputs multilevel RGB image signals. The input signals are converted into CMYK signals by a color conversion section 202, subjected to various correction processing operations by a various correction processing section 203, and input to a pseudo-halftoning processing section 204. The pseudo-halftoning processing section 204 converts the input image signal into quantization levels smaller in number than the input gray levels by pseudo-halftoning processing and two-dimensionally expresses halftone using quantization values of a plurality of pixels. In this embodiment, for pseudo-halftoning processing, any one of existing systematic dithering and error diffusion can be used. Any scheme can be used assuming that the quantization values are binary values "0" and "1". For a pixel (to be referred to as an "on-dot" hereinafter) having a quantization value "1", a dot (ink or toner) is printed on a printing medium such as paper. CMYK components after the above-described pseudo-halftoning processing will be represented by $I_c(x,y)$, $I_m(x,y)$, $I_y(x,y)$, and $I_k(x,y)$, respectively.

Additional information generated by an additional information generation section 207 is superposed on the Y component $I_y(x,y)$ binarized by the pseudo-halftoning processing section 204, using a predetermined dot pattern by an additional information superposition section 205. This processing uses the feature that the Y component is hard to identify with a human eye as compared to the remaining components. As information to be attached by the additional information superposition section 205, various kinds of information are available, including the output device manufacturer name, model name, machine number, and output condition in outputting the image to paper. These signals are encrypted, as needed, and superposed.

After the above processing, the CMYK components are output to a printer engine 206. Consequently, an output image having various kinds of information superposed can be obtained.

The outline of operation of the image processing apparatus according to this embodiment has been described above. Each of the above-described sections will be described below in detail. First, the additional information generation section 207 will be described.

Figure 87:
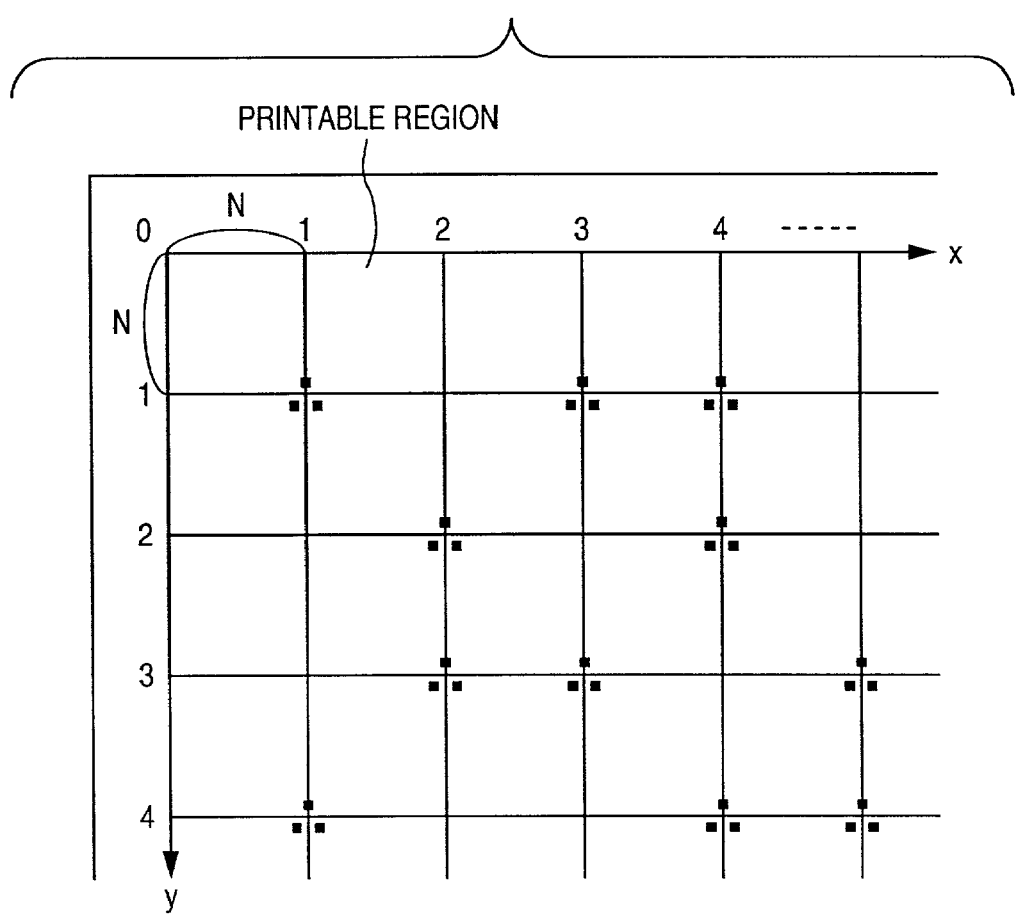
FIG. 87 is a view showing an image to which a dot pattern is attached.

As a general method of superposing additional information on an image, matrix points present at an N-pixel interval in a printable region are defined, as shown in FIG. 87, and additional information is expressed depending on whether a dot pattern stored in a storage device in a computer or printer main body for executing predetermined processing is present at each matrix point.

Figure 88:
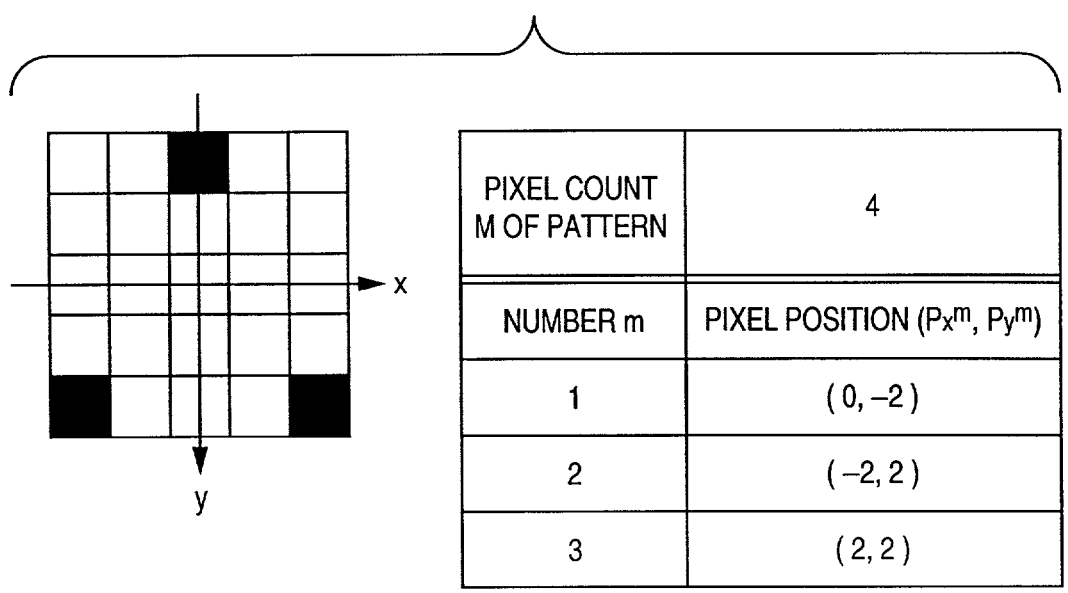
FIG. 88 is a view showing a dot pattern in this embodiment.

FIG. 88 is a view showing a dot pattern in this embodiment. Referring to FIG. 88, a point where a dot (ink to toner) is printed on paper is indicated by a black point. In addition, since the origin of the coordinate axes is set at the center of the dot pattern shown in FIG. 88, data such as a pixel count M of the dot pattern, and a pixel position $(P_k^m, P_y^m)$ as shown in the table shown in FIG. 88 are stored in advance in the storage device present in the computer or printer main body for performing processing.

Figure 89:
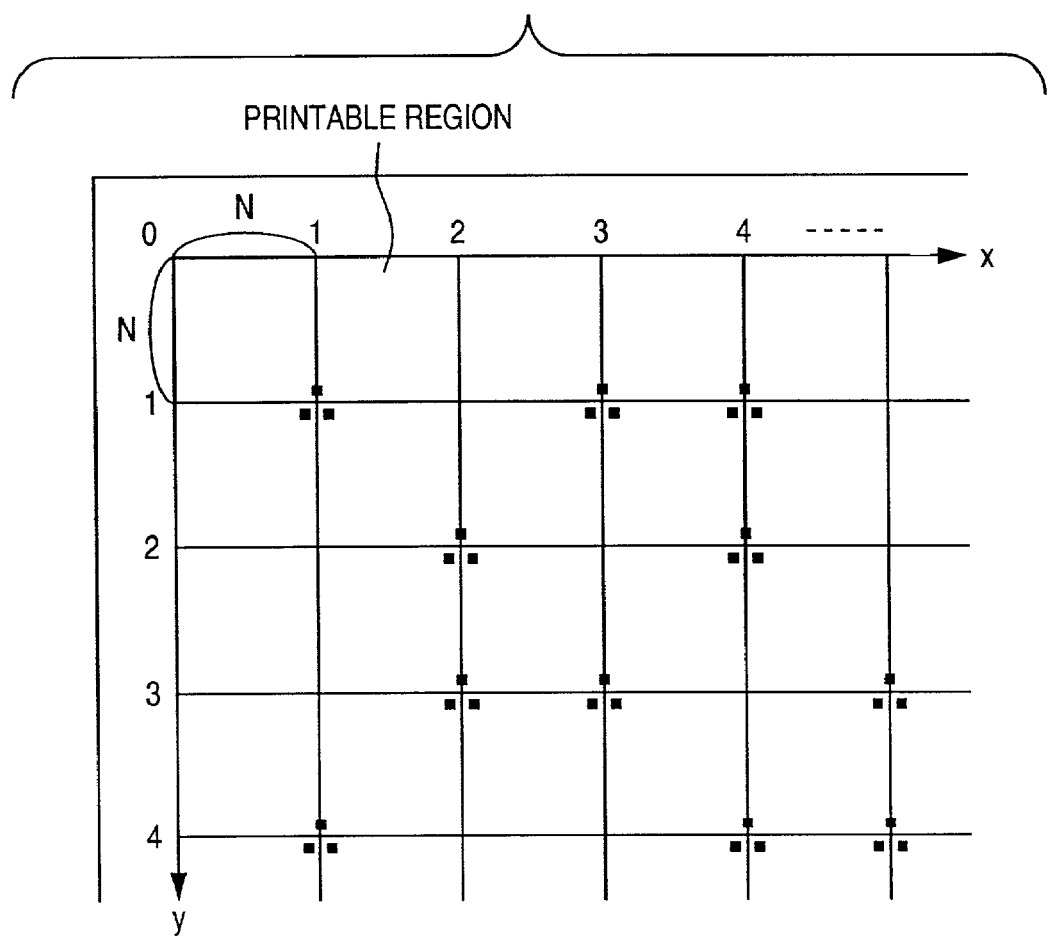
FIG. 89 is a view showing generated attachment position information.

The additional information generation section 207 obtains a position where the above-described dot pattern is to be attached, using, e.g., a means for converting information (e.g., the machine number of printer) to be superposed on the basis of some rule. Various rules can be used for conversion to position information. For example, the machine number or model name of the printer main body is expressed by a binary sequence, and bits "1" and "0" are expressed by the presence and absence of dot pattern, respectively. In this embodiment, any method can be used. The pieces of obtained attachment position information are expressed by the matrix point interval N and the coordinates $(L_x^z, L_y^z)$ of Z matrix points where the pieces of information are to be attached, as shown in the table of FIG. 89, and input to the additional information superposition section 205. The additional information generation section 207 has been described above.

Figure 90:
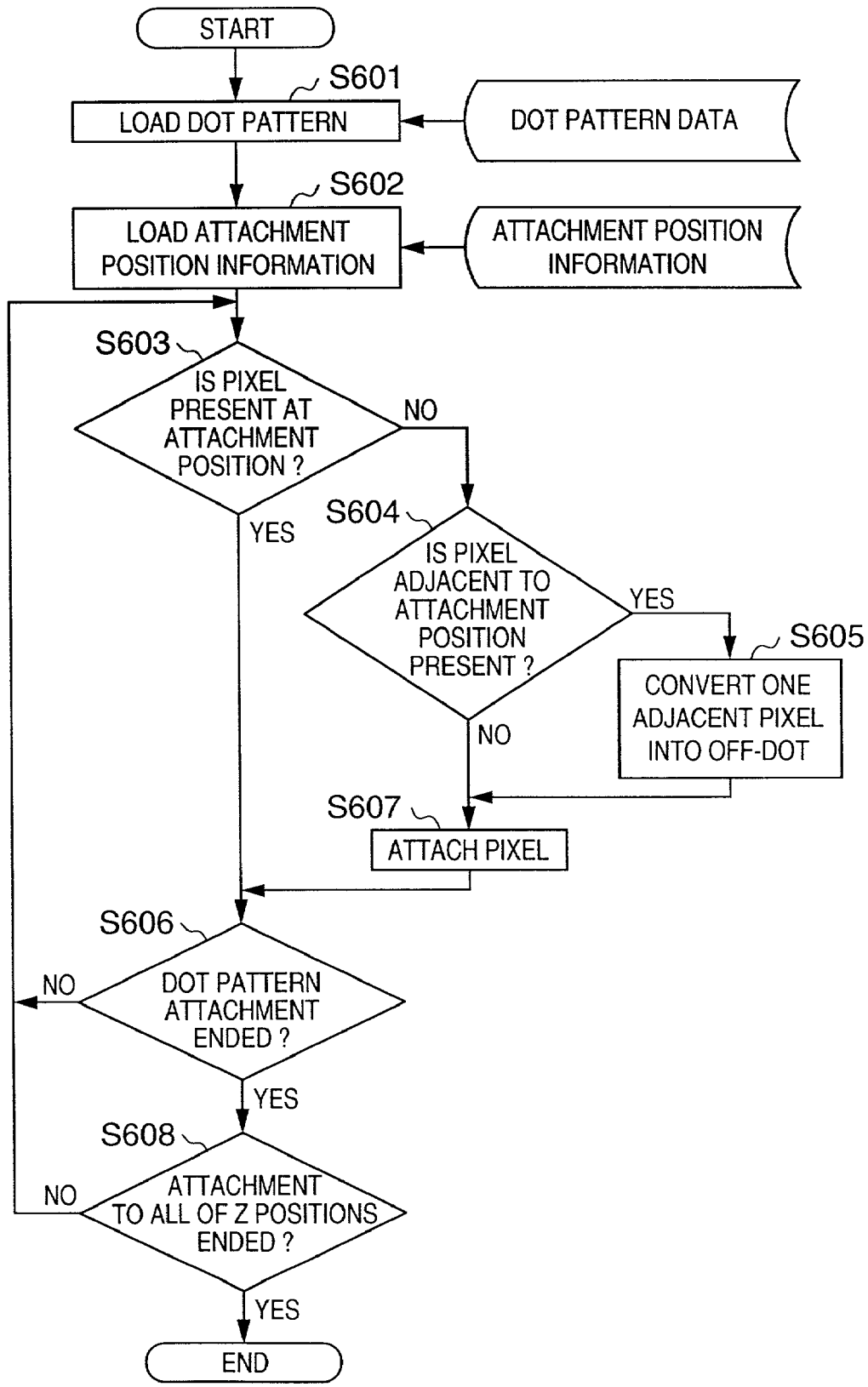
FIG. 90 is a flow chart showing additional information superposition processing in this embodiment.

Additional information attachment processing by the additional information superposition section 205 will be described next. FIG. 90 is a flow chart showing additional information superposition processing in this embodiment. First, in step S601, the above-described dot pattern data is loaded. In step S602, each attachment position information generated by the additional information generation section 207 is loaded.

From step S603, the dot pattern is attached to $I_y(x,y)$ using these pieces of information. First, in step S603, it is determined for each of the three dots of the dot pattern whether a pixel is present in advance at the pixel position where the dot pattern is to be attached. If YES in step S603, it is determined that no change in pixel count occurs at the neighboring portion. The flow advances to step S606, and no processing is executed at all. In step S606, it is determined whether the dot pattern has been attached in correspondence with the pixel count M. If NO in step S606, the flow returns to step S603 to repeat the above-described processing. When the dot pattern is attached to all the Z positions, the processing is ended in step S608.

If NO in step S603, the flow advances to step S604 to determine whether a pixel is present at a position adjacent to the new attachment position. If YES in step S604, the flow advances to step S605 to execute processing (to be referred to as off-dot processing hereinafter) of inhibiting to print one of the pixels at the neighboring portion to store the pixel count.

If NO in step S604, or when off-dot processing is ended in step S605, the flow advances to step S607 to attach a new pixel constructing the dot pattern.

Figure 91A:
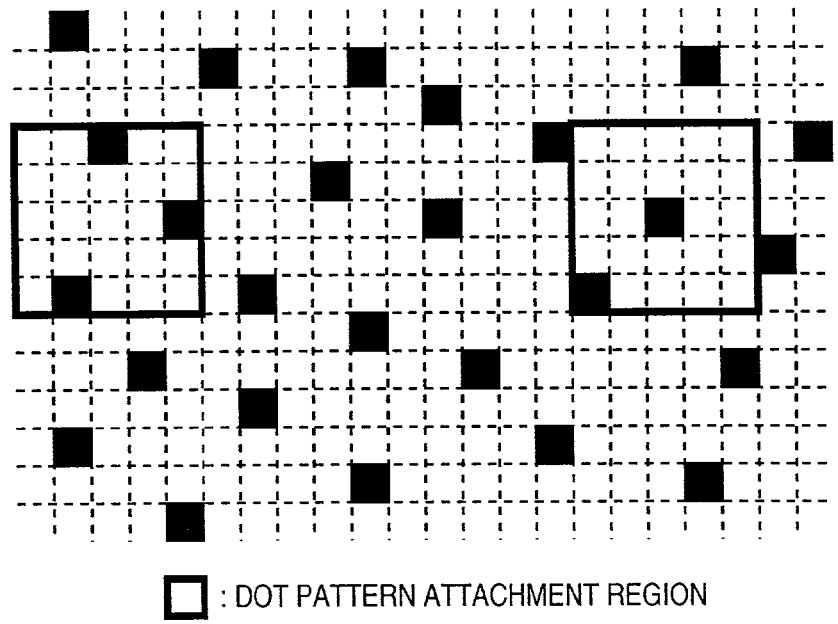
FIGS. 91A and 91B are views showing images before and after the dot pattern in this embodiment is attached.
Figure 91B:
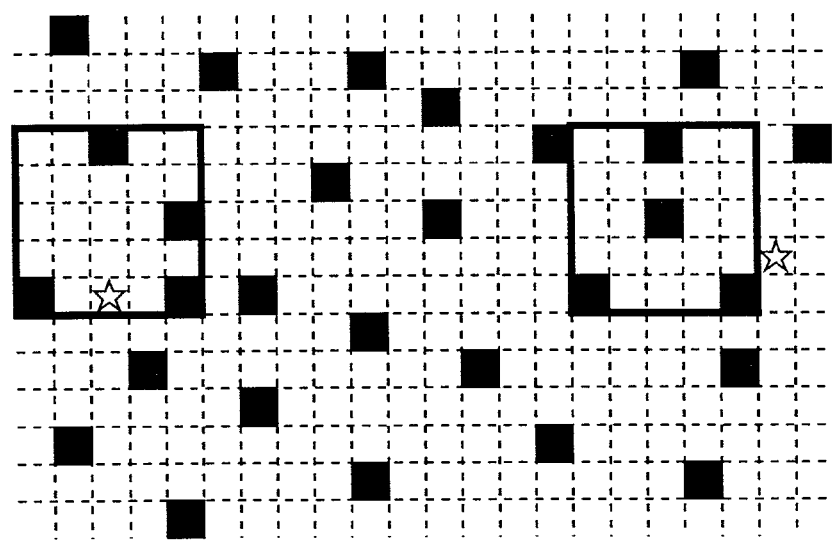

FIGS. 91A and 91B are views showing images before and after the dot pattern in this embodiment is attached. FIG. 91A shows an image before dot pattern attachment, and the gray region is a dot pattern attachment region. FIG. 91B shows an image after dot pattern attachment, and ☆ indicates a pixel which has been present in advance and converted into an off-dot by the processing in step S605.

According to the above-described embodiment, in processing of unnoticeably embedding a dot pattern on an image that has undergone pseudo-halftoning processing to superpose additional information, the number of pixels (density) can be maintained to almost the same level before and after information attachment by a relatively simple means. Hence, additional information can be superposed with little visual incompatibility.

Still another embodiment of the present invention will be described next in detail with reference to the accompanying drawings.

In the above-described embodiment, as the output result from the pseudo-halftoning processing section 204 shown in FIG. 86, binary values (0 and 1) are assumed as quantization values. In this embodiment, ternary values (0, 1, and 2) are assumed as quantization values.

Figure 92:
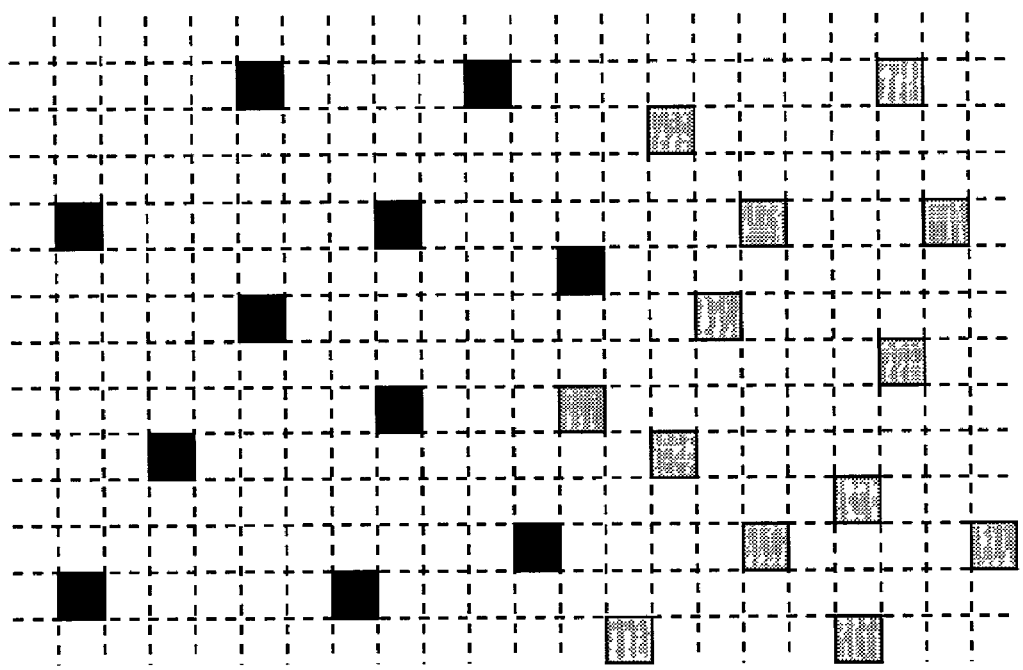
FIG. 92 is a view showing an image that has undergone pseudo-halftoning processing in this embodiment.

FIG. 92 is a view showing an image that has undergone pseudo-halftoning processing in this embodiment. Referring to FIG. 92, pixels indicated by density level 1 and density level 2 represent pixels (on-dots) where dots are printed on paper using ink or toner. A pixel indicated by density level 0 represents a pixel (off-dot) where no dot is printed. A pixel indicated by density level 2 is printed at a density twice that of the pixel indicated by density level 1.

In the above-described embodiment, in attaching a predetermined dot pattern to a pseudo-halftone image quantized to multiple levels (binary or more levels), processing is executed not to change the sum of quantization values around the attachment position.

Figure 93:
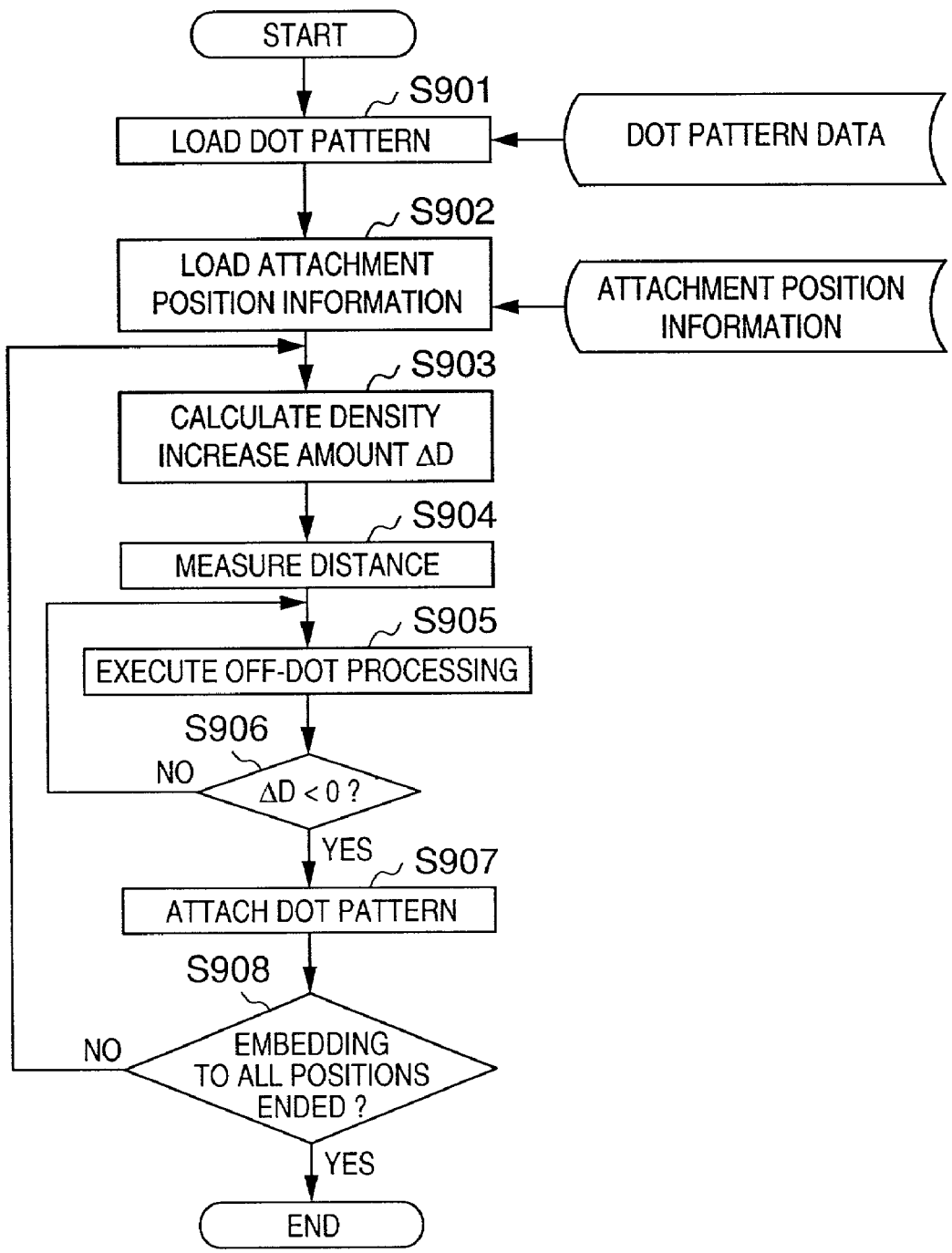
FIG. 93 is a flow chart showing additional information superposition processing in this embodiment.

FIG. 93 is a flow chart showing additional information superposition processing in the embodiment to be described below. In step S901, as in the above-described embodiment, a dot pattern predetermined and stored in the storage device section of a computer or printer main body for executing processing of this embodiment is loaded.

Figure 94:
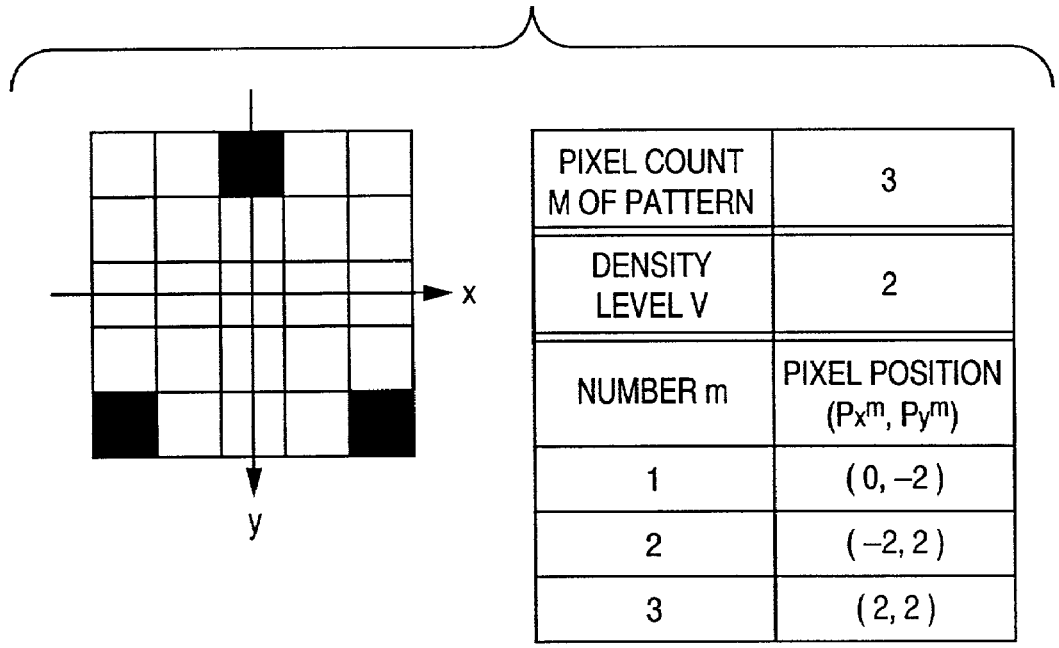
FIG. 94 is a view showing a dot pattern to be used in this embodiment.

FIG. 94 is a view showing a dot pattern used in this embodiment. In this embodiment, the dot pattern is described by data as shown in the table of FIG. 94 and stored in the storage device. Referring to FIG. 94, this embodiment is different from the above-described embodiment in that the density level for dot pattern attachment is described.

Next, in step S902 shown in FIG. 93, each position information $(L_x^z, L_y^z)$ for dot pattern attachment is loaded. This processing is the same as described in the above embodiment.

In step S903, an increase amount ΔD of density upon attaching the above-described dot pattern to the Zth matrix point position $(L_x^z, L_y^z)$ is calculated by $$\Delta D = M \cdot V \cdot \Sigma I_y(N \cdot L_x^z + P_x^k, N \cdot L_y^z + P_y^k) \quad (2.1)$$

for k=1, . . . , M.

Equation (2.1) means that the difference between the sum of density levels of pixels of the dot pattern and the sum of pixels which are present in advance at the positions of pixels to be attached is calculated to obtain the increase amount of density.

Figure 95:
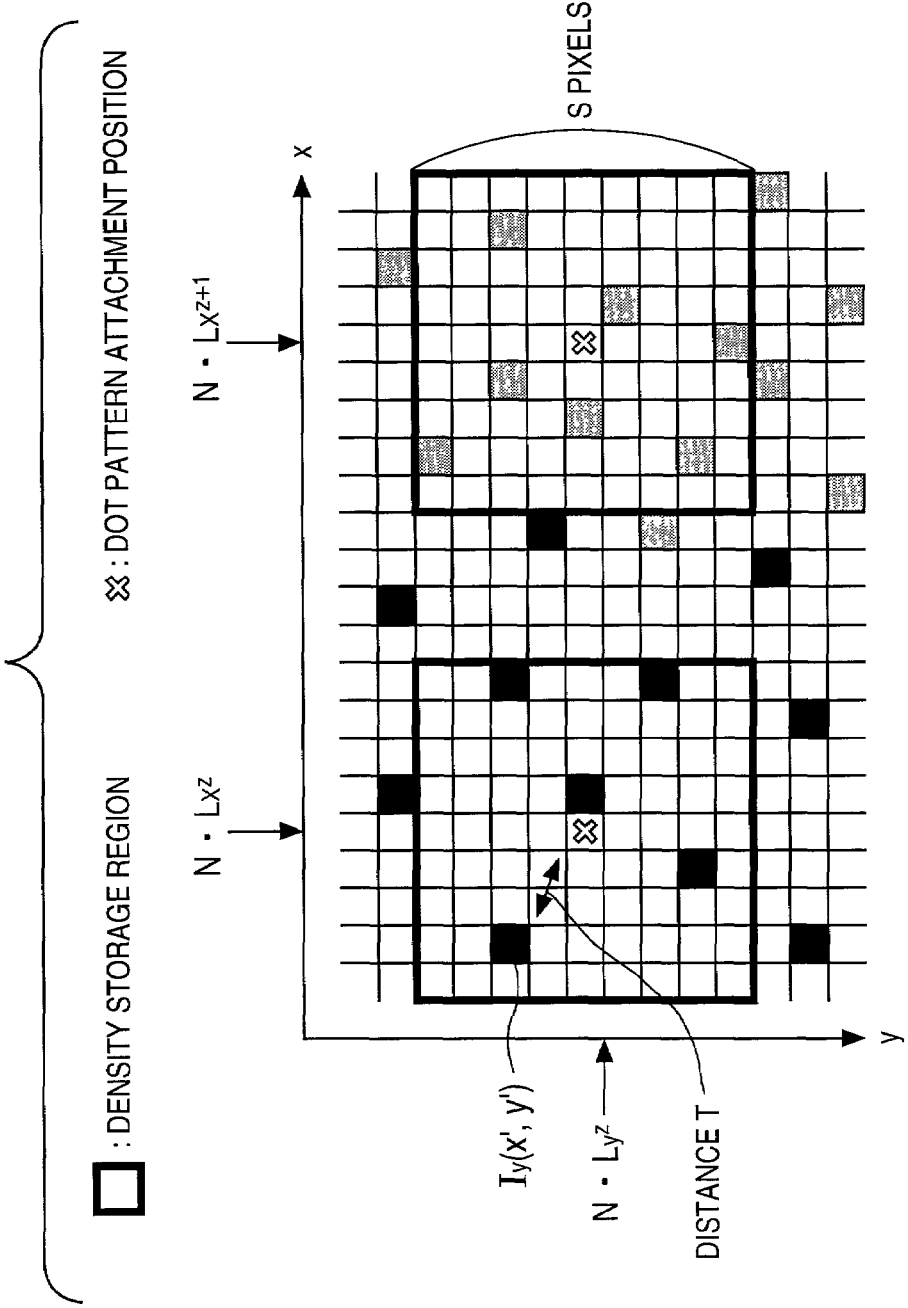
FIG. 95 is a view showing a density storage region in this embodiment.

Next, pixels in an amount corresponding to the density increase amount ΔD obtained by equation (2.1) are converted into off-dots in the image $I_y(x,y)$. For this off-dot processing, first, in step S904, the density storage region of an S-pixel square block centered on the position $(N\_L_x^z, N\_L_y^z)$ to which the above-described dot pattern is to be attached is set, as shown in FIG. 95, and a distance T(x',y') from the central position to the pixel $I_y(x',y')$ present in that region is calculated using $$T(x',y') = \sqrt{\{(x'-N \cdot L_x^z)^2 + (y'-N \cdot L_y^z)^2\}} \quad (2.2)$$

Using this result, in step S905, the pixels are sequentially converted into off-dots in ascending order of the distance T(x',y'). At this time, the pixel value converted into an off-dot is subtracted from the density increase amount ΔD.

$$\Delta D = \Delta D - I_y(N \cdot L_x^z + R_x^k, N \cdot L_y^z + R_y^k) \quad (2.3)$$

Next, in step S906, this off-dot processing is repeated until ΔD<0. When off-dot processing is ended, the flow advances to step S907 to attach a pixel constructing the dot pattern onto the image $I_y(x,y)$. Until the dot pattern is embedded at all positions in step S908, the above-described processing from step S903 is repeated.

Figure 96A:
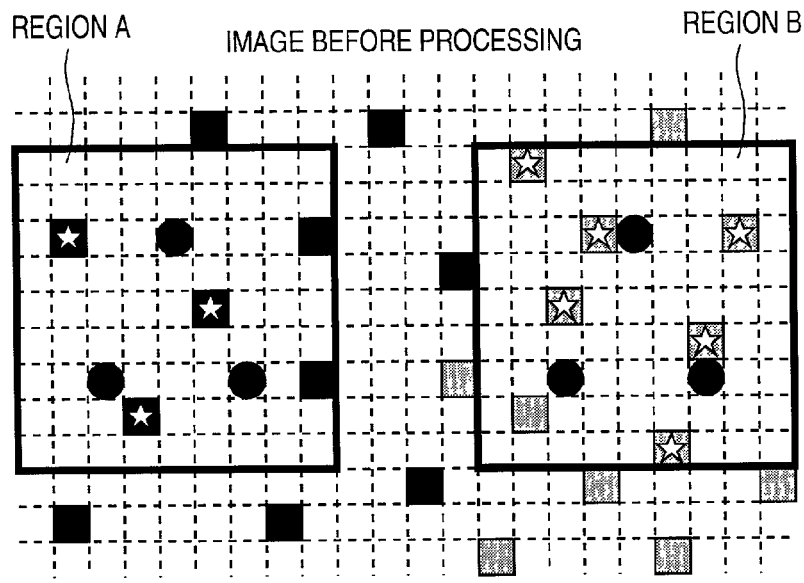
FIGS. 96A and 96B are views showing images before and after off-dot processing in this embodiment.
Figure 96B:
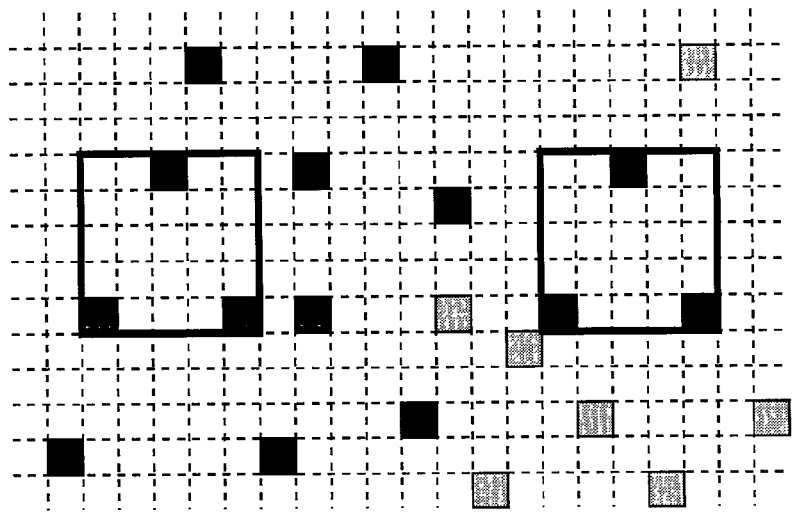

FIGS. 96A and 96B are views showing images before and after off-dot processing in this embodiment. Referring to FIG. 96A, ☆ indicates a pixel which will be converted into an off-dot by off-dot processing of this embodiment. In regions A and B shown in FIG. 96A, no pixel values are present at positions where the pixels of dot pattern are to be attached. Hence, equation (2.1) is rewritten to $$\Delta D = 3\_2 - 0 = 6 \quad (2.4)$$

From this result, in both the regions A and B, pixels corresponding to the density level sum of 6 are sequentially converted into off-dots from a position close to the center of dot pattern attachment position. More specifically, in the region A, three pixels of density level 2 are converted into off-dots, and in the region B, six pixels of density level 1 are converted into off-dots. As a result, the image shown in FIG. 96B is obtained.

According to the above-described embodiment, the sum of density levels can be maintained around the dot pattern attachment position, so additional information can be superposed with little visual incompatibility.

Still another embodiment of the present invention will be described next in detail with reference to the accompanying drawings.

In the embodiment to be described below as well, assume that the quantization output values from a pseudo-halftoning processing section 204 are ternary values (0, 1, and 2).

Figure 97:
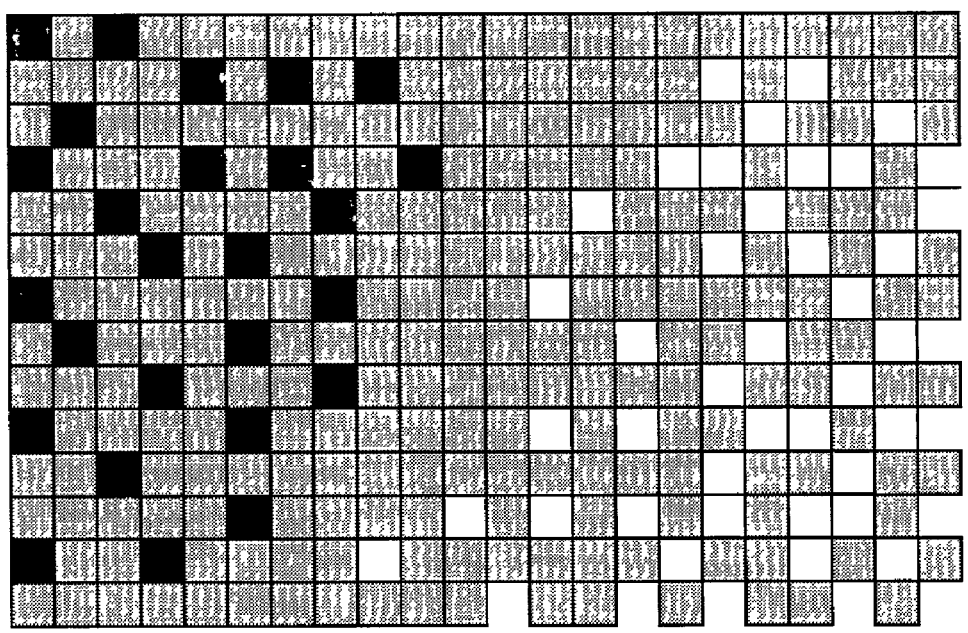
FIG. 97 is a view showing an image that has undergone pseudo-halftoning processing in this embodiment.

FIG. 97 is a view showing an image that has undergone pseudo-halftoning processing in this embodiment. Referring to FIG. 97, pixels indicated by density level 1 and density level 2 represent pixels (on-dots) where dots are printed on paper using ink or toner at high and intermediate densities, respectively. A pixel indicated by density level 0 represents a pixel (off-dot) where no dot is printed.

In this embodiment as well, in attaching a predetermined dot pattern to a pseudo-halftone image quantized to multiple levels (binary or more levels), processing is executed not to change the sum of quantization values around the attachment position.

Figure 98:
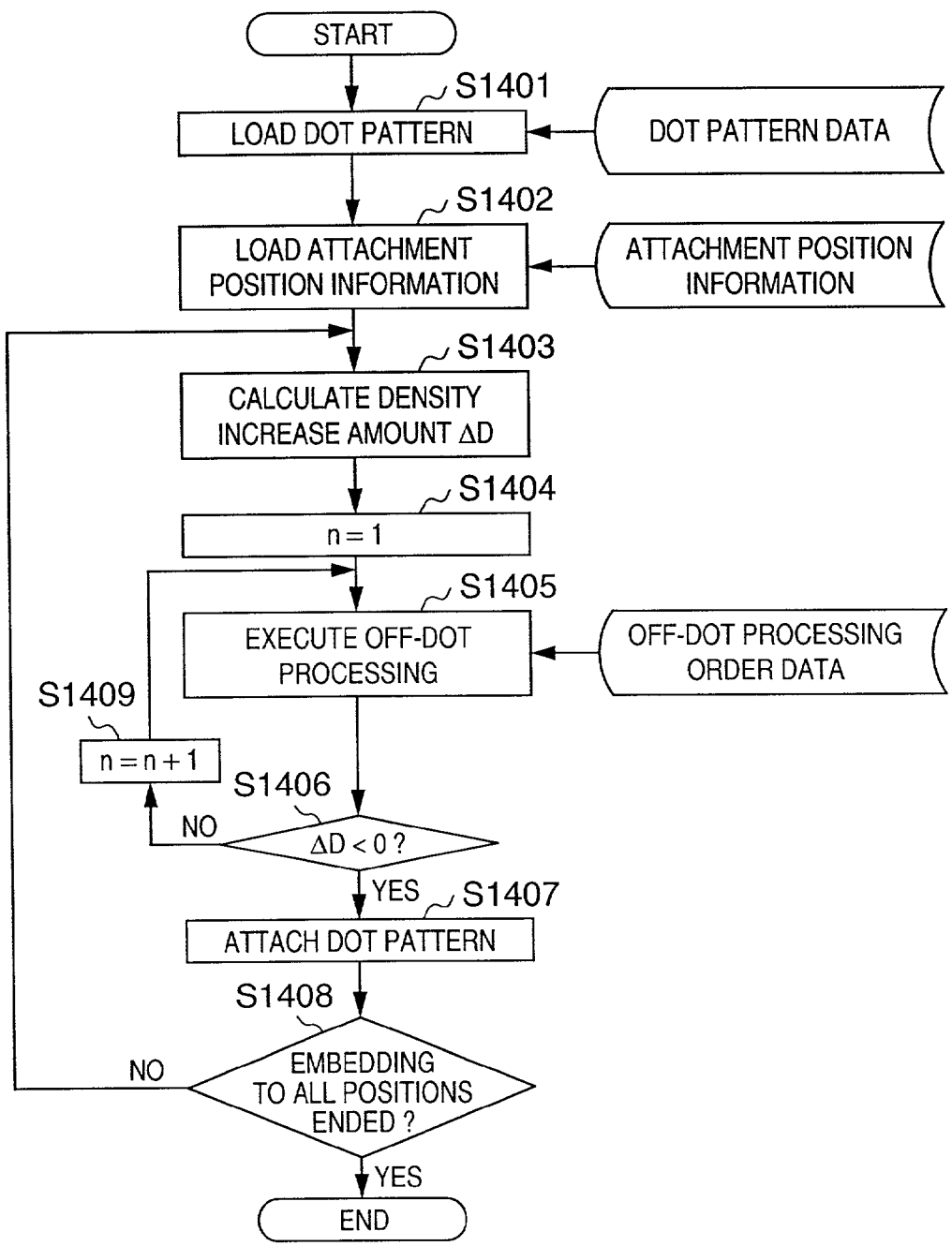
FIG. 98 is a flow chart showing additional information superposition processing in this embodiment.

FIG. 98 is a flow chart showing additional information superposition processing in the embodiment to be described below. In step S1401, as in the above-described embodiment, a dot pattern predetermined and stored in the storage device section of a computer or printer main body for executing processing of this embodiment is loaded.

Figure 99:
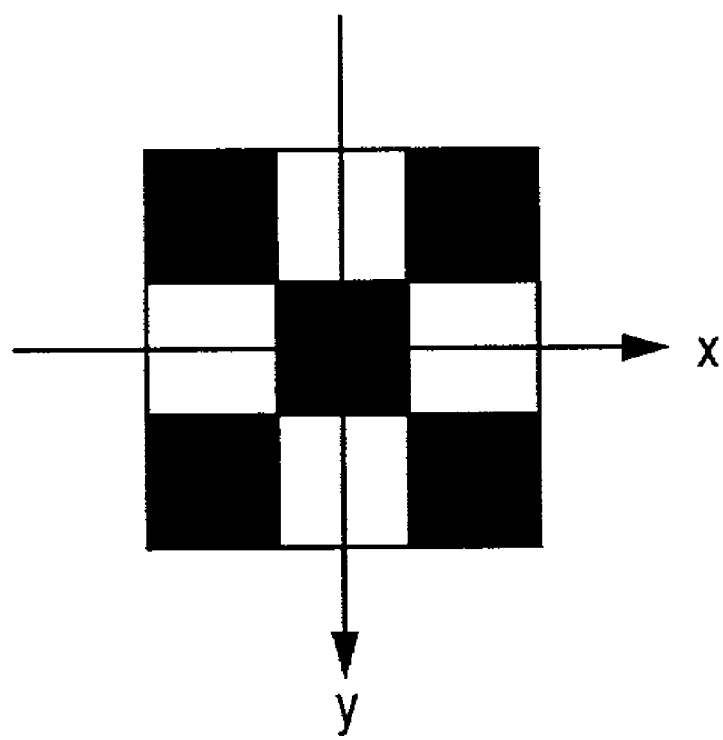
FIG. 99 is a view showing a dot pattern to be used in this embodiment.

FIG. 99 is a view showing a dot pattern used in this embodiment. In this embodiment, the dot pattern is described by data as shown in FIG. 100 and stored in the storage device. Referring to FIG. 100, note that the density level of pixels of the dot pattern is described, as in the above embodiment.

Next, in step S1402 shown in FIG. 98, each position information ($L_x^z$, $L_y^z$) for dot pattern attachment is loaded. This processing is the same as described in the above embodiment. For processing of calculating a density increase amount ΔD in step S1403, equation (2.1) is used, as described in the above embodiment.

In step S1405, pixels in an amount corresponding to the density increase amount ΔD obtained by equation (2.1) are converted into off-dots in the image $I_y(x,y)$. For this off-dot processing, as shown in FIG. 101, the order of off-dot processing of pixels is determined in advance, and the off-dot processing order data is described as shown in FIG. 102 and stored in the storage device incorporated in the computer or printer main body for executing this processing. In converting the pixels into off-dots in accordance with the order shown in FIG. 101, the pixel value converted into an off-dot is subtracted from the density increase amount ΔD on the basis of equation (3.2).

$$\Delta D = \Delta D - I_y(N \cdot L_x^z + R_x^k, N \cdot L_y^z + R_y^k) \quad (3.2)$$

Next, in step S1406, this off-dot processing is repeated until ΔD<0. When off-dot processing is ended, the flow advances to step S1407 to attach a pixel constructing the dot pattern onto the image $I_y(x,y)$. Until the dot pattern is embedded at all positions in step S1408, the above-described processing from step S1403 is repeated.

Figure 103A:
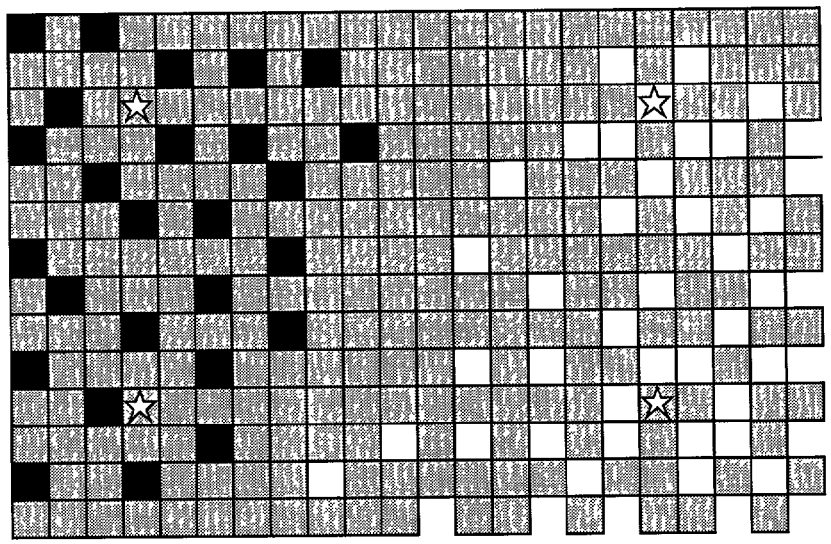
FIGS. 103A and 103B are views showing images before and after off-dot processing in this embodiment.
Figure 103B:
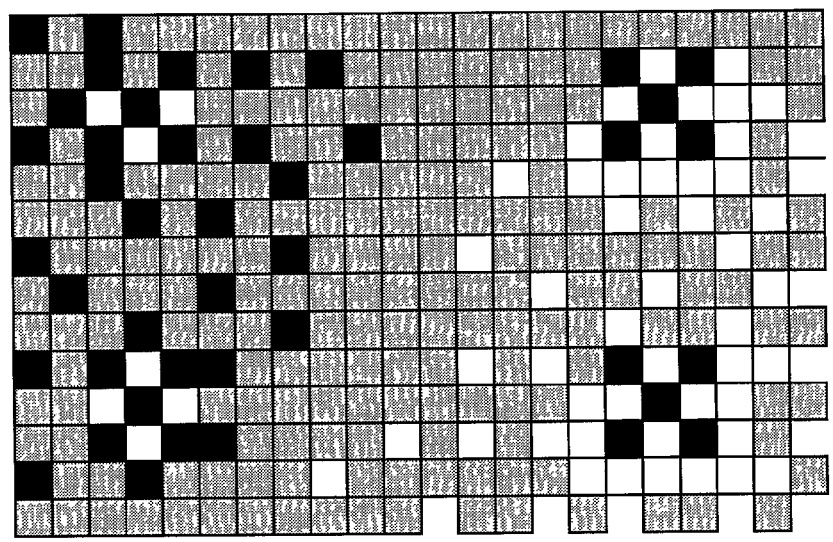
Figure 104:
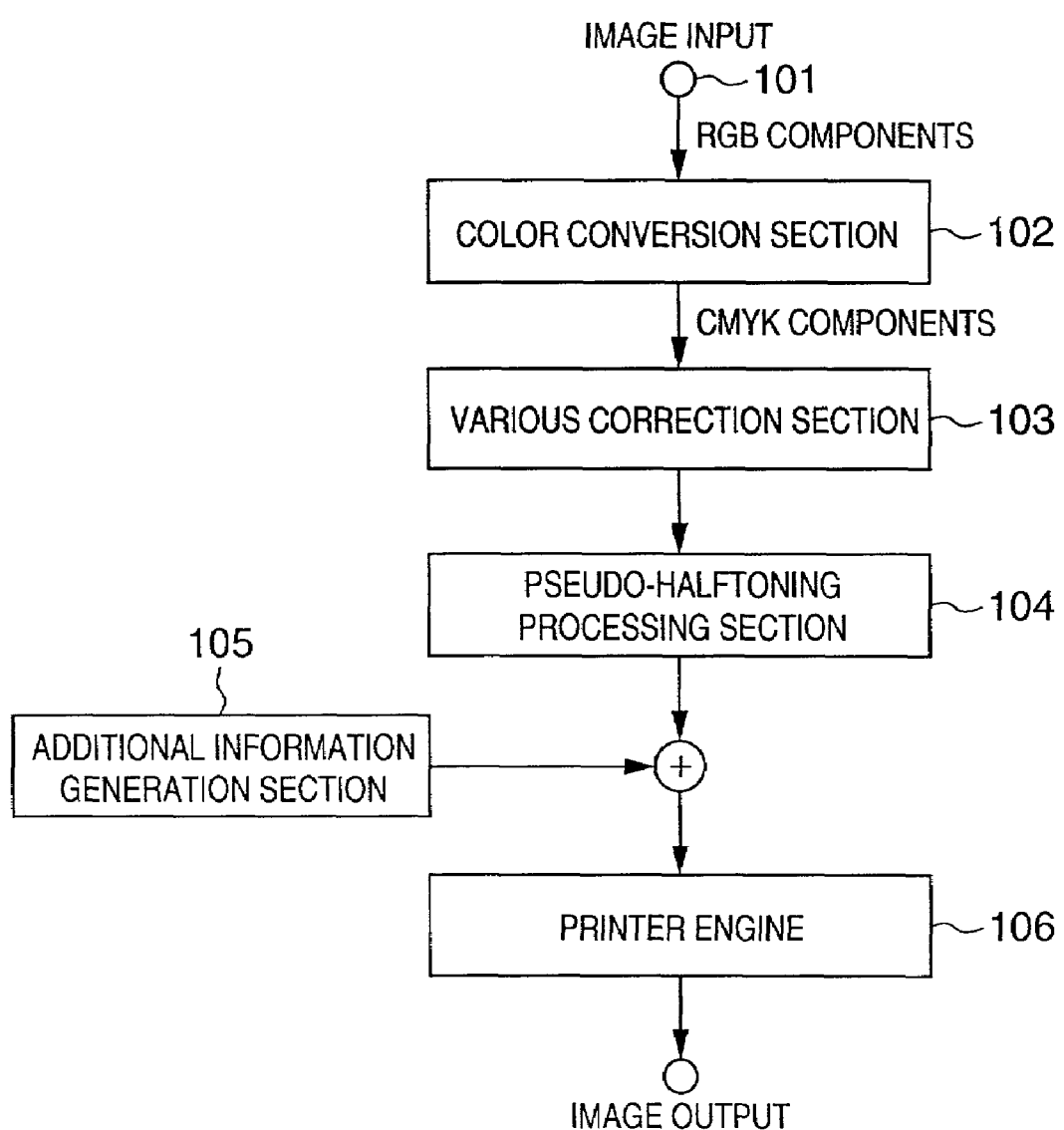
FIG. 104 is a block diagram showing conventional additional information superposition processing.
Figure 105:
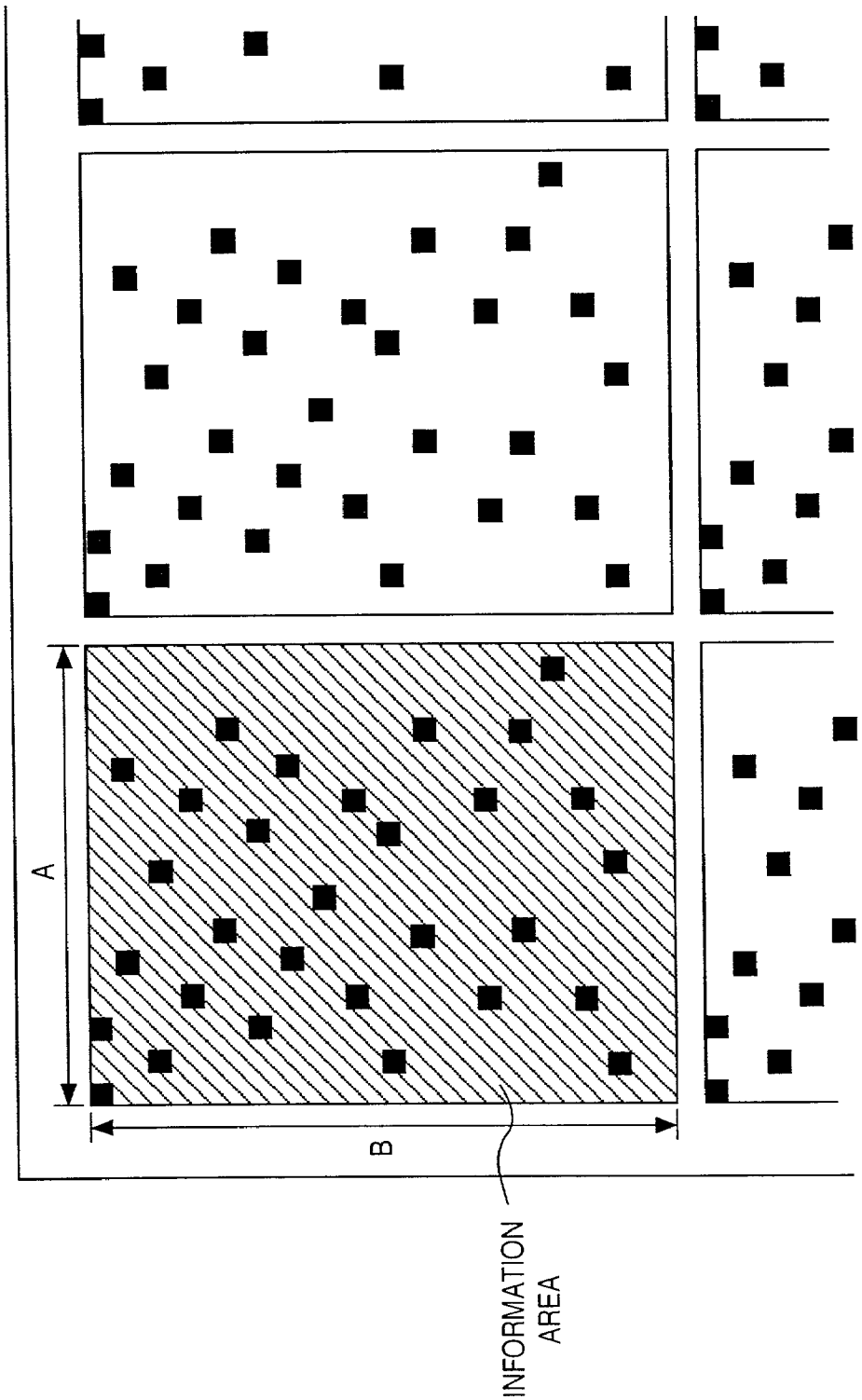
FIG. 105 is a view showing a yellow plane to which a dot pattern is attached.
Figure 106:
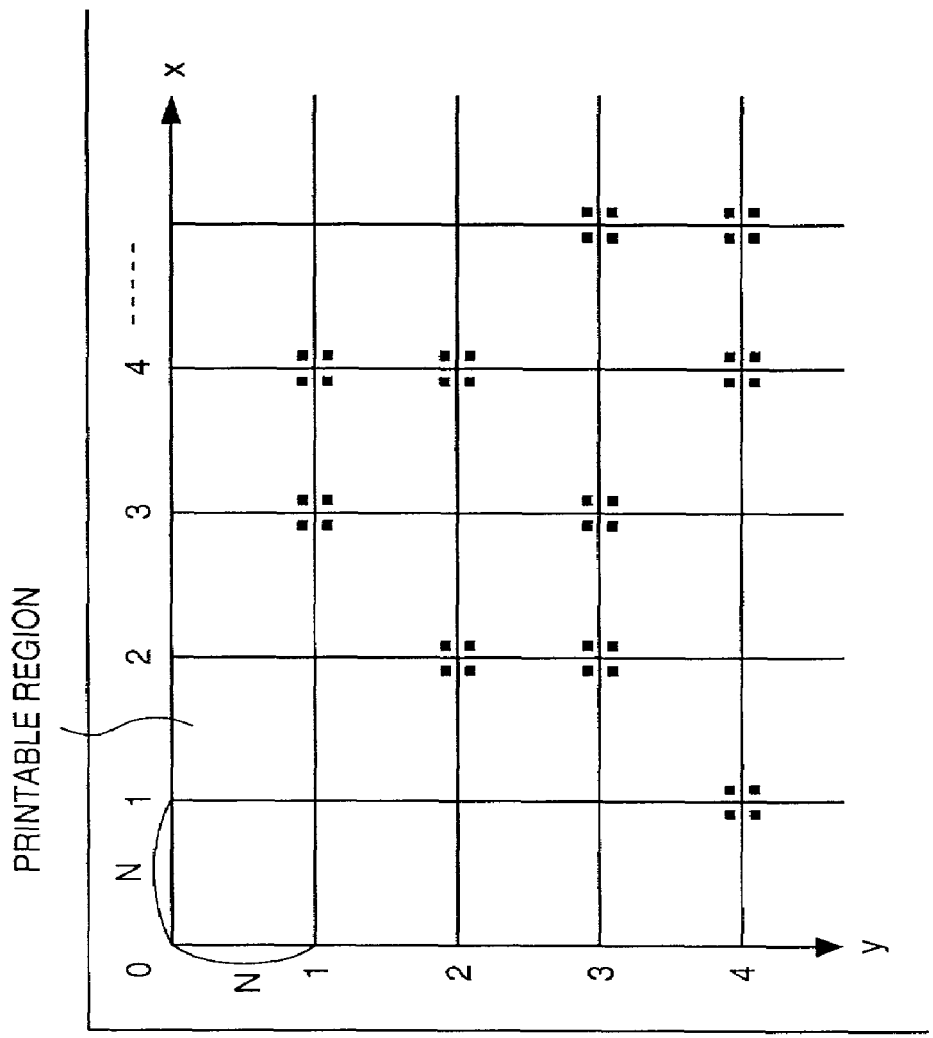
FIG. 106 is a view showing an image to which the dot pattern is attached.
Figure 107:
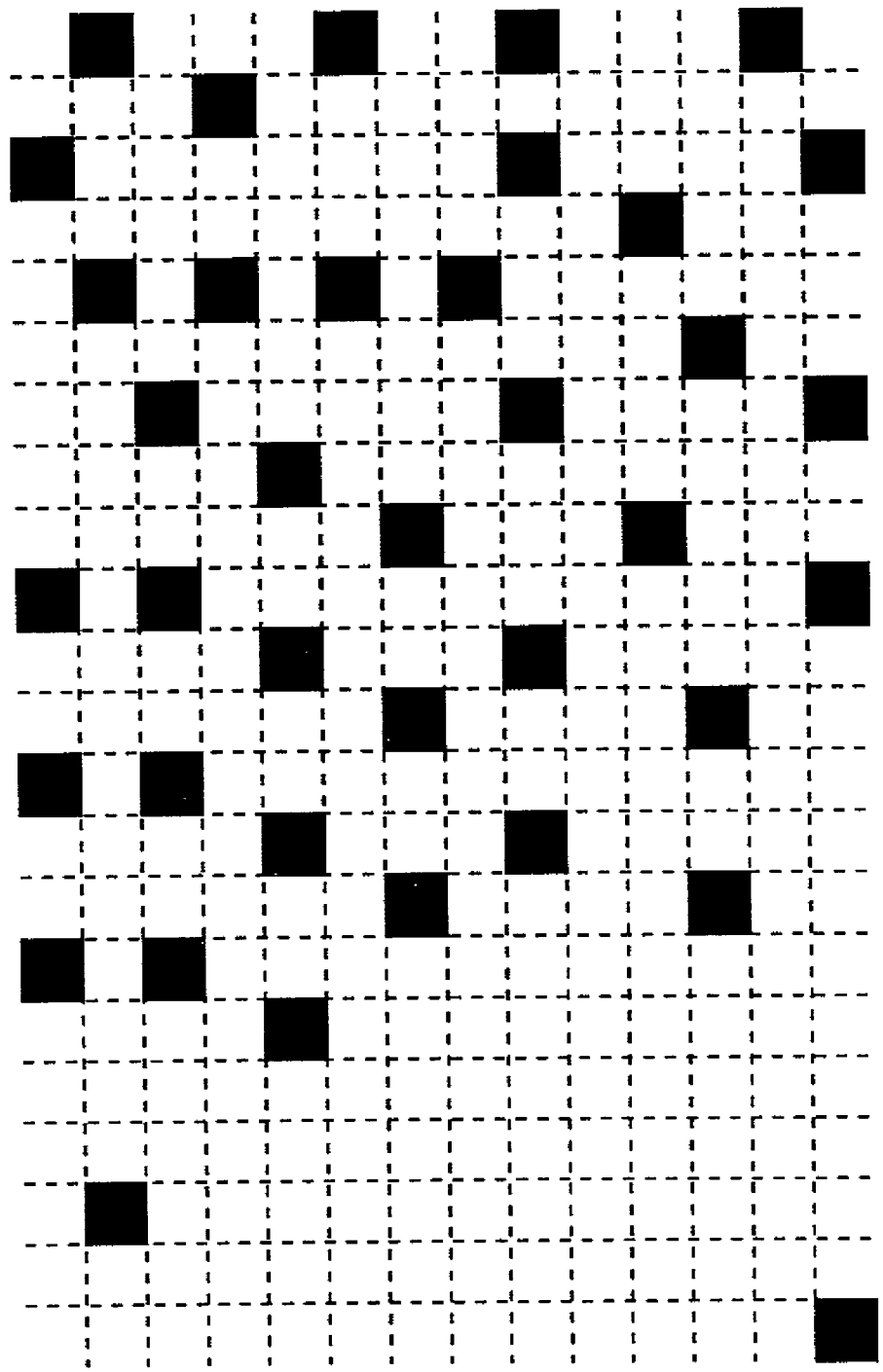
FIG. 107 is a view showing an image after pseudo-halftoning processing.
Figure 108:
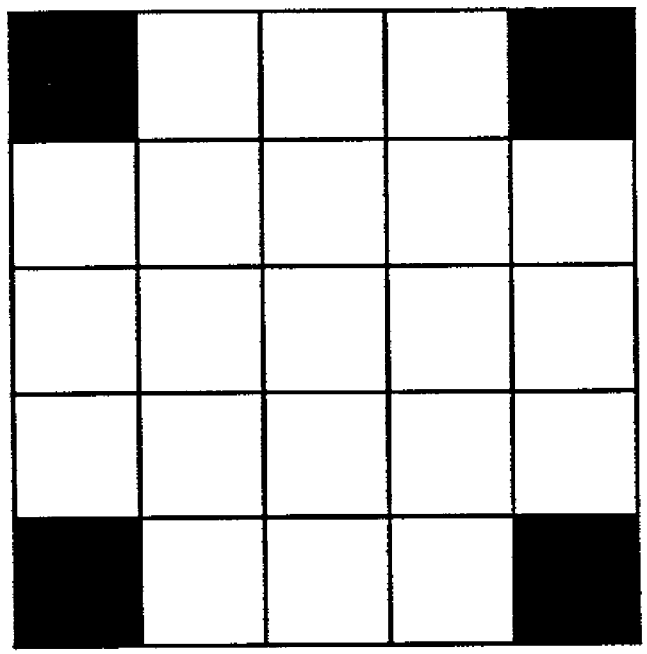
FIG. 108 is a view showing a dot pattern to be attached.
Figure 109:
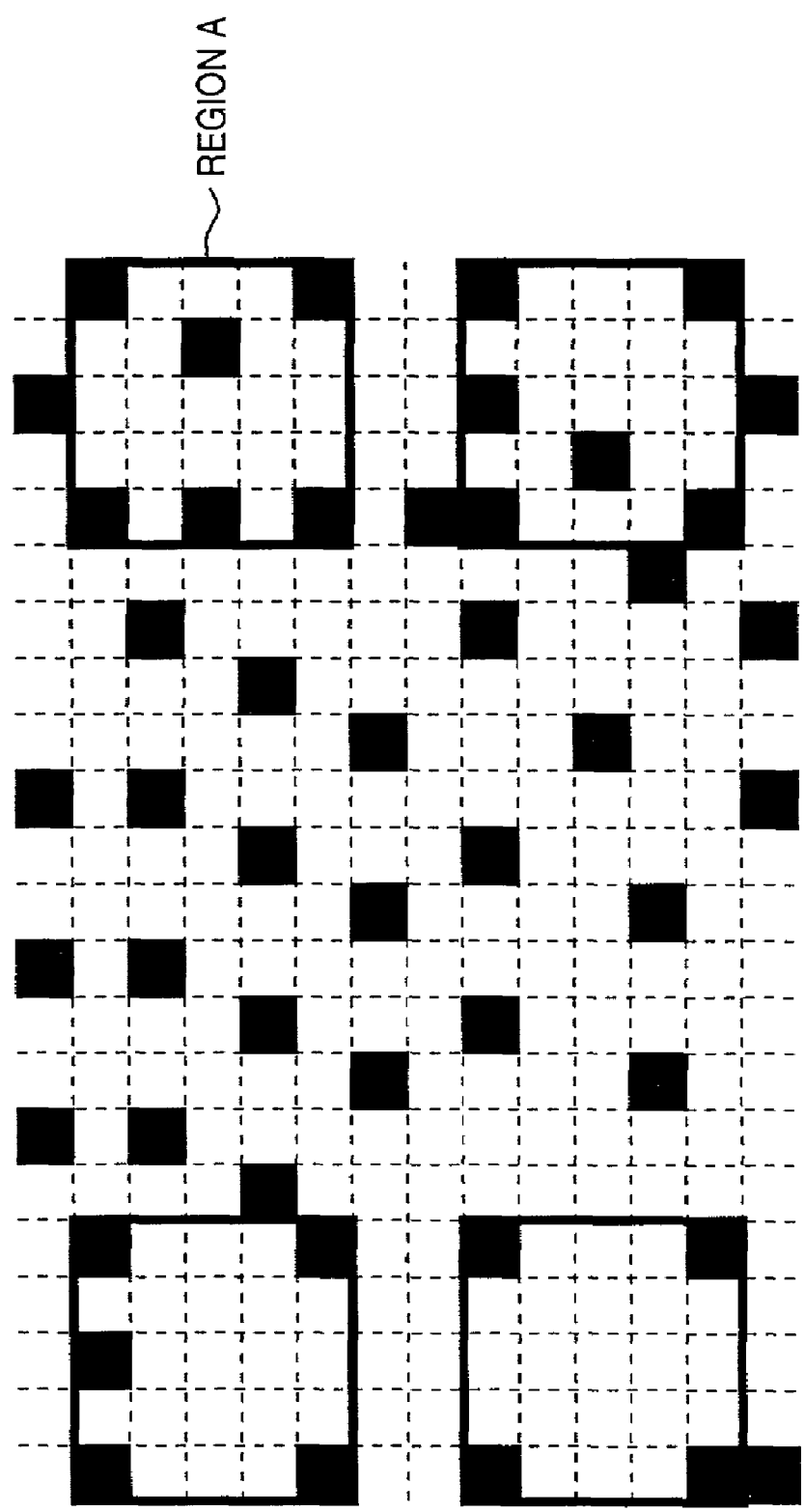
FIG. 109 is a view showing an image after conventional dot pattern attachment processing.
Figure 110:
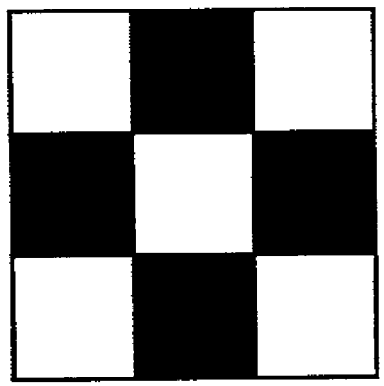
FIG. 110 is a view showing a dot pattern having a smaller pixel interval.
Figure 111:
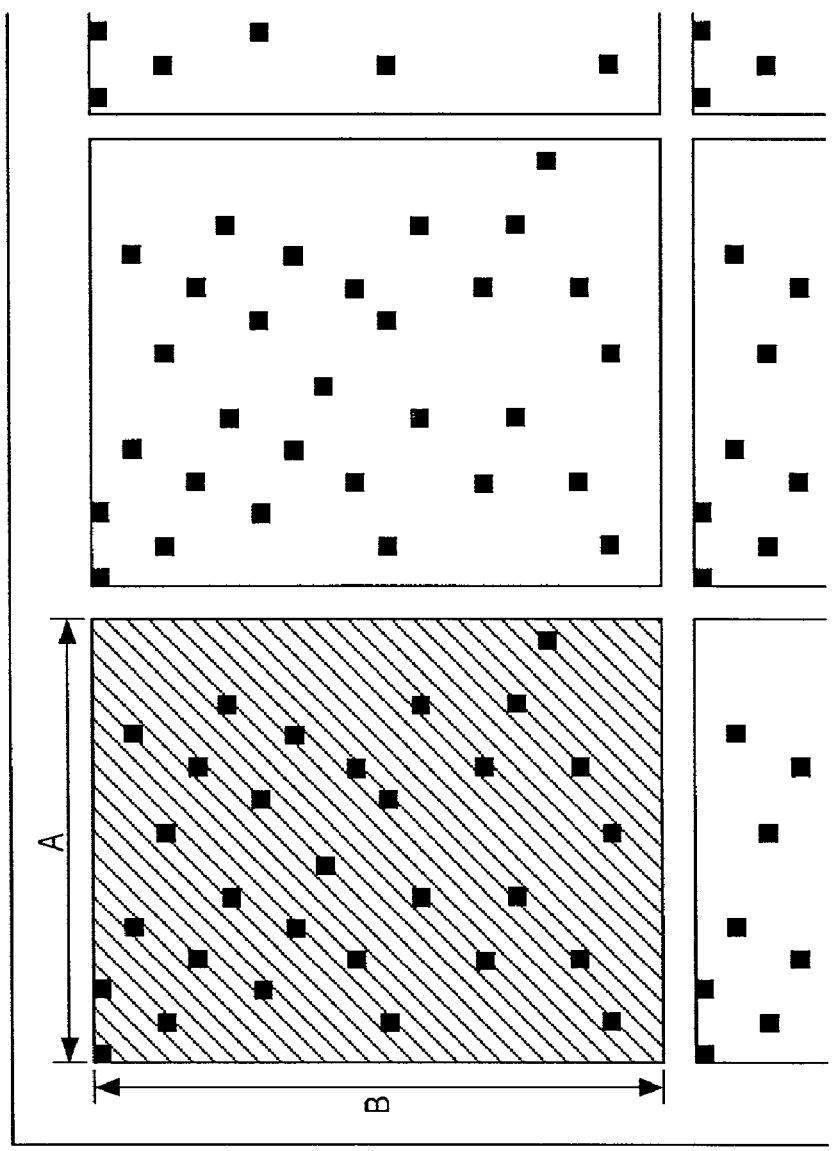
FIG. 111 is a view showing a yellow plane to which a general dot pattern is attached.
Figure 112:
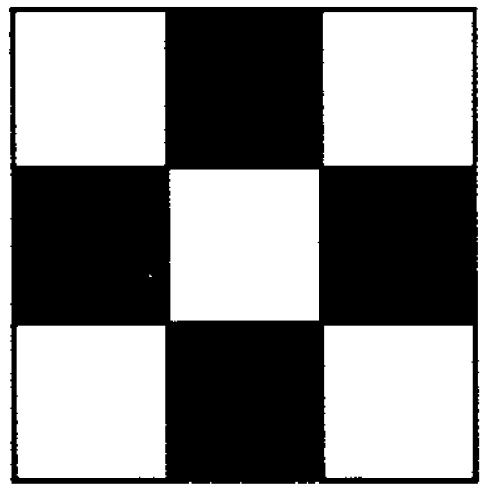
FIG. 112 is a view showing a conventional dot pattern to be attached.
Figure 113:
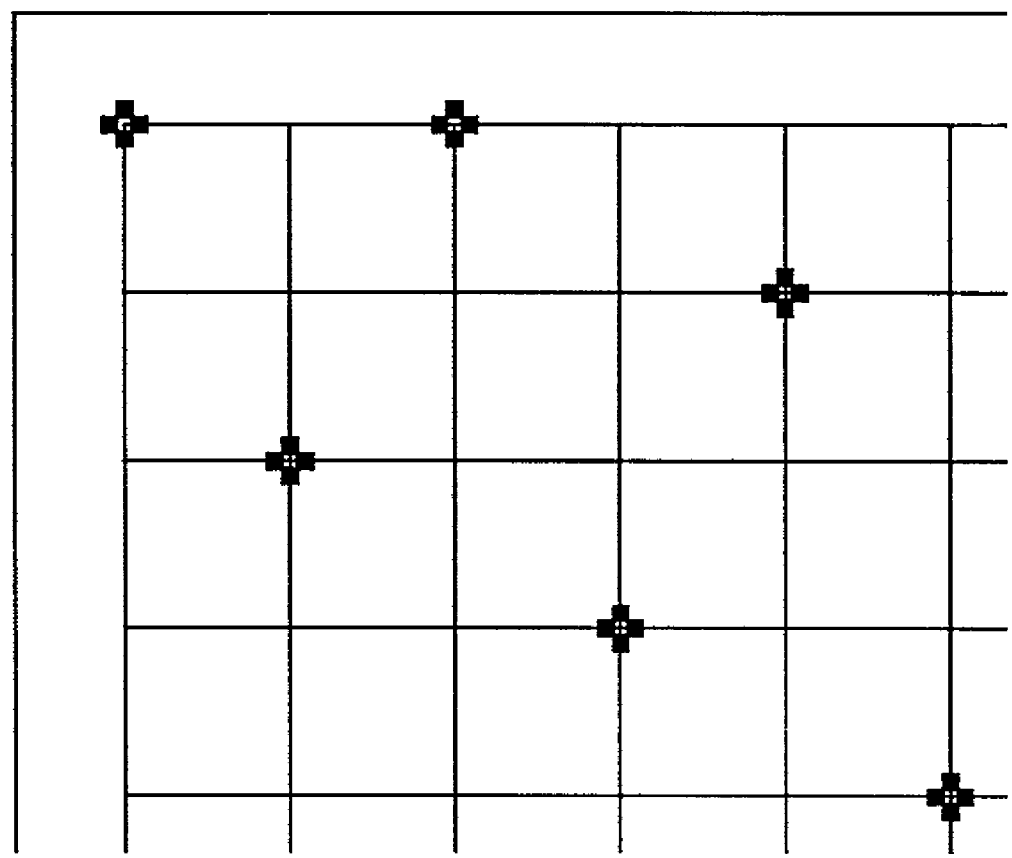
FIG. 113 is an enlarged view of a yellow plane to which the conventional dot pattern is attached.
Figure 114A:
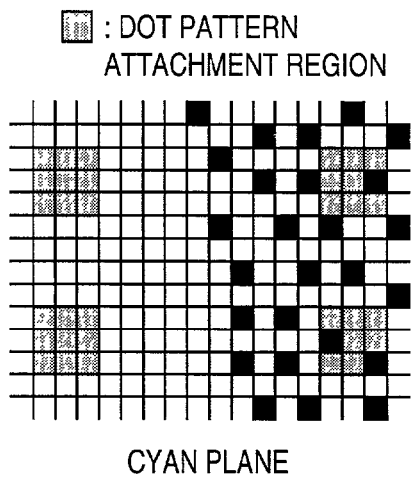
FIGS. 114A to 114D are views showing CMYK components after conventional pseudo-halftoning processing.
Figure 114B:
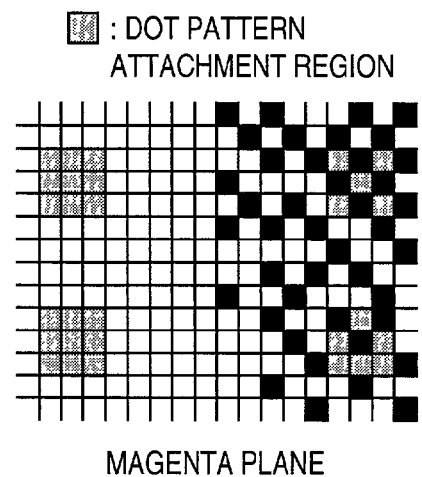
Figure 114C:
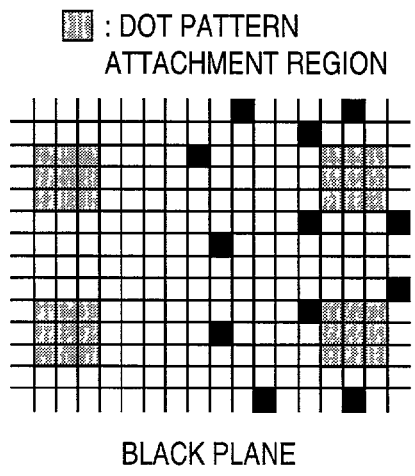
Figure 114D:
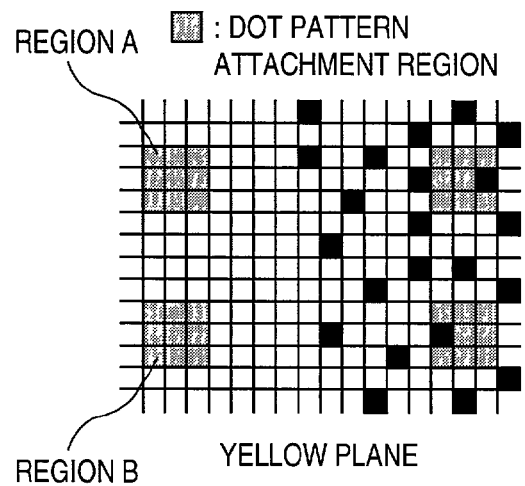
Figure 115:
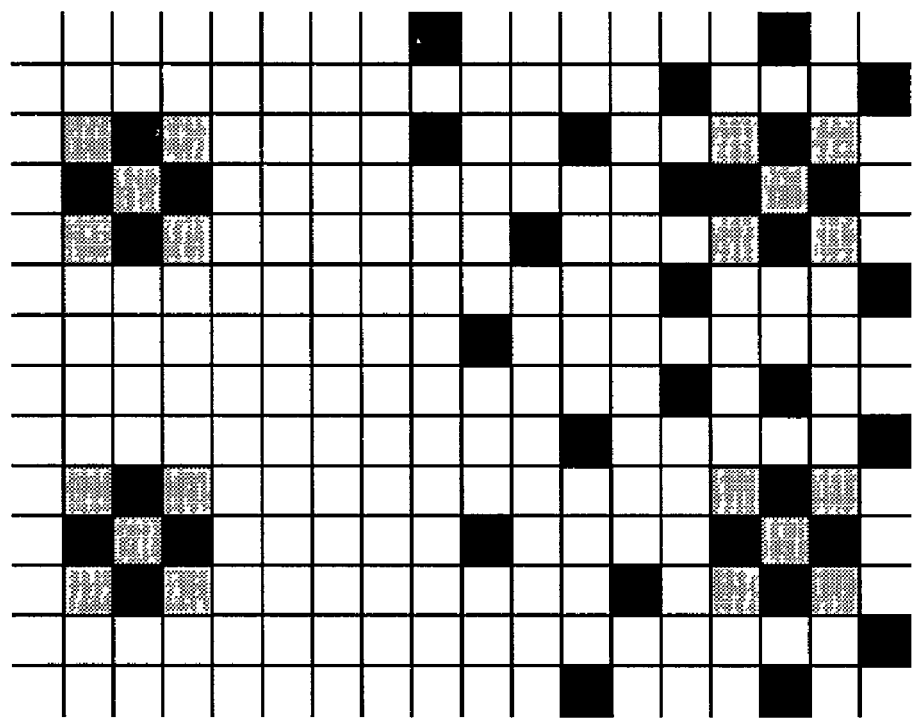
FIG. 115 is a view showing a Y plane after dot pattern attachment processing by a conventional dot pattern attachment method.

FIGS. 103A and 103B are views showing images before and after off-dot processing in this embodiment.

According to the above-described embodiment, the sum of density levels can be maintained around the dot pattern attachment position, so additional information can be superposed with little visual incompatibility.

As has been described above, according to the present invention, in attaching additional information having a specific dot pattern onto an image that has undergone pseudo-halftoning processing, pixels present around the attachment position are converted into off-dots, thereby maintaining the density state. Hence, additional information can be superposed with little visual incompatibility.

In addition, information can be attached with little visual incompatibility by adjusting the density of image information around the additional information attachment position in accordance with the density of additional information to be attached.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The present invention can be implemented even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention. As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
   discrimination means for discriminating characteristics of image information of a first region included in a region of a first dot pattern representing predetermined information;
   generation means for generating a second dot pattern representing any one of a plurality of types of dot patterns in accordance with a discrimination result by said discrimination means;
   embedding means for embedding the second dot pattern in the first region; and
   means for repeatedly executing discriminating characteristics of image information of a next first region, generating a second dot pattern, and embedding the second dot pattern in the next first region, until the region of the first dot pattern is embedded.

2. The apparatus according to claim 1, wherein the second dot pattern is a dot pattern formed from a single line.

3. The apparatus according to claim 1, wherein the first dot pattern comprises the second dot pattern.

4. The apparatus according to claim 1, wherein said embedding means quantizes the first region to output quantized image information containing the second dot pattern.

5. The apparatus according to claim 4, further comprising determination means for determining a quantization condition on the basis of the image information in the first region, the predetermined information, and the second dot pattern, wherein said embedding means quantizes the first region on the basis of the determined quantization condition.

6. The apparatus according to claim 4, wherein the quantization is executed by pseudo-halftoning processing using error diffusion.

7. The apparatus according to claim 1, wherein said discrimination means discriminates a quantization error previously generated in the first region by said embedding means.

8. The apparatus according to claim 1, wherein said discrimination means discriminates a type of the second dot pattern previously embedded by said embedding means.

9. The apparatus according to claim 1, wherein said embedding means inhibits embedding the second dot pattern when it is determined on the basis of the discrimination result by said discrimination means that the first region has a predetermined density.

10. An image processing method, comprising:
- a discrimination step of discriminating characteristics of image information of a first region included in a region of a first dot pattern representing predetermined information;
- a generation step of generating a second dot pattern representing any one of a plurality of types of dot patterns in accordance with a discrimination result in the discrimination step;
- an embedding step of embedding the second dot pattern in the first region; and
- a step of repeatedly executing discriminating characteristics of image information of a next first region, generating a second dot pattern, and embedding the second dot pattern in the next first region, until the region of the first dot pattern is embedded.

11. A computer-readable memory, comprising:
- a code for discriminating characteristics of image information in a first region included in a region of a first dot pattern representing predetermined information;
- a code for generating a second dot pattern representing any one of a plurality of types of dot patterns in accordance with the discrimination;
- a code for embedding the second dot pattern in the first region; and
- a code for repeatedly executing discriminating characteristics of image information of a next first region, generating a second dot pattern, and embedding the second dot pattern in the next first region, until the region of the first dot pattern is embedded.

* * * * *

UNITED STATES PATENT AND TRADEMARK OFFICE
CERTIFICATE OF CORRECTION

| | |
|---|---|
| PATENT NO. | : 7,372,594 B1 |
| APPLICATION NO. | : 09/671623 |
| DATED | : May 13, 2008 |
| INVENTOR(S) | : Minoru Kusakabe et al. |

It is certified that error appears in the above-identified patent and that said Letters Patent is hereby corrected as shown below:

IN THE DRAWINGS:
On "Sheet 60 of 115," in "FIG. 60," in logic box "704," "PSEUD-HALFTONING" should read -- PSEUDO-HALFTONING --.

COLUMN 26:
Line 22, "if" should read -- If --.

COLUMN 32:
Line 12, "color," should read -- color --.

COLUMN 35:
Line 36, "continuos" should read -- continuous --.
Line 38, "continuos" should read -- continuous --.

COLUMN 49:
Lines 26-35, "if (D<thres1)

$$I_y(L_x^z+P_{lz}^c, L_y^z+P_{ly}^c) = 1,\ 1 \leq c \leq C \quad (2.1)$$

else if (D<thres2)
$$I_y(L_x^z+P_{mz}^c, Lyz+Pmy^c) = 1,\ 1 \leq c \leq C \quad (2.2)$$

else
$$I_y(L_x^z+P_{hz}^c, L_y^z+P_{hy}^c) = 1,\ 1 \leq c \leq C \quad (2.3)"\text{ should read as follows:}$$

-- if (D<thres1)
$$I_y(L_x^z+P_{lx}^c, L_y^z+P_{ly}^c) = 1,\ 1 \leq c \leq C \quad (2.1)$$

else if (D<thres2)
$$I_y(L_x^z+P_{mx}^c, L_y^z+Pmy^c) = 1,\ 1 \leq c \leq C \quad (2.2)$$

else
$$I_y(L_x^z+P_{hx}^c, L_y^z+P_{hy}^c) = 1,\ 1 \leq c \leq C \quad (2.3) \text{ --.}$$

UNITED STATES PATENT AND TRADEMARK OFFICE
CERTIFICATE OF CORRECTION

PATENT NO. : 7,372,594 B1
APPLICATION NO. : 09/671623
DATED : May 13, 2008
INVENTOR(S) : Minoru Kusakabe et al.

It is certified that error appears in the above-identified patent and that said Letters Patent is hereby corrected as shown below:

COLUMN 54:
Line 16, "$I_y(L_x^z+P_{hz}^c, L_y^z+P_{hy}^c)= 1, 1\leq c \leq C$  (2.3)" should read -- $I_y(N \cdot L_x^z+P_x^c, N \cdot L_y^z+P_y^c)= 1, 1\leq c \leq C$  (2.5) --.

COLUMN 58:
Line 4, "$\Delta D = M \cdot V \cdot \Sigma I_y(N \cdot L_x^z+P_x^k, N \cdot L_y^z+P_y^k)$  (2.1)" should read -- $\Delta D = M \cdot V - \Sigma I_y(N \cdot L_x^z+P_x^z, N \cdot L_y^z+P_y^k)$  (2.1) --.

Signed and Sealed this

Tenth Day of February, 2009

JOHN DOLL
*Acting Director of the United States Patent and Trademark Office*